United States Patent [19]

Hungerford et al.

[11] 3,810,100

[45] May 7, 1974

[54] LOOPED DIRECT SWITCHING SYSTEM

[75] Inventors: Laurence D. Hungerford; Clarence G. Marshall, both of Cedar Rapids, Iowa

[73] Assignee: Collins Radio Company, Dallas, Tex.

[22] Filed: Dec. 16, 1971

[21] Appl. No.: 208,548

[52] U.S. Cl. .......................... 340/172.5, 179/15 AL
[51] Int. Cl. ............................................ H04j 3/16
[58] Field of Search ............ 340/172.5; 179/15 AL; 178/2 D, 69 G

[56] References Cited

UNITED STATES PATENTS

| | | | |
|---|---|---|---|
| 3,519,750 | 7/1970 | Beresin et al. | 179/15 AL |
| 3,579,191 | 5/1971 | Andreae et al. | 340/172.5 |
| 3,586,782 | 6/1971 | Thomas | 179/15 AL |
| 3,597,549 | 8/1971 | Farmer et al. | 179/15 AL |
| 3,632,881 | 1/1972 | Graham | 179/15 AL |
| 3,651,474 | 3/1972 | Liberman | 340/172.5 |
| 3,659,271 | 4/1972 | Collins | 340/172.5 |
| 3,676,846 | 7/1972 | Busch | 340/172.5 X |
| 3,680,056 | 7/1972 | Kropfl | 340/172.5 |
| 3,681,759 | 8/1972 | Hill | 340/172.5 |
| 3,692,941 | 9/1972 | Collins et al. | 179/15 AL |
| 2,192,961 | 3/1940 | Branson et al. | 178/2 D |
| 3,331,923 | 7/1967 | Neiswinter et al. | 178/69 G |
| 3,569,635 | 3/1971 | Bloch et al. | 178/2 D X |
| 3,648,256 | 3/1972 | Paine et al. | 340/172.5 |
| 3,710,026 | 1/1973 | Graham et al. | 179/15 AL |
| 3,731,002 | 5/1973 | Pierce | 179/15 AL |
| 3,732,543 | 5/1973 | Rocher et al. | 340/172.5 |
| 3,735,362 | 5/1973 | Ashany et al. | 340/172.5 |

OTHER PUBLICATIONS

Unk, J. M.; "Communication Networks for Digital Information" in IRE Transactions on Communications Systems; Dec., 1960; pp. 207–214.

Hayes, J. F. and Sherman, D. N.; "Traffic Analysis of a Ring Switched Data Transmission System" in The Bell System Technical Journal; Vol. 50, No. 9, Nov. 1971; pp. 2947–2978.

E. N. Barnes et al.; "Bypass Function for Stations on a Closed Communication Loop" in IBM Technical Disclosure Bulletin, Vol. 14, No. 2, July 1971, p. 488.

*Primary Examiner*—Paul J. Henon
*Assistant Examiner*—Melvin B. Chapnick

[57] ABSTRACT

A communication system for transmitting messages between calling and called parties wherein the message is divided into predetermined length blocks and transmitted a block at a time. The concept includes the possibility of a very complex system wherein the message is transmitted via communication links from one node to the next node such that the transmitting party does not have a solid connection to the ultimate receiving party. In other words the transmission of a block from one node to the next is completed and satisfactory receipt is acknowledged before the message block is transmitted to a further node. The message blocks can be transmitted at a time when some of the nodes connecting the calling and called parties are busy with other messages such that the message block is stored in each node of the connection path until the following node is clear to receive a new message block.

38 Claims, 68 Drawing Figures

INVENTORS
LAURENCE D. HUNGERFORD
CLARENCE G. MARSHALL
BY Bruce C Lutz
ATTORNEY

TT = $(\overline{RESDEL}) \cdot (\overline{POLDEL} + \overline{RDYCAL}) \cdot (\overline{SENPOL} + \overline{RDYCAL} + POLIN)$

VV = TXCD · CNT = 1056 + TXCD · CNT = 72

* SEE NOTE IN DESCRIPTION re RDWT · CTLDT

WW = $\overline{INLCK}$ · STCON · CTLDT · $\overline{RDWT}$

XX = $\overline{INLCK}$ · STCON · $\overline{CTLDT}$ · TXINT

YY = $\overline{INLCK}$ · STCON · CTLDT · TXINT · $\overline{CTLRX}$ · LPBUSY

ZZ = $\overline{INLCK}$ · STCON · $\overline{WW}$ · $\overline{XX}$ · $\overline{YY}$

LOOPED DIRECT SWITCHING SYSTEM

THE INVENTION

The present invention is generally directed toward communication, and more specifically, toward a network which provides subscriber-to-subscriber connections by the routing of discrete digital message segments over shared transmission facilities.

BACKGROUND OF THE INVENTION

In the prior art, subscriber-to-subscriber connections were provided by a switched circuit connection between the two parties. This hardline connection provided a dedication of the network transmission facilities for the duration of the transaction independent of actual information flow; and furthermore, required the existence of a discrete circuit through the network for each transaction in progress. In certain instances many conversations have been concentrated on a single circuit to minimize the discrete circuit requirements of the communications network. In time division multiplexed systems, a fixed number of time slots, or a certain amount of circuit capacity of the transmission links, has been dedicated to each connection for the duration of a transaction; this results in a loss of efficiency since the character of the information exchange between connected subscriber terminals does not require the full time dedication of the circuit. In all of the previous systems, the switching circuits which provide the establishment of connections between subscriber terminals have been implemented as centralized switching matrices. The network efficiency is impaired by this implementation by the requirement to transmit all messages to a switching node for routing to the connected station.

SUMMARY OF THE INVENTION

The present invention is a distributed network which provides subscriber-to-subscriber connections on the basis of traffic requirements. The communication links are arranged to provide a switched path between terminal pairs by means of directly routing messages on the basis of an associated address field. The shared transmission links connected as closed loops provide the logic of fully-connected switching exchanges with respect to the connected nodes or subscriber terminals. Each node in the present network is configured with a fixed length message segment storage buffer which permits sharing the common transmission link by responding to a poll signal when a full buffer is available for transmission. Each node is configured to recognize a discrete address appended to each message block on the transmission links and accept appropriate messages into the associated message segment buffer. The network therefore permits maximum use of the transmission links by allocating the links on the basis of available traffic and by providing direct switching of message traffic between subscriber nodes. The network is further extended by interconnecting the switching exchanges with high usage trunks; which, through the use of buffered nodes, provide a highly concentrated traffic flow stream between exchanges with resulting efficient use of the network. The connection of digital computers to the network provides a further extension of service functions available to subscriber terminals and permits the implementation of more complex network supervisory functions.

It is accordingly an object of the present invention to provide improved communication apparatus.

BRIEF DESCRIPTION OF THE DRAWINGS

Other objects and advantages of the invention may be ascertained from a reading of the specification and appended claims in conjunction with the drawings wherein:

DESCRIPTION OF THE PREFERRED EMBODIMENT

FIG. 1

Figures 1, 2:
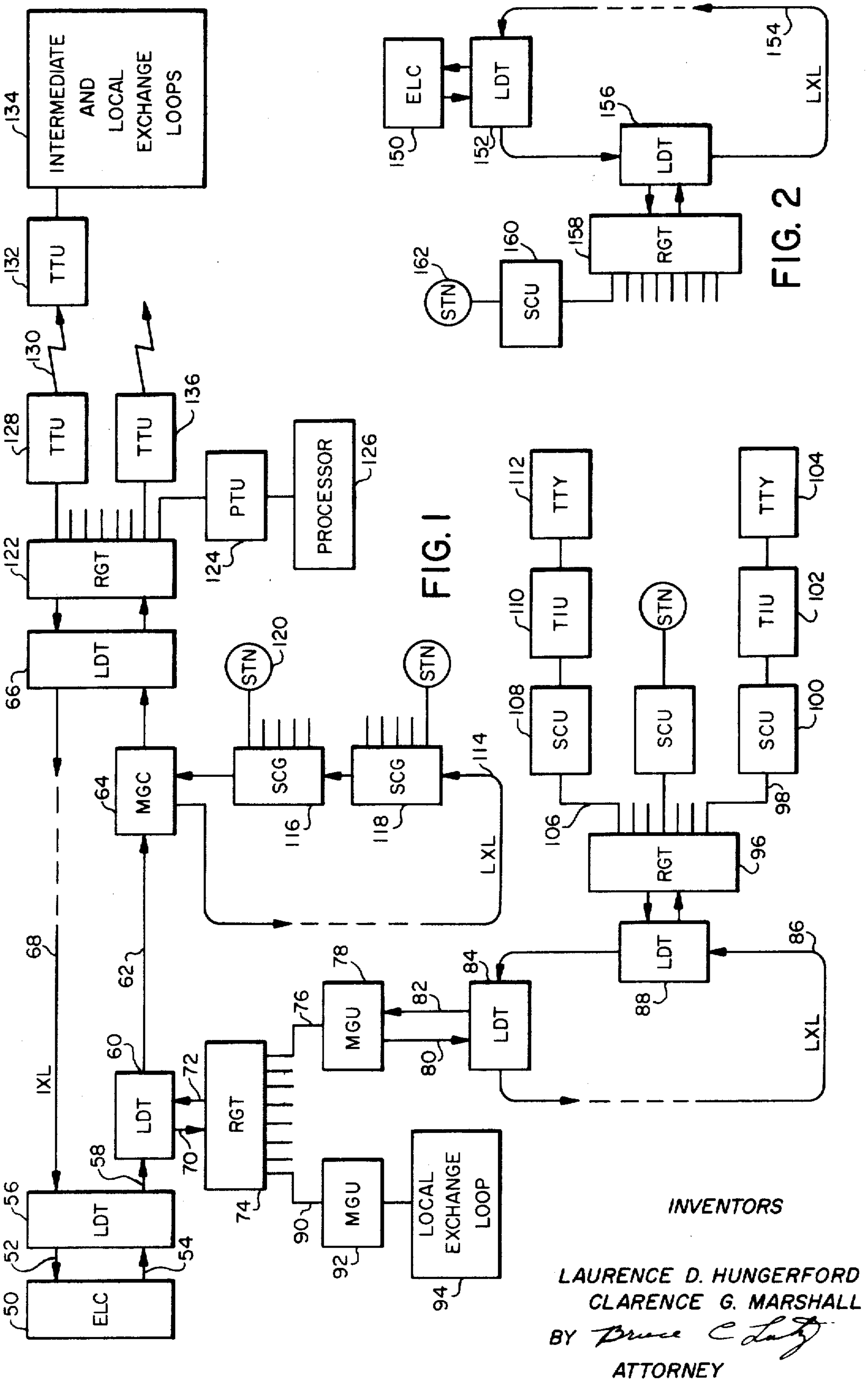
FIG. 1 is an overall block diagram of a preferred embodiment of the invention.
FIG. 2 is a block diagram disclosure of a simple or small communication network utilizing the teachings of the invention.

FIG. 1 discloses the block diagram connection for the system concept of this disclosure. The remaining figures amplify on the disclosure of FIG. 1. While the basic overall system is believed inventive, most of the blocks utilized in implementing the overall system are also believed inventive. Therefore, the remaining figures are utilized in describing the main invention and in amplifying upon the concepts incorporated in designing and producing the individual blocks of FIG. 1.

Figure 26:
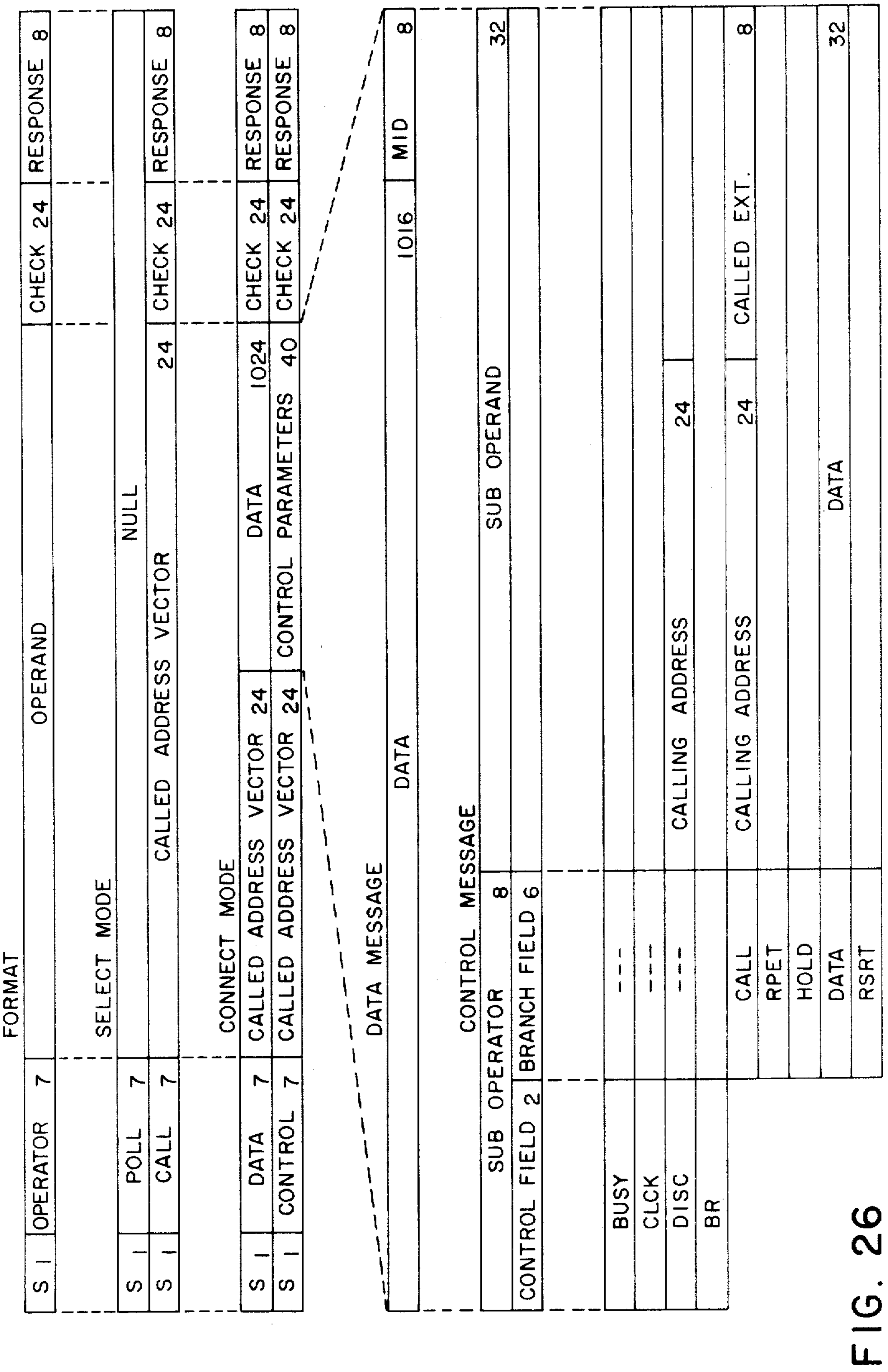
FIG. 26 illustrates the format of SELECT and CONNECT messages transmitted in one embodiment of the invention.

An ELC (Exchange Loop Control) block or intermediate loop controller switching means 50 is shown connected by leads 52 and 54 to a LDT (Loop Driver Terminator) block 56. An output of block LDT 56 is shown as a lead 58 connected to a LDT block 60 which is further connected by a lead 62 to a MGC (Master Group Control) block buffer means, intermediate node message storage and forwarding means or master station switching node means 64. An output of MGC block 64 is connected through a LDT block 66 back to the LDT block 56 via a dash line connection 68. Connection 68 is shown as a dashed line in part to symbolize the fact that many more connections may be placed on this circular line or closed loop connection. One embodiment of the invention was designed by addressing to utilize 64 MGU's (Master Group Units), 64 TTU's (Truck Terminal Units), and 64 PTU's (Processor Terminal Units) simultaneously. This loop including the LDT blocks 56, 60, and 66, along with MGC 64 is in this specification termed an IXL (Intermediate Exchange Loop). The LDT 60 is connected via leads 70 and 72 to a RGT (Regenerative Tap) 74. RGT 74 has many outputs of which a first lead 76 is connected to a MGU (Master Group Unit) block 78. MGU 78 is connected via leads 80 and 82 to a LDT unit 84. A closed loop designated as 86 starts from one side of LDT 84 and continues through dashed lines, a LDT unit 88 and returns to and through LDT 84. The loop is described as closed because, as will be determined later, any unit on a loop may communicate directly with any other unit without having to first send the message to a master unit for retransmission. Rather, the message passes through the master unit which merely notes its passage. This loop is designated as a LXL (Local Exchange Loop). Again, the dash lines indicate that many more LDT's may be connected to LXL 86. Similar to the IXL loop indicated above, one embodiment of the invention utilized 64 (Station Control Unit) SCU's in the local exchange loop. Another lead 90 connects RGT 74 to a MGU 92. MGU 92 is connected to a further local exchange loop 94. As indicated RGT 74 has six other leads which may or may not be connected to further MGU's. In actual practice the RGT's are normally strapped so that all of the MGU's are connected to the first few taps if less than the total number of leads provided are to be utilized. The MGC 64 represents the combination of one or more LDT's, RGT's, and MGU's. As will be noted, LDT 88 is connected to a RGT 96 which is connected via a first lead 98 to a SCU (Station Control Unit), subordinate station node means, message storage means, or buffer node means 100. The Station Control Unit 100 is connected via a terminal interface unit (TIU) 102 to a teletypewriter device (TTY), terminal means, message receiving means and/or message originating means 104. A further lead 106 from RGT 96 is connected through a SCU 108, a TIU 110 to a further TTY 112. The TIU 102 shown in this disclosure is adapted for connection to a single TTY and is merely an interface unit between the present direct switch and the teletypewriter unit which must be individualized for each type of teletypewriter. If more than one TTY per SCU is used, the called extension portion of the CONNECT call operand is used as illustrated in FIG. 26.

MGC 64 has a local exchange loop 114 which connects a pair of SCG's 116 and 118 in the loop. The terminology SCG stands for Station Control Group and includes one or more LDT's, RGT's, and SCU's. As shown, each of the SCG's 116 and 118 is presently connected to only a single station (STN) such as 120. The STN 120 would include a TIU and at least one teletypewriter unit.

The LDT 66 is connected to a RGT 122 which has a first connection through a PTU (Processor Terminal Unit) 124 to a processor or computer means 126. A further connection is made through a TTU (Trunk Terminal Unit) 128 through a trunk line 130 and then through a further TTU 132 to a further or remote set of intermediate and local exchange loops 134. The block 134 would represent a remote area while the group connected to IXL 68 would represent a local area. Other areas could be connected via further TTU's such as TTU 136. In this manner various areas of communication may be connected together for communication therebetween. A further embodiment included in the concept of this invention is to use a further higher speed exchange loop which would connect each of the areas together in a high speed exchange loop (HSXL) rather than through the use of TTU's. However, in many instances such a HSXL would be uneconomical because of the great distances involved and the fact that the long distance trunks are already in existence in many areas of the world and thus may be advantageously used.

As will be realized, each of the blocks of FIG. 1 having the same letter or mnemonic designations therein are identical units. Further, the single leads shown in various places such as 68, 70, 76, 80, and 86 are not single leads but rather are cables comprising a plurality of leads as will be ascertained from a review of the detailed description of later figures.

In the later discussions of the system it should be realized that the RGT's such as 96 and 74 are necessary only for the connection of more than one control switching means to a single loop connection such as the LDT connecting means. In fact, if only a single SCU or MGU is to be connected at a given point on a loop, the modulation and demodulation means may be incorporated in the switching unit or, if the loop is short, the loop can operate directly on TTL logic and no modem is necessary. In view of the above it should be realized that terms such as "station control switching means" would, as pertains to SCU 108, include a portion of RGT 96 and the function of LDT 88 in its terminology. The term "master group controller switching means" as applied to MGU 78 would include a portion of RGT 74 as well as the functions of LDT's 60 and 84.

GENERAL DESCRIPTION OF OPERATION OF FIG. 1

As indicated previously the present invention provides for more efficient transmission of messages from node to node in a data link or communication system. In general a SCU, MGU, TTU, or PTU is indicative of a node in the data link. If TTY 104 wishes to communicate with TTY 112, a message will be placed in the unit 104 indicating the address of TTY 112 and SCU 100 will be notified, via TIU 102, of the fact that TTY 104 wishes to send a message. If there is more than one unit such as 104 connected to SCU 100, 104 may have to wait until it is polled in some type of order before it can notify SCU 100 that it wishes to call another party. However, once SCU 100 is notified of a request to call and has the message in its storage buffer, it awaits a single bit SELECT poll sent on the local exchange loop 86 via MGU 78. After each CONNECT message is completed on the exchange loop 86, the MGU 78 sends a new poll which is picked up by the first available SCU having information to transmit on the line. If a SCU has recently placed a communication on the line it may be prevented internally from responding to a given number of future polls. Upon the next poll received by SCU 100, the poll message is changed to a SELECT call by adding more bits after the single poll bit, this call is transmitted around the loop until picked up by SCU 108. Each SCU in succession receives the call but only responds if the address previously given by TTY 104 corresponds with the address of that SCU. In this instance SCU 108 is close by since it is connected to the same RGT 96 and upon receipt of the address, SCU 108 checks with the TTY 112 to see whether or not it has already signified an intention to transmit or is otherwise busy. If the TTY 112 is busy or otherwise unavailable to accept a call, the response portion of the SELECT call message is changed to a busy indication. If the TTY 112 is available to accept a call, the response portion of the SELECT call message is changed to a connect indication. The word continues the circulation around the LXL 86 by leaving RGT 96 and returning to LDT 88 and then to LDT 84 and MGU 78 and back to LDT 84 before returning to LDT 88 and to SCU 100. SCU 100 takes the first word returned and examines to see whether or not TTY 112 is busy or able to accept a call. If TTY 112 is busy, SCU 100 responds to a further poll later on and again attempts to make a call. After a predetermined number of attempts, SCU

100 will give up and so notify TTY 104. However, assuming that TTY 112 acknowledges the call with a connect response, thereby indicating that it is not busy and wishes to accept a call, SCU 100 sends a CONNECT call message. This CONNECT message is transmitted through RGT 96 to SCU 108 which responds by changing the response portion of the CONNECT message to an ACK (ACKNOWLEDGE), indicating a positive acknowledgment if the parity of the receive CONNECT message is correct. If the parity does not properly check, a NAK (NOT ACKNOWLEDGE) is inserted in the response portion of the CONNECT message. The return of the CONNECT message with a negative acknowledgment will cause SCU 100 to again attempt to send a SELECT call and CONNECT message at some future date.

Assuming, however, that the response portion of the CONNECT call message has been changed to ACK, the SCU 100 awaits the receipt of a SELECT call and CONNECT clock (CLCK) message from TTY 112 by SCU 108. Once TTY 104 receives the clock message from TTY 112, the two devices are "connected" and the TTY may commence sending data messages as they are assembled in the storage buffer of the SCU 100.

Under normal conditions the SCU 100 will transmit a message block containing a predetermined number of data characters, using first a SELECT call and then a CONNECT data message and await the return of a SELECT call and CONNECT clock message from TTY 112 indicating satisfactory receipt of the data message, before TTY 104 sends further data characters.

The distinction between SELECT and CONNECT messages should be made at this point. In this embodiment of the invention SELECT messages are data link supervisory messages which always stay within a link or data loop (i.e., between nodes on the same link). The SELECT words comprise a control channel. The CONNECT words on the other hand comprise a working channel of information messages which are transmitted between terminal nodes which may be more than one data link distant. Those CONNECT information messages are passed from node to node and loop to loop via the individual loop SELECT supervisory messages. As may be apparent, the present invention thus allows the sharing of the same data transmission links for both the supervisory and working channels.

As illustrated in this disclosure, the TTY's may continuously transmit message blocks as quickly as they are assembled in the storage buffer of their associated SCU without waiting for a reply CONNECT clock message, but this approach is undesirable since there is no indication that the received message at the called party station makes sense.

As may be ascertained from the above, the changing of the response section of a SELECT call message provides an indication that the next node in the communication path is available to accept a CONNECT message while changing the response portion of the CONNECT message indicates that parity is correct. There is a parity check of the SELECT call messages; however, since as may be ascertained from FIG. 26, the only parity being checked is the called party's address and the data bits utilized in defining a SELECT call message, the lack of parity check would indicate that the called party address was being received by the wrong station. In this instance the parity check portion of the SCU would override the portion indicating that the TTY is available and prevent the response section from being filled with any word. The return of the SELECT call with nothing in the response section would cause the calling SCU or other communication system node to try a further SELECT call at a later date.

The only defined response characters for CONNECT messages in this system are ACK and NAK. Since this is merely a check of parity in the entire CONNECT message, the calling party should await the return of a CONNECT clock indicating that the contents of the message make sense to the called party.

From the above, it will be ascertained that data is supplied as assembled in message blocks, interleaved by return CONNECT clock messages, until all the data is transmitted or for some other reason either party wishes to disconnect. At this time a SELECT call and CONNECT disconnect message is transmitted thereby removing the "connected" condition previously existing between the two stations which would act to refuse messages by either of these stations from third parties.

As will be realized, if the SCU 108 and SCU 100 are connected to more than one TTY, there will occasionally be temporary interference from other TTY's attempt at making SELECT calls even though the two TTY's are "connected." If on the other hand there is only one TTY 112 connected to SCU 108 as assumed in the above description, TTY 112 will automatically receive the message once a CONNECT response has been received from a SELECT call since only one message is placed on a given loop at a given time and since the two TTY's 104 and 112 are already "connected."

It should be apparent, however, that while TTY is formulating further message block portions or is awaiting CONNECT clock replies, other TTY's and SCU's can either be making calls or transmitting data on local exchange loop 86.

The term "connected" in this application refers to the fact that a given station will respond to all CONNECT calls from other parties with a "busy" control message and will accept only messages from a given station to which it is "connected." Thus, the term does not indicate a hard line connection but rather the fact that it is open for business only to a selected one of many stations.

As will be noted, when TTY 104 wishes to communicate with TTY 112, only the facilities up to and including MGU 78 are utilized. If, however, TTY 104 wishes to connect to station 120, a SELECT call is originated and a CONNECT call message is sent out through the local exchange loop 86 and stored in MGU 78. When the next poll is received on the intermediate exchange loop 68 by MGU 78, an attempt is made by MGU 78 to reach a particular MGU in MGC 64. If the MGU in MGC 64 is busy, MGU 78 will wait and try again later. If it is available for connection, MGU 78 will transmit the CONNECT call to the MGU in MGC 64. During this time of attempted connection, there is no connection between TTY 104 and MGU 78 as the call message has already been transmitted to and stored in the storage buffers of MGU 78.

Once the MGC 64 has the CONNECT call message stored in its receiving buffer, a SELECT call will be placed on the local exchange loop 114. This SELECT call is responded to with a busy or connect alteration in the response portion of the SELECT call, depending upon the condition of station 120.

If station 120 is not busy and responds with a connect, the CONNECT message is supplied from the storage buffers of the MGU in MGC 64 and stored in the SCU of SCG 116 for station 120. After the operator at station 120 examines the message block, it returns a CONNECT mode control clock message back to TTY 104 from node to node, one communication link at a time until the CONNECT clock is received by TTY 104. The two stations are now "connected" and TTY 104 may now send data messages. As before, each of the CONNECT messages are transferred from the storage buffer of one node to the storage buffer of the next node only after a connect response is received to a SELECT call message.

As indicated with respect to TTY's 104 and 112, the TTY 104 and station 120 will remain "connected" until one of the two pairs senses a CONNECT disconnect message.

The same process is utilized to place a call to processor 126 or to the remote exchange loop 134.

Since the trunk lines 130 may be low speed (have a low data transmission rate), the TTU's 128 and 132 may be of the type which will store many messages and utilizes a full duplex trunk so that messages can be sent out continuously without first waiting for a response from the TTU at the other end of trunk 130 that a particular message has been received satisfactorily before accepting another message from IXL 68.

SINGLE LOOP SWITCH

FIG. 2

The apparatus of FIG. 1 can be scaled down to a form shown in FIG. 2 which uses only a local exchange loop but requires the use of an ELC 150 connected thereto. As will be later ascertained the ELC has its own clock mechanism and operates independently to send polls through the associated LDT 152 to the LXL 154. While a MGU could be used in FIG. 2, this would be a waste of electronics since an ELC forms one of the electronic portions of a MGU. The operation of FIG. 2 includes at least one LDT such as 156 connected in the local exchange loop 154 and having a RGT 158 connected to at least one SCU such as 160 and its associated station 162. Other SCU's and stations would be connected either to the RGT 158 or to further RGT's on other LDT's in the exchange loop. As indicated in connection with FIG. 1, the dash line indicates that further LDT's may be connected if there is a demand for further terminal units and stations. In operation, the apparatus of FIG. 2 is substantially identical to a local exchange loop in FIG. 1 except that the signals are not passed to a higher speed loop.

SCU LOOP CONNECTION BLOCK

FIG. 3

Figure 3:
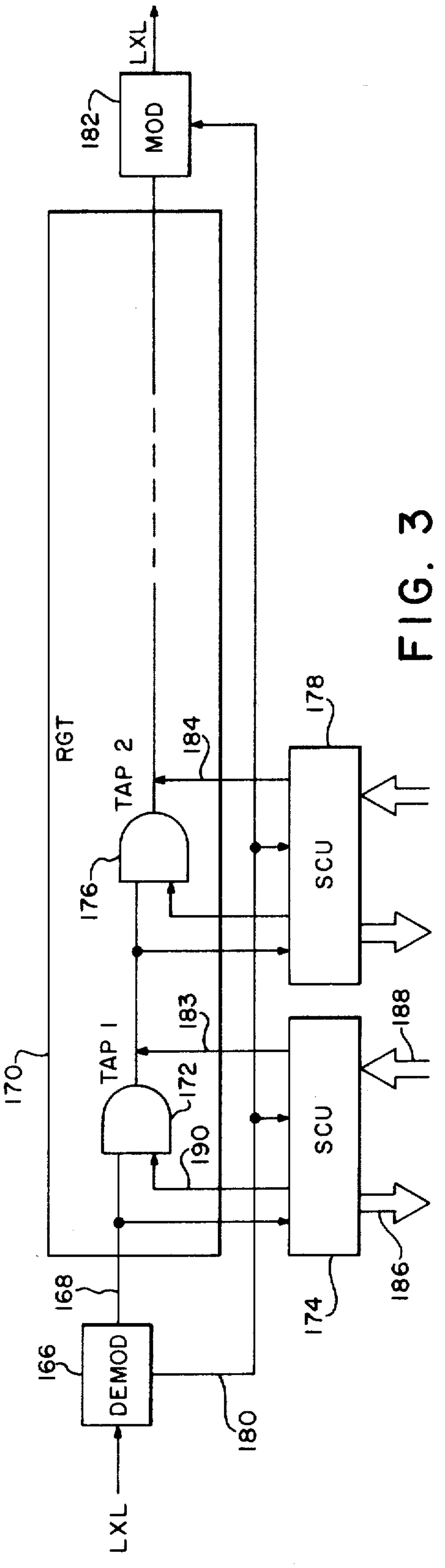
FIG. 3 is a block diagram showing the general connection of station control units through a regenerative tap and loop driver to a local exchange loop.

In FIG. 3 a local exchange loop lead is shown providing signals to a demodulator 166 which has a first output 168 supplied to a RGT 170. Within RGT 170 is a first gate 172 which receives an input from lead 168. Lead 168 is also supplied to a first SCU 174. An output of gate 172 is supplied to a further gate 176 and to a second SCU 178. A further output of demodulator 166 is a clock output shown as lead 180 which supplies clock inputs to the SCU's 174 and 178 as well as to a modulator 182 which operates to supply an output to the local exchange loop. Modulator 182 also receives an output from the RGT 170 which, as shown, in dash-line connected to the output of gate 176. SCU 174 has an output line 183 which is connected to the output of gate 172 and thus to the input of gate 176 on the lead previously mentioned. SCU 178 has a similar lead 184 connected to the output of gate 176. SCU 174 has a plurality of output leads generally indicated as 186 and a plurality of input leads generally indicated as 188. SCU 178 has a similar set of input and output leads which may be connected either directly to an appropriately designed teletypewriter or to an interface such as a TIU between the SCU and a teletypewriter or other communication device.

The demodulator 166 along with the modulator 182 and the internal clock in demodulator 166 provides the apparatus shown as LDT in FIG. 1. In operation bi-phase modulated signals arrive on the LXL loop and are demodulated to TTL (Transistor Type Logic) signals and applied to the RGT 170. At the output of RGT 170 these TTL signals are again modulated in modulator 182 to produce bi-phase signals. The bi-phase signals are utilized because there is less possibility of error in long distance transmissions. Where all the communication is completed on short distance lines, the LDT's shown in FIG. 1 and FIG. 3 are not required. However, these are shown for completeness of disclosure.

SCU 174 has a further lead 190 which is connected to tap 1 (gate 172). The connection of SCU 174 to RGT 170 provides a signal on lead 190 to gate 172 to disable gate 172. Thus, all signals received from demodulator 166 are supplied to SCU 174 and continue along the output lead of tap 172 after being returned by lead 183 of SCU 174. Then, if further SCU's are connected to the RGT they again prevent the passage of signals through the various taps such as 176. One embodiment of this invention utilized RGT's which may be strapped to allow the connection of only one, two, four, or eight SCU's. If strapped to allow the connection of only two SCU's as shown in FIG. 3, the output of SCU 178 would be connected directly to modulator 182 without any further delays. It should be noted that there is a one clock time delay or one data bit time period delay as the signal traverses each of the taps in the RGT 170.

LDT, RGT, TTU, & PTU BLOCK CONNECTION

FIG. 4.

Figure 4:
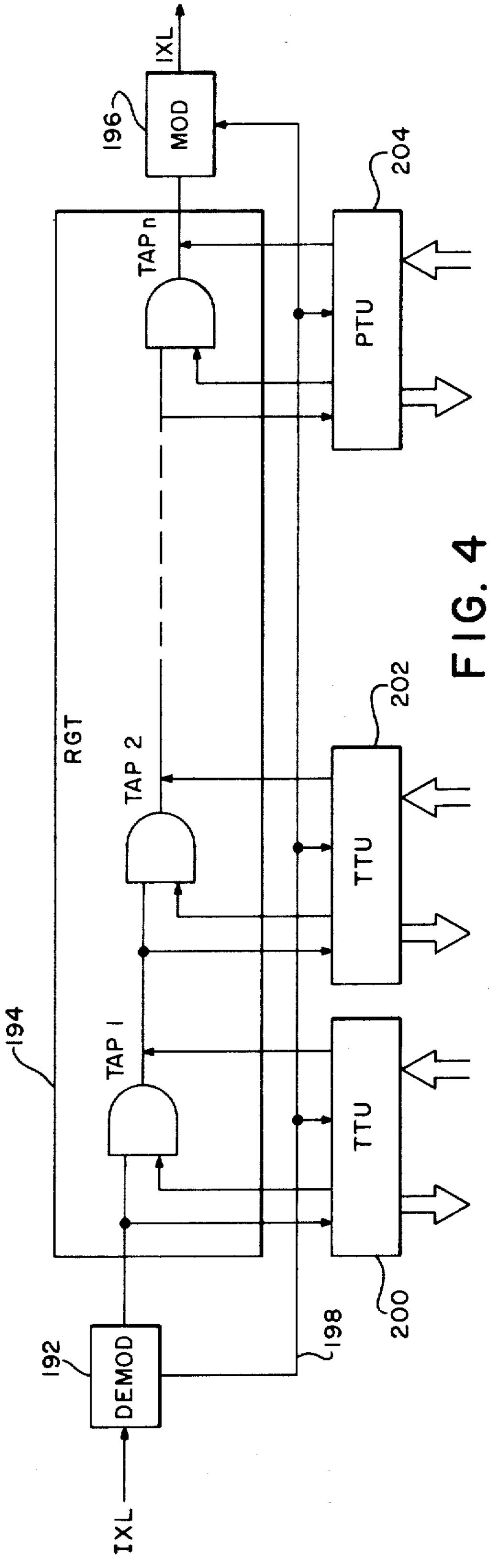
FIG. 4 is a block diagram disclosure of a general connection of trunk terminal units and a processor terminal unit through a regenerative tap and a loop driver terminator to an intermediate exchange loop.

In FIG. 4 a demodulator 192 is shown connected to a RGT 194 which is further connected to a modulator 196. Again, the demodulator 192 has an oscillator or clock output 198 and together with modulator 196 forms a LDT. This particular LDT is on the intermediate exchange loop and is shown connected through a RGT to two TTU's 200 and 202 as well as being connected to a PTU or Processor Terminal Unit 204. In each instance the connection of such a terminal unit is substantially identical in response to input lines whereby a particular tap logic gate is disabled by the connection of a terminal unit and the signals from the line that would normally flow through the logic gate are, instead, by-passed to the terminal unit. Within the RGT 194 dash lines are shown to indicate that other taps and terminal units are connected between tap 2 and tap *n*.

EXCHANGE LOOP CONTROL

FIG. 5

Figure 5:
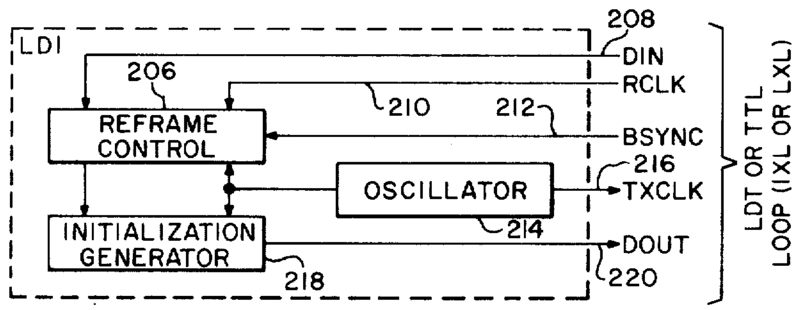
FIG. 5 is a block diagram disclosure of the exchange loop control disclosed in FIGS. 1 and 2.

In the ELC of FIG. 5 a reframe control block 206 receives data in (DIN) and recovered clock (RCLK) signals 208 and 210 as well as a bit sync input (BSYNC) 212. An oscillator 214 also supplies an input to reframe control 206 and provides an output clock called transmit clock (TXCLK) 216. The output of oscillator 214 is also supplied to an initialization generator 218 which receives a further input from reframe control 206. This input from 206 is basically a straight through line which is supplied as a data output signal (DOUT) 220 upon occurrences of clock signals from oscillator 214. As indicated previously, FIG. 5 is a more detailed showing of the ELC 50 of FIG. 1.

The ELC contains the circuitry necessary to monitor and control the operation of either an intermediate exchange loop or a stand alone local exchange loop. (Internal strapping alters logic for one or the other use.) The oscillator 214 provides the master clock for the loop and the initialization generator 218 provides loop initialization to make sure all connected units are synchronized.

When the ELC is used to control an intermediate exchange loop, it initializes the loop at initial turn ON or power ON clear (POC) condition and then monitors the messages as they come by. After 64 messages (the embodiment disclosed was strappable to any of several number of messages including 64) the ELC reinitalizes the loop by preventing the passage of the next poll received on lead 208 and instead providing an output of 2,000 logic "0" bits before providing a logic "1" bit. This initialization sequence is decoded by the connected devices and enables them to be activated since a recently connected device is not allowed to become active until it detects an initialization sequence. The ELC also counts the number of zeros between messages received on the data in line 208 and whenever 1,500 zeros are counted, the initialization sequence reoccurs.

If the ELC is used on a local exchange loop the ELC sends a new poll upon each detection of an end of transmission (EOT) or end of message block (EOB) signal.

The exchange loop control operates on TTL logic and thus will interface either with a LDT or a short coupled loop using TTL logic.

Since the circuitry of FIG. 5 may be identical to a portion of other blocks it has been given a common reference LDI (Loop Data Initialization Interface).

LOOP DRIVER TERMINATOR

FIG. 6

Figure 6:
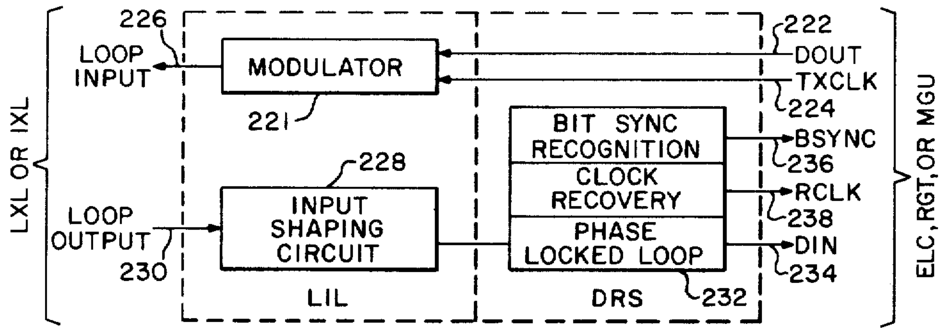
FIG. 6 is a block diagram of the loop driver terminator utilized in FIG. 1.

In the LDT of FIG. 6, a modulator 221 receives data out signals from a device such as the ELC on lead 222 and transmit clock signals on lead 224. The modulator 221 provides bi-phase modulated signals to the loop via input lead 226. An input shaping circuit 228 receives signals from the loop on a lead 230 and supplies these to a phase locked loop 232. The bi-phase input signals are shaped in circuit 228 to be more accurately usable by a demodulator in the phase locked loop 232. The output of phase locked loop 232 provides data input signals on lead 234 to the ECL, RGT, or MGU to which the LDT is connected. Further portions of block 232 provide a bit sync output on lead 236 and a receive clock output on 238.

The function of the modulator section of the LDT is self-explanatory in that it simply converts TTL level signals from the attached device to bi-phase signals for use on the loop. The reason for the phase locked loop in the demodulator section to to extract both data and the clock from the incoming bi-phase modulated signal. The bit sync line 236 provides an alarm, by change of logic level, when the demodulator is out of sync with the modulated input.

As previously indicated, the modulating and demodulating function of a LDT are not required when only TTL signals are used.

DETAILED RGT

FIG. 7

Figure 7:
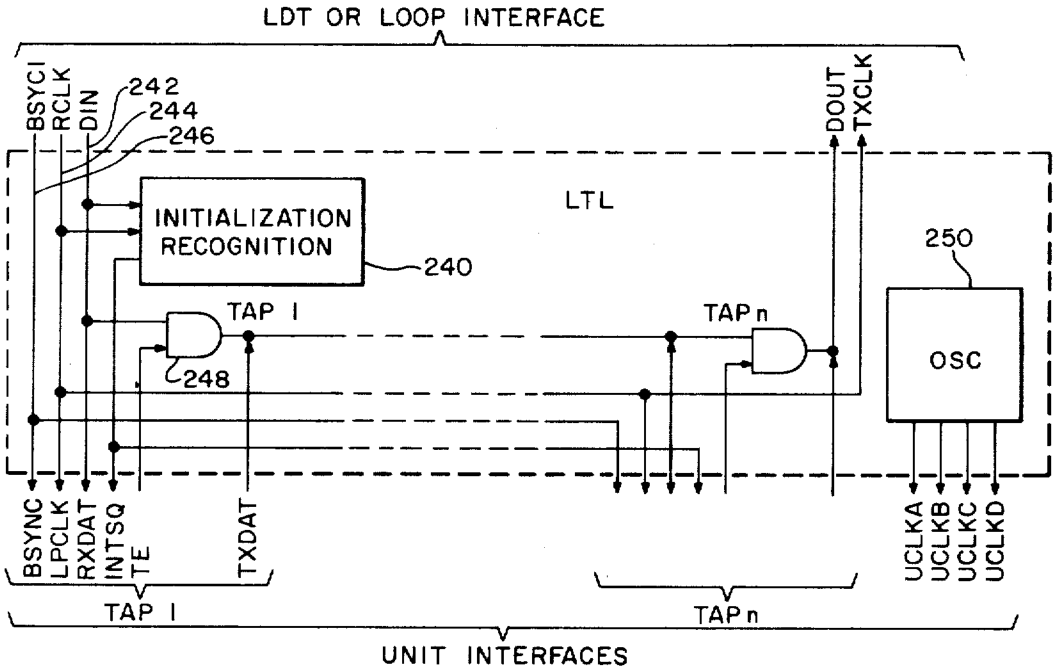
FIG. 7 is a block diagram disclosure of the regenerative tap disclosed in FIG. 1.

The regenerative tap shown in FIG. 7 contains slightly more detail than that shown in FIGS. 3 and 4. An initialization recognition block 240 receives inputs from both a data in line 242 and a receive clock line 244. The block 240 is basically a counter for counting the number of zeros and is reset every time a logic "1" occurs. An output of the block 240 is labeled INTSQ or initialization sequence line. This output is provided to each of the units which is attached to the RGT. A further input lead 246 is labeled bit sync in BSYCI and is only used when the regenerative tap is connected to a LDT. This lead 246 is also supplied as an output Beync to each of the connected units. The data in lead 242 is connected to a logic gate 248 in the same fashion as shown in FIG. 3 and provides a receive data or RXDAT to the first unit. The signal is received back on a lead TXDAT when the transmit enable (TE) lead disables gate 248. The attached unit also receives a lead labeled LPCLK or loop clock from lead 244. Each of the four lines to and the two lines from each of the units is provided to any other terminal units connected to the regenerative tap. Outputs from the regenerative tap back to the LDT or the loop itself are a transmit clock lead which is identical with receive clock and a data output lead which is connected to the last operative logic gate of the regenerative tap. Also shown is an oscillator 250 which provides different frequency outputs to the particular units depending upon their particular function and loop operation speed. Thus, each of the outputs of the oscillator are different frequency clock signals.

One embodiment of the invention utilized a 4.9512 MHz oscillator to provide clocks of ½, ¼, ⅛, and 1/16 of the basic oscillator frequency. The received data on lead 242 in one embodiment is provided in sync with the recovered clock on lead 244 and the data changed on 1 to 0 transitions of the clock. The bit sync in lead 246 in the given embodiment contained a zero when the demodulator of the LDT was out of sync and a logic "1" when it was in sync. The referenced embodiment of the invention utilized a logic "1" on TE to allow passage of the input data through logic gate 248. When the connected unit was initialized the lead TE would be reduced to a logic "0" and data would be forced to pass through the unit and prevented from passing through gate 248. The initialization sequence lead from the block 240 provided a logic "1" for one bit time to indicate that an initialization sequence had been received from the loop. The logic "1" did not occur again until the counter 240 again counted at least a predetermined number of consecutive logic "0's."

MASTER GROUP UNIT

FIG. 8

Figure 8:
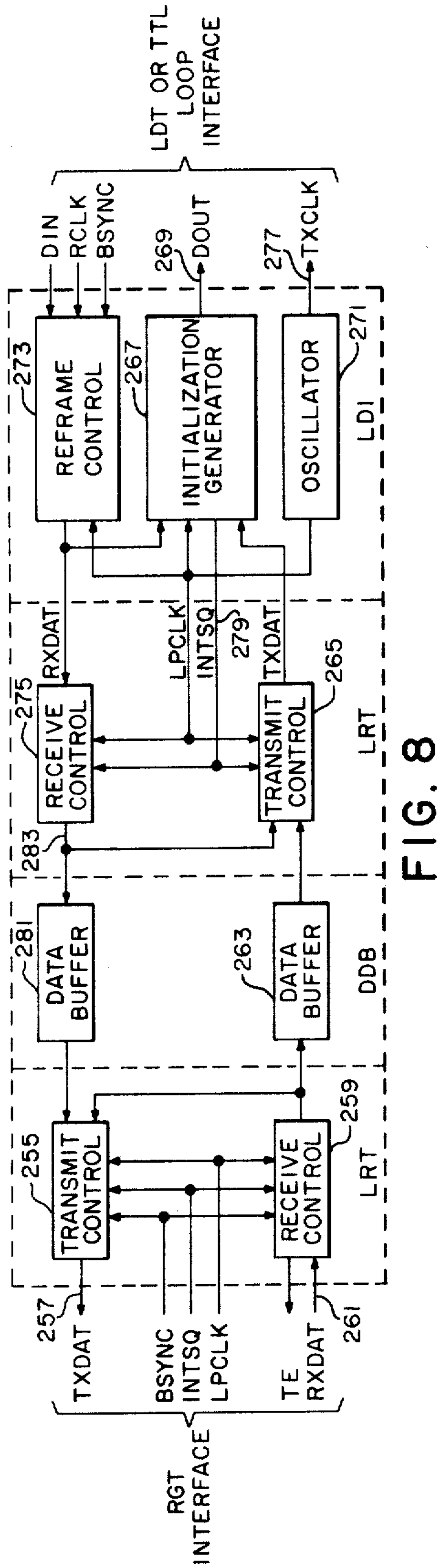
FIG. 8 is a block diagram disclosure of a master group unit disclosed in FIG. 1.

FIG. 8 illustrates a detailed block diagram of a master group unit such as 78 of FIG. 1 and is divided into sections which are used in other parts of the system. Two sections are LRT's (Loop Receive and Transmit) cards which in some instances do not require the use of all the input and output terminals. One section is a LDI (Loop Data Initialization Interface) which uses the same electronics as the ELC of FIG. 5. A final section is the DDB (Dual Data Buffer) section which is used for the storage of data prior to transmission from one loop to another. A transmit control block 255 is shown providing a TXDAT output 257 for transmitting data through a RGT to the intermediate exchange loop. From the RGT three lines of bit sync, initialization sequence and loop clock are supplied to both the transmit control 255 and a receive control block 259. The receive control block 259 also receives data on a lead 261 and provides an output transmit enable lead to the RGT logic block. An output of the receive control unit 259 supplies data, delayed by one-half bit in time, to a data buffer 263 and also provides a second input to the transmit control 255. If the data is not being used by the particular local exchange loop connected to this master group unit, the data is merely transferred from the receive control unit to the transmit control unit 255 and back to the RGT. There is a one-half bit delay in each of the receive control unit 259 and the transmit control unit 255 making a total of one bit delay through the MGU. When operating, an output of the data buffer 263 is supplied to a transmit control 265 in the second LRT. An output of transmit control unit 265 supplies data through an initialization generator 267. This data is therein supplied to a data output lead 269. An oscillator 271 supplies clock signals to the initialization generator 267 as well as to a reframe control unit 273, the transmit control unit 265 and a receive control unit 275. In addition the oscillator 271 provides a transmit clock output on a lead 277. The initialization generator also supplies an initialization sequence output signal on a lead 279 to the receive control block 275 and the transmit control block 265. The receive control block 275 supplies an output to the transmit control unit 265 and to a data buffer 281 on a lead 283. An output of the data buffer 281 is supplied to the transmit control unit 255.

As indicated above with respect to the intermediate exchange loop portion, the local loop exchange portion of the MGU also passes data messages therethrough as they are received on the data-in line or passed through the receive control 275 and transmit control 265 before exiting on lead 269 from initialization generator 267. In spite of the passage through four blocks, this data is delayed only a total of one bit time period if it is not intended to be passed from the local exchange loop to the intermediate exchange loop. If it is intended to be transferred, the incoming data not only is supplied to data buffer 281 but also is still passed through the transmit control 265 to the output lead 269 so that the calling party can read the response section to determine whether or not the MGU storage buffer was able to receive a message containing the proper parity check.

As indicated, the first or left-hand LRT is connected to a RGT while the LDI block on the right is connected either to a LDT or directly to a TTL loop interface for a local exchange loop.

The initialization generator 267 is constructed the same as 218 of FIG. 5 except that a further terminal indicating the initialization sequence is connected in the use of the master group unit of FIG. 8.

The MGU is basically two separate units combined into one package. One embodiment of the invention has the device constructed half duplex with two pairs of states. One state is idle and calling with respect to the local exchange loop while the other is idle and calling with respect to the intermediate exchange loop. Initially both sections are idle and monitor their associated loops for calls. When a call is received from either one of the loops, a "connect" is returned to the calling node and the CONNECT message is accepted and stored in the buffer. The other section then goes into a calling state to forward the message to the following node in the connecting set of links. In the calling state, the loop is acquired and after the connect message is sent correctly (acknowledgement returned) to the next buffer, the section goes idle. If the further station being called responds with a busy or negative acknowledgement, the message is sent again. In one embodiment of the invention, after three failures of attempted transmissions, the message is sent to an intercept device where it is recorded and the MGU returns to a monitoring state.

STATION CONTROL UNIT

FIG. 9

Figure 9:
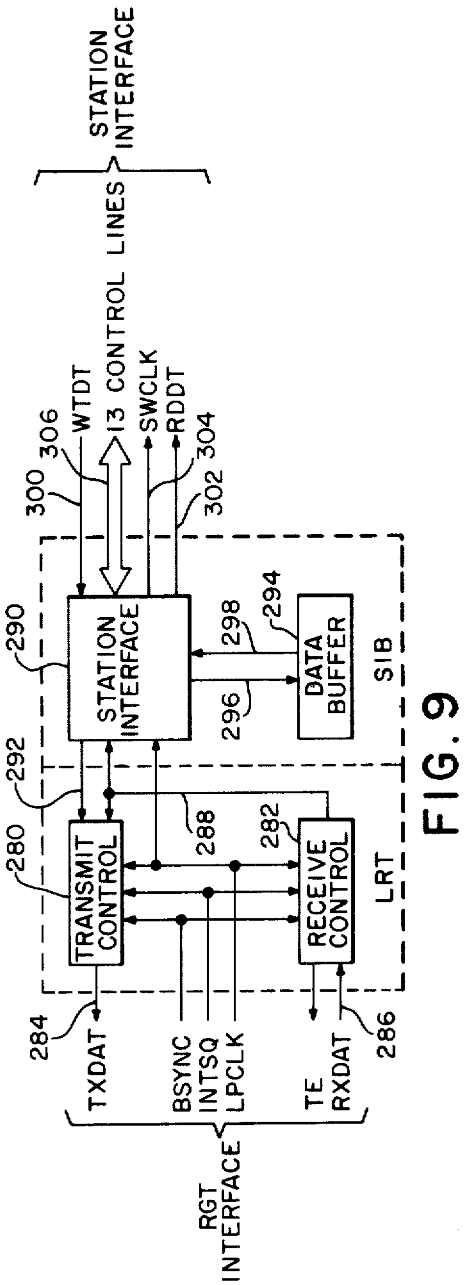
FIG. 9 is a block diagram disclosure of a station control unit disclosed in FIG. 1.

The station control unit of FIG. 9 contains a LRT or loop interface section identical to the LRT section of the master group unit of FIG. 8. This LRT section is connected to the RGT interface and contains a transmit control unit 280 and a receive control 282 with a transmit data lead 284 connected to the RGT and a tap enable connected from the receive control 282 to the RGT. From the RGT, bit sync, initialization sequence and loop clock signals are supplied to both the transmit control 280 and the receive control 282. The receive control 282 also receives data on a lead 286. An output of receive control 282 is supplied on a lead 288 both to the transmit control 280 and to a station interface control 290. Station interface control 290 additionally receives the LPCLK input supplied from the RGT. Station interface control 290 supplies an input to transmit control 280 on a lead 292 and supplies information to and from a data buffer 294 on leads 296 and 298, respectively. The interface control unit 290 receives data on a write data (WTDT) line 300 from the station or teletypewriter and supplies data on a RDDT or Read Data Line 302 along with a switch clock signal (SWCLK) on 304. An additional 13 control lines are represented by a cable designated as 306. These control lines are supplied both to and from the station or teletypewriter unit connected to the station control unit.

As will be noted, the SCU contains a data buffer and the necessary control circuitry to interface a local exchange loop RGT and a teletypewriter station, terminal unit interface, or station interface. The data buffer 294 is utilized to store both incoming messages from the loop to the station and outgoing messages from the station to the loop. The SCU is normally in an idle state where it monitors both the local exchange loop and the station. When a SELECT call is received from the local exchange loop with the correct address and parity the SCU goes into a called state. In the called state, the SCU accepts a further CONNECT call indicating the address of the calling station which is then forwarded to the called or connected station for this particular SCU and the SCU goes to the "connected" state.

While the SCU is in an idle condition, an associated station (TTY) can originate a "connection" by sending a called party address to the SCU. The SCU goes into the "calling" state by sending a CONNECT control branch call (CTRL-BR-CALL) to this address and if successful goes to the "connected" state. Message transfers are accomplished while the "connected" SCU's are in this state.

As was indicated in connection with the MGU of FIG. 8 the data which is not utilized by the SCU or the station is delayed one-half time periods in the receive control unit 282 and likewise the same amount of time in transmit control 280 so that the total time delay from reception at lead 286 to transmission at 284 is one full bit time period.

The 13 control lines plus the other three lines are given mnemonics for ease in presenting the flow charts of later diagrams. Since the leads are numerous a listing of the total 16 lines and their mnemonics are provided below:

| LINES FROM THE STATION TO THE SCU | LINES FROM THE SCU TO THE STATION |
|---|---|
| STCON — Station Connect | SWCON — Switch Connect |
| WTDT — Write Data | RDDT — Read Data |
| GTCLK — Gated Clock | SWBSY — Switch Busy |
| CTLDT — Control/Data | CTLRX — Control Received |
| RDWT — Read/Write | DTRX — Data Received |
| TXINT — Transmit Initiate | MSMRK — Message Mark |
| STBSY — Station Busy | TXACT — Transmit Active |
| INLCK — Interlock | SWCLK — Switch Clock |

The station connect line is raised to a logic "1" to indicate that the station or TTY wishes to establish a connection to the local exchange loop or that it is acknowledging a connection from the loop.

The gated clock is used to clock data from the station to the SCU on the write data line.

The control/data line is utilized to tell the SCU whether the message to be transferred will be a data word or a control word. As long as this line is a logic "1" the SCU will respond to all loop calls as being busy. The read/write line is utilized to tell the SCU whether the data flow will be on the read data or the write data line.

The transmit initiate line is used by the station to tell the SCU to transmit a message in one of the data buffers to the local exchange loop.

The station busy line is used to inform the SCU that the station is actively using the data message buffer in the SCU. With this line at a logic "1," the loop calls to a station will be responded to with a busy indication. This line can be placed in a logic "1" without a logic "1" appearing on the station connect line in the event that the station operator wishes to use the data memory for a scratch pad or for some other reason does not want to respond to calls for a given period of time.

The interlock line is used to tell the SCU that the station wishes to stop all communications with a connected party or that the station has become inoperable. A logic "1" on this lead will produce a control disconnect answer to all calls and if this interlock logic "1" is in combination with a station connect logic "1," the SCU will supply a control disconnect to an already "connected" party.

The switch connect line at a logic "1" level is utilized to establish or acknowledge a connection to the station. The read data line is utilized to transfer data to the station while the switch busy line is utilized to inform the station that the SCU is busy responding to data bits from the local exchange loop. If, at the time of the switch busy line going to a logic "1," the station is in partial completion of a task, the station may continue with that task but may not start any new operation with respect to the SCU.

The control received lead in a logic "1" is utilized by the SCU to inform the station that a control message has been received from the loop.

The message mark line in a logic "1" is utilized to mark the last byte and the end of a data message when the station is writing and marks the end of the message when the station is reading.

The data received line in a logic "1" is used to inform the station that a data message has been received from the loop.

The transmit active line informs the station when the SCU is transmitting a message to the loop.

TRUNK TERMINAL UNIT

FIG. 10

Figure 10:
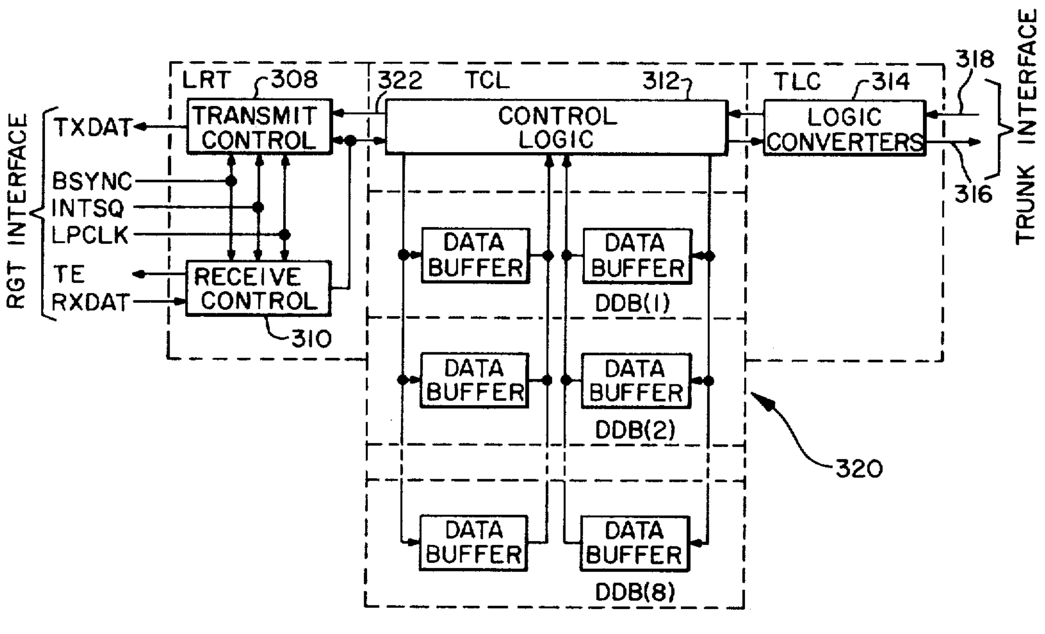
FIG. 10 is a block diagram disclosure of a trunk terminal unit shown in FIG. 1.

The trunk terminal unit of FIG. 10 also contains a LRT with a transmit control 308 and a receive control 310. Additional sections in this TTU are TCL (Trunk Control Logic) and TLC (Trunk Logic Converter) as indicated. The blocks 308 and 310 are identical in operation with the units 280 and 282 of FIG. 9 and previous LRT's. The output of receive control 310 is supplied in the TCL to a control logic block 312 which receives data bits from the loop via control unit 310 and supplies them in the TLC through a logic conversion block 314 to the long distance trunks. This data is supplied on half of a full duplex line via lead 316 while returning data is supplied from the other half on lead 318 through the logic converter 314 to the control 312. In both directions of data flow, the data is stored in one of the data buffers, generally indicated as 320. More than one data buffer may be required so that other information may be transferred while awaiting confirmation of successful transmission of previous data. Since data flow can occur simultaneously in both directions, this wait should not be very long and the length of waiting time should be fairly predictable. One embodiment of the invention utilized eight incoming and eight outgoing data buffer units. The data received from the trunk on line 318 passes through control unit 312 and, after storage and parity check, is transmitted via a lead 322 to the transmit control unit 308 and back through a RGT and a LDT to the intermediate exchange loop.

As will be realized from the above remarks, the TTU provides the connection of a long distance trunk to an intermediate exchange loop. The buffers and control logic are required to communicate with another TTU on the other end of the trunk which is part of a further intermediate exchange loop.

In one embodiment of the invention, trunk status control words are transmitted between each message and, also, periodically whenever there are no messages being sent. This provides a continuous monitor of the trunk facility even during low activity periods.

As each message is received by the TTU from the trunk lines, the message is loaded into a buffer corresponding to that in the transmitting remote TTU. The parity is checked and if the message is bad a negative acknowledgment (NAK) is returned. If, however, the message is acknowledged (ACK) as having correct parity, the receiving TTU calls on the intermediate exchange loop in an attempt to forward the message to the next node in the transmission link. Normally, this would be the MGC connected to the proper local exchange loop on that particular intermediate exchange loop. However, the message could be for a further intermediate exchange loop of which the present is merely a convenient connecting node. In this case the TTU would be calling a further TTU on the same intermediate exchange loop.

PROCESSOR TERMINAL UNIT

FIG. 11

Figure 11:
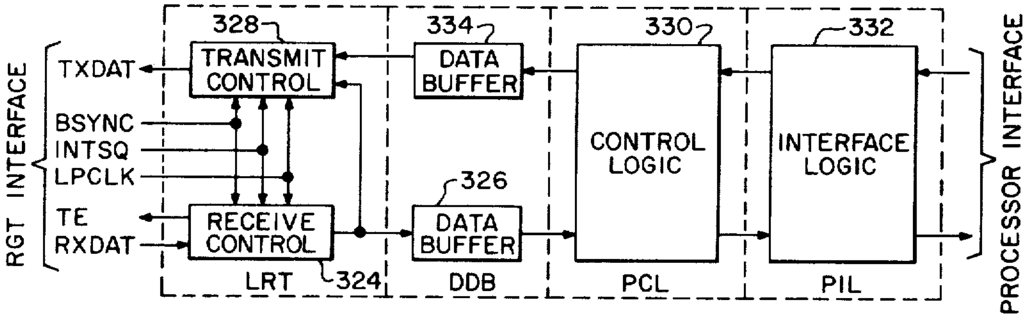
FIG. 11 is a block diagram of a processor terminal unit shown in FIG. 1.

In FIG. 11 a processor terminal unit (PTU) has a LRT connected to a RGT of an intermediate exchange loop. A receive control block 324 of the LRT supplies data to a data buffer 326 in a DDB as well as a transmit control block 328. The data is then forwarded from buffer 326 to a control logic block 330 in a PCL (processor control logic) for submission through an interface logic block 332 in a PIL (processor interface logic) to a processor. Since the control logic 330 and interface logic of 332 would be readily determinable and different for each particular processor, such logic is not greatly expanded upon in this application. A flow diagram is presented in FIGS. 27–29 in conjunction with connecting the present switching system to a processor such as disclosed in U.S. Pat. No. 3,544,976 issued Dec. 1, 1970. This flow diagram describes the logic operations used in one embodiment of a PTU control logic and interface logic sections. Returning data is, of course, supplied back through the interface logic 332 and the control logic 330 for placement in a data buffer 334 before being transmitted to the loop via transmit control 328.

The PTU control circuitry necessary to interface the intermediate exchange loop with a processor operates in much the same fashion that a SCU interfaces a teletypewriter and a local exchange loop. While buffering is shown in FIG. 11, such buffering may not be necessary with certain types of processor interfaces. The operation of the intermediate exchange loop interface section (LRT) is identical with that of the MGU of FIG. 8. Primarily the entire PTU is utilized as a data rate changing means for supplying messages to a processor from other nodes and supplying return messages from the processor to the nodes.

TERMINAL INTERFACE UNIT

FIG. 12

Figure 12:
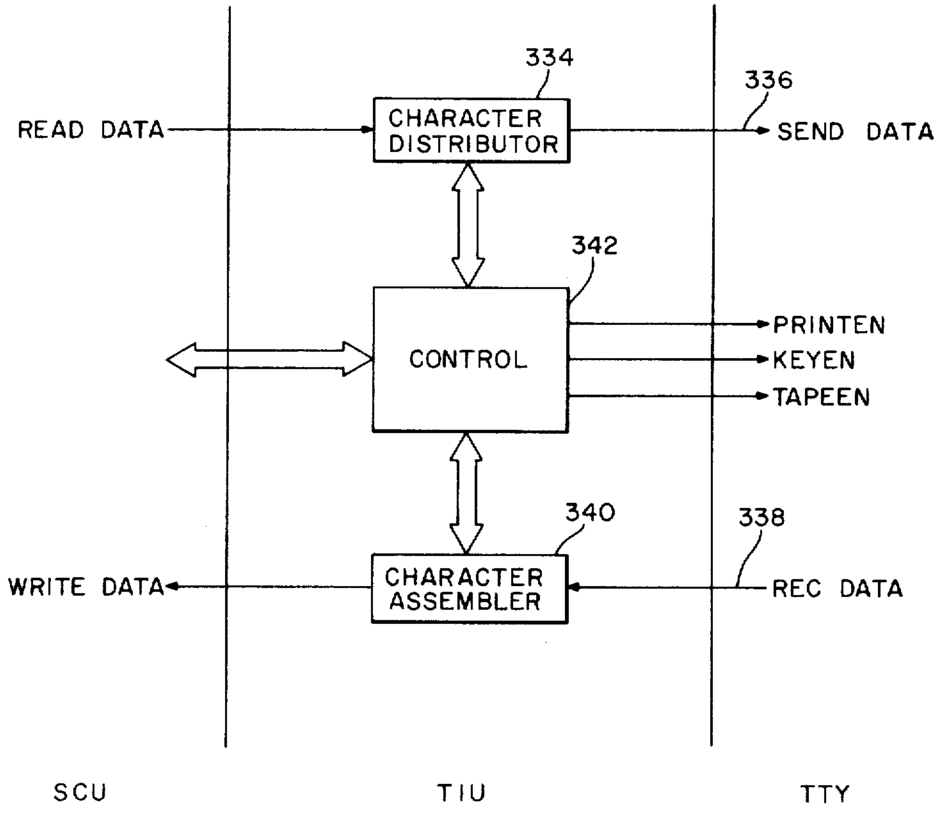
FIG. 12 is a block diagram of a terminal interface unit shown in FIG. 1.

FIG. 12 illustrates a terminal or station interface unit (TIU) which takes the read and write data from and to the SCU of FIG. 9. In addition it is connected to the 13 control lines and the SWCLK for making the proper responses to information from the SCU and the terminal unit. The incoming data from the SCU is supplied to a character distributor and buffer 334 one serial character at a time before transmission on lead 336 to the terminal unit one data bit at a time. The return data is received from the teletypewriter on lead 338 and supplied to a character assembler and buffer 340 one bit at a time before being supplied as write data back to the SCU as one serial character at a time. A control unit 342 is connected to receive the 13 control and the SWCLK lines as well as being connected to the two character units 334 and 340 for control thereof. In addition, with certain types of teletypewriters, three leads of print enable, key enable, and tape enable may be utilized for enabling the teletypewriter unit at the proper times.

RECEIVE CONTROL MODULE

FIG. 13

Figure 13:
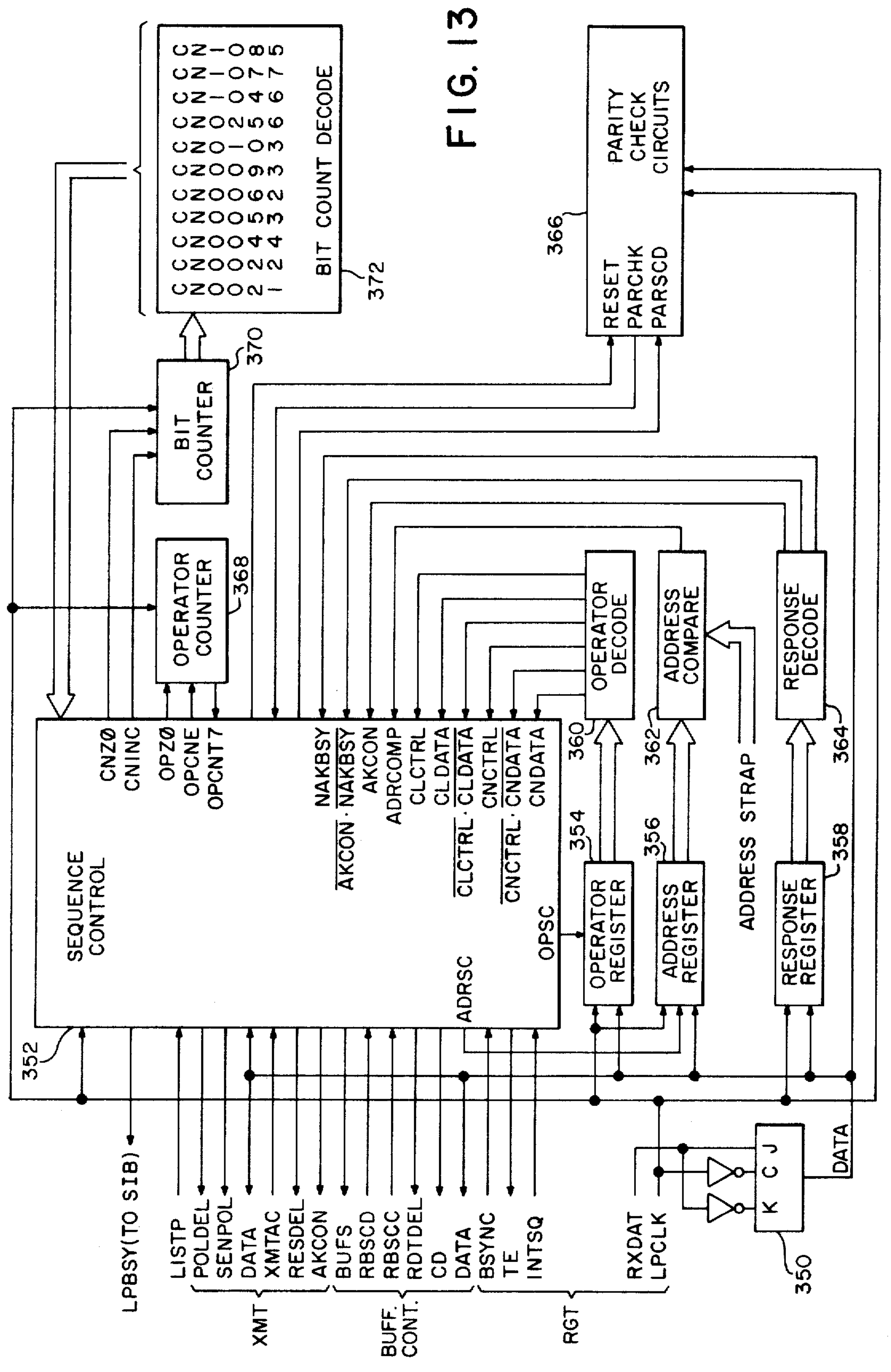
FIG. 13 is a block diagram of a receive control module such as is found in the LRT sections of the various units such as shown in FIGS. 8–11.

FIG. 13 illustrates the receive control module found in the LRT sections of the various units such as shown in FIGS. 8–11. As will be noted, there are two receive control modules in the master group control block of FIG. 8 and one in each of the other figures.

Figure 15:
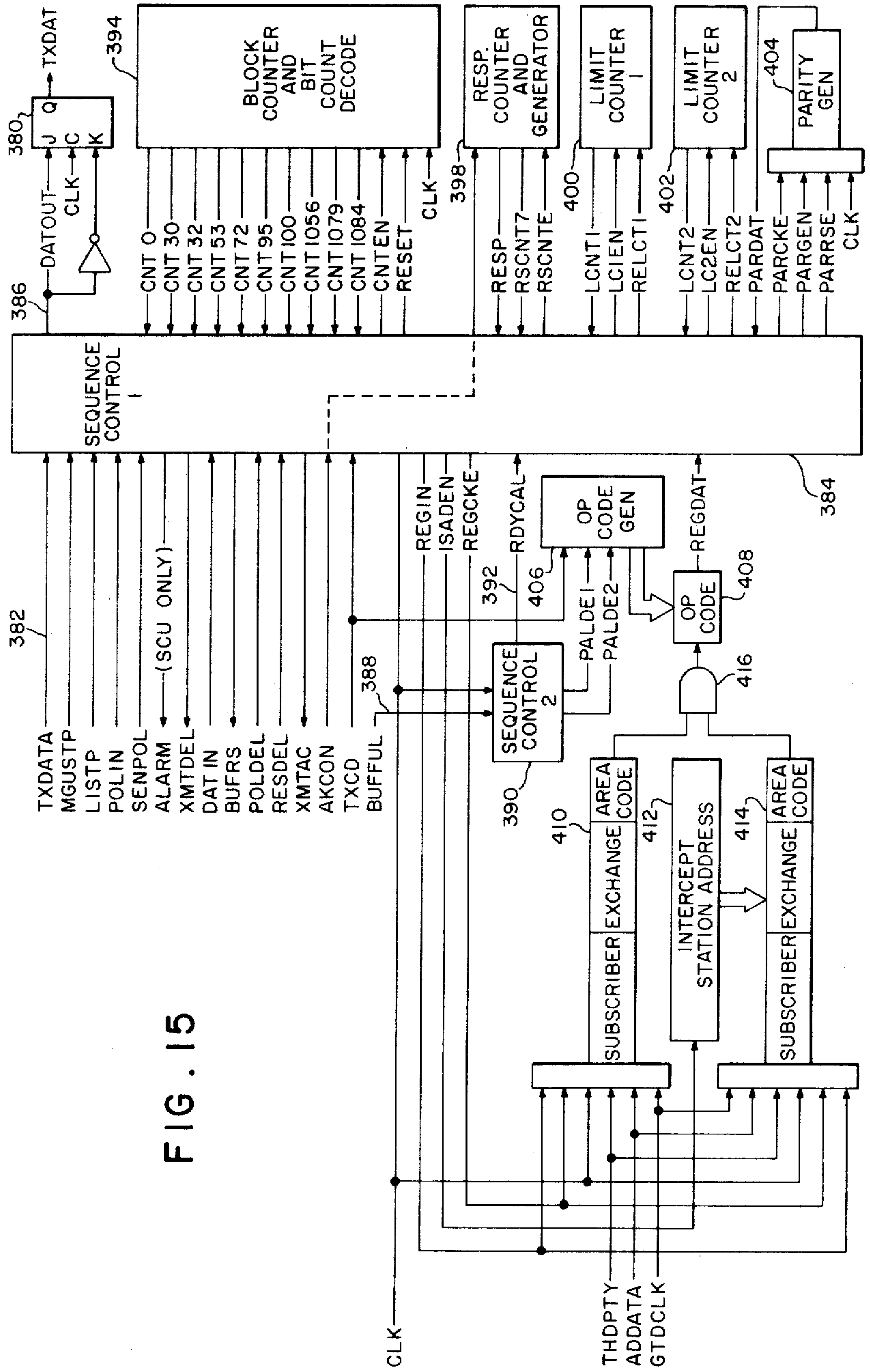
FIG. 15 is a block diagram of the transmit control module portion of the LRT sections of FIGS. 8–11.
Figure 16A:
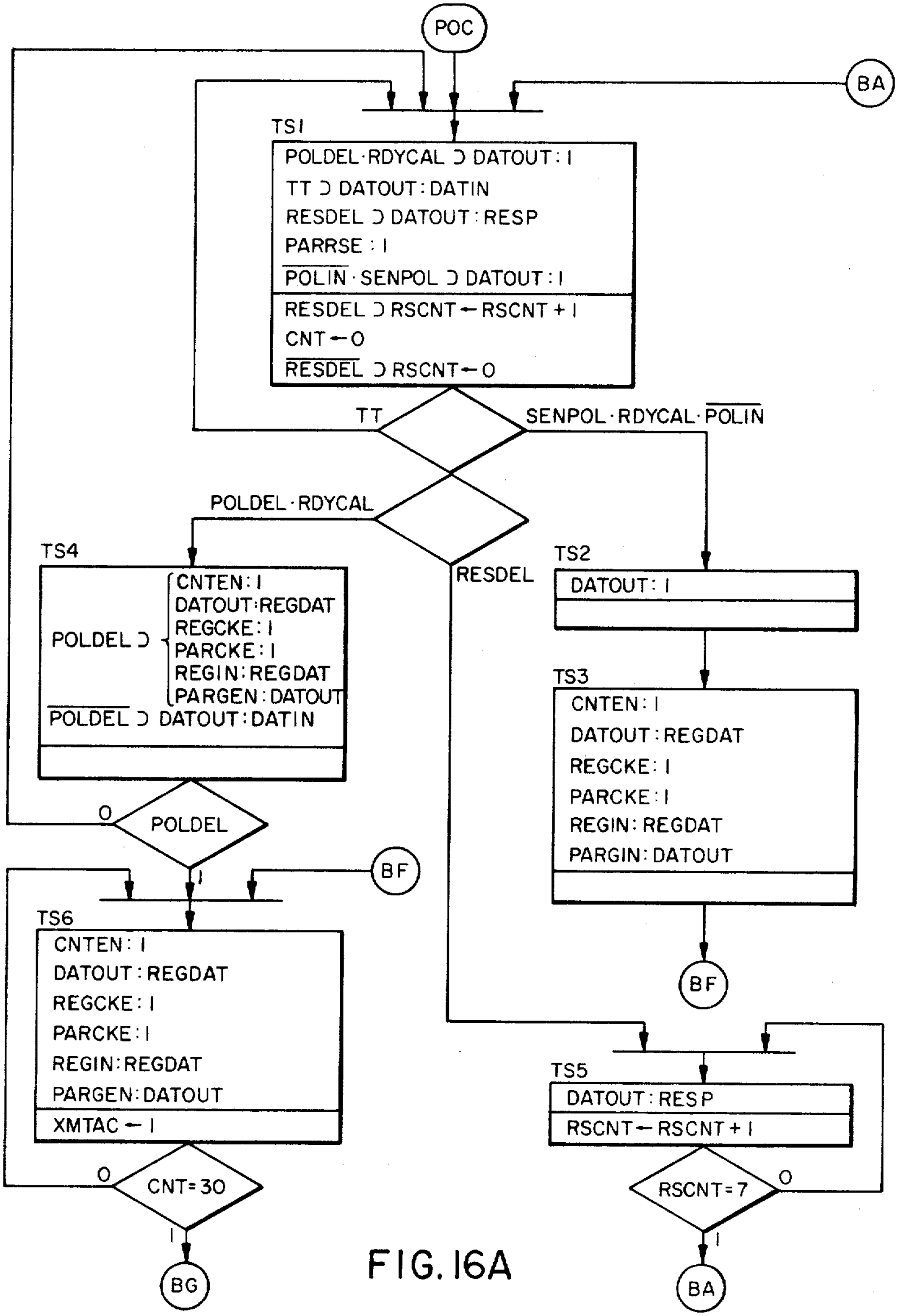
FIGS. 16A–16E are flow diagrams illustrating the operation of FIG. 15.
Figure 16B:
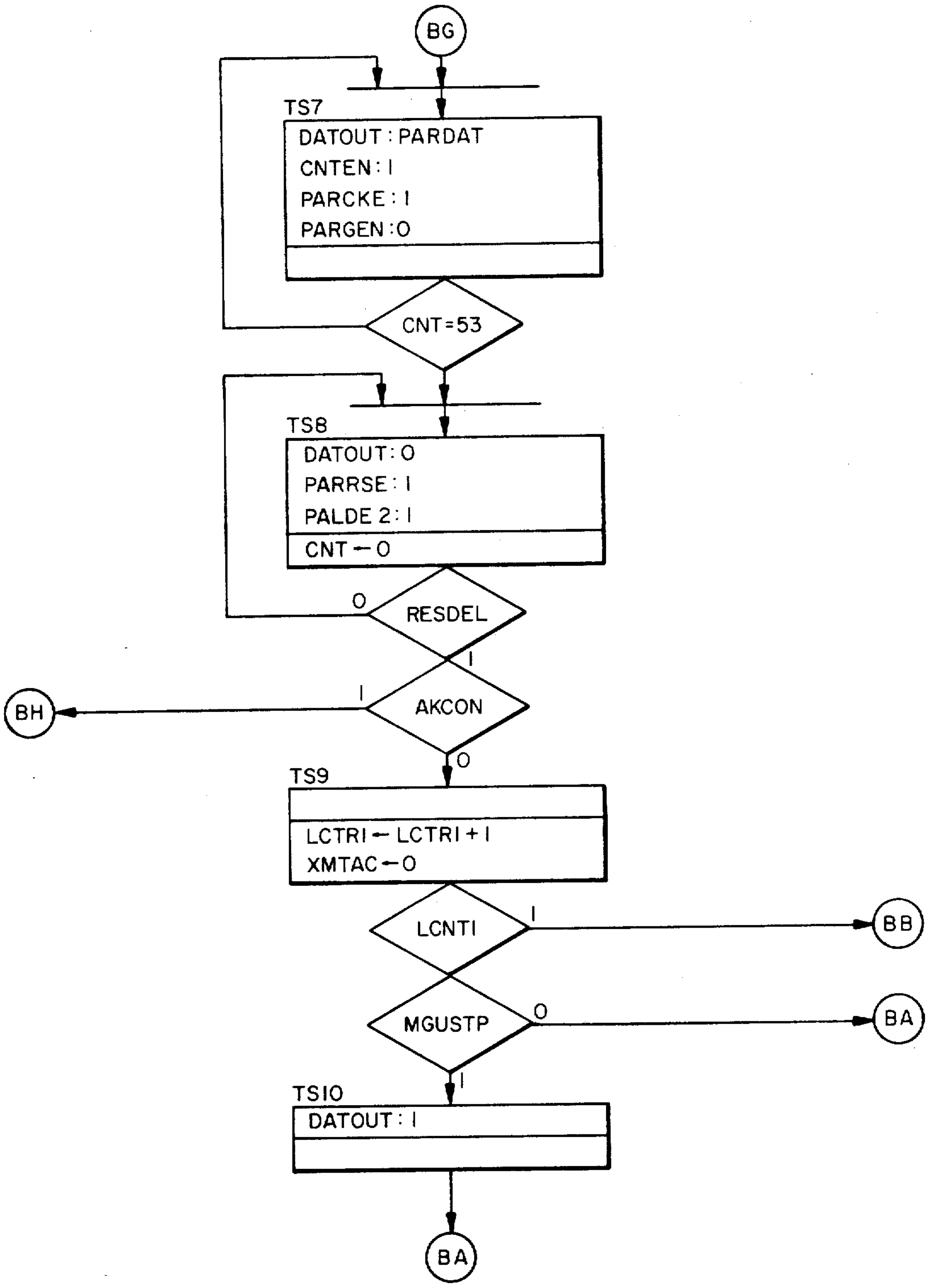
Figure 16C:
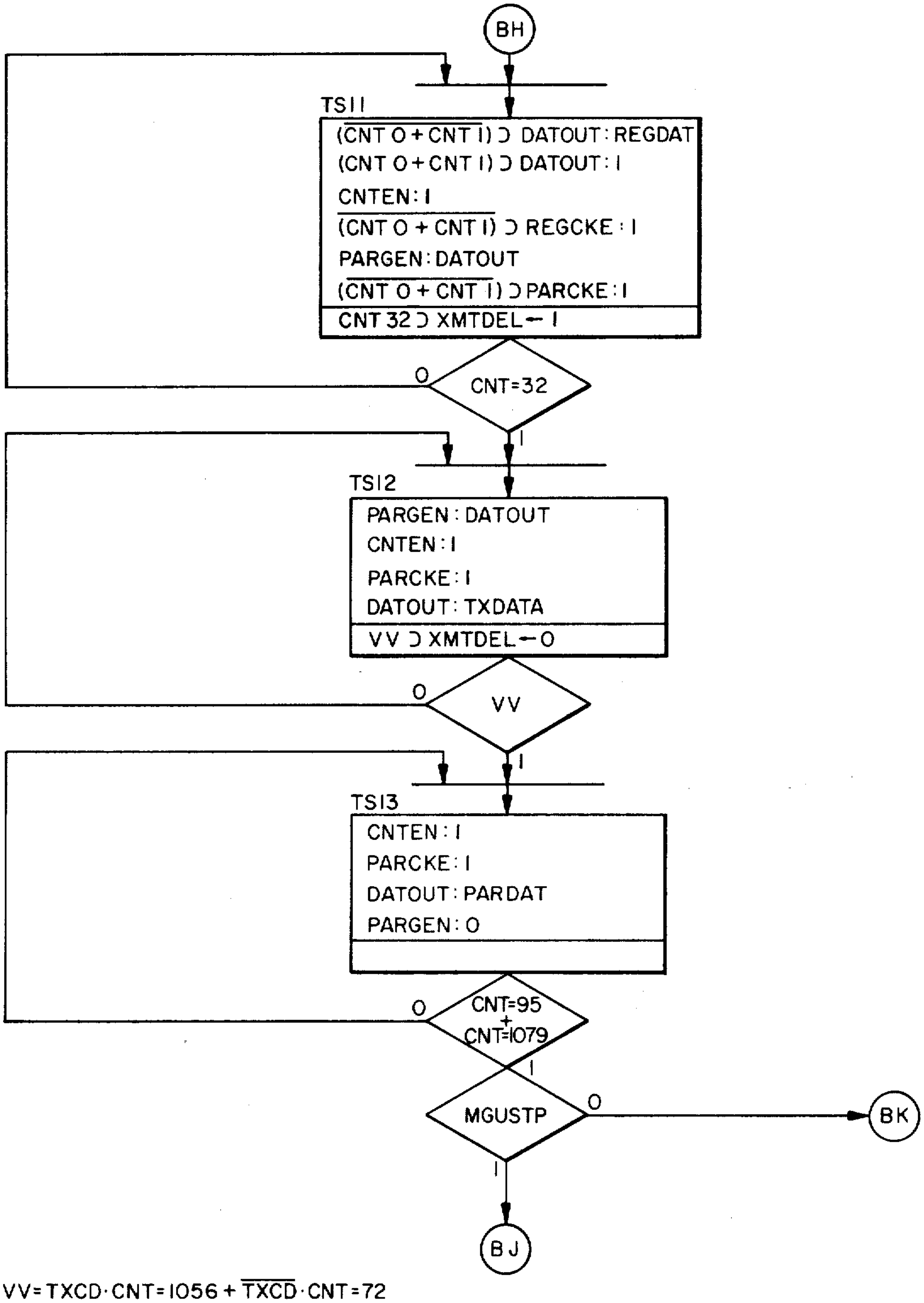
Figure 16D:
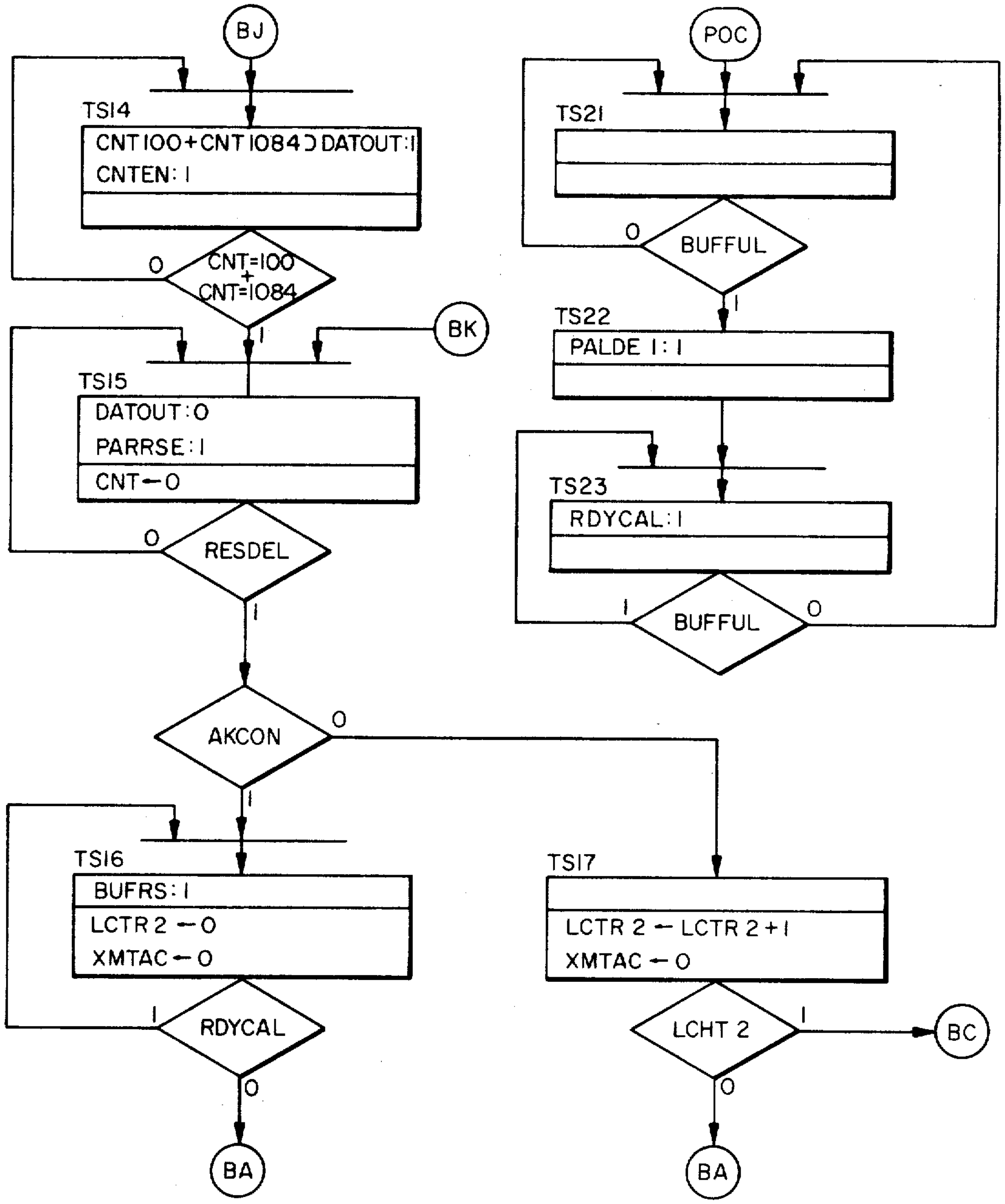
Figure 16E:
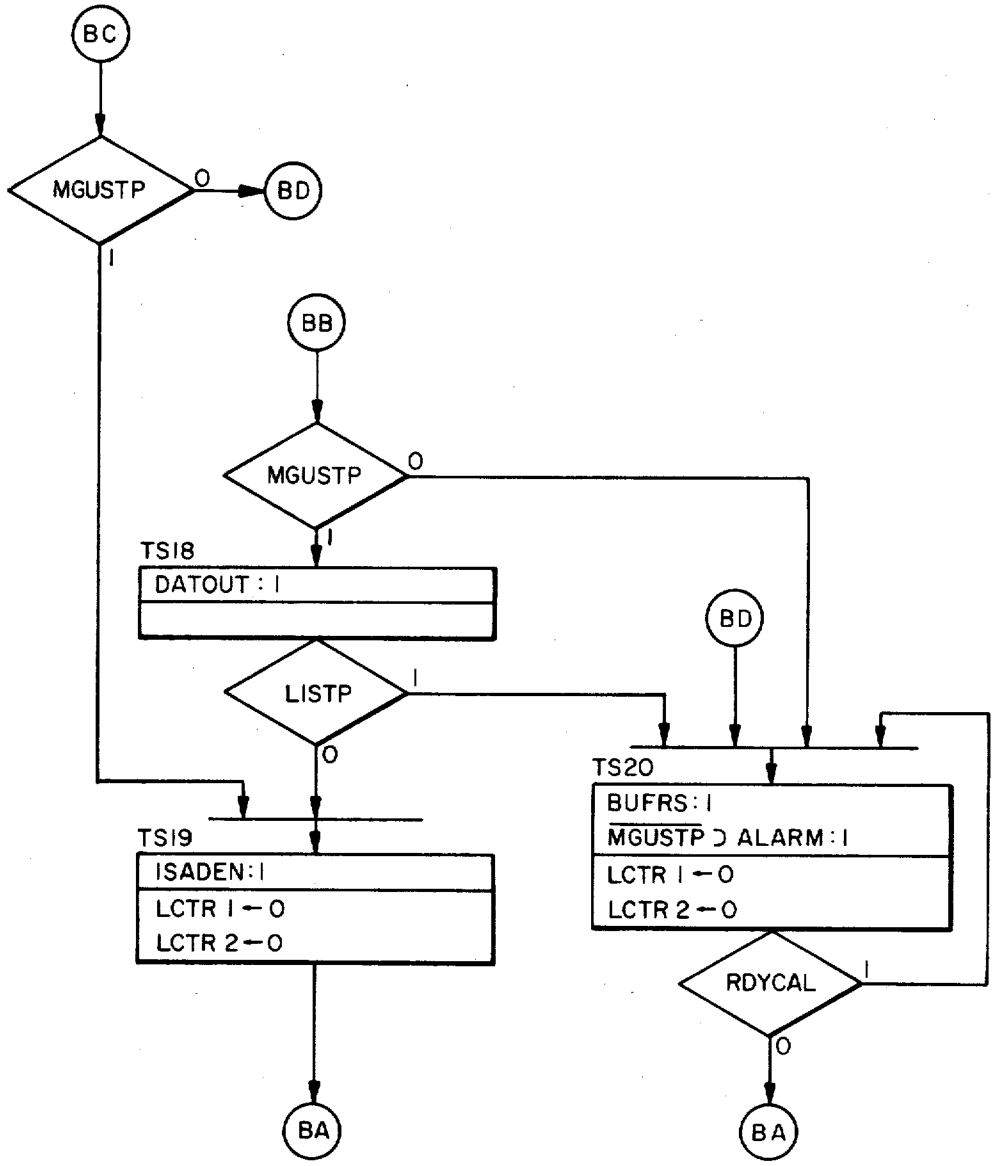

As indicated on the left-hand side of FIG. 13, there are leads coming from and going to the RGT interface as well as leads coming from and going to the buffer sections of the appropriate devices and leads going to and coming from the transmit control section. Within the FIG. a J–K flip-flop 350 is illustrated as well as a sequence control unit 352, an operator register 354, an address register 356 and a response register 358. Cables are utilized to connect the last three referenced registers to operator decode 360, address compare 362, and response decode 364, respectively. In addition a parity check circuit 366 is illustrated along with an operator counter 368, a bit counter 370, and a bit count decode 372. It should be realized that polynomial check codes may be used other than parity and that further references to parity are by way of example only. A receive data (RXDAT) supplies input data from the RGT to a J input of the J–K flip-flop 350 and through an inverting circuit to the K input of J–K flip-flop 350. A loop clock input supplies data through an inverter to the C or clock input of flip-flop 350 as well as to blocks 352–358 and 366–370. The bit sync and initialization sequence inputs are supplied to the sequence control block 352 and a transmit enable is supplied from control block 352 to the RGT. The leads to and from the buffer portion of the particular unit in which the receive control module is utilized are, respectively, BUFS (bufferfull set), RDTDEL (receive data delimit), and CD (control/data) each of which is obtained from sequence control 352. Another line to the buffer unit is a data lead which is obtained from the output of J–K flip-flop 350. The J–K flip-flop 350 provides the one-half bit delay, which was previously mentioned, by having the loop clock 180° out of phase with the received data. A further J–K flip-flop in FIG. 15 provides a further half bit delay in the same manner in the transmit control module to produce the one full bit delay for each module connected to a loop. The data lead from *f/f* 350 is also supplied to blocks 352–358 and 366 and is output to the transmit control block. Two leads labeled RBSCD and RBSCC (receive busy select call data and receive busy select call control, respectively) supply signals from the buffer portion to the sequence control unit 352.

From the transmit control block a single input is received labeled XMTAC (transmit active). This transmit active lead is supplied to the sequence control unit which returns five signals to the transmit control block via leads POLDEL, SENPOL, DATA, RESDEL, and AKCON. These last referenced leads refer to poll delimit, send poll, data, response delimit, and acknowledge/connect, respectively. A further lead from the sequence control is the LPBSY (loop busy) lead when the receive control module is being used in certain units.

The operator register 354 receives an additional input OPSC (opcode register shift control). The address register 356 also has an additional input ADRSC (address shift control). The operator decode has six outputs supplied to the sequence control 352. The first two are call control and call data (CLCTRL and CLDATA, respectively). The next is a signal which indicates that it is neither a call control or a call data ($\overline{CLCTRL} \cdot \overline{CLDATA}$). Two further inputs from the operator decode supply a signal for connect control or connect data (CNCTRL and CNDATA, respectively). Finally, a signal is supplied indicating that the input decoded is neither a connect control or a connect data ($\overline{CNCTRL} \cdot \overline{CNDATA}$).

The address compare 362 supplies a single input labeled ADRCOMP to the sequence control 352. The response decode 364 supplies three inputs to sequence control 352 of acknowlege/connect (AKCON), negative acknowledgement/busy (NAKBSY), and neither of the above ($\overline{AKCON} \cdot \overline{NAKBSY}$). The parity check circuit 366 was previously indicated as receiving the loop clock and the data signal, and it also receives a reset input and a parity shift delimit (PARSCD) from the sequence control block. In addition a parity check output (PARCHK) is supplied from 366 to the sequence control 352. The operator counter 368 receives two control signals OPZO and OPCNE (operator zero and operator count enable, respectively). The sequence control unit 352 also supplies the operator the bit counter 370 with an input CNINC (bit counter clock line). The operator counter 368 returns an input to sequence control labeled OPCNT7 (operator count 7).

The bit counter 370 also receives an input CNZO which is the bit counter reset line. This input accomplishes the same result as the OPZ0 input to counter 368. The bit counter 370 supplies a multiple lead output to the bit counter decode 372 which provides outputs, upon the decoding of counts of 21, 22, 44, 53, 62, 93, 103, 256, 1,046, 1,077, and 1,085, back to the sequence control 352.

In view of the extensive use in mnemonics in FIGS. 13 and 14, a mnemonic list is provided below as a simple reference to the mnemonics used in these two figures.

RECEIVE MODULE MNEMONIC LIST

ACK — (Acknowledge) Positive response field in a connect message.

ADRCKE —(Address Clock Enable) Enables called address transfer from receive module to transmit module.

ADRCOMP — (Address Compare) Checks for comparison between received address and receive module address.

ADRSC — (Address Register Shift Control) Enables the loading of the 24-bit address register.

AKCON — (Acknowledge/Connect) Indicates positive response to reception of a message from receive to transmit module.

BSYNC — (Bit Sync) Logic "1" indicates deomodulator is in sync; logic "0" indicates demodulator is out of sync.

BUFS — (Buffer Full Set) Decode signal which establishes that the buffer requested is full to the buffer control from the receive module.

BUSY — (Busy) Response field in a SELECT call message which indicates to the receive module that the called party is busy.

CD — (Control/Data) Line from receive module which indicates the type of CONNECT block received. Logic "1" implies data; logic "0" implies control.

CLCTRL — (Call Control) SELECT call control field which indicates a control message will follow. (Operator code - 1001100)

CLDATA — (Call Data) SELECT call data field which indicates a data message will follow. (Operator code - 1000011)

CNCTRL — (Connect Control) CONNECT message supervisory opcode. (Operator code - 1110000)

CNDATA — (Connect Data) CONNECT Message data opcode. (Operator code - 1111111)

CN0021 — A bit counter decode of count 21.

CN0022 — A bit counter decode of count 22.

CN0044 — A bit counter decode of count 44.

CN0052 — A bit counter decode of count 52.

CN0062 — A bit counter decode of count 62.

CN0093 — A bit counter decode of count 93.

CN0103 — A bit counter decode of count 103.

CN0128 — A bit counter decode of count 128.

CN1046 — A bit counter decode of count 1046.

CN1077 — A bit counter decode of count 1077.

CN1085 — A bit counter decode of count 1085.

CNINC — Bit counter clock line.

CNZO — Bit counter reset line.

CONN — (Connect) Positive response field in a SELECT call message.

CNT — (Counter) Modulo 2048 counter to count message bits.

INTSQ — (Initialization Sequence) Normally a logic "0." Generates a one shot logic "1" after 1537 zeros have been counted on the line.

LPCLK — (Loop Clock) Clock line from Regenerative Tap (RGT).

LISTP — (Local-Intermediate Loop Strap) Logic "1" enables MGC poll generator for local loop polling.

LPBSY — (Loop Busy) Indicates receive module may be in the process of receiving a call.

NAK — (Negative Ackowledgement) Negative response field in a CONNECT message.

NAKBSY — Indicates negative response to reception of any message.

OPCNE — (Opcode Counter Enable) Enables the modulo eight counter 368 to increment.

OPCNT — (Opcode Counter) Modulo 8 counter 368.

OPCNT7 — Decoded count 7 of operator counter.

OPSC — (Opcode Register Shift Control) Enables the loading of an 8-bit opcode register.

OPZO — Operator counter reset line

PARCHK — (Parity Check) Signals good message parity.

PARSCD — (Parity shift Delimit) Delimits parity check field.

PLA — (Poll Active) Enables poll delimit to be sent to the transmit module when a poll is detected.

POC — (Power On Clear) Establishes all initial conditions for receive module during system connection.

POLL — (Poll) Signal for activating loop devices (Operator code plus start bit - 10000000)

POLDEL — (Poll Delimit) Signal to delimit loop poll condition to the transmit module.

RBSCC — (Receive Busy Select Call Control) Busy to a SELECT call control message.

RBSCD — (Receive Busy Select Call Data) Busy to a SELECT call data message.

RDTDEL — (Receive Data Delimit) Signal which delimits the control parameters or data portion of a CONNECT message.

RESDEL — (Response Delimit) Signal which delimits response field to the transmit module.

RXDAT — (Receive Data) Data line from RGT.

SENPOL — (Send Poll) Requests the transmit module to send a poll.

TE — (Tap Enable) synchronously routes data from regenerative tap unit (RGT) to receive module after POC.

XMTAC — (Transmit Active) Signal which delimits the condition which implies that the transmit module has sent a SELECT call message.

The purpose of the receive module is to take the incoming message and check its operator, address and response portions to determine the type of message being received along with checking its parity to make sure there are no mistakes in the message before transferring the message into the data buffer and/or indicating to the transmit control section of the LRT to send a return response of ACK, NAK, etc. As may be ascertained from FIG. 26 to be later described, the message used in one embodiment of the invention comprised first a start bit of one digit, an operand of seven digits, a called address vector of 24 bits, a data portion of either 40 or 1,024 bits depending upon the operator portion, a check field of 24 bits, and a response field of eight bits. The 40-bit data field is utilized for control messages while the 1,024-bit data field is used for data messages. The operator register 354 is enabled from the OPSC input and the output is decoded via decode block 360 which provides an input to sequence control 352. The address register 356 is enabled by the output ADRSC for comparing the received address with the address supplied from the address strap input to address compare circuit 362 to determine whether or not the address is the same as the present station. The address strap is used so that the address of a station can be changed to any given call code.

The response register 358 continuously receives input data and the output is merely ignored until the proper time. This proper time is obtained by checking the operator to determine whether the word is a data or control message and then using the bit count decode 372 and the operator counter 368 to determine the proper time to start checking the response decode and the ending of this check eight bits later. Since the time at which parity check occurs depends upon the type of word, this circuit is also dependent upon the response obtained from operator decode 360. Thus, an input labeled parity shift delimit is utilized to enable the parity check circuit only during the proper time.

Returning to the address compare section it will be realized that if the station incorporating the receive control module is awaiting a call, the address should compare. However, if the station has just transmitted a call and is awaiting a return of that call to determine the response, the address will not compare.

The response register and its decode 364 are utilized to determine whether the call which is returned contains a busy or connect signal or an acknowledge or not acknowledge response. There will on occasion be a faulty return word wherein the response section is such that none of these responses is decoded. This bit of information is also provided to the sequence control unit. As will be ascertained from a study of the discussion in connection with FIG. 14, the sequence control utilizes this information also.

RECEIVE CONTROL MODULE FLOW DIAGRAM

FIG. 14

Since the block diagram of FIG. 13 can be implemented utilizing a plurality of logic circuits and registers and since these circuits can be implemented in such a variety of ways, it is believed that a flow diagram of the operation of FIG. 13 will provide more information to one skilled in the art. In this manner the apparatus can be easily programmed into a computer in practicing the invention. However, since the flow diagram is quite detailed, the physical circuit design will also be apparent from an understanding of the flow chart.

The flow charts of FIG. 14 are divided into five pages labeled 14A to 14E. As indicated previously, the receive module is found in several places. Normally, it is a passive unit although on the local loop side of a MGU, it is responsible for initiating a poll. Thus, the local-intermediate loop strap is utilized in a MGC to force a return to state 2 (RST2) whenever the device reaches a state indicated as AG as shown in FIGS. 14B, 14D, and 14E. This strapping operation is performed upon installation of the device.

Figure 14A:
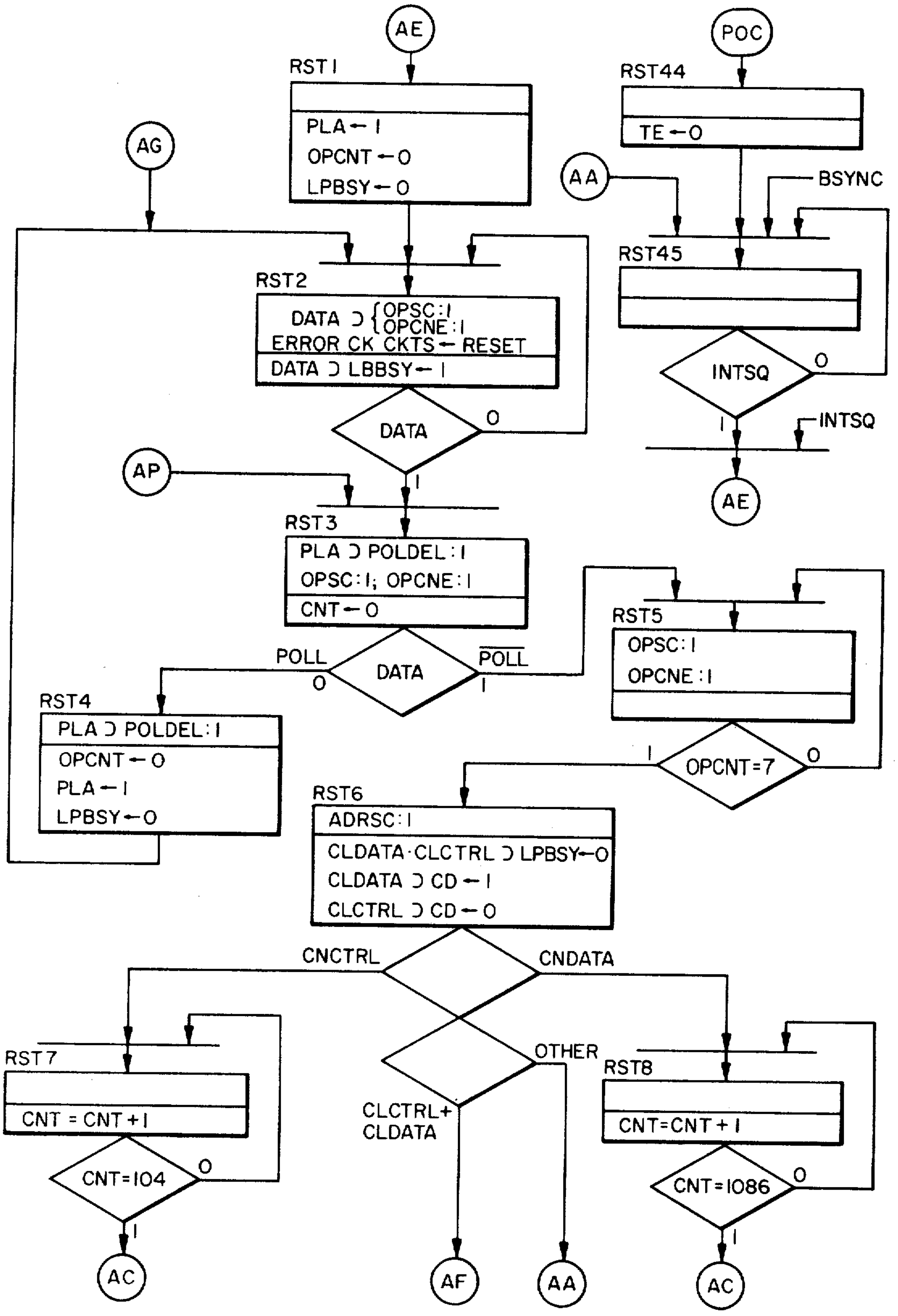
FIGS. 14A–14E illustrate the flow diagram for FIG. 13.

Referring now to FIG. 14A, a POC or power on clear signal is supplied to state 44 after actuation of the device. The device will then set the tap enable to zero and pass to state 45.

In the present flow diagram and the remaining flow diagrams, it should be noted that the blocks for each state have upper and lower portions. The upper portion defines an immediate action upon state entry. The lower portion of the block defines a clocked action on exit from the state. The symbol ":" denotes an action which occurs upon entering a state, or immediately thereafter, and exists only during the existence of that state. Thus, such an action cannot, by definition, occur during the bottom portion of a flow chart block. The symbol "→" denotes a setting, which is often a flag or flip-flop setting, external to the flow diagram actions. This "→" symbol is a "permanent" setting, which remains until set otherwise and can occur either upon entering (top part) a state or upon leaving (bottom part) a state. Thus, the receive module remains in state 44 as long as power on clear (POC) is present. The first clock occurring after POC is removed causes a change from state 44 to state 45. While the receive module remained in state 44, tap enable (TE) was set at logic "1." Upon completion of POC during state 44, the device is ready to enter state 45 upon receipt of the next clock at which time TE is set to logic "0."

As will be noted state 45 receives three other inputs besides the one from state 44. The device remains in state 45 until the initialization sequence (logic "1") is obtained from the RGT. Prior to this time the device remains in an idle or recirculating condition since the output of the initialization sequence quadrangle continually indicates that the initialization sequence line is zero. On the simultaneous occurrence of a "1" and a clock signal to the sequence control, the device proceeds to state 1. As the device passes through state 1 the poll active signal is set to one to enable a poll delimit signal to be sent to the transmit module when a poll is detected. The opcode counter 368 is set to zero and the loop busy output is set to zero. The device then passes to state 2 and idles there until a start bit is received indicating the commencement of data.

The character which looks like a backward C in both the upper and lower portions of the state 2 block should be interpreted in this specification to mean "means the same as, or implies." Thus, upon each passage of the idling status through the data decision block the error check circuits are reset. Upon the occurrence of the start bit or first data bit the loop busy lead is set to a one, and the opcode register shift control and opcode counter enable are momentarily set to one.

In state 3 the next bit is examined and if it is a "1," the apparatus will realize this is not a poll and will go to state 5. However, if the second bit is a zero, a poll is indicated and the device will go to state 4. As may be seen from the lower portion of state 3, the count is set to zero at this point and the opcode register shift control and opcode counter enable are again temporarily set to one. Further, if poll active is still a one from state 1 or is a one for some other reason, the poll delimit is set to a one.

Assuming the condition of the second data bit is a zero, the apparatus enters state 4 where poll active is still considered to be the same as poll delimit equal to one, and the op count, and loop busy are again set to a zero while the poll active is set to "1" if zero or if already a "1" causes the poll delimit to be set to a one. The device then returns to state 2 and again waits for a start bit. However, if the second bit is a one, the device knows that this is not a poll and proceeds to state 5. It remains circulating in state 5 until the operator counter 368 provides a count of 7. On each clock bit through state 5 the OPSC and OPCNE are set to a one temporarily. When the counter 368 reaches a count of 7, the device proceeds to state 6. This count of 7 is 7 plus the bit which allowed the apparatus to pass through the states 2 and 3. Thus, as the device reaches state 6, there are actually 9 bits or clock pulses since the first data bit was received.

In state 6 the decoded output from operator decode 360 is checked by the decision boxes. If the operator decode provides anything other than a connect-control, a connect-data, or a call-control and call-data, the device will proceed to state 45. The passage through state 6 will activate the address register shift control lead to a temporary one even though the opcode indicates improper operation.

If the output from the operator decode 360 indicates a connect-control, the device will proceed to state 7. The bit counter 370 was started counting at the same time the operator counter 368. The device will stay in state 7 until bit counter 370 reaches a count of 104. At this time the decode 372 provides an output which enables the device to change from state 7 to the decision block LISTP in FIG. 14D. If the unit is in a MGU, the device will proceed to state 43; and as it passes threrethrough, will send a poll and return to state 1. However, in most installations the device will be strapped to a zero and the device will return to state 2 directly and await the reception of another data or start bit.

If the operator decode provided an indication of connect-data in the decision block of state 6, the device would proceed to state 8 where the device would remain in an idling or recycling state until the decode counter 372 reached a count of 1,086. The count of 1,086 is the length of a complete data message including the header, parity check, and response sections. Upon a count of 1,086 the device again proceeds to the decision block in FIG. 14D where it sends a poll or returns directly to state 2.

The reason for the MGU initiating a poll on the local exchange loop is to give it priority on sending messages. When the operator decode indicates that there is a CONNECT message on the loop, the MGU merely waits until the message has passed and sends a new poll so that further devices on the loop can respond with calls. If the MGU has a message from the intermediate exchange loop which it wishes to place on the local exchange loop, it merely withholds the poll bit and instead sends the message out to the appropriate device on the local exchange loop.

As previously indicated, the ELC on the intermediate exchange loop only sends out a poll periodically after it determines that no data bits have appeared on the loop for a predetermined length of time or after a predetermined number of messages have passed through the ELC. On the intermediate exchange loop the poll bit is passed from unit to unit as each device completes transmission of its message.

Later in the flow diagram the receive control will react differently to a CONNECT message.

It will now be assumed, after returning to state 2, that a further message is decoded which is either a call-control or a call-data message. In this event the flow sequence leaves state 6 through the decision control block and preceeds to state 9 in FIG. 14B. The apparatus reaches state 9 at the time of the first bit of the called address portion of the data word. Thus, the address register shift control lead is placed in a one and the bit counter is incremented for 22 bits until the bit count decode 372 supplies an output indicating that count 22 is reached. Upon receipt of this signal, the device moves to state 17. The address register is no longer activated since it is only activated long enough to admit 24 data bits into the address register. The 24 bits are obtained by one bit being entered from state 6 and 22 bits being entered from state 9 before the apparatus makes its final loop through state 9 and finds that the 22nd count occurred as it left the decision block with a "no" indication on the previous recycle. In other words, the count is incremented after the decision is made whether or not the count equals the desired amount. Thus, 23 counts are obtained from state 9 and one count is obtained from state 6 to make a total of the 24 counts for the called address vector. The device then enters state 17 where it awaits an output from address compare 362. If the address compares, the device proceeds to state 26 on FIG. 14D. As it leaves state 17 the parity shift control delimit is temporarily set to one and since the address did compare the loop busy is set to a zero. If the address did not compare then, of course, the loop busy would be left alone. In state 26 the device idles or recycles for a number of bits while advancing the count register until on the 46th counted bit the device proceeds to state 27. As will be noted from FIG. 26, a SELECT mode call contains the parity check section for the 24 bits after the called address vector. Thus, an output is obtained from parity check circuit 366 and the sequence control determines whether the parity checked or did not check. If parity did not check the device proceeds directly to state 29. As may be ascertained from the lower portion of state 27 the occurrence of a parity not checking will reset the loop busy line to a logic "0." In state 29 the opcode counter enable circuit is temporarily set to one on each circle of the recycling device until a count of 7 is reached and then upon the next cycle the device proceeds to FIG. 14B and enters the strap decision block prior to state 42. If the device is anything other than a MGU, the apparatus will return to state 2 and again await an incoming data bit. However, if it is a MGU, the device will proceed to state 42 and wait for 256 counts. The error check circuits are reset on each cycle. If prior to count of 256 a data bit is detected, the device will proceed to state 3 of FIG. 14A. However, if no data bit is detected prior to count 256, upon reaching count 256 the device will proceed to state 43 on FIG. 14D where a poll will be sent and the device will return to state 2 to await the return of the poll or a further data message.

Returning to state 27 it may be assumed that, instead of not obtaining a parity check, a parity check is obtained. If either RBSCC or RBSCD is a logic "1" along with an indication of parity check, the device will proceed to state 28. The raising of either of these lines indicates that the station is busy to any calls whether control or data.

In state 28 the response delimit is raised to a "1" as well as raising the operational counter enable to a "1." The device then proceeds to state 29 and continues as previously described to state 42 to send a poll if it's a MGU or returns to await a data bit if the device is not a MGU.

If the parity checks and neither of the receive busy SELECT call lines are raised to a "1," the device proceeds to state 30. It cycles through state 30 for seven counts until on the 8th count it passes to state 31. During each cycle the response delimit, the opcode counter enable, and the acknowledge/connect lines are placed in a logic "1" state.

The device then proceeds to state 31 where it awaits the receipt of additional logic bits. The raising of the acknowledge connect line in state 30 to a logic "1" supplied a signal to the transmit control block enabling it to supply the proper response in the final eight bits of the SELECT mode call word to be returned to the calling device. The receive control block is now awaiting a CONNECT message from the calling device. When the device receives its first data bit the opcode counter enable and the opcode register shift control leads are placed at a logic "1" temporarily while the count is shifted to a "0." In state 32 the device recycles for seven counts during each of which the opcode register shift control and the opcode counter enable leads are temporarily placed in a logic "1" condition. On the next clock after the 7th count the device proceeds to state 33 of FIG. 14E. As the device passes through state 33 the address clock enable is set to "1." Since eight bits have passed since the first data bit was received, the operator decode 360 provides an output signal. If the output is a connect-control and the control-data line is a logic "0" or the output is a connect-data and the control-data line is a logic "1," the device will proceed to state 34. If neither of these conditions exist, the device will proceed to state 45 and await another initialization sequence. This procedure is taken because the arrival of the wrong CONNECT words at this time would indicate that either the calling or the called device is inoperative.

However, assuming that the control data lines in the operator section of the CONNECT word correspond, the device will proceed to state 34. It will stay in state 34 for 22 counts until on the 23rd count the device proceeds to state 35. As will be ascertained, during each of the recycles in state 34, the address clock enable is set to a "1" while the count is incremented. Upon reaching state 35 the 24 address bits will have been entered into the register 356 of FIG. 13 and decoded in comparator 362. The device stays in state 35 and continuously increments the counter until the count reaches 62 or 1,046. During each of these cycles the received data delimit signal is placed in a logic "1." If the control-data line is a logic "1," the apparatus counts to 1,046 to allow the passage of the full data message. However, if the control data line is a logic "0," this indicates a control word and only a count of 62 is required. Upon the attainment of the required count, the device proceeds to state 36 where, upon passing to state 37, the parity shift control delimit is set to a "1" temporarily while the loop busy and count leads are placed in a logic "0." The device stays in state 37 for 22 counts while incrementing the counter until on the 23rd count the device proceeds to state 38. The 23 counts necessary to go through state 37 plus the one count for state 36 allows a parity check after the passage of the message. Thus, a parity check is made in state 38. If parity does not check, the device proceeds to state 40 where a count of 7 is completed during which time the response delimit and opcode counter enable are each set to a one. On the 8th count the device proceeds to state 41 on FIG. 14E. If the parity does check, the device proceeds from state 38 to state 39 whereby the acknowledge connect line is raised to a "1" in addition to the response delimit and the opcode counter enable being set to "1." Again, this state idles for a count of 7 and the device proceeds to the strap prior to state 41.

As will be ascertained, if the parity did not check, no acknowledgment would be sent to the calling party. However, since the parity did check, an acknowledgment was sent so that a further message portion could be transmitted. If the device is anything other than a MGU on the local loop side, the device proceeds to state 2 and awaits a data input signal. If, however, the device is a MGU, the device proceeds to state 41 where the opcode counter enable is set to a "1" and the apparatus waits 7 more counts before proceeding to state 43 where a poll is sent and it now returns to state 2.

Figure 14B:
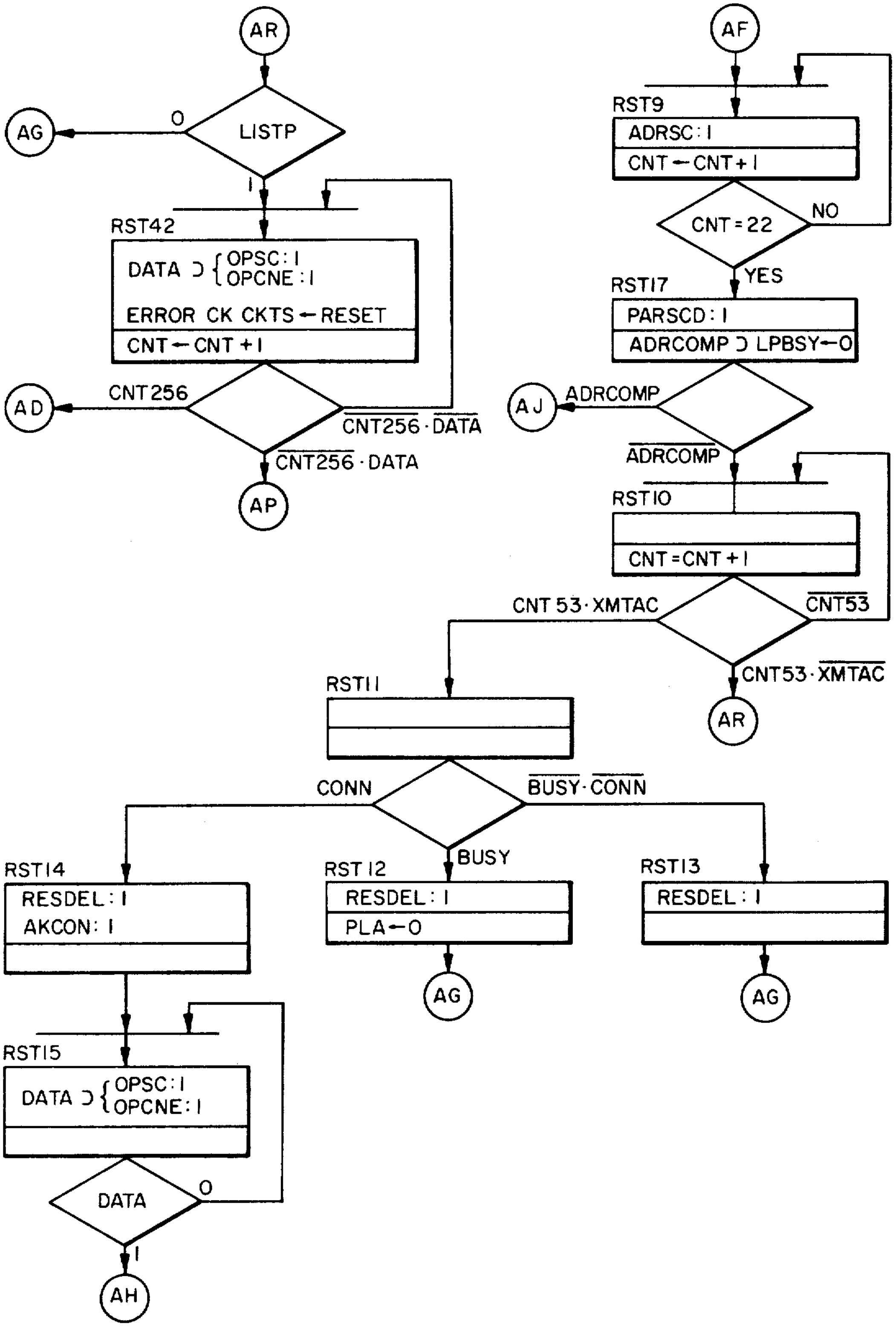
Figure 14C:
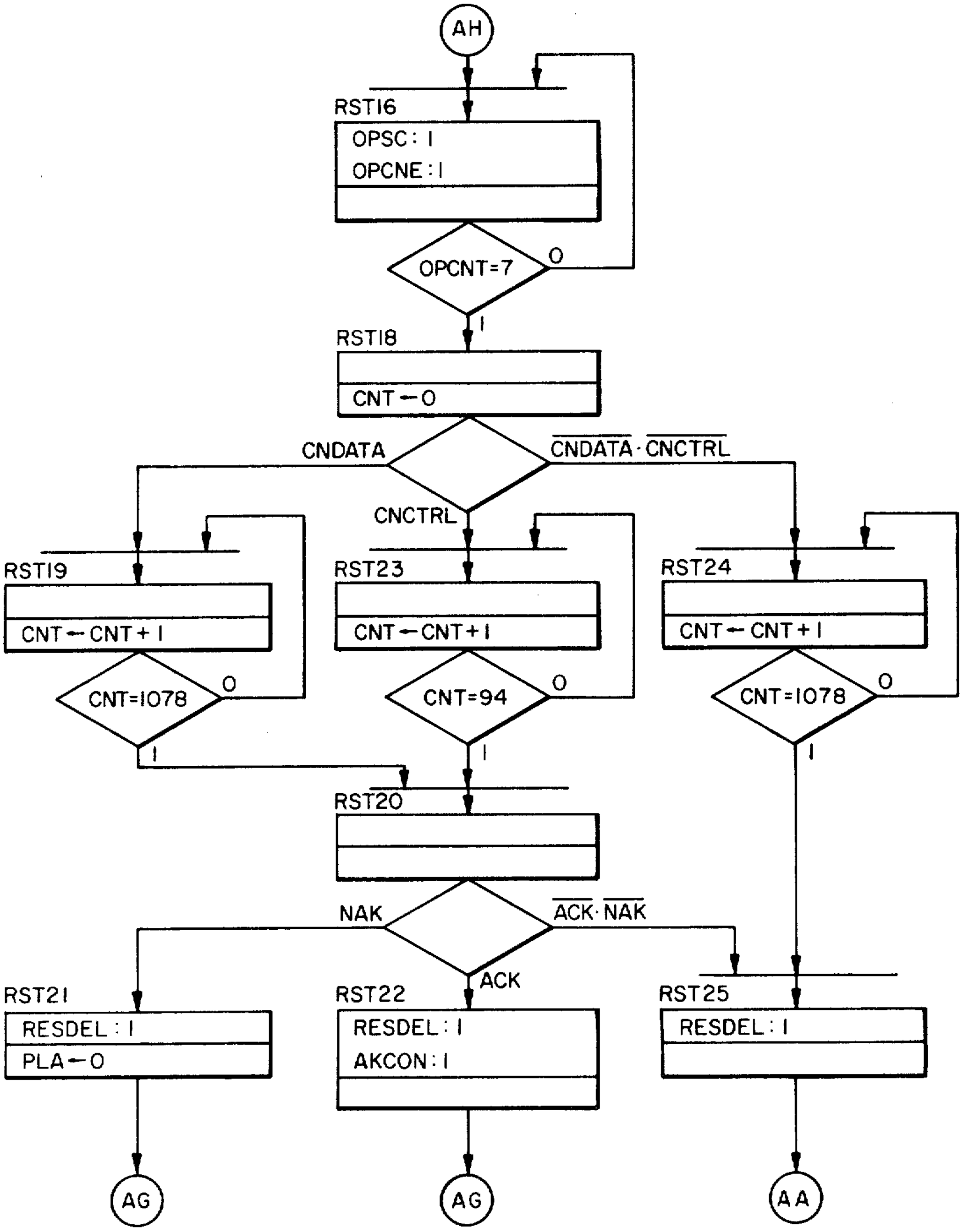
Figure 14D:
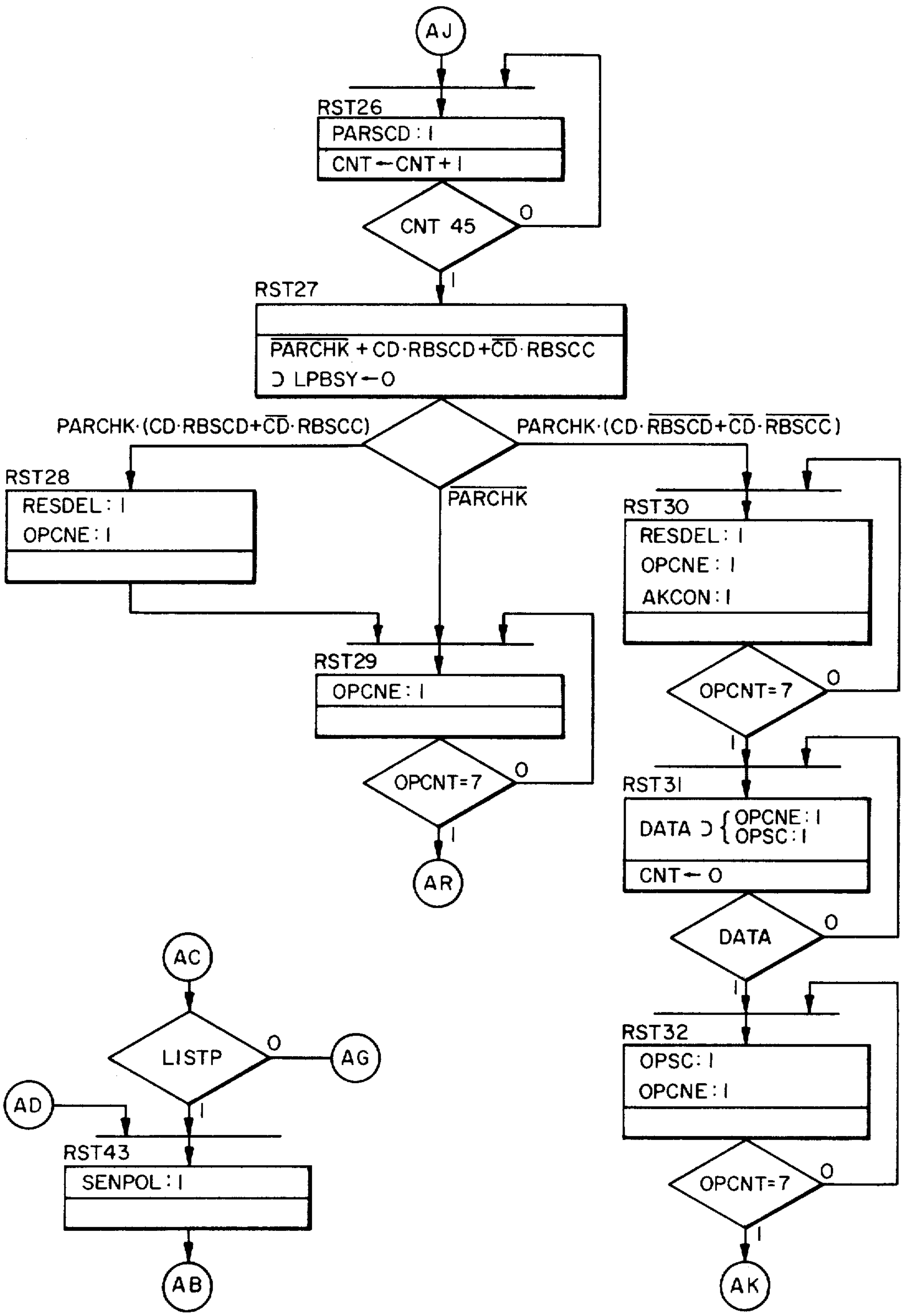
Figure 14E:
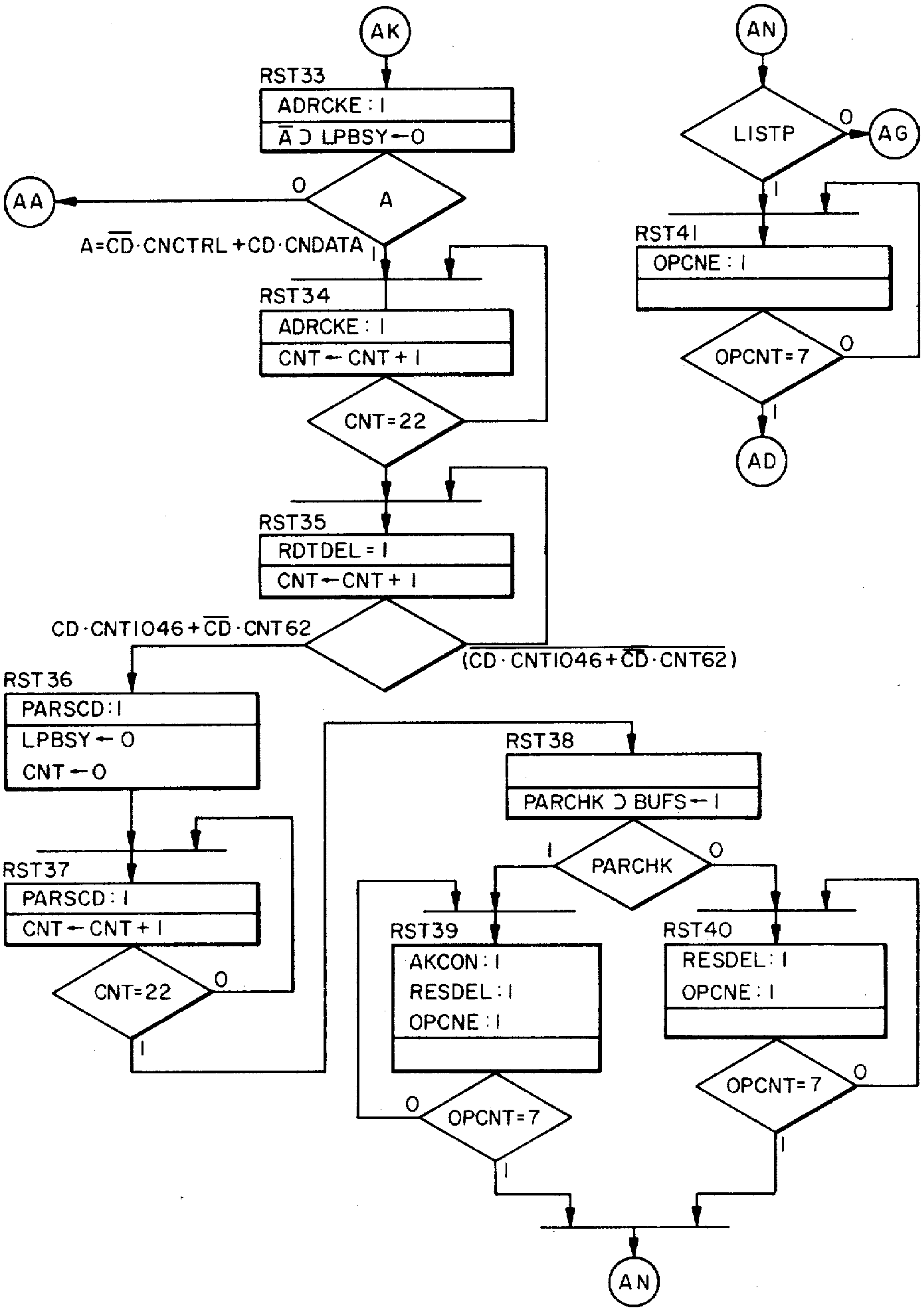

Previously, the apparatus was followed through to state 17, in FIG. 14B, where it was assumed that the address compared. However, if the address does not compare, the device proceeds to state 10. It stays in state 10 for 53 counts. If after the 53rd count the transmit active signal is a logic "0," the device proceeds to a strap decision block above state 42 on the same sheet. Again, depending upon whether the device is a MGU or not, the device may or may not supply a poll output before returning to state 2.

If upon a count of 53 the transmit active signal is a logic "1," thereby indicating that the reason the address did not compare was that a call had just been sent out and it was not being received, the device proceeds to state 11. The response field is examined by decode network 364 and if a busy signal is supplied the device will proceed to state 12 where the response delimit is set to a one temporarily and the poll active is set to a zero. The device then proceeds to state 2 to await a new data bit. If the decode indicates that the response is not busy and if further there is no connect signal, the device will proceed through state 13 to state 2. Again, the response delimit is set to a one.

If the response decode indicates that a connect was received, the device proceeds to state 14 and as it passes threrethrough sets the response delimit to a "1" and the acknowledge-connect lead to a logic "1." The device then proceeds to state 15 where it awaits the reception of further data. When further data is received, the opcode register shift control is set to a "1" as well as the opcode counter enable lead. The device proceeds to state 16 where it waits the 7 counts necessary to have the operator section of the word decoded. Each cycle around stage 16 the opcode counter enable and the opcode register shift control is temporarily set to a one. After the 7th passage the device proceeds to state 18 where the operator decode signals from 360 are examined. If the output is connect-data, the device proceeds to state 19 where a total count of 1,078 is obtained before proceeding to state 20. If the operator is decoded as a connect-control signal then the device proceeds to state 23 where it waits 94 counts before proceeding to state 20. In either case, by the indicated counts upon reaching state 20 the response field is in the response register. As indicated previously, the data continuously runs through the response register and may be examined at any time via the response decode block 364 by the sequence control block 352. The response decode is now examined and if it indicates that there is a negative acknowledgment, the device proceeds to state 21 where the response delimit is set to a "1" temporarily and the poll active is set to a zero before proceeding to state 2 and awaiting a new data bit. However, if the response is an acknowledge, the response delimit is temporarily set to a "1" and the acknowledge connect is to a "1" so that the transmit control unit knows that a positive response has been obtained. The device again returns to state 2 to await new data bits. If neither an acknowledge nor a negative acknowledgment is received, the device proceeds to state 25. As the apparatus passes through state 25 the response delimit is set to a "1" and the device proceeds to state 45 to await an initialization sequence thereby indicating that the present circuit apparatus is apparently inoperative.

After reaching state 18, if the operator decode block 360 indicates that the operator is neither a CONNECT data or CONNECT control, the apparatus proceeds to state 24 and counts 1,078 before passing to state 25 and thereafter to state 45 to await an initialization sequence. Again, receipt of either a signal indicating that it is not a CONNECT block in state 18 or an improper acknowledgment in state 20 indicates that the circuitry is inoperative and requires a return to the initialization sequence to ascertain if the circuitry can be made operative on a new attempt.

To summarize, the receive module awaits the start of a message; if it is a poll, it ignores it and awaits an actual message. If the message decoded is anything other than a call, at initial conditions, the device returns to waiting for further messages after an appropriate time interval. When a call is received and the address does not compare, and the device further knows that it is its own call previously sent, it is examined to see if the response field indicates a connect. The next reception of data should again be a word transmitted by the transmit control portion of the associated device, the device awaits the CONNECT data or CONNECT control word which it examines to make sure that it is acknowledged before returning to its initial waiting state. If the address does compare, the device checks parity, the control/data lines and whether or not the station wishes to stay in a busy condition before proceeding to receive the CONNECT word. When the CONNECT word, either data or control, is received, its parity is checked and an acknowledgment is supplied before returning to the initial state.

TRANSMIT CONTROL MODULE

FIG. 15

The transmit control module normally remains in an idle condition and allows the passage therethrough of loop data as received from the receive control module. As previously indicated, the transmit control module delays the data by a half bit time period. This is accomplished in a J–K flip-flop 380 constructed very similar to that found in the receive control module of FIG. 13. The incoming data to the transmit control module is received on lead 382 to a sequence control No. 1, block 384. This data leaves control block 384 on a lead 386 to the J–K flip-flop 380 and leaves from the true output of the J–K flip-flop. A further input lead 388 to a sequence control unit No. 2 designated as 390 provides an indication that a buffer has been filled with data to be transmitted. Upon completing a sequence of logic steps, the control block 390 supplies an input on a lead 392 to the control block 384 that data is available to be transmitted by the transmit control module. A block counter and bit count decode block 394 is illustrated with clock, reset, and count enable inputs and with a plurality of outputs providing an output decode of count 0, 30, 32, 53, 72, 95, 100, 1,056, 1,079, and 1,084. All of these decoded outputs are supplied back to the control sequence block 384. A further output of the sequence control block 384 is BUFRS supplied to a response buffer 358 in FIG. 13. There is a response counter and generator 398 which receives an input of response count enable from block 384 and an acknowledge/connect input from the receive module of FIG. 13. The counter 398 supplies outputs of response and response count 7 to control block 384. A limit counter 400 receives inputs of limit count 1 enable and reset limit count 1 while providing an output of limit count 1. A further limit counter 2 is designated as 402 and it receives inputs of limit count 2 enable and reset limit count 2 while again providing an output indicative of limit count 2. A parity generator block generally designated as 404 receives as inputs a clock, a parity generator input, a parity generator register reset, and a parity clock enable. The parity generator holds 23 bits and provides an output to the sequence control block 384 of parity data. An opcode generator block 406 receives an input of transmit control/data (TXCD) from the control block for the data buffer or from the station interface buffer and receives further inputs of parallel load 1 or parallel load 2. The output of the opcode generator 406 is supplied in parallel to an opcode register 408 of six bits. The parallel load inputs to generator 406 enables the loading in parallel to register 408 of SELECT or CONNECT opcodes. An address register 410 is illustrated having several serial inputs such as a third party input, an address data input, and a gated clock input. The register 410 contains three 8-bit areas of subscriber, exchange, and area code data bit messages. Each 8-bit area or field contains a 6-bit address and a 2-bit prefix. The area code prefix is -01, the exchange prefix is -10, and the subscriber prefix is -00. Where the device being addressed is a processor rather than a subscriber, the address is -11. Although not pertinent at the present time, the system may be designed to have a party line with a plurality of stations connected to a single SCU; and if so, an extension number would be included as an 8-bit address in the first CONNECT message sent to the called station as shown in FIG. 26. Returning to FIG. 15, the three portions of block 410 and a similar register 414 are drawn in different sizes for convenience although in actuality each contains an 8-bit register section.

The sequence control block 384 also supplies an input of register clock enable to 410 along with register in (REGIN). A final serial input to block 410 is a normal clock input. Further register 414, which is utilized as a third party address register, receives the same serial inputs as did register 410 and additionally receives a parallel input from intercept station address block 412. Each of the registers 410 and 414 provide an output through an OR gate 416 to the opcode register 408. The intercept address block 412 receives a serial input from control block 384 labeled intercept station address enable (ISADEN). When this lead is raised to a logic "1," the intercept station address is parallel loaded into the address register 414.

Most of the inputs to control block 384 have already been listed; but there are several more such as the MGU strap input (MGUSTP) which may be set upon production of the device. A further strap is the local/intermediate strap (LISTP). If the transmit control module is to be placed on the local loop side of a MGU, this is set to be a "1"; and it is set to be a "0" if it is on the intermediate loop side of the MGU. A further input is poll in (POLIN) for indicating to the control block not to send a poll. The control block 384 supplies an output labeled ALARM (if used in a SCU) to the station interface that the set limit number of busy or NAK responses were received and indicated by limit counters 400 and 402, respectively. Another output is a transmit delimit (XMTDEL) which output is supplied to the station interface or to the data buffer control for obtaining the data to be transmitted via line 382. A buffer reset (BUFSR) output is also utilized to reset the buffer full lead 388 to its logic "0" condition. A final output of block 384 is transmit active (XMTAC) which is supplied to the receive module of FIG. 13 to indicate that a message is being transmitted and that the device is thus busy.

A further input to block 384 is data (DAT IN) which is the input from the receive control module of FIG. 13 delayed by one-half bit in time. This data, during normal idle conditions of the transmit control module, is merely transmitted through block 384 to the data-out line 386. Another input is poll delimit (POLDEL) received from the receive module and indicating that a poll has been received from the loop. Response delimit and acknowledge-connect are two further input leads to block 384. The response delimit informs control block 384 when it should look at or send a response as indicated by the acknowledge connect line. A final input is the transmit control/data line which was previously indicated as being supplied to opcode generator 406. It should be noted that, although not previously mentioned, several of the other blocks such as 380, 390, and 394 receive clock inputs.

As previously indicated, messages are sent in the direct switch system from node to node or station to station along the entire path. In order to determine whether or not the next station is busy, a SELECT mode call is sent; and if the response section of this word is changed to a connect, the data or control word is then supplied in a CONNECT mode word. The device being called may already be connected to a given party. However, from the format used in the present embodiment of the invention, the party receiving the SELECT mode word does not know whether the SELECT call word is coming from the party to which he is connected or from a third party. Thus, he must reply with a connect so that he can either receive the data or control word. If the word is from a third party, it will be a branch call control message of a CONNECT word block. Thus, it will contain the address of the calling party. The called device will decode the branch call portion of the word and determine that it must now send a SELECT call and CONNECT mode control message back to the third party indicating that, although it accepted the SELECT word, in actuality it is busy to third party messages. Thus, the return message has the calling party's address in the called address vector portion thereof, and the reply word is the busy control message word as shown in FIG. 26.

Applying this information to FIG. 15 it will be noted that the data normally is supplied directly through control block 1. When the device is not connected to anyone, it responds to a call with a connect and then when it receives the control branch message the calling party's address is placed in the register 414. This information is retained so that the device can return a disconnect or supply CLCK messages back to its connected station. At the time that the calling address is stored in register 414, the response section is changed to a connect so that the calling buffer will determine upon examining the response section that the two parties may be connected. The called party then sends out a SELECT call and CONNECT CLCK to the calling party indicating a "connection."

If the device now receives a third party SELECT call, the device, not knowing that the calling party is a third party, will change the response section to a connect and await the CONNECT mode word. If by some inadvertence this CONNECT mode word were a data message, the device would, of course, accept the message as coming from the connected party rather than a third party. However, the apparatus is designed such that this will not occur. Rather, any message from a third party which was not connected to the present device would have as its CONNECT mode word the branch call control message which would be decoded as such by the station interface module of FIG. 17. The address information from the branch call control message is supplied to block 414, where it will be available for sending a reply of a busy control message to the party in the next available instance.

When the transmit control module supplied output data, this information is supplied through the parity generator 404 so that the parity count can be checked and a parity code can be generated. At the appropriate time, the parity information is supplied to the message and transmitted as part of the overall message. Referring to FIG. 26 this section of the message is referred to as a "check."

The transmit control device will receive, on occasion, a negative acknowledgment or a busy signal from a party which is being called. Each consecutive occurrence of negative acknowledgment or busy is recorded in the limit counters 400 and 402. If more than the set number of busy signals are consecutively received, the alarm lead is raised if the transmit control block is in a SCU. If the transmit control module is in a MGU, the MGU will merely issue a poll. If the transmit control module is on the local loop side nothing further will be done with the message and the calling party on another local loop will, after a predetermined amount of time, attempt to send the message again. If the transmit control section is on the intermediate loop side of the MGU, the intercept station address will be loaded into address register 414 and the message will be sent to an intercept station (not shown specifically).

The response counter 398 is utilized to count the number of bits in the response section of the received SELECT or CONNECT mode words and to generate a new response if indicated to do so.

TRANSMIT CONTROL MODULE FLOW DIAGRAM

FIG. 16

A flow diagram is presented in FIG. 16 of the block diagram of the transmit control module of FIG. 15. As may be ascertained from the following step-by-step description of the flow path of FIG. 16, the transmit control module awaits the receipt of a start bit at the data-in line and a ready-to-call indication. If the start bit is anything other than a poll or if there is no ready-to-call indication, the device returns to its idle state. Two exceptions to returning to the idle state immediately are if it has been asked to send a poll or if it has been asked to send a response. If it has been asked to send a poll and it is ready to call, it will send the call rather than the poll. This, of course, only happens to the transmit control module which is on the local loop side of a MGU. The call will be sent and the device will return to its idle state awaiting a return of the message to the receive control module for examination of the response return.

Returning to the situation of the device being polled and being ready to call, the transmit control module will send out the operator code and the address from the registers 408 and 410 of FIG. 15. The address register 410 was previously filled with an address by a previous CONNECT call. The parity bits are now transmitted and then zeros are transmitted while the device awaits receipt of the SELECT mode call from the next node. When the message is returned with the appropriate indication in the response section, the transmit control module either notes that it is busy and increments the busy limit counter and then, depending upon whether the transmit control module is part of a MGU, sends a poll or awaits further instructions. By awaiting further instructions it is meant that the device will await the next poll while still containing the ready to call indication so that upon the next poll a further SELECT call can be transmitted. If the response is a connect signal, the busy counter is set to "0" and the CONNECT mode block is assembled by sending the data from the address and opcode registers 408 and 414 onto the output line preparatory to sending the data or control bits and then sending the parity bits. If the device is a MGU, a poll will be sent thereafter. However, for other units, a response will be awaited from the called station to see if it is negative or positive acknowledgment. If it is a negative acknowledgment the appropriate limit counter 402 is incremented. If the number of negative acknowledgements exceeds the prescribed maximum, the message is sent to the intercept station if on the intermediate exchange loop and the message is dumped if on the local exchange loop. If the allowable number of negative acknowledgments has not been exceeded, the device returns to its initial state. If the response is a positive acknowledgment, the buffer full line is reset as well as the negative acknowledgment counter and it now returns to the initial state.

Keeping the above information in mind and further noting that there are two sequence control blocks 384 and 390, the flow diagrams will be described. Since the flow diagram for 390 is very short it will first be described from FIG. 16D. Upon receipt of the power-on-clear signal, control 390 awaits the receipt of a buffer full indication from the station interface module or from the buffer control unit of the MGU. When this indication is received, the apparatus proceeds from state 21 to state 22 wherein either a SELECT control call or SELECT data call opcode is parallel loaded into the opcode register 408 by setting PALDE 1 to a logic "1" condition. The device then proceeds to state 23 and places a logic "1" on the ready call lead 392 to sequence control block 384. The device then remains in this state and recirculates until the buffer full lead is changed from a logic "1" to a logic "0" by the buffer reset (BUFRS) output lead of control block 384. Upon the buffer full lead being returned to zero, block 390 returns from state 23 to state 21.

Block 384 awaits the power-on-clear signal from other circuitry in the device and when it is received goes to state 1. It stays in state 1 as long as the input conditions correspond to conditions TT. TT is expanded upon at the bottom of FIG. 16A as being the conditions of no response delimit signal and no poll delimit or no ready call signal and no send poll or no ready call signal or a poll in. As will be noted by the upper portion of the state 1 block, the TT detection keeps the dataout line directly connected to the data-in line and there is merely a direct connection through block 384 of data received from the receive module. On each circulation through state 1, the parity generator register is reset. It should be remembered as mentioned in conjunction with FIG. 14 that the setting of any logic in the bottom portion of a state causes that indication to stay until it is changed by another state. The top portions are temporary changes and only occur upon each passage through the state. Thus, on the first passage the count in counter 394 is set to zero. However, the device will immediately start counting when it leaves state one and encounters CNTEN in later states.

When a response delimit signal is received by the device it will proceed to state 5. The response delimit output causes the connection of the output of the response generator 398 to be connected to the data output line and for the response counter in 398 to be incremented by one. The device stays in state 5 for seven more counts and then returns to state 1. Basically the response delimit is to add a response to a received message for the station signifying that the device acknowledges the received message whether it is a SELECT or CONNECT message.

While the response delimit also occurs if a word is received back which has previously been transmitted, this sequence of events occurs later in the flow chart.

If the transmit control module receives both a ready call signal and a send poll signal while simultaneously having a logic "0" on the POLIN lead, the device will go to state 2. Upon leaving state 1 in this condition, the transmitter sets the data lead to a "1." The second data output bit is also placed in a logic "1" in state 2, and the device passes to state 3. In state 3 the count enable is set to a "1" temporarily as well as connecting the output of opcode generator 408 to the data output lead and also connecting the output of 408 to the REGIN for returning or recirculating the address back to register 414. In addition the parity check enable is set to a logic "1" along with the register clock enable for shifting the address and opcode out of the appropriate registers. A final setting is to set the parity generator input to the data output so that the parity generation can proceed. The device then proceeds to state 6 where these six settings are continued for 30 more counts. States 2 and 3 only occur in the transmit control module in the local loop side of a MGU. In all other units the device proceeds to state 4 upon simultaneous reception of a poll delimit and a ready call. The occurrence of these two signals sets the data output to a "1" and sets the response counter to a "0." As previously, the parity reset enable is set to a "1" and the main counter 394 is set to a "0."

In state 4 each of the settings of state 3 occur. By this time the receive control module has been able to determine whether the start bit reacted to by state 1 comprised a poll or was the start of someone else's message. If it preceded someone else's message, the device returns to state 1 as poll delimit is reduced to zero. This reduction to zero occurs immediately after entering state 4 at which time DATOUT is connected to DATIN. If, however, this is actually a poll, the device proceeds to state 6 where the six requirements or settings are set for 30 more times and the transmit active is set to a "1" for each of 30 recirculations until on the 31st time it proceeds to state 7. At the time that the transmit control unit reaches state 7 the six bits of the opcode plus the 24 bits of the address have been transmitted. In state 7 the data output lead 386 is connected to the parity data output lead of parity generator 404. The count enable is set to "1" and the parity check enable is set to "1" while the parity generator input is set to a "0." This condition remains for 23 more counts until the count reaches 53. On the 24th count the complete parity check word has been transmitted and the device proceeds to state 8. In state 8 the data output lead is placed at zero while the parity generator register is reset and the opcode register is parallel loaded from the opcode generator 406 by the setting of PALDE 2 to a logic "1." The opcode is loaded with either a CONNECT control or CONNECT data opcode. The device remains in state 8 until the response delimit line is raised to a logic "1" indicating that the receive control module has received the message back, and it is now time for the device to determine whether the response from the call sent out is a connect or busy. If the acknowledgment connect line is a zero from the receive control module, the device proceeds to state 9 where the limit counter 400 is incremented by one indicating that another attempt has resulted in a busy. The transmit active line is returned to zero so that the device can receive further calls. If the LCNT1 lead is a one, thereby indicating that the limit of busy signals has been exceeded, the device will proceed to the MGU strap decision block prior to state 18 in FIG. 16E. If it is not a MGU it proceeds to state 20 where the buffer reset is placed in a logic "1" condition and the alarm is set equal to one and the two limit counters are set to zero. The device then awaits the time necessary for the second sequence control unit 390 to return its output of ready call to a zero condition. When this occurs the device returns to state 1. If the device is a MGU when it leaves the decision block above state 18, it proceeds to state 18 where the data output lead is set to a logic "1." It then enters the decision block LISTP where a one is strapped if the transmit control unit is on the local loop side of the MGU, and a zero is strapped if it is on the intermediate loop side of the MGU. Assuming it is on the local loop side, the alarm is not raised since it is in a MGU and the device eventually returns to state 1. However, if it is on the intermediate loop side (indicated by a logic "0") the device proceeds to state 19 where the intercept station address is parallel loaded from 412 to unit 414 and the two limit counters are set to zero so that the device is now ready to send the message to the intercept station where all non-delivered messages on the intermediate exchange loop are delivered.

Returning now to the decision block below state 9 where it may be assumed that the limit of busy signals has not occurred and the device proceeds to the MGUSTP decision block. If it is not a MGU the device returns to state 1 and attempts to send the message on the next poll. If it is a MGU, it proceeds to state 10 where a one is placed on the output lead for the purpose of sending a poll before returning to state 1.

Returning even further back to the decision block AKCON, it may be assumed that a positive acknowledgement was received from the select word previously sent. In this instance the device will proceed to state 11. In state 11 the new opcode is placed in register 408 and transmission and parity check is commenced. Leaving state 8 had placed the count at zero so the upper portion of state 11 indicates that the count zero and count one conditions places a one on the output lead and the output of the lead from register 408 is not connected for the first two counts. However, the count enable is set to a one for each of the 32 circulations. The register clock enable is set for the counts 2–32. The output lead is connected to the input of the parity generator during each of the 32 recycling operations and after a count of one, the parity check enable is set to a logic "1" so that the parity generator will receive the output message.

As will be noted, upon reaching a count of 32 the transmit delimit lead is placed in a logic "1" condition immediately before proceeding to state 12.

The device remains in state 12 until the count reaches 1,056 or 72 depending, respectively, upon whether the message to be transmitted is a data or a control word. This information is obtained by checking the transmit connect data line to see if it is a logic "1" meaning that the CONNECT block is data or a logic "0" meaning that it is a control word. On each circulation through state 12, the output line is connected to the parity generator as well as to the transmit data line 382 which is connected to the buffer control unit or the station interface buffer. Additionally, the parity check enable and the count enable leads are set to a logic "1" so that counter 394 can count the data bits out and the parity generator 404 can generate parity.

Upon reaching the proper state as determined by line TXCD and the count in bit count decode block 394, the device proceeds to state 13. Upon leaving state 12 the transmit delimit is placed in a zero condition.

In state 13 the parity bits are transmitted by connecting the output of parity generator 404 to the data output lead and placing the parity generator lead to a zero while continuing the count enable and parity clock enable leads at one. By placing the parity generator lead at a zero, the parity generator is automatically cleared by receiving zeros at the input. When the count reaches 95 or 1,079, depending upon the lead TXCD, the device proceeds to the MGUSTP decision block immediately below state 13. If the device is not a MGU, it proceeds directly to state 15 where it awaits return of a transmitted CONNECT block to determine the response. If it is a MGU it proceeds to state 14 where zeros are transmitted until a count of 100 or 1,084 is reached at which time a poll is sent out by placing data out to a one. As will be noted, each circulation thereof the count enable is set to a one. Upon reaching either of the prescribed counts, the device will proceed to state 15 where it awaits the return of the transmitted CONNECT block to determine the response.

The reason for sending out the poll from the MGU in state 14 is to allow the next device in the loop on the intermediate loop side to receive a poll and transmit a word or on the local loop side to allow the next appropriate device on the local loop to receive a poll and transmit a word.

The device stays in state 15 until the response delimit is set to a one. During this time the data out is placed at a zero and the parity reset enable is placed at a one. Further, the counter is set to a zero. When the response delimit is raised to a one, the device proceeds to the decision block AKCON. If the response is negative acknowledgment, the limit counter 402 is incremented and the transmit active is set to zero in state 17. The device then checks to see if the predetermined limit has been reached. If it has been reached it proceeds to the MGUSTP strap in FIG. 16E prior to state 19; and if it is not a MGU, proceeds to state 20 where it proceeds as previously indicated. If it is a MGU it proceeds to state 19 and continues as previously indicated by sending the message to the intercept station. If, however, the acknowledgment is positive, the acknowledgment limit counter is set to zero in state 16. Transmit active is also set to a zero and the buffer reset is placed in a logic "1" condition. As soon as the sequence control block 390 changes ready call to a zero, the device returns to state 1 so that it may respond to other start bits for transmitting data.

From the above flow diagram description it should be apparent that the transmit control module supplies polling bits, response sections of messages acknowledging receipt of a word from a calling buffer or node and supplies SELECT and CONNECT messages in responding to a "connected" device. Additionally, it supplies busy responses to third party calls after determining the calling party's address.

MNEMONIC LIST FOR TRANSMIT MODULE OF FIGS. 15 AND 16

ADDATA — Address data - Data received from the receive control module containing third party addresses or received from station interface buffer for address of party being called.

ALARM — Alarm - Informs station interface that more than the predetermined limit number of busy or NAK responses were received; this is an output signal.

BUFFUL — Buffer full - Informs transmit control module to place a SELECT call MESSAGE on the loop. This is an input from buffer control or station interface.

BUFRS — Buffer reset - Instructs the buffer control or station interface to reset BUFFUL to logic "0."

CNTEN — Count enable - Line used to enable block counter 394.

CNT( ) — Count decoded output - The count number is a specific lead from the bit decode unit 394 indicating that a specific numerical count has been reached. This is an output from 394 to sequence control 384.

DATOUT — Data out - An output from control unit 384 to flip-flop 389 containing the data to be provided back to the loop.

DATIN — Data in - Input data from the receive module to sequence control 384.

GTDCLK — Gated clock - Clock signals from the receive control module for shifting an address into the address register 410. (NOTE: The clock from the receive module may be slightly different from the clock used to send data to the loop and thus two different clocks are used in the transmit module.)

ISADEN — Intercept station address enable - The line used to parallel load the intercept station address from register 412 to register 410.

LCNT — Limit count 1 or 2 - The lines from limit counters 400 and 402 to the sequence control 384 for indicating that a predetermined set limit for busy signals or negative acknowledgment (NAK), respectively, have been reached.

LC1EN — Limit count 1 enable - Enabling lead from control unit 384 to the busy counter 400.

LC2EN — Limit count 2 enable - Enabling lead from 384 to negative acknowledgment counter 402.

LISIP — Local-intermediate strap - This is an input supplied to control block 384 whose value is dependent upon the use for the transmit control module. The input is a logic "1" if the control module is used for the local loop side of a MGU and is a logic "0" if used for the intermediate loop side of a MGU.

MGUSTP — Master group unit strap - This is an input to control unit 384 which remains constant for a particular transmit control module and is placed at a logic "1" if the control module is used in a MGU and is placed at a logic "0" if it is used in any other device.

POLIN — Poll in - This is an input from the LDI indicating that a poll has just been received.

PARRSE — Parity generator register reset - Lead from 384 to parity generator 404 to reset the generator to zero.

PARCKE — Parity clock enable - Input from 384 to 404 containing the clock utilized by the parity generator for shifting data inputs.

PARGEN — Parity generator - This line provides data input to the parity generator. When operative this lead is connected to the DATOUT line 386.

PALDE1 — Parallel load enable 1 - Lead for directing opcode generator 406 to parallel load a SELECT control call or a SELECT data call opcode into the register 408.

PALDE2 — Parallel load enable 2 - Line to generator 406 for parallel loading a CONNECT control or CONNECT data opcode into register 408. The determination whether the above two inputs will provide control or data opcodes depends on input TXCD also supplied to generator 406.

RDYCAL — Ready call - Input from control 390 to control 384 indicating that the data buffer is full and that the control unit 390 has provided the proper opcode to register 408.

REGDAT — Register data - Output line from register 408 to control unit 384 for supplying thereto the opcode and address.

REGCKE — Register clock enable - Output from control 384 to the address registers 410 and 412 for enabling these registers to accept an address from the receive module, the buffer control, or the station interface.

REGIN — Register in - Input from control module 384 for circulating the opcode and address register from the output REGDAT of this portion of the transmit control circuitry and back to the input to maintain the proper address therein.

RESDEL — Response delimit - Informs block 384 when to look at or send a response as indicated by the AKCON line.

RELCT — Reset limit counter 1 or 2 - An input for resetting the respective limit counter after the transmit control makes a successful call or takes the procedural steps of setting an alarm or sending information to an intercept register when the predetermined limit count is reached.

RESP — Response - Response register line from 398 containing the proper response data for insertion into the response section of a select or control word.

RECNTE — Response counter enable - Line from control block 384 to response counter 398 to enable this block for commencing the count.

SENPOL — Send poll - Input from the receive control module to the sequence control 384 for informing the transmit control module to send the poll on the loop.

TXDAT — Transmit data - Output from flip-flop 380 for transmission to the loop connected to this particular control module.

TXDATA — Transmit data - Data received from the buffer control or the station interface buffer by the control unit 384. In most instances this data is passed through control unit 384 but on occasions of transmit this data (on lead 382) is open-ended.

TXCD — Transmit control/data - This line is a logic "1" if the CONNECT block is data and is a logic "0" if the CONNECT block is control. This line also controls whether the select block is a call or a poll.

THDPTY — Third party - This line is obtained from the receive control module and indicates if the call is to be placed to a third party. Basically, this line activates receipt of an address by register 414 and deactivates register 410 from receipt of an address on the ADDATA line.

XMTDEL — Transmit delimit - A delimit line from control block 384 to the station interface or buffer control for obtaining the data on line 382.

STATION INTERFACE MODULE FOR SCU

FIG. 17

The station interface module for the SCU is basically an interface between the station and the receive and transmit modules of the SCU and is shown as block 290 in FIG. 9. In addition, it is connected to the SCU data buffer for supplying words to and from the buffer for storage and retransmission. The data received by the SCU is supplied from the receive control module and routed to the data buffer. Later the information is retrieved from the data buffer and supplied to the station. The incoming data from the receive module is also placed in part in a register for decoding the operator and retrieving the address portion of a branch call. The station interface module further contains a transmit control register wherein the address and operator is assembled from data obtained from the station preparatory to supplying this information to the transmit control block 280 of FIG. 9.

STATION INTERFACE MODULE MNEMONIC LIST

FIGS. 17 AND 18

AKCON — Acknowledge/connect - Line from the receive control module 282.

ALARM — Alarm - Line from the transmit control module that indicates the transmit function was unsuccessful more than a predetermined number of times.

BRACAL — Branch call - Control operator branch call indication from the receive control register.

BSCD — Busy SELECT call data - A signal which is used to cause the receive control module to respond busy to SELECT call data blocks. This signal is to be distinguished from the disconnect signal which must be supplied in response to third party SELECT calls after the station is already connected. It should further be noted that the RBSCD is the line to the receive control module to accomplish this function. In other words RBSCD = BSCD + DTRX + STBSY.

BUFCNT — Buffer bit counter - A counter and decoder which, after activation, provide output counts of 1,015 and 1,023 before automatically returning to a count of zero.

BUFIN — Buffer input - Data line to a control unit for the data buffer.

BUFOUT — Buffer output - Data line from the control unit for the data buffer 294 of FIG. 9.

BUSY — Busy - Control operator signal to operator encode block 438.

CD — Receive control/data - Line from receive control block 282 which indicates the type of CONNECT block received from the loop. A logic "1" indicates data while a logic "0" indicates a control block.

CEXCK — Called extension register clock - A clock signal provided by the control logic to the called extension register 436.

CEXIN — Called extension register input - A line for supplying input signals indicative of the extension number for a station being called to the called extension register 436.

CEXOUT — Called extension register output - An output from extension register 436 indicating that the register is full.

COOP — Control operator - The operator portion of the transmit control register 434.

CTLDT — Control/data - Line from the station used to tell the station interface the type of message to be transferred. A logic "1" is a control message while a logic "0" is a data message.

CTLRX — Control received - Line to the station indicating a control message has been received from the loop via the station interface.

DISC — Disconnect - A line from the control logic to the operator encoding device 438 for inserting the digital word indicating disconnect therein.

DTRX — Data received - A line to the station which indicates that a data block from the loop has been stored in the buffer 294.

GTADCK — Gated Address Clock - A clock line to the transmit control module used to clock data into the appropriate call register in the transmit control module. The appropriate register is selected by the third party line.

GTCLK — Gated clock - Gated clock line from the station used to provide timing for data transfers to the buffer 294 connected to the station interface.

GTDTCK — Gated data clock - Clock line to the buffer control used to clock data from the station interface to the data buffer 294.

INLCK — Interlock - Logic "0" line from the station indicating that it is operative. (NOTE: This usage of logic values deviates from customary procedures and should be recognized in following the flow diagram.)

MSMRK — Message mark - Line to the station which marks the last byte and the end of a data message when the station is writing. The occurrence of a logic "1" on this line marks the end of the message when the station is ready.

POC — Power on clear.

RBSCC — Receive busy SELECT call control - A line to the receive control module which when in a logic "1" causes the receive control module to respond busy to SELECT call control blocks.

RBSCD — Receive busy select call data - A line to the receive control module which when in a logic "1" causes the receive control module to respond busy to SELECT call data blocks. RBSCD = BSCD + DTRX + STBSY.

RCCNCK — Receive control register clock - Clock signals on this line are used to transfer data to the receive control register 427 from the receive control module.

RCCNDO — Receive control register data out - Serial data output line of the receive control register 427.

RCDATA — Receive data - Data line from the receive control module to the receive control register 427.

RCRTAP — Receive control register tap - Tap on receive control register 427 to enable removal of a portion of the address on a branch call from register 427.

RDDT — Read data - A line to the station on which data is transferred from the station interface.

RDTDEL — Receive data delimit - A line from the receive control module used to delimit data transfers to the buffer 294.

RDWT — Read/Write - A line from the station to the station interface to define the direction of data flow. If this line is a logic "1" it is read while a logic "0" defines write or flow of data from the station to the station interface.

RECIRC — Recirculate - A line to the buffer control indicating the I/0 function is a read and the buffer should be end-around recirculated.

RESDEL — Response delimit - Line from the receive control module to delimit the response portion of a received word. This response portion is encoded in register 434 by operator encode 438.

STBSY — Station busy - Line from the station used to inhibit the receiving of data messages from the loop.

STCON — Station connect - Line from the station used to establish or acknowledge a connection from a calling party.

SWBSY — Switch busy - Line to the station indicating the SCU is busy managing loop functions.

SWCLK — Switch clock - Continuous clock line to the station from the station interface.

SWCON — Switch connect - Line to the station used to establish or acknowledge a connection.

TXCD — Transmit control/data - Line to the transmit control module which indicates the type of CONNECT block to be transmitted. Logic "1" indicates data and logic "0" indicates control.

TCNRCK — Transmit control register clock.

TCNRDI — Transmit control register data input.

TCNRDO — Transmit control register data output.

THDPTY — Third party - Line to the transmit control module to indicate which call register to load or unload. A logic "1" indicates that register 414 should be loaded or unloaded with the third party address.

TXACT — Transmit active - Line to the station indicating the SCU is transmitting to the loop in response to a transmit initiate signal.

TXBUFL — Transmit buffer full - Line to the transmit control module which indicates there is a CONNECT block to be transmitted from the SCU.

TXBUFR — Transmit buffer reset - Line from the transmit control module that signals completion of a transmit function from the SCU.

TXDATA — Transmit data - Data line to the transmit control module from the station interface.

TXDEL — Transmit data delimit - Line from the transmit control module which delimits the data portion of either data or control messages.

TXINT — Transmit initiate - Line from the station used to initiate a data transmission to the buffer of the SCU before being relayed to the transmit control module.

WTDT — Write data - A line from the station on which data is transferred to the station interface.

Figure 17:
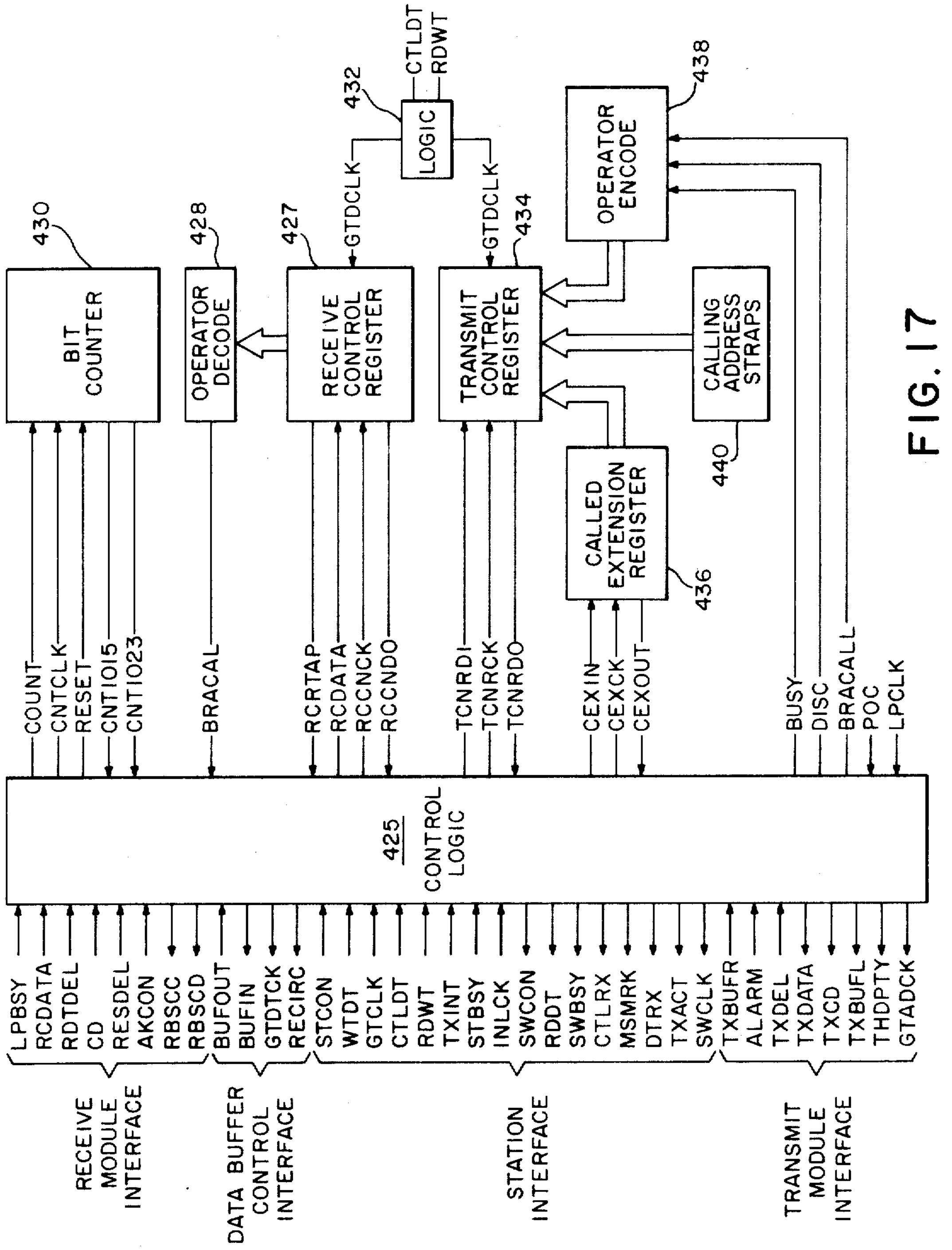
FIG. 17 is a block diagram of the station interface module for use between the receive and transmit modules of a SCU and the station or TIU and is illustrated as to placement in the SIB section of FIG. 9.

As indicated previously, the station interface module of FIG. 17 is the same as station interface 290 of FIG. 9. Although FIG. 9 indicates a single lead 288 extending from the receive control module 282 to the interface 290 and a single lead 292 from interface 290 to the transmit control module 280, it will be noted that these leads are actually a plurality of leads extending in both directions. Further, there are a plurality of leads to the data buffer 294 and to the station itself. The control logic for the station interface module of FIG. 17 is generally designated as 425. The operation of the control logic is explained further in the flow diagram of FIGS. 18. As shown, the control logic 425 receives inputs from the receive control module of loop busy, receive data, receive data delimit, receive control/data, response delimit, and acknowledge connect. Leads going to the receive control module are receive busy SELECT call control and data. The leads from the transmit control module are transmit buffer reset, alarm, and transmit data delimit. Leads from the station interface module to the transmit control module are transmit data, transmit control/data, transmit buffer full, third party, and gated address clock. The station interface control logic 425 receives a single buffer out lead from the buffer 294 while supplying information on three leads of buffer in, gated data clock, and recirculate to the data buffer 294.

The most leads are connected between the station and the module of 290 as shown in FIG. 17. From the station are received 8 leads of station connect, write data, gated clock, control/data, read/write, transmit initiate, station busy, and interlock. Lines to the station are switch connect, read data, switch busy, control received, message mark, data received, transmit active, and switch clock.

Also shown in FIG. 17 is a receive control register 427, an operator decode 428, a bit counter 430, a logic block 432, a transmit control register 434, a called extension register 436 and an operator encode 438. A further block is indicated for providing calling address straps and is designated as 440. The receive control register 427 receives lines of receive data and receive control register clock from logic 425 while returning thereto receive control register tap and receive control register data out. A plurality of leads for providing a parallel load is connected from 427 to decode 428. Decode 428 then supplies a branch call lead back to control logic 425. The bit counter 430 receives inputs of count, count clock, and reset from logic 425 while returning two leads indicative of decoded counts of 1,015 and 1,023. The logic block 432 utilizes the inputs of control data and read/write to provide a gated clock to either receive control register 427 or transmit control register 434. The decisions within logic 432 are based on supplying the gated clock to register 427 when the two inputs are logic "1." When control data is a logic "1" and read/write is a logic "0," the gated clock is applied to register 434. While on the subject of read/write and control data lines, it will be noted that these are applied to the control logic 425 from the station interface. These two inputs have further control logic responsive thereto in logic 425. When the control data lead is a logic "1" and read/write is a logic "1" as indicated previously, the control received line to the station is reset to "0" and if control data is logic "0" while read/write is a logic "1," the data receive line is reset to a logic "0."

Each of the actions in the above paragraph occur regardless of which stage the device is in in its progress through the flow chart of FIG. 18.

The transmit control register 434 receives parallel inputs to the appropriate sections thereof from the called extension register 436, the operator encode 438 and the calling address straps 440. Additionally, the register 434 receives inputs of transmit control register data input and transmit control register clock from control logic 425 while supplying to the logic a transmit control register data output. The called extension register receives inputs of called extension register clock and called extension register input from logic 425 while supplying called extension register output signals thereto. The operator encode 438 receives busy and disconnect signals from logic 425 as well as branch call control signals. The operator encode responds to these signals by placing prescribed logic bit combinations therein for transfer to the register 434.

The station interface module awaits receipt by the SCU of a SELECT call. When a proper SELECT call is received and responded to, a branch call is then awaited. When the branch call is received, the calling address thereof is transferred to the receive control register 427. The operator decode 428 senses this receipt of branch call and supplies an output to the control logic which is transmitted to the station. When the station indicates a connect, via the station connect line, the station interface awaits a message from the station. If instead the station responds with an interlock, a disconnect message is encoded into the transmit control register 434 from the operator encode 438 and the transmit control block 280 is enabled to begin transmission of the disconnect word.

Returning now to the situation where the station interface is "connected" and awaiting a message from the station, it will enter a state, while the message is being read, to which it will return after each message is transmitted until a disconnect is received. After the message is entered into the station, the station interface awaits further action from either the loop or the station. If a control message is to be transmitted by the station, this message is entered into control register 434 and then transmitted to transmit control 280. If the message is a data message, the message is entered in the data buffer 294 and transmitted when complete. The control logic is informed when transmission is complete and the station is so notified.

On the other hand, while in the waiting condition, further messages may be received from the connected party via the loop. In these instances the messages will be stored in the data buffer, if the message is data, or may be stored in the receive register, if it is a control word. The address is checked by operator decode and if a branch call is indicated, this is inappropriate and indicates a third party. Thus, a busy is returned to the third party call via operator encode 438 and the transmit control register 434.

The device then returns to its original state and awaits further messages to or from the loop between the "connected" stations.

FLOW DIAGRAM FOR STATION INTERFACE OF SCU

FIGS. 18

As indicated in previous flow diagrams, each of the states are numbered and are not necessarily in order of completion because of many procedural routes the device can take through the flow diagram depending upon circumstances. Further, the information in the upper portion of a particular state is a temporary change while the lower portions indicate changes which remain until altered by later procedural states.

Figure 18A:
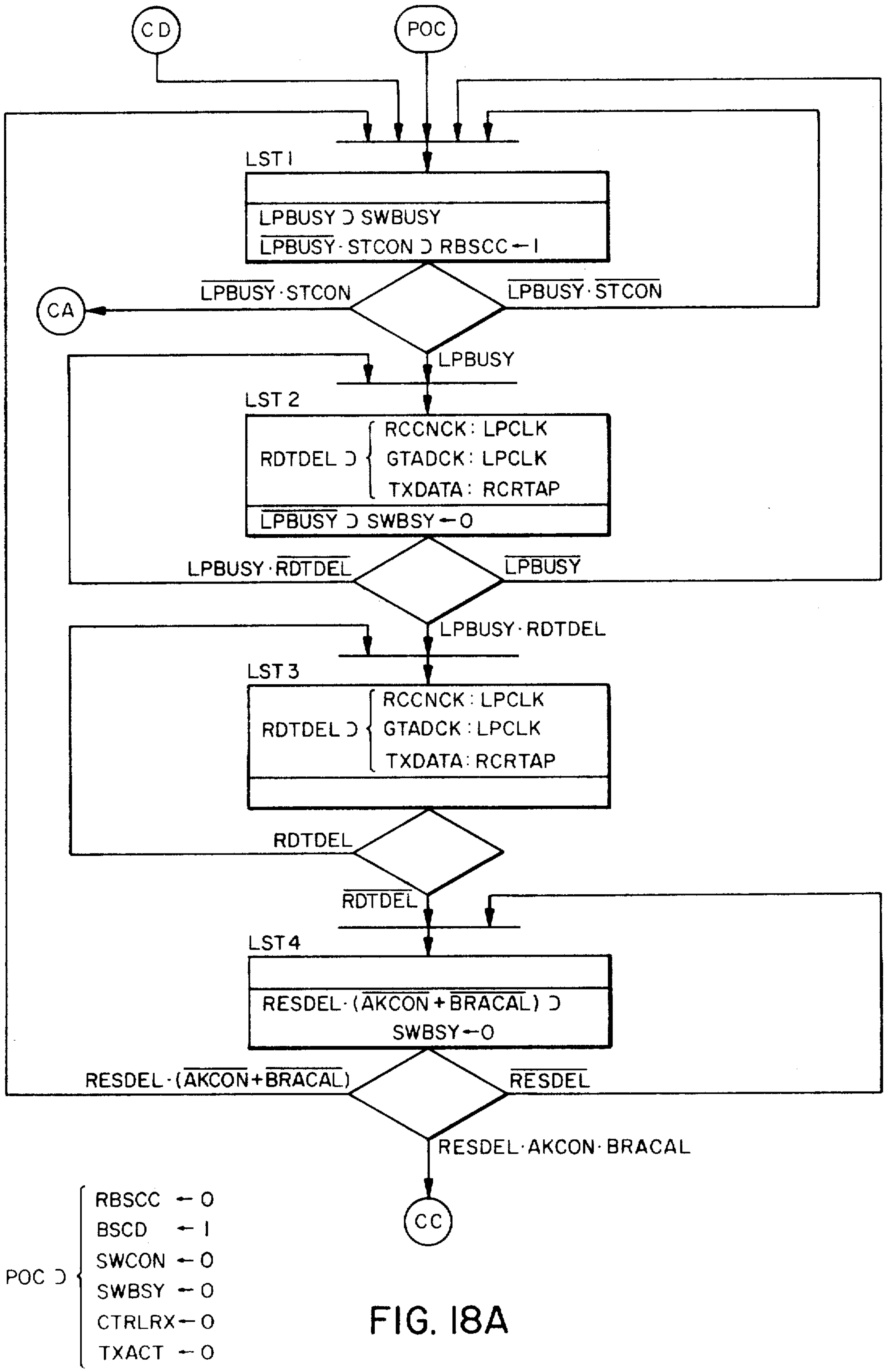
FIGS. 18A–F provide a flow diagram of FIG. 17.
Figure 18B:
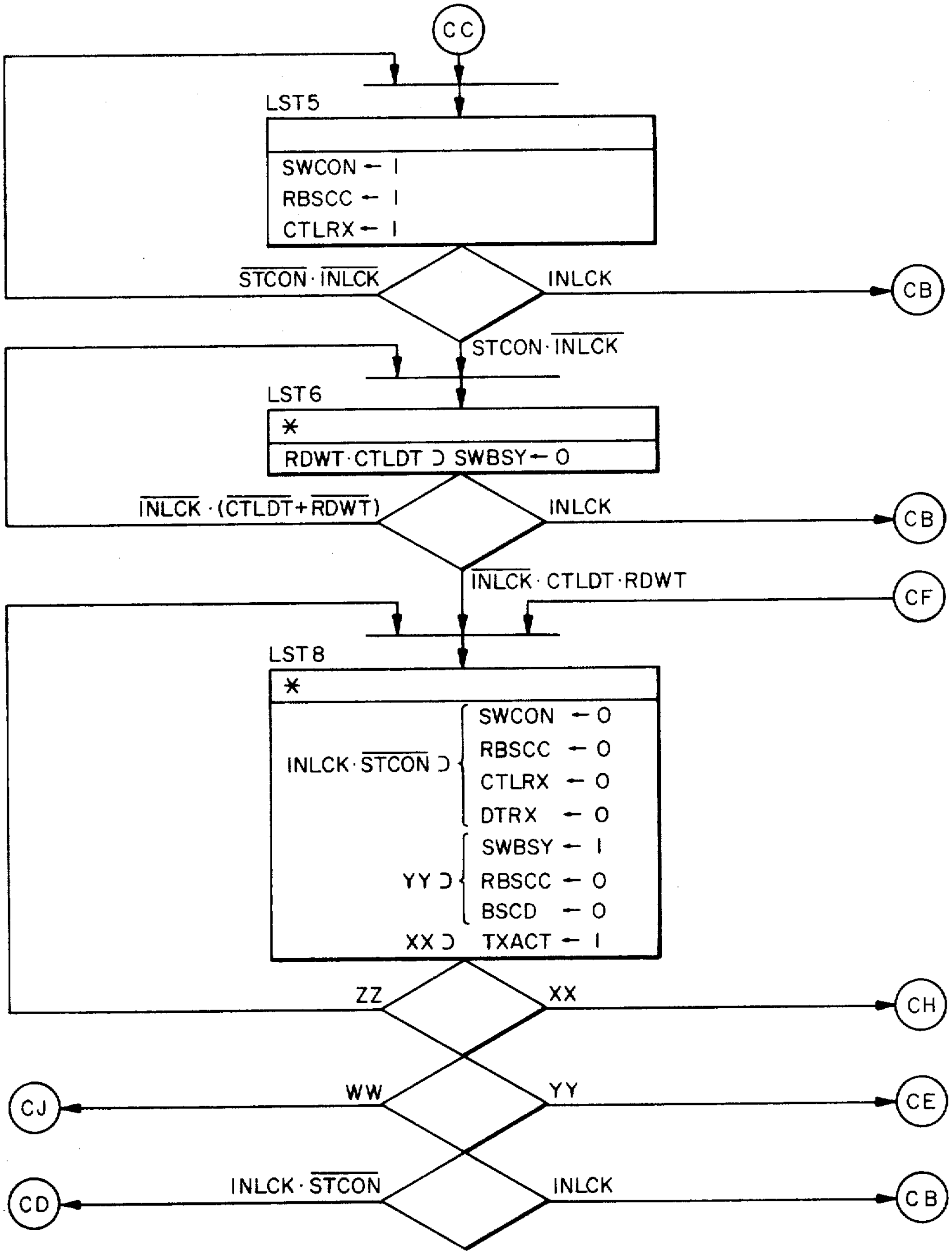
Figure 18C:
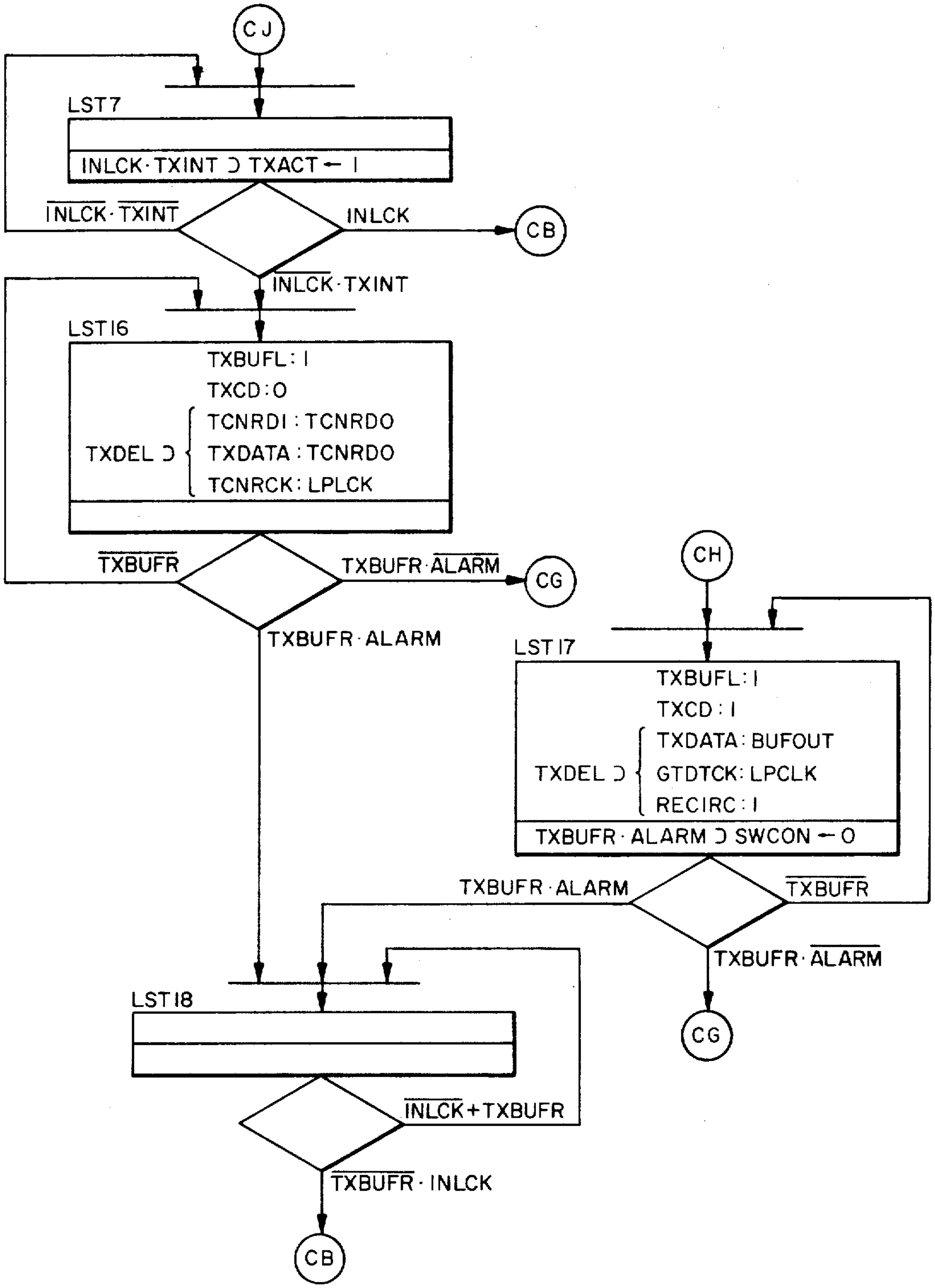
Figure 18D:
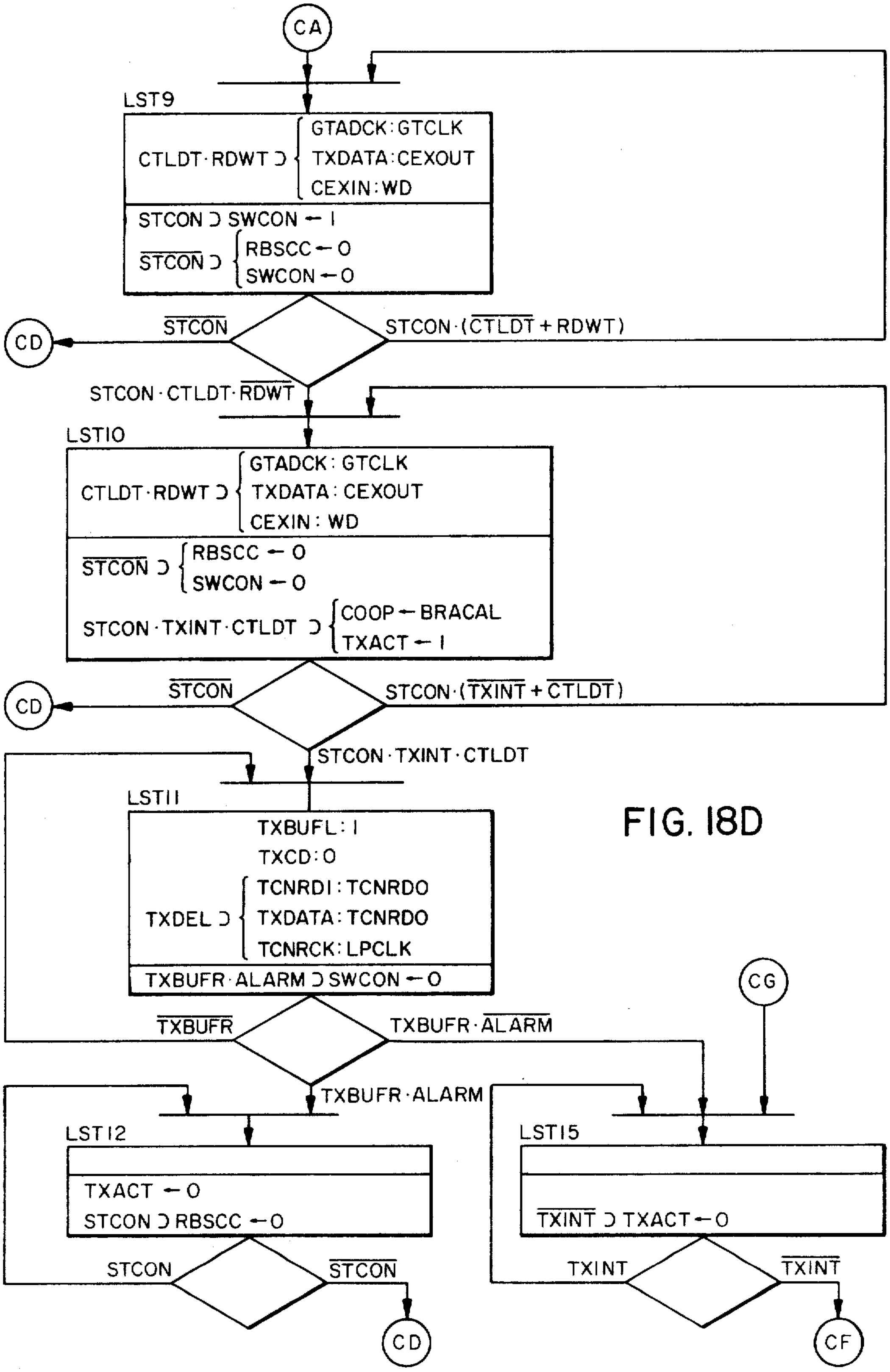
Figure 18E:
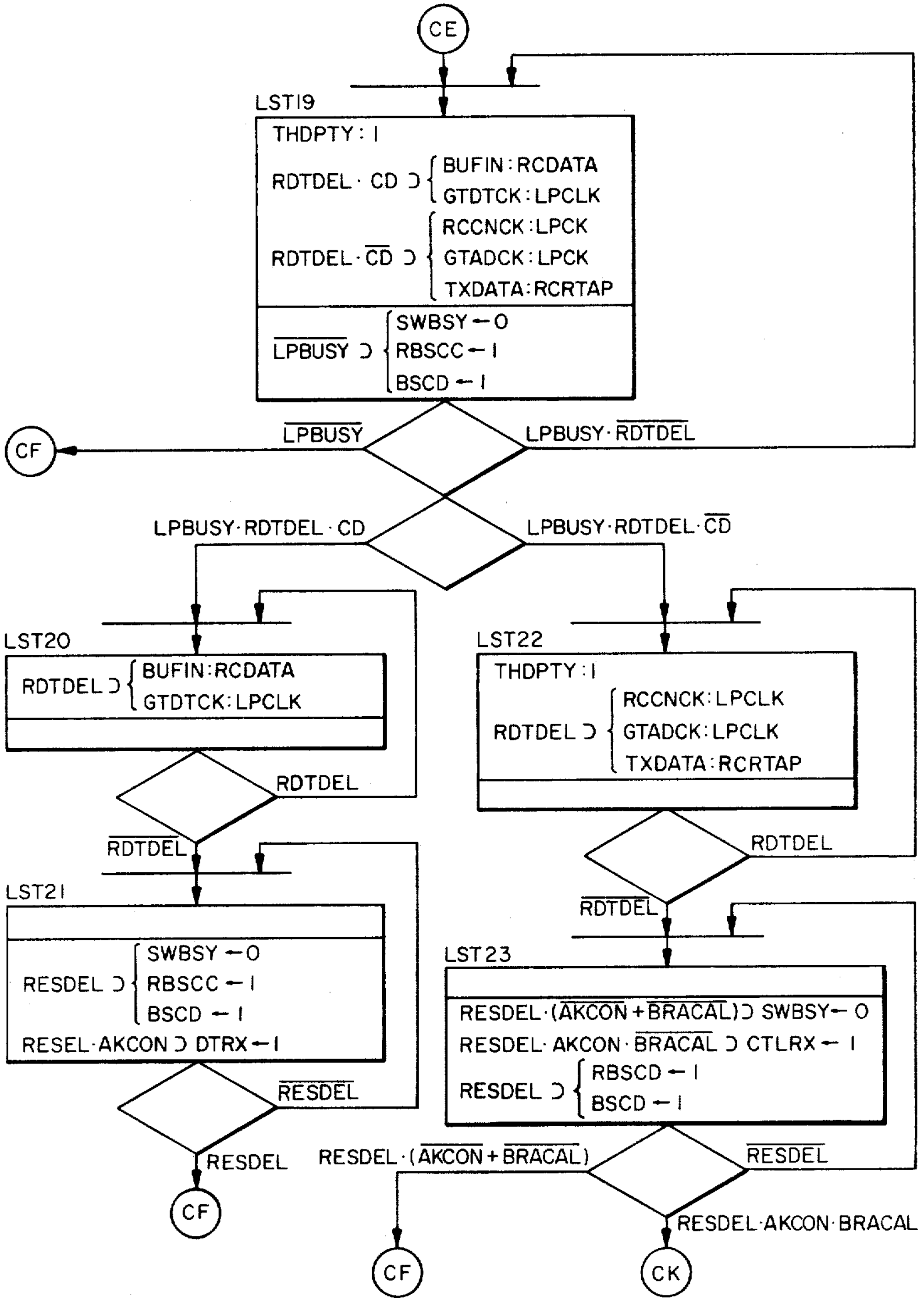
Figure 18F:
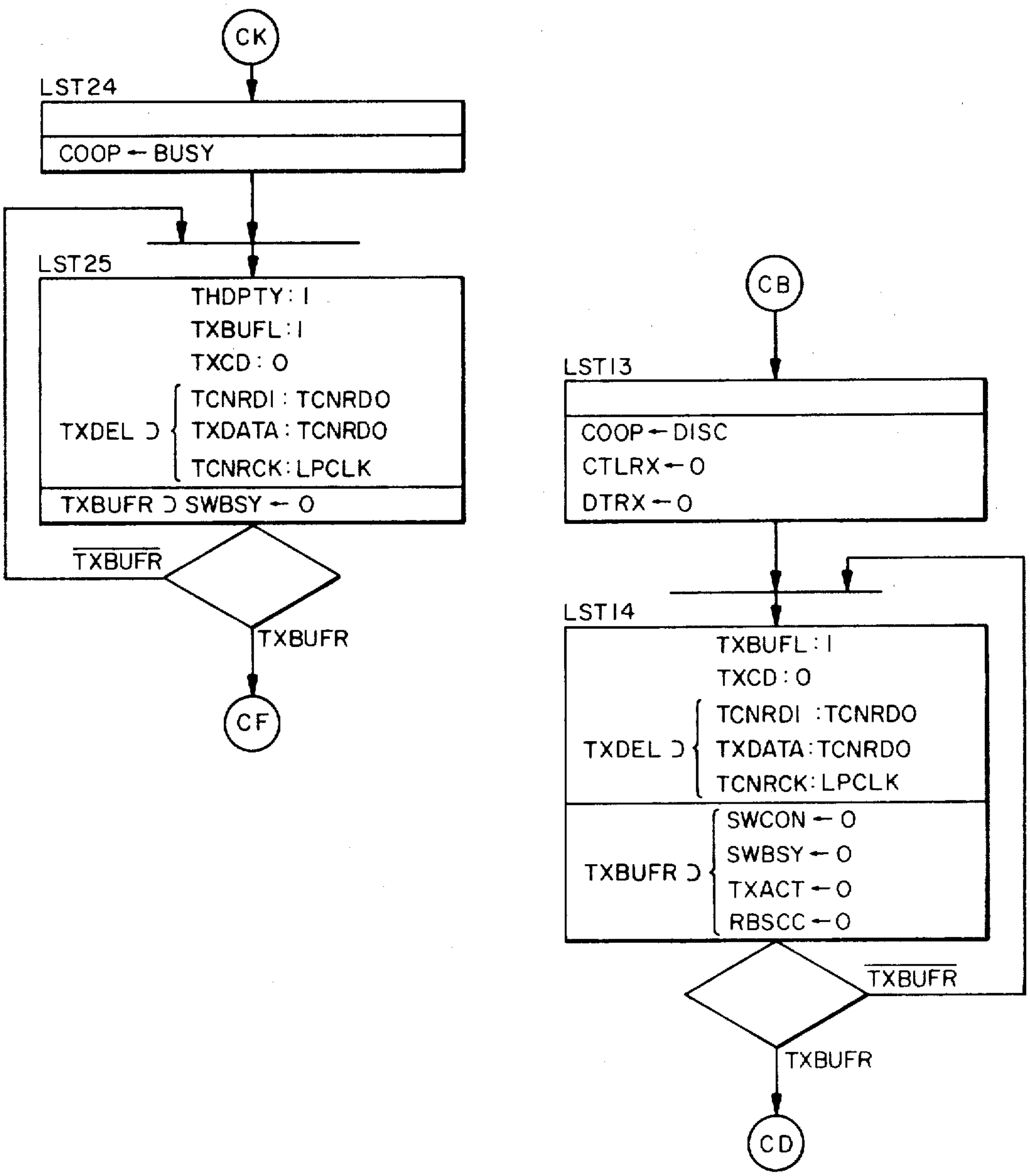

Referring now to FIG. 18A, the device enters state 1 after an initial power on clear is received. After the station interface enters state 1, it remains there and recirculates until a loop busy or station connect signal is received. If the loop busy signal is received from the receive control module 282 indicating the receipt of a data bit, the device proceeds to state 2. The device stays in state 2 while awaiting a decision from the receive control module as to whether the call is for the present SCU. Until this is determined, the receive data delimit line will remain at a logic "0" and the device will recirculate in state 2. If the call is for someone else, the device will stay in state 2 until the loop is free again at which time the loop busy signal will drop to a logic "0" and the device will return to state 1. However, if the call is for the present station, the receive module will eventually receive the branch call and supply a logic "1" on the receive data delimit. Upon receipt of this, combined with the loop busy signal, the device will proceed to state 3. As will be noted, upon receipt of the receive data delimit signal and leaving state 2, the receive control register clock is connected to the loop clock as well as the gated address clock. Further, the transmit data line is connected to the receive control register tap.

Previously in state 1, the switch busy line was set to a logic "1" since the loop was busy and the SCU needs to indicate to the station that messages cannot be received therefrom since a message is being received from the loop.

The device stays in state 3 until the receive data delimit sign returns to a logic "0." Until this time the same conditions remain as in the upper part of state 2. During state 3 the calling address on the branch call is placed in the receive control register 427.

Upon return of the receive data delimit to a logic "0" the device proceeds to state 4. It remains in state 4 until a response delimit line is raised to a logic "1" from the receive control module. The receipt of the response delimit signal and the acknowledgment signal from the receive module along with the indication from decode 428 that it is a branch call allows the device to proceed to state 5. However, if either the branch call or acknowledgment is not received at the time of receiving the response delimit, the device returns to state 1 and the switch busy signal is returned to "0." Assuming that the response was sent to a branch call, the device enters state 5 where the station is informed of the branch call and the device circulates or idles in state 5 while awaiting receipt of the station connect and interlock signals or a signal indicating that the station is busy or inoperative. If the station is busy or inoperative, the interlock line is raised to a logic "1" and the device proceeds to state 13 in FIG. 18F where a disconnect signal or message is encoded into the transmit control register 434 by setting the control operator equal to disconnect and the control and data receive lines to "0." The device then proceeds to state 14 where the transmit control device 280 is enabled and the disconnect word is transmitted. The device remains in this state until transmit buffer reset is received indicating completion of the transmit function. When the transmit data delimit line from the transmit control module raises to a "1" to delimit the connect block data, the transmit control register data input is connected to its output as well as to the transmit data lead and the loop clock is connected to the transmit control register clock. Upon the first circulation, the transmit buffer full is set to a "1" while transmit control data is set to a "0" indicating that a control signal is being transmitted (disconnect control word). When the transmission is completed, the transmit buffer reset line is set to a "1" for resetting the buffer and indicating completion of the transmit function. At this time the device returns to state 1 and awaits further loop calls or until the station stops being busy or inoperative. Returning now to state 5 it may be assumed that the station connnect and interlock signals indicate that the station is operative and wants to establish or acknowledge a connection. The device then proceeds to state 6.

Although a possible output from the decision block of state 6 is that the station is now inoperative, this is only provided as a possible contingency and normally will not happen. Further, the station normally does not stay in state 6 but rather proceeds to state 8 immediately. The progress depends upon receiving a signal from the station to start reading the message. This is indicated by having an operative interlock signal along with a logic "1" on the control data line and a logic "1" on the read/write line. The occurrence of these two signals changes the switch busy indication to a "0." The star in the upper portion of states 6 and 8 indicates that this is normally the first occurrence of the control data and the read/write lines entering the picture. However, as explained in conjunction with FIG. 17, the control logic blocks 425 and 432 produce results from various combinations of these two lines regardless of the state of the device. Reference may be made to the previous description of FIG. 17 for further information.

In state 8 the device waits while the message is being read at the station and awaits further action from either the loop or the station. The next CONNECT message from the station may be either a control or data message. However, any further messages from the loop would have to be control messages. The various possible combinations of signals are shown below state 8. There is, of course, the possibility that the station might suddenly become inoperative and the device would proceed to state 13 as previously indicated. Another possibility is that the station connect line may be reduced to a logic "0" with the station remaining operative. This would cause the device to return to state "1." The station may want to write a control message and this would cause the read/write signal to be reduced to a logic "0" with the control data line remaining at a logic "1." In this instance the device would proceed to state 7. In state 7 the device would circulate until the control message was written into transmit control register 434. When this was completed the transmit initiate line from the station would be used to initiate data transmission to the loop. This would cause the device to proceed to state 16 and to set the transmit active line to a logic "1." The device would remain in state 16 while transmission of the control message from the SCU is completed. As indicated the transmit control data line would be a logic "0" indicating transmission of a control word and transmit buffer full line would be set to a "1" indicating that a CONNECT block is to be transmitted. During this time the transmit delimit signal is raised to a "1" for delimiting the connect block data and the transmit control register clock is connected to the loop clock while the transmit control register data input is connected to the output and to the transmit data lines for supplying the data in register 434 to transmit control 280.

If the alarm line is raised to a logic "1" thereby indicating that transmission has been attempted a predetermined number of times and failed, the device will proceed to state 18 where the station is informed that the message was not transmitted and awaits the reception of the transmit buffer reset signal. Upon reception of this signal, the device proceeds to state 13 where a disconnect message is transmitted as previously indicated.

However, returning to state 16 it may be assumed that the transmit buffer reset is raised to a logic "1" indicating that the transmit function has been completed without raising the alarm. In this instance the device would proceed to state 15 where the device awaits acknowledgment by the station of transmission complete. The station acknowledges by reducing the transmit initiate to a logic "0" so that the device may return to state 8. The reducing of transmit initiate to a logic "0" resets the transmit active line to a logic "0." In state 8 the next signal received may be "XX" signal indicating that the word to be transmitted is a data word. While control words are assembled in state 7, the data words are assembled in state 8 in one embodiment of the invention due to the particular arrangement of logic circuitry. In this embodiment the device will proceed to state 17 upon reception of the logic "0" interlock, logic "1" station connection, logic "0" control data and logic "1" transmit initiate. The reception of these signals will also place the transmit active line to a logic "1." In state 17 transmit buffer full is set to a "1" as well as transmit control/data. When the transmit delimit signal is received, the transmit data line is connected to buffer out while the gated data clock is connected to the loop clock and recirculate is set to "1." If an alarm is sounded at the reception of transmit buffer reset, the device proceeds to state 18 and switch connect is changed to a "0." However, assuming that no alarm is received, the device procees to state 15 and awaits acknowledgment of station transmission complete as indicated previously. From state 15 the device again returns to state 8. It may now be assumed on this occasion that the station receives a message from the loop as indicated by "YY" and the device proceeds to state 19. Upon leaving state 8 the switch busy is set to a "1" while the busy select call data and the receive busy select call control are both set to "0." The device proceeds to state 19 basically because the loop busy signal has been raised to a "1" while the control received and transmit initiate lines from the station are in a logic "0" condition. The device stays in state 19 while awaiting further instructions from the receive control module for comparison of the address. If loop busy changes to a logic "0," the device returns to state 8 because the raising of loop busy was on account of a poll being received or that the address did not compare with that of the presently connected stations to the SCU. While in state 19 the third party indication is set to "1" so that the calling party address in the branch call will be placed in the third party register 414 for transmission of a disconnect if the received data word is a branch call. If the loop busy signal has been dropped to a "0" indicating the poll or no address compare, the switch busy signal would have been dropped to a logic "0" while the busy select call data and receive busy select call control signals would be set to a "1" so that the receive control module 282 could respond to further SELECT calls.

It may now be assumed that a receive data delimit signal is received and the device will move to state 20 or state 22, depending upon whether the message is a control word or a data word. If the message is a data word the CD line will be in a logic "1" condition. Thus, the device will proceed to state 20. Upon proceeding to state 20 the receive data line will be set equal to buffer in so that the data received by the receive control 282 will be supplied to data buffer 294. The gated data clock will be connected to loop clock. In state 20 the device recirculates until all the data is stored in buffer 294. During this time the buffer in and gated data clock remain connected as previously indicated. When the receive data delimit line returns to a logic "0," indicating that all the data in the message has been transferred to the buffer, the device proceeds to state 21. In state 21 the station interface is awaiting a parity check. The end of parity check is indicated by a raising of the response delimit signal to a logic "1." When this occurs the device proceeds to state 8 and awaits further messages. In transferring to state 8, the device returns switch busy to a "0" while changing the receive busy select call control and the busy select call data signals to a logic "1." If the acknowledge connect line is at a logic "1" upon receipt of the response delimit signal, the data received line to the station is raised to a logic "1" to indicate that there is a data block from the loop stored in buffer 294.

Returning to state 19, it may be assumed that the word received indicated that it was a CONNECT control message after the address was compared and the operator decoded. In this case the device will proceed to state 22 where the control block is stored in the station interface receive register 427. At the same time this same data is supplied to the third party register 414 of transmit control module 280 in the event that this may be a third party call. This is accomplished by setting the third party line equal to a "1" and during each circulation in state 22 connecting the receive control register clock to the loop clock and to the gated data clock while connecting the transmit data line to the receive control register tap output from register 427. When the receive data delimit line reduces to a logic "0," the device proceeds to state 23 where a parity check is awaited. After parity check the response delimit is raised to a logic "1" and if the answer is either a negative acknowledge connect or a negative branch call the device will return to state 8. Either of these conditions will set the receive busy select call data and the busy select call data leads to a "1" while changing the switch busy to a "0." The occurrence of a logic "0" for acknowledge/connect would, of course, indicate that there was some problem such as parity. The occurrence of a logic "0" in the branch call line would indicate that it was a proper control message and not a message from a third party. However, if it were a branch call and there were no acknowledgment it would still be satisfactory to return to state 8 and await another call. However, if the branch call were acknowledged, the device would proceed to state 24 where the control operator is set to busy so that busy is encoded from encoder 438 to register 434 and the device would proceed to state 25 where, by setting third party equal to "1," transmit control data equal to "0" and transmit buffer full to a "1," the device will enable the transmitter and transmit a busy signal to the calling third party. During this time the transmit data delimit will be raised to a logic "1" and at this time the loop clock is connected to the transmit control register clock while the transmit data line will be connected to the transmit control register data output and data input of register 434. Upon completion of transmission, transmit buffer reset momentarily becomes a logic "1" and the device returns to state 8 to await further messages to or from the station.

In summary, the station interface during its first six states checks each incoming word until a SELECT call is received and replied to by the receive control 282 and a branch call is returned for the station "connected" to the SCU in question. The station is then informed and when it replies with a satifactory interlock and station connect signal it goes to state 8. From then on the device returns to state 8 as long as the station is connected to a given calling party. It will take control or data messages from the station and supply them to the remote "connected" station and receive control and data messages from the remote station for transmission to the station. Further, it will take third party calls and reply thereto with busy control words. All of the above are accomplished through the cooperation of the data buffer 294 and the receive and transmit control block 280 and 282 of FIG. 9.

LOOP DRIVER AND INITIALIZATION MODULE

FIG. 19

The LDI (loop driver and initialization) module forms part of the MGU and forms the entire ELC of FIG. 1. This device counts the number of consecutive logic "0's" occuring between logic "1's" and whenever the number exceeds 1,536, the device continues the count by restricting further passage of logic "1's" regardless of source until 2,048 bit time periods have passed so that a new initialization sequence can be commenced. At this time a new poll bit is sent on the loop in an attempt to correct any loop problems. In normal circumstances there will be no occasions when there are 1,536 bit time periods with no logic "1's." The device also counts the number of SELECT calls and polls. After a combined count of 63 calls and polls have occurred, the device reinitializes to actively connect any new units which may have been physically attached to the direct switch apparatus in the interim since the last initialization sequence.

The data being supplied to the LDI from the LDT or the TTL loop interface arrives on a lead 448 labeled DIN and is applied to a resync register 450. A receive clock signal is also applied through an inverter 452 to the register 450. A final input to register 450 is received from an oscillator 454 which would be the same as oscillator 271 of FIG. 8. This oscillator supplies the clock signal to other portions of FIG. 19 in addition to the specific connection shown to a sequence control unit 456. The incoming data on 448 after passing through register 450 is supplied as an output to a S register 458, the sequence control unit 456 and a further sequence control unit 460. The S register 458 contains eight bit positions and supplies a parallel output to an opcode decode register 462. It supplies a further serial output to an AND gate 464. An output 466 of sequence control unit 460 is labeled RSDAT and supplied through an inverter to a second input of AND gate 464. It is also supplied to a first input of an AND gate 468. The outputs of the two AND gates 464 and 468 are supplied through an OR gate 270 to an output lead 472. It will be noted that there is a strapped or dash line connection 474 between lead 472 and a lead labeled TXDAT 476. Lead 476 is labeled as shown with data out. The strap 474 is used as a connection when the LDI is utilized for an ELC. When the LDI is used as shown in FIG. 8, this strap is removed and lead 476 remains unattached. A lead labeled STBIT for start kit also connects sequence control 460 to AND gate 468.

Figure 19:
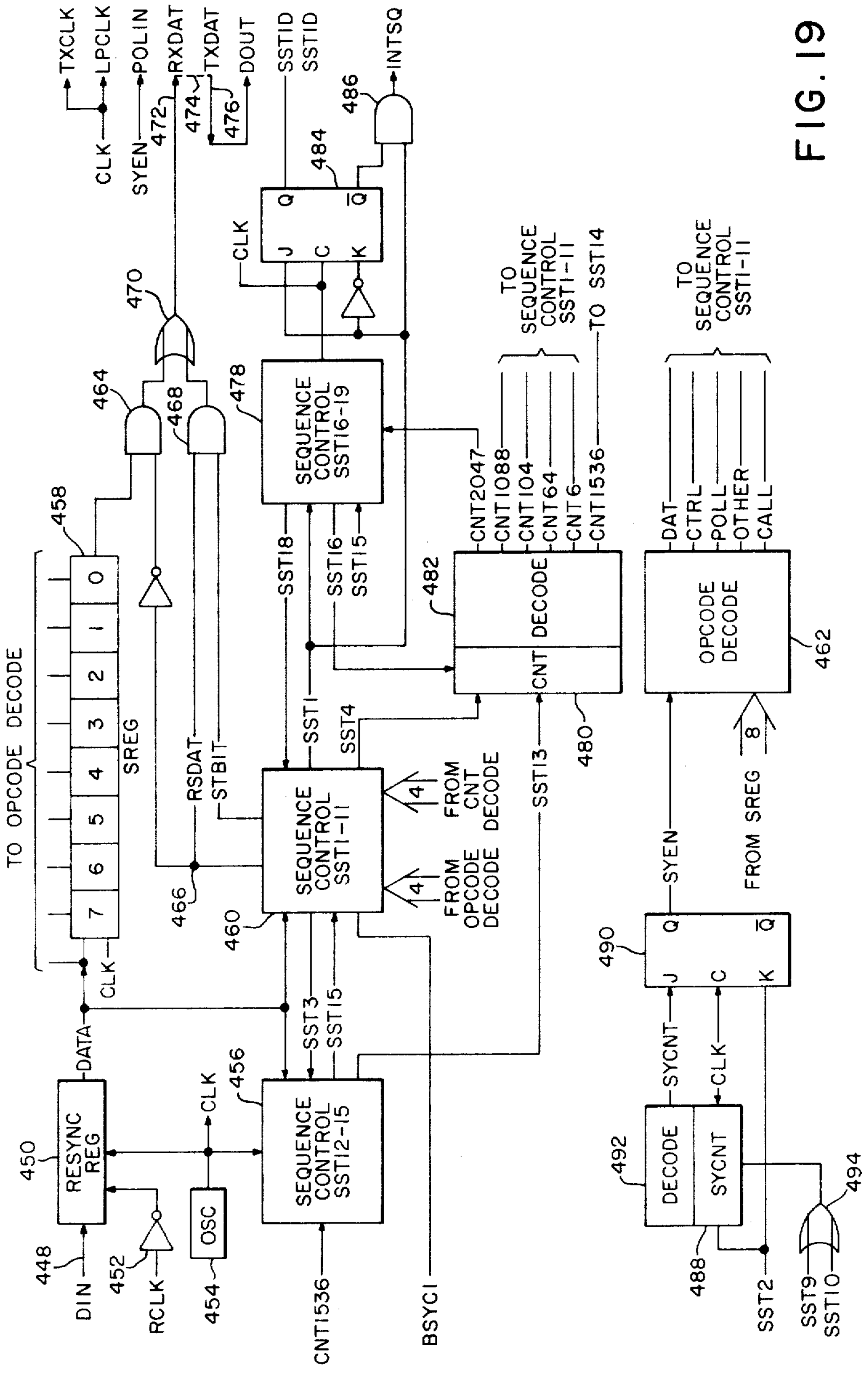
FIG. 19 is a block diagram of the LDI module forming part of the MGU as shown in FIG. 8 and forms the entire ELC of FIG. 1.
Figure 20A:
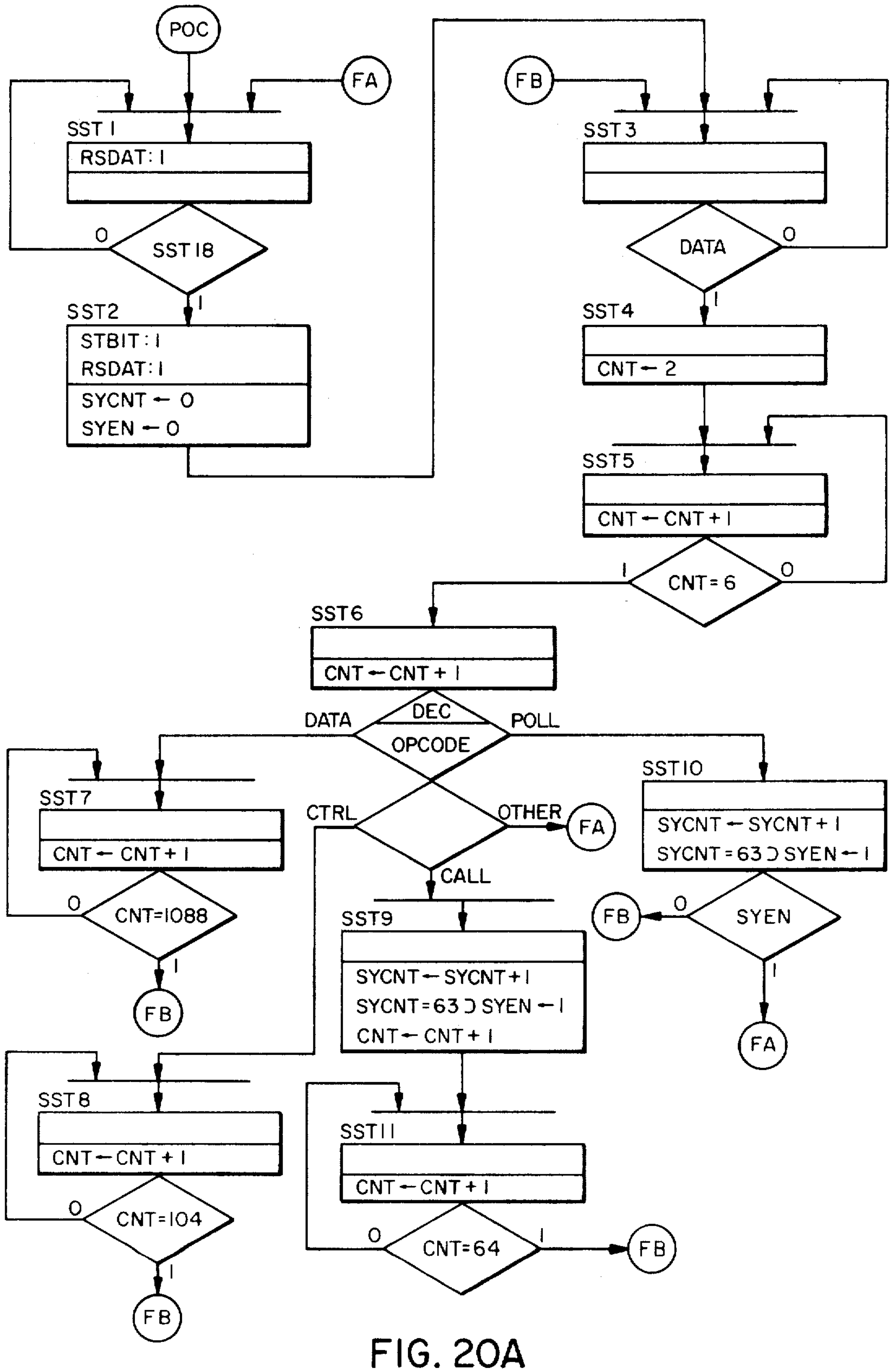
FIGS. 20A–B illustrate the flow diagram of FIG. 19.
Figure 20B:
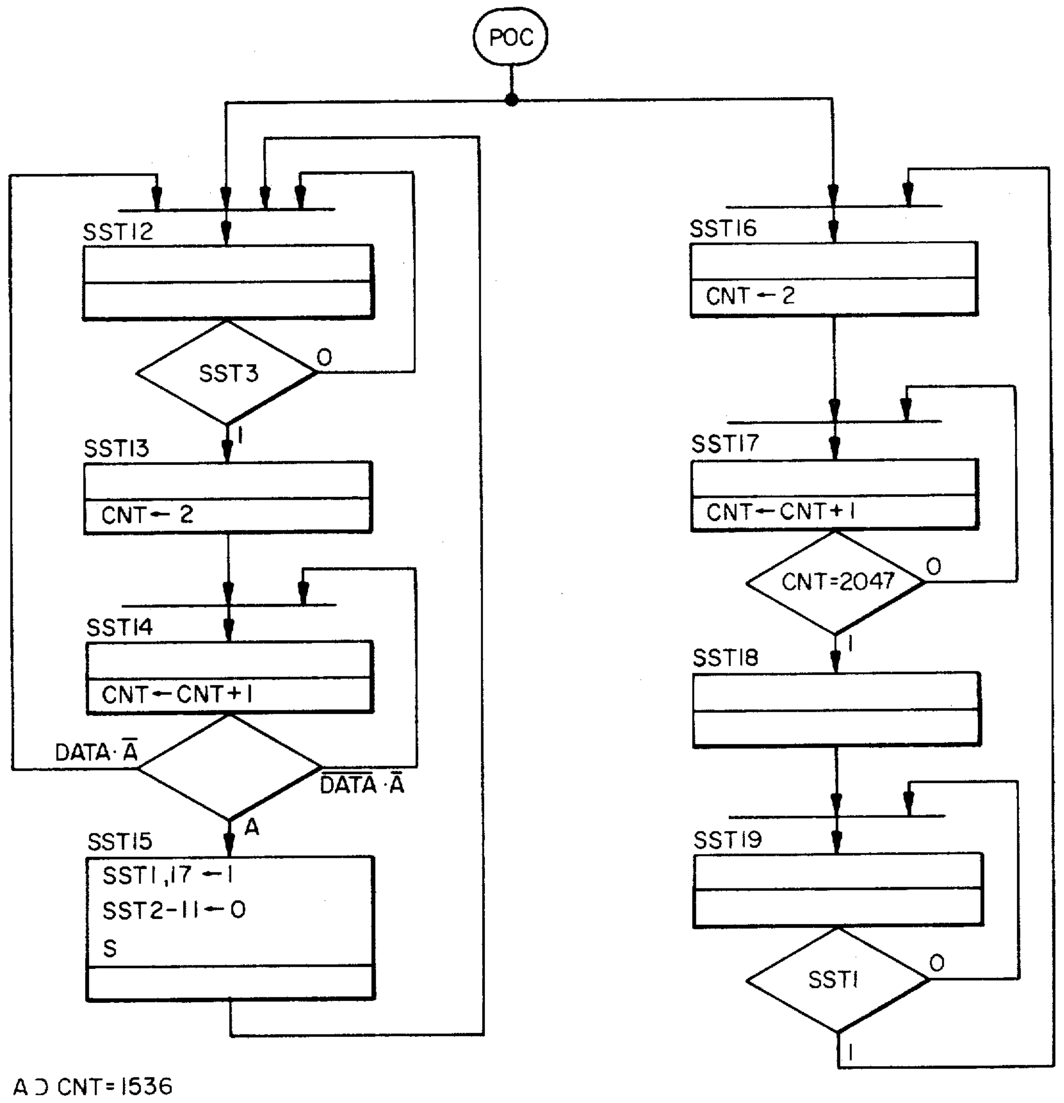

It will be noted in various places in FIGS. 19 and 20 that the notation SST followed by a numeral is used. This is a notation indicating a particular state in a particular sequence control portion of the LDI. Unit 456 contains states 12 through 15 while unit 460 contains states 1 through 11. An additional sequence control 478 contains states 16 through 19. As will be noted, a lead indicative of the occurrence of state 3 is connected from control 460 to control 456 while a lead indicative of state 15 is connected from 456 back to 460. A further pair of leads indicative of states 18 and 1 are connected between control units 460 and 478. A lead indicative of state 13 is supplied from control 456 to a counting device designated 480. A decoder 482 is connected to counter 480 for providing output signals indicative of particular counts within counter 480. As shown, decoded output counts of 6, 64, 104, and 1,088 are supplied from decode 482 to control unit 460. A decoded output of 1,536 is supplied to control 456 while a count decode of 2,047 is supplied to control 478. Control 478 on the other hand supplies an input from state 16 to counter 480 to set the counter at a count of 2 as will be discussed in connection with FIG. 20. Control 460 supplies an input indicative of state 4 to counter 480 to also set it to a count of 2. The state 13 input from control 456 accomplishes the same result. As will be noted, the state 15 input from control 456 is also applied to control 478. As previously indicated, the clock signal from oscillator 454 is applied to several other places in the circuit. Examples are to counter 480 and sequence control 478. In addition, the clock signal is applied to two output leads of TXCLK and LPCLK (transmit clock and loop, respectively). A further application of the clock signal is to the clock input of a flip-flop 484 which flip-flop also receives an input at the J terminal from the state 1 output of control 460 which is inverted and applied to the K terminal and is also applied in its uninverted form to an AND gate 486. A second input of AND gate 486 is received from the $\overline{Q}$ output of flip-flop 484. An output of AND gate 486 is supplied as an initialization sequence output INTSQ. A line indicative of state 2 is supplied to a SYCNT or synchronization counter 488 and supplied to a K input of J–K flip-flop 490. The count of sync counter 488 is decoded by a connected decoding device 492 which supplies an output to a J input of flip-flop 490 when the desired sync count is obtained. The flow diagram of FIGS. 20 assumes that the sync count will be 64 but this was merely chosen for purposes of explanation as one embodiment of the invention used straps to change the code to 32, 64, 128, or 256. A clock input from oscillator 454 is supplied both to the sync counter 488 and to the clock input of flip-flop 490. The Q output of flip-flop 490 is labeled sync enable (SYEN) and is applied to opcode decode block 462. This decode device is utilized to detect particular data formats in the initial bits of a word and provide an output on lines labeled DAT (data), CTRL (control), POLL, CALL, and OTHER, depending on the formats of the data supplied.

Lines indicative of states 9 and 10 in control unit 460 are passed through an OR gate 494 to an input of sync counter 488.

Although the description of operation will be apparent from the flow diagram description of FIG. 20, a brief summary will be provided. The counter 480 counts the number of clocks that occur before a data bit comes in. The occurrence of a data bit will cause the counter 480 to be reset by the passage of control unit 460 through state 4. If more than 2,048 clocks occur before a data bit is received, this indication is provided to sequence control 478 which allows sequence control 460 to leave its first state and send a poll out on to the loop. The poll sent to the loop will normally cause one of the devices of the loop to respond with a call. If a call is not received then the poll bit will come back as a data bit to be added by the count of sync counter 488. As previously indicated the occurrence of 64 SELECT polls and/or calls will provide an output from decode 492 to produce another initialization sequence. However, assuming that one of the units on the loop provided a call or a data or other control message, the data obtained would be decoded by the opcode 462 in response to the output of opcode register 458 and counter 480 would count the appropriate number of counts until the end of the data or control message until all data bits have passed out of the LDI and will then again monitor the loop for further data bits.

As previously indicated, the main function of the LDI is to provide reinitialization whenever the direct switch falls out of sync and to provide clock pulses to the various units.

All of the mnemonics utilized in FIGS. 19 and 20 have been explained or previously listed and will not be further commented upon in this section.

LOOP DRIVER AND INITIALIZATION FLOW CHART

FIGS. 20

When POWER ON CLEAR is received by the LDI, each of the control blocks will go to their initial states; in other words, states 1, 12, and 16.

Control 460 will remain in state 1 until control 478 reaches state 18. During this time the line RSDAT is placed to "1" on each circulation around the state after determining that state 18 has not occurred. As was previously indicated the data in the top portion of the box occurs upon entering the stage while the data or statements in the bottom part of each state box occurs upon leaving.

Since control 460 cannot leave state 1 until control 478 reaches 18, nothing further happens in this state. State 12 is awaiting the reaching by control 460 of state 3 and thus it stays in its initial state. Control 478 sets the counter 480 to a "2" and proceeds to state 17. In this state the device allows counter 480 to count to 2,047. At this time there is no possibility of any data bits passing to the output because RSDAT is set to a logic "1" which enables AND gate 468 but disables AND gate 464 through the inversion of the logic "1" signal to a logic "0." Thus, any data bits which arrive on 448 are prevented from reaching output 472 after passing through the S register.

After a count of 2,048 is reached, the control 478 passes through state 18 to state 19. As the device passes through state 18, the decision block in control 460 is satisfied and this control passes to state 2. At this time both of the leads RSDAT and STBIT are placed in a "1" condition so that a poll bit is sent out on the loop. At the same time the sync counter is set to a "0" as well as the sync enable line. The device then passes to state 3 and awaits data. This data may be in the form of a poll bit just sent or messages in response to the poll. The arrival at state 3 of control 460 satisfies the decision block in control 456 which now passes from state 12 to state 13 while setting the counter 480 to a count of 2. It then proceeds to state 14 where the count is incremented on each clock occurrence until a data bit is received. If a data bit is received, control 456 returns to state 12 and again awaits the arrival of control 460 in state 3. If, however, a data bit is not received within a count of 1,536, the device proceeds to state 15 where all states are set to "0," except for state 1 and 17 so that the count may proceed to 2,048 and a new poll bit sent.

It may be assumed, however, that a message was returned in response to the poll bit and the device recognizes the data bit and proceeds to state 4 where counter 480 is set to a count of 2 and then proceeds to state 5 for a count of 6 until the entire operator code is placed in the S register. The device then proceeds to state 6 where the decoded output of decode 472 determines the sequence of control 460. If the word received is a data message, the device waits for the counter to reach 1,088 and then returns to state 3 and awaits more data. If it is a control word the device waits for the counter to reach 104 in state 8 and then returns to state 3. If the message is a call, the device proceeds to state 9 and then to state 11. In proceeding to state 11 the counter is incremented by one and the sync counter is incremented by one. If the sync counter is already at 63 when it passes to state 11, the sync enable is set to a 1 so that an output is supplied on POLIN to the transmit module of FIG. 15. The device then waits for the counter to reach 64 before returning to state 3.

If the data or logic bit received was merely a poll, the device passes through state 10 while incrementing the sync counter and if the sync counter equals 63, the sync enable is set to a "1." If sync enable is set to a "1" prior to reaching state 10, the decision block will send control 460 back to state "1" to reinitialize the system. However, if on passage through state 10 the sync counter only equals 63 or less, the device will return to state 3.

If the decode is anything other than the four desired ones, it will return to state 1 and reinitialize.

TELETYPEWRITER INTERFACE UNIT

FIGS. 21–25

The teletypewriter (TTY) interface unit or TIU presented in the following figures assumes that there will be only one teletypewriter connected to each SCU. The logic and circuit diagrams presented infra may be readily changed or adapted to allow the connection of several teletypewriter units to one SCU through a TIU but it is believed that this would add unnecessary complications to the description of the invention. Therefore, the embodiment being described will be restricted to a single TTY to a SCU.

In describing the TIU, the flow diagram description has been broken into two portions. One is the SCU portion of the TIU interface unit and the other is the TTY portion of the TIU interface unit. The first portion is described in conjunction with FIGS. 22 while the second portion is described in connection with FIGS. 23. FIGS. 24 and 25 show, respectively, detailed block diagram portions of the character distributor block and the character assembler block of FIG. 21. Thus, in the description, the portion of FIG. 21 which is directly associated with the SCU may at various times be described as the SCU interface (SCU INT). On the other hand, the other portion will be referred to as TTY INT (teletypewriter interface).

Figure 21:
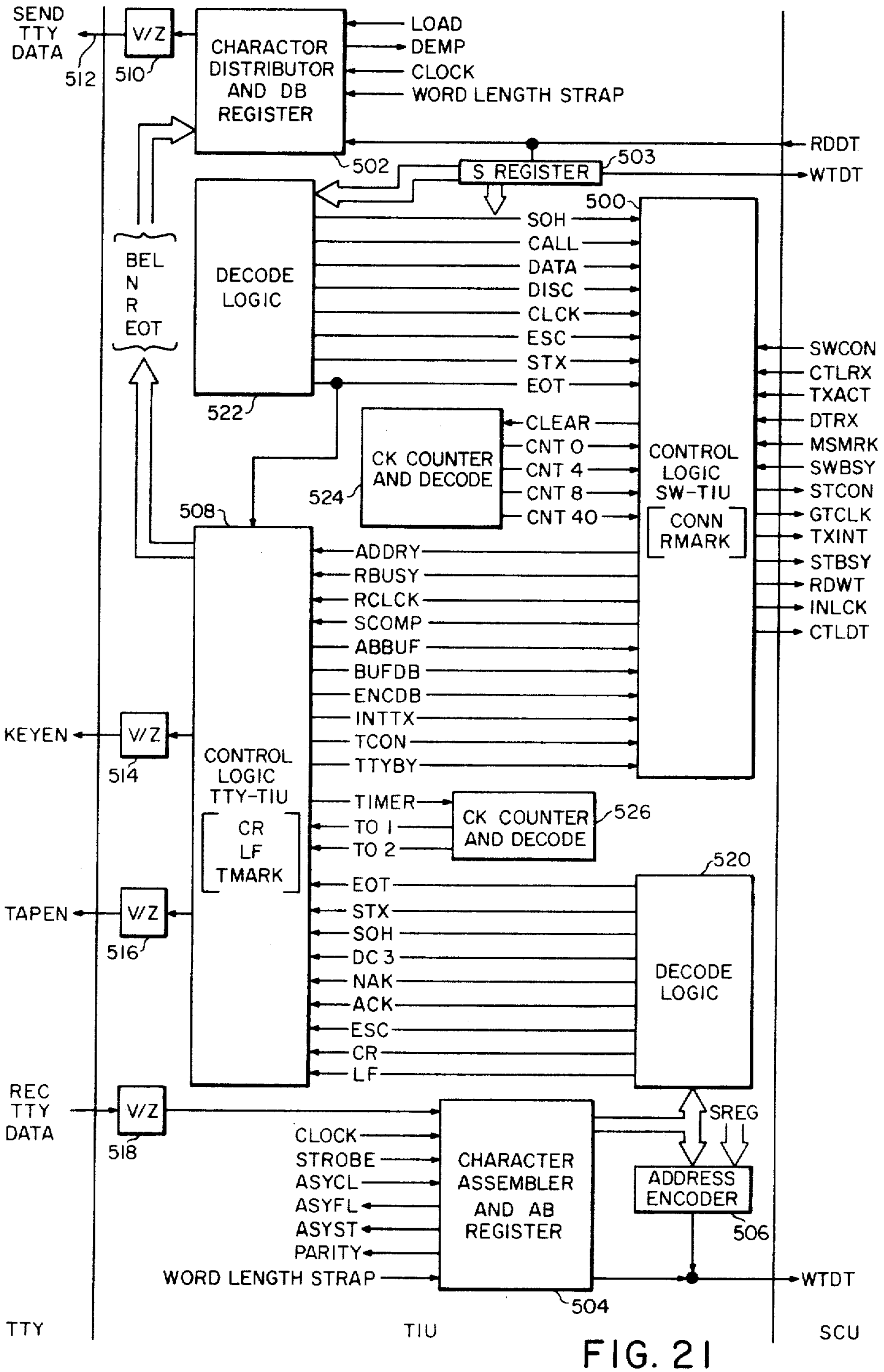
FIG. 21 is a block diagram of a teletypewriter interface or a TIU for use between the SCU of FIG. 9 and a teletypewriter unit.
Figure 22A:
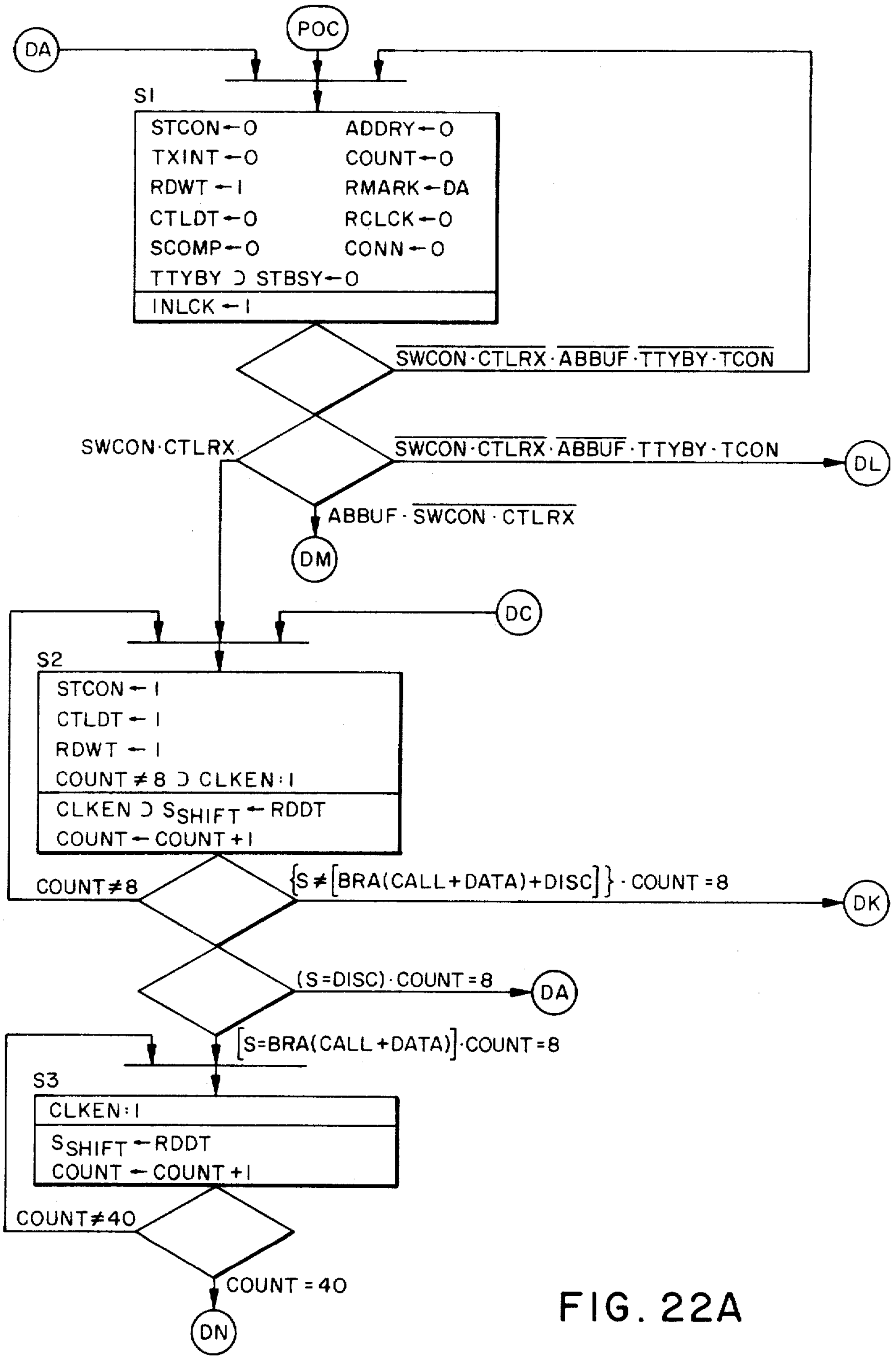
FIGS. 22A–22H illustrate the flow diagram of the SCU connected portion of the TIU interface of FIG. 21 and is basically descriptive of the logic contained in block 500 thereof.
Figure 22B:
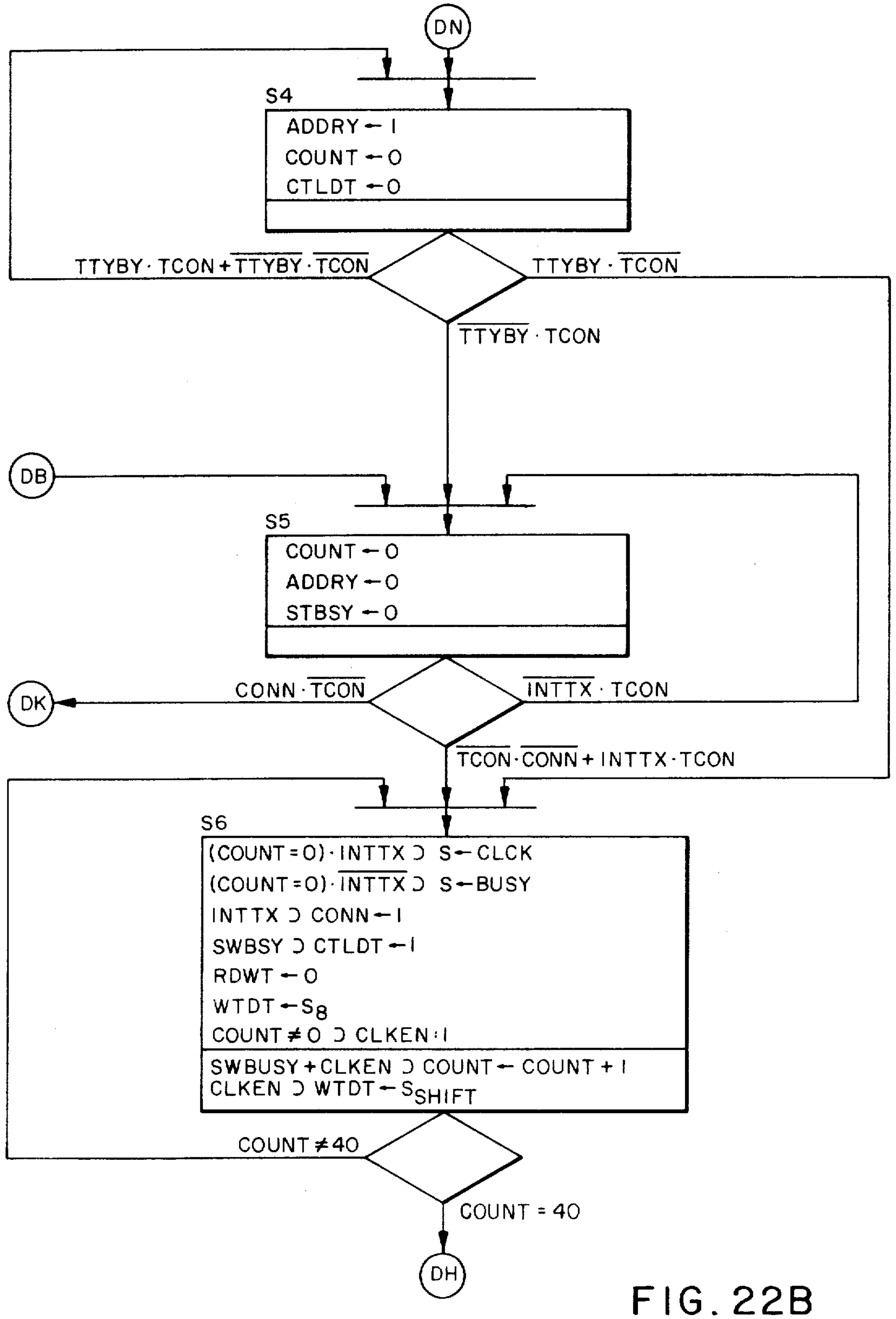
Figure 22C:
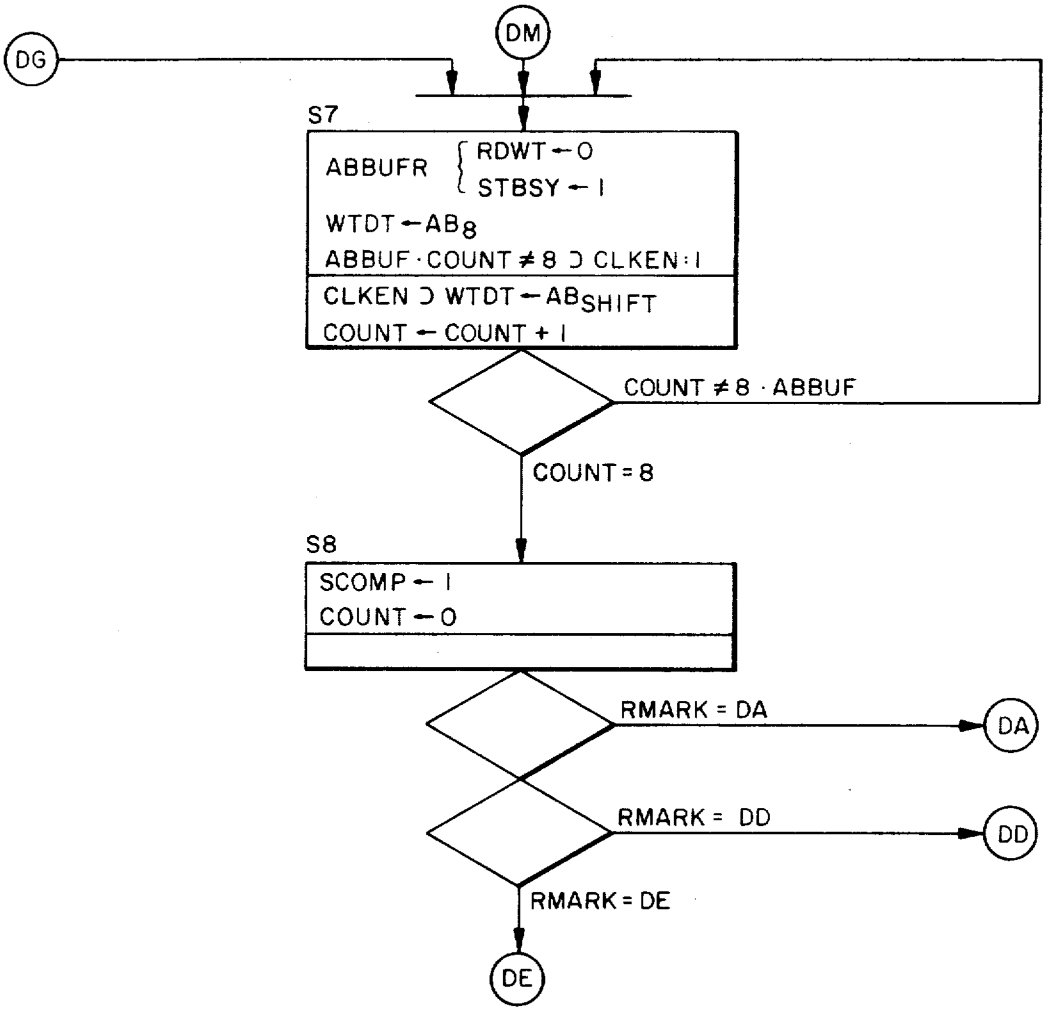
Figure 22D:
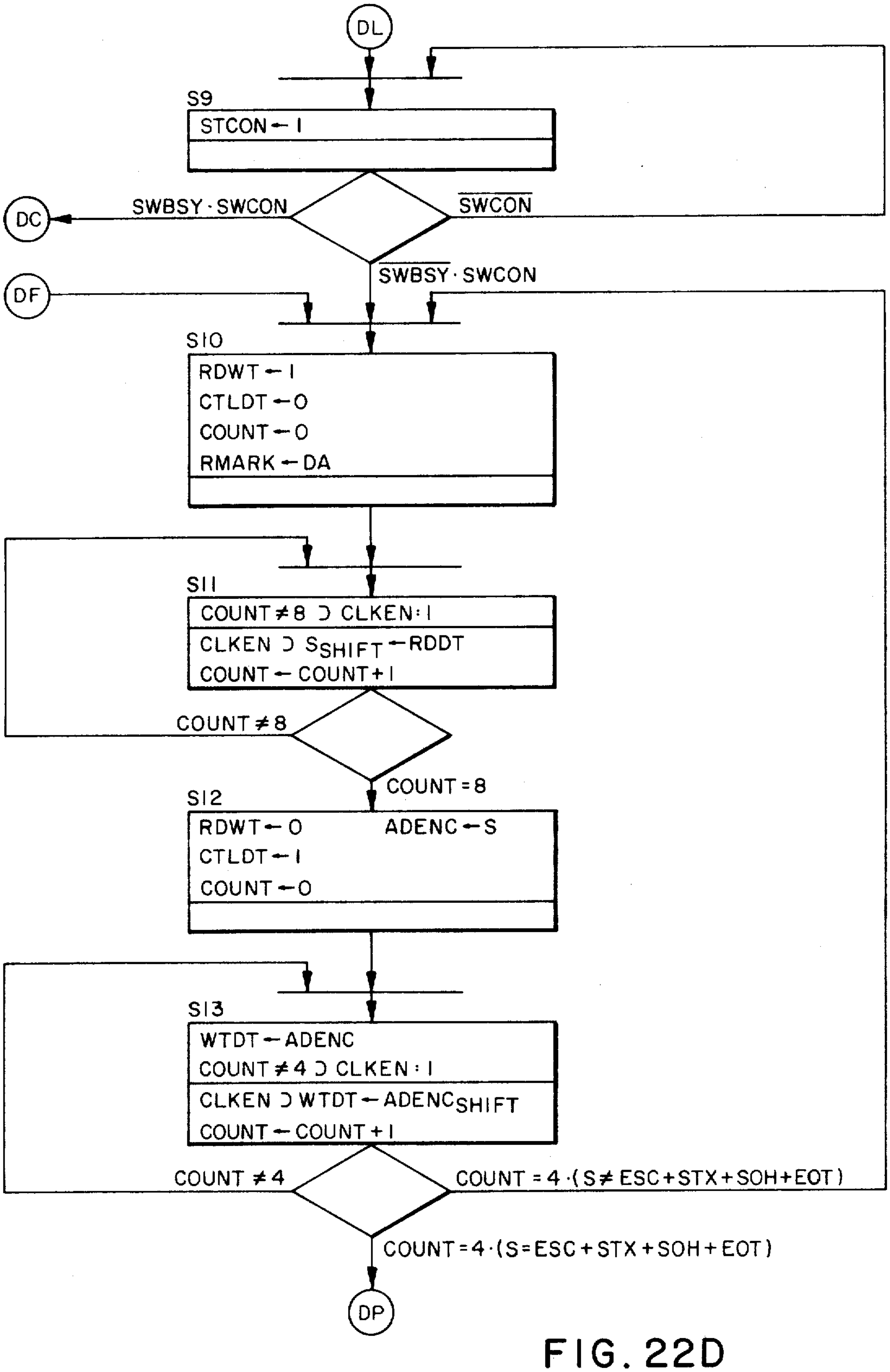
Figure 22E:
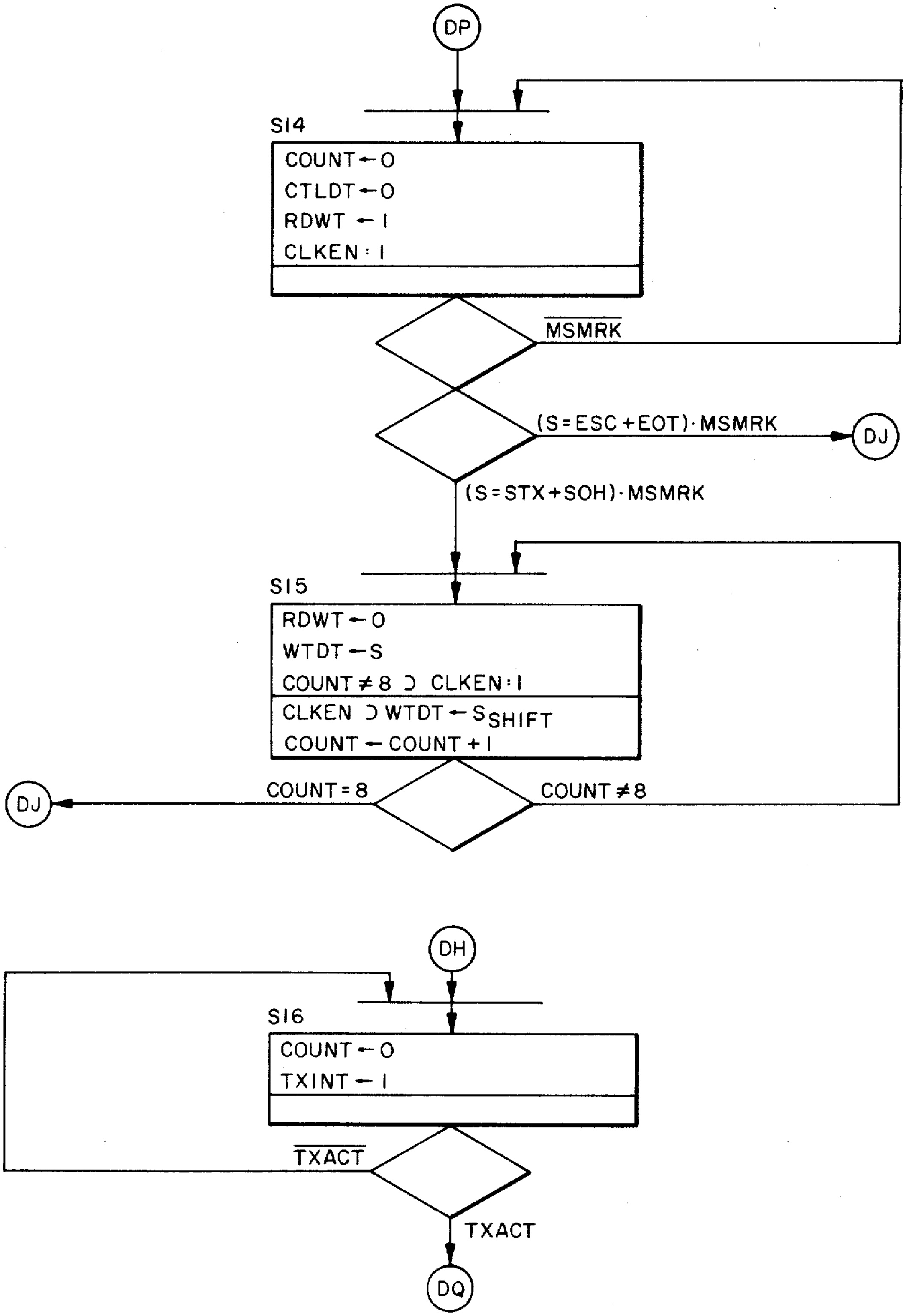
Figure 22F:
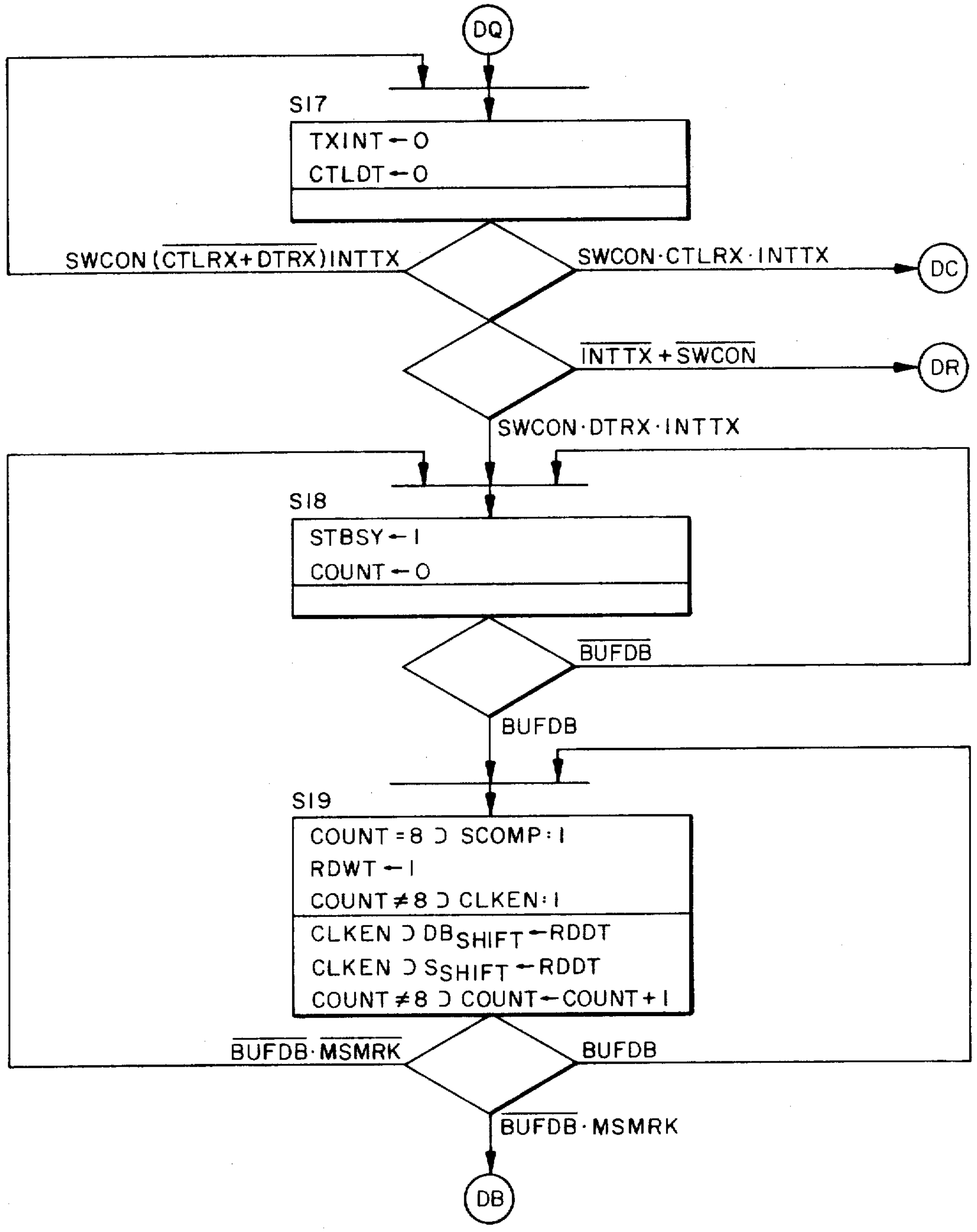
Figure 22G:
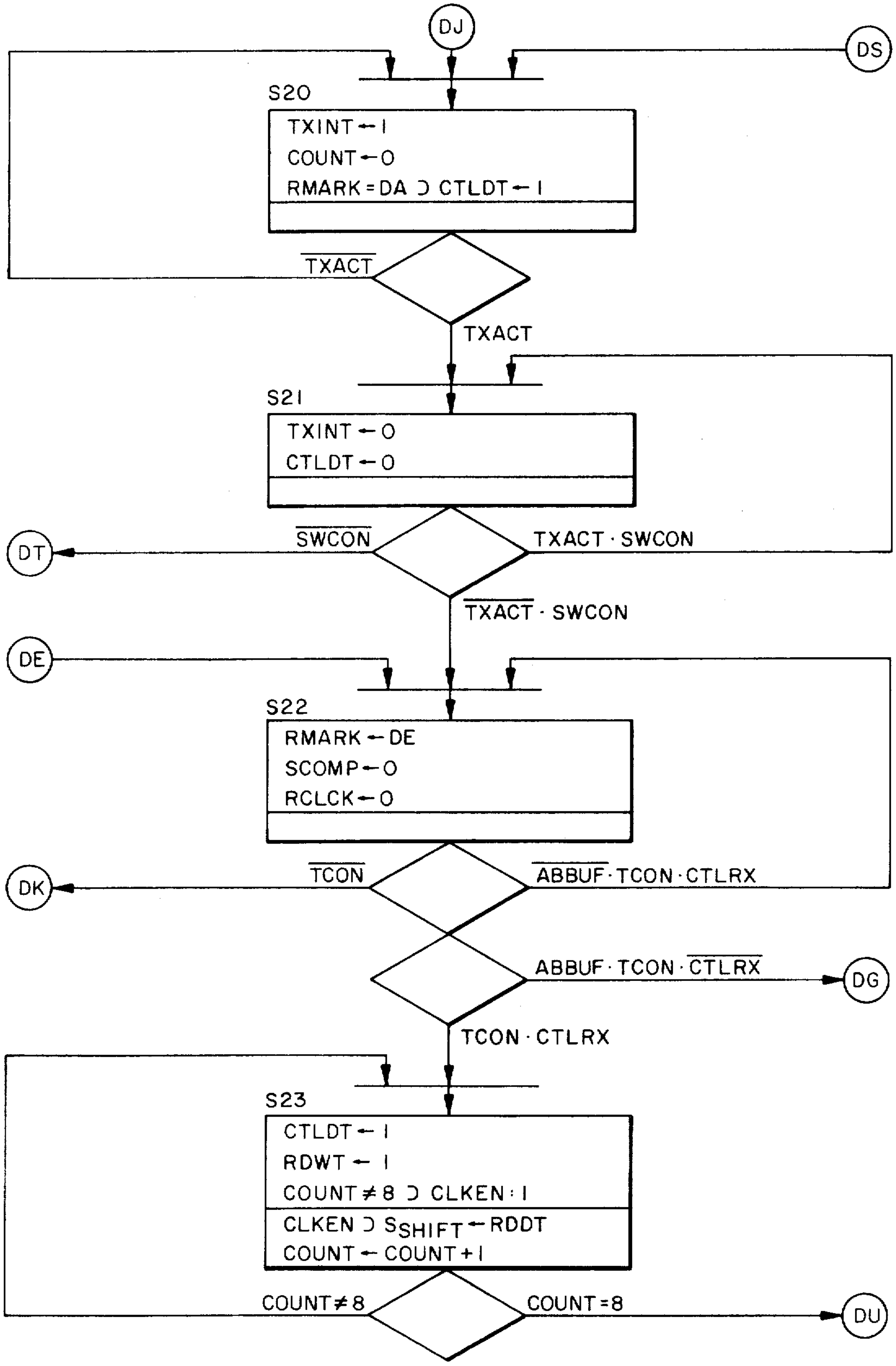
Figure 22H:
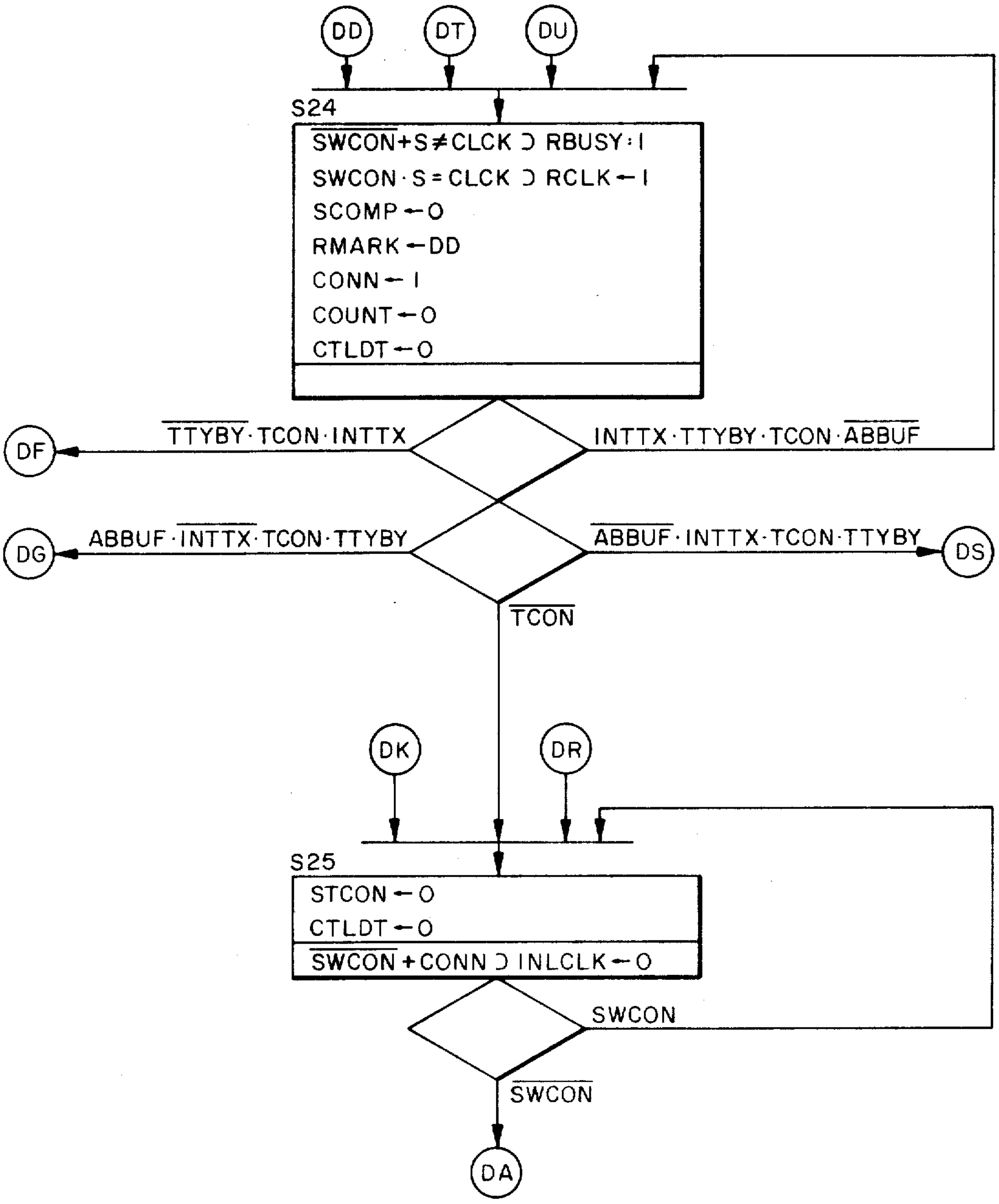
Figure 23A:
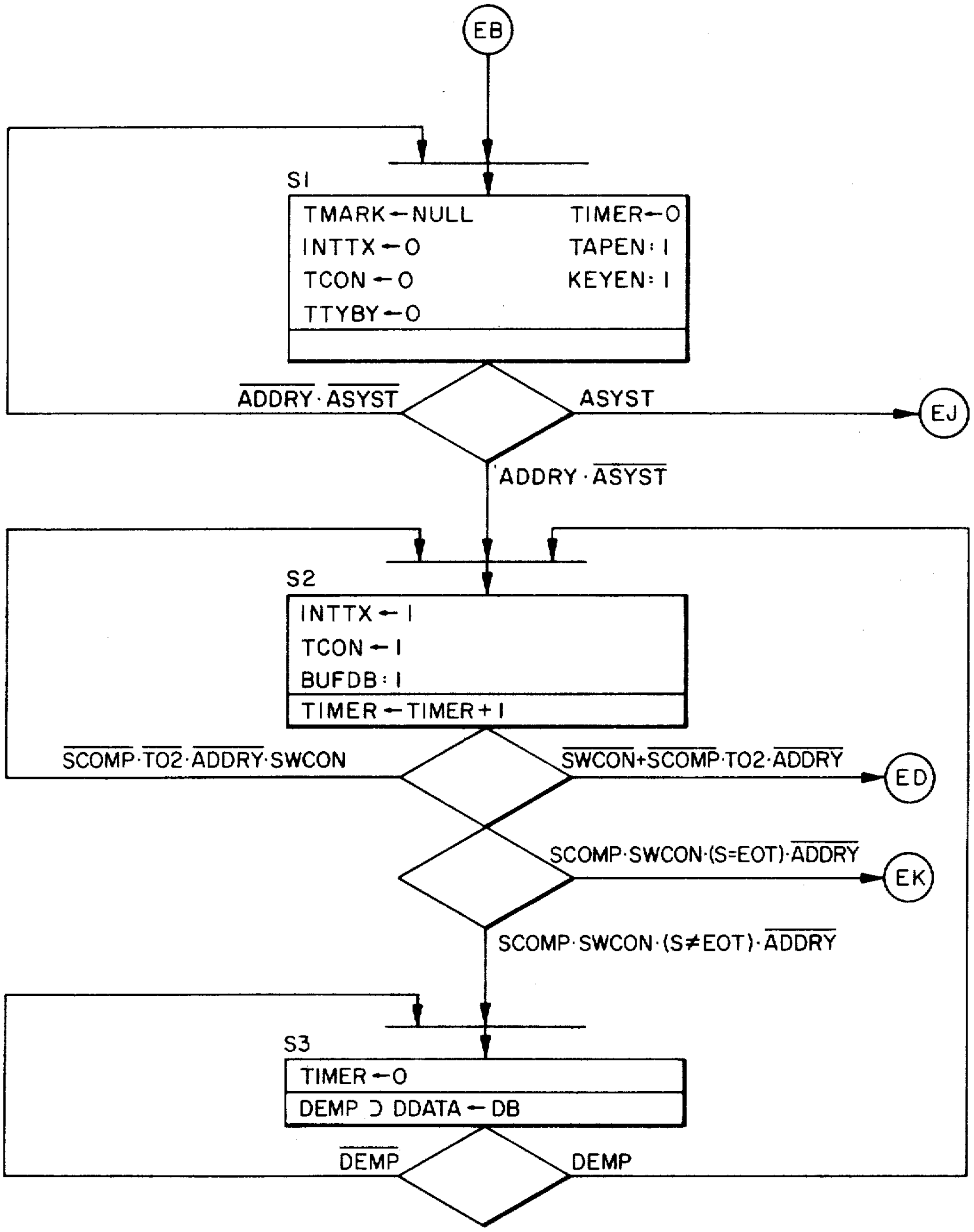
FIGS. 23A–23G illustrate the flow diagram of the teletypewriter connected portion of the TIU interface shown in FIG. 21 as is basically descriptive of the logic contained in block 508 thereof.
Figure 23B:
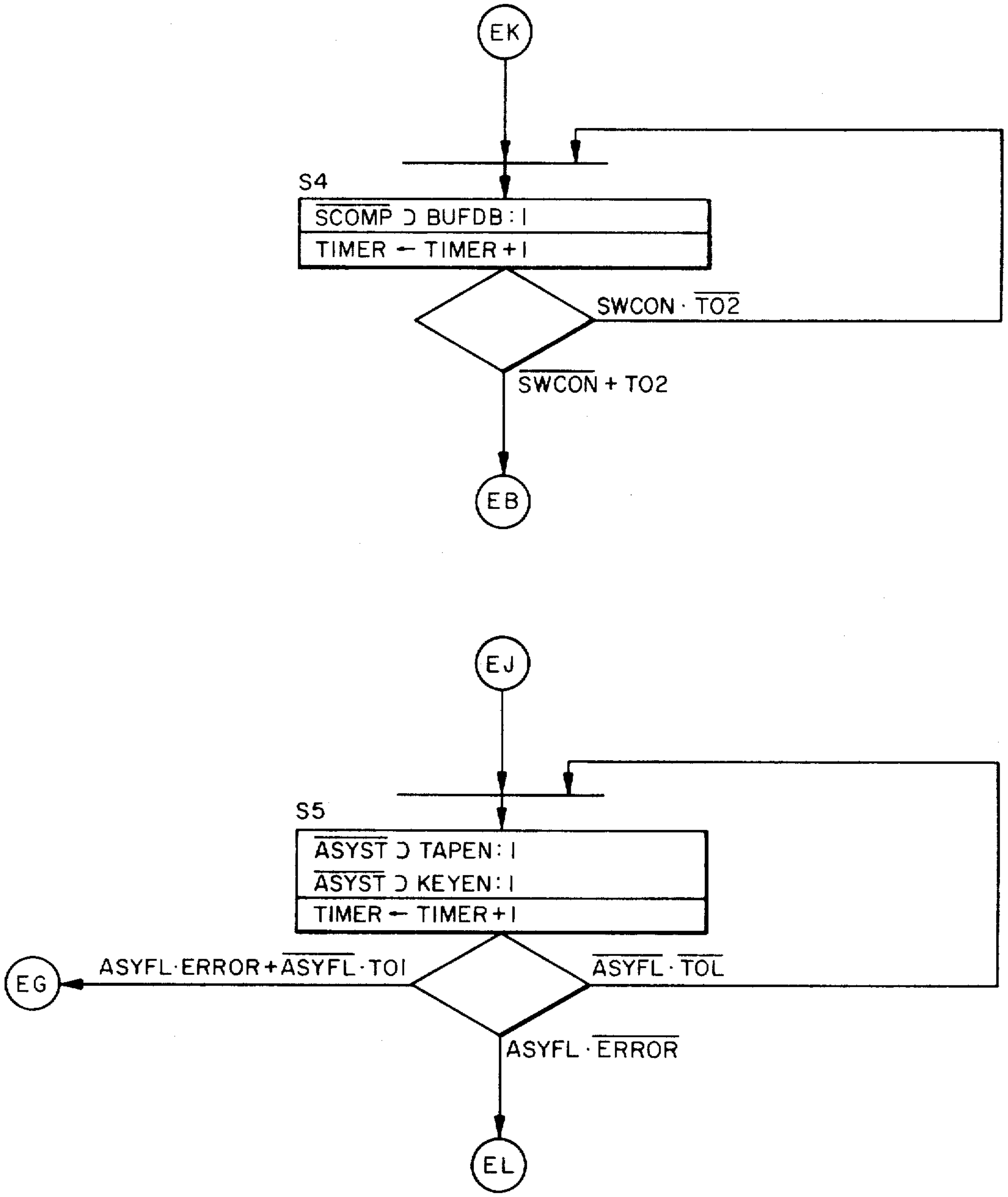
Figure 23C:
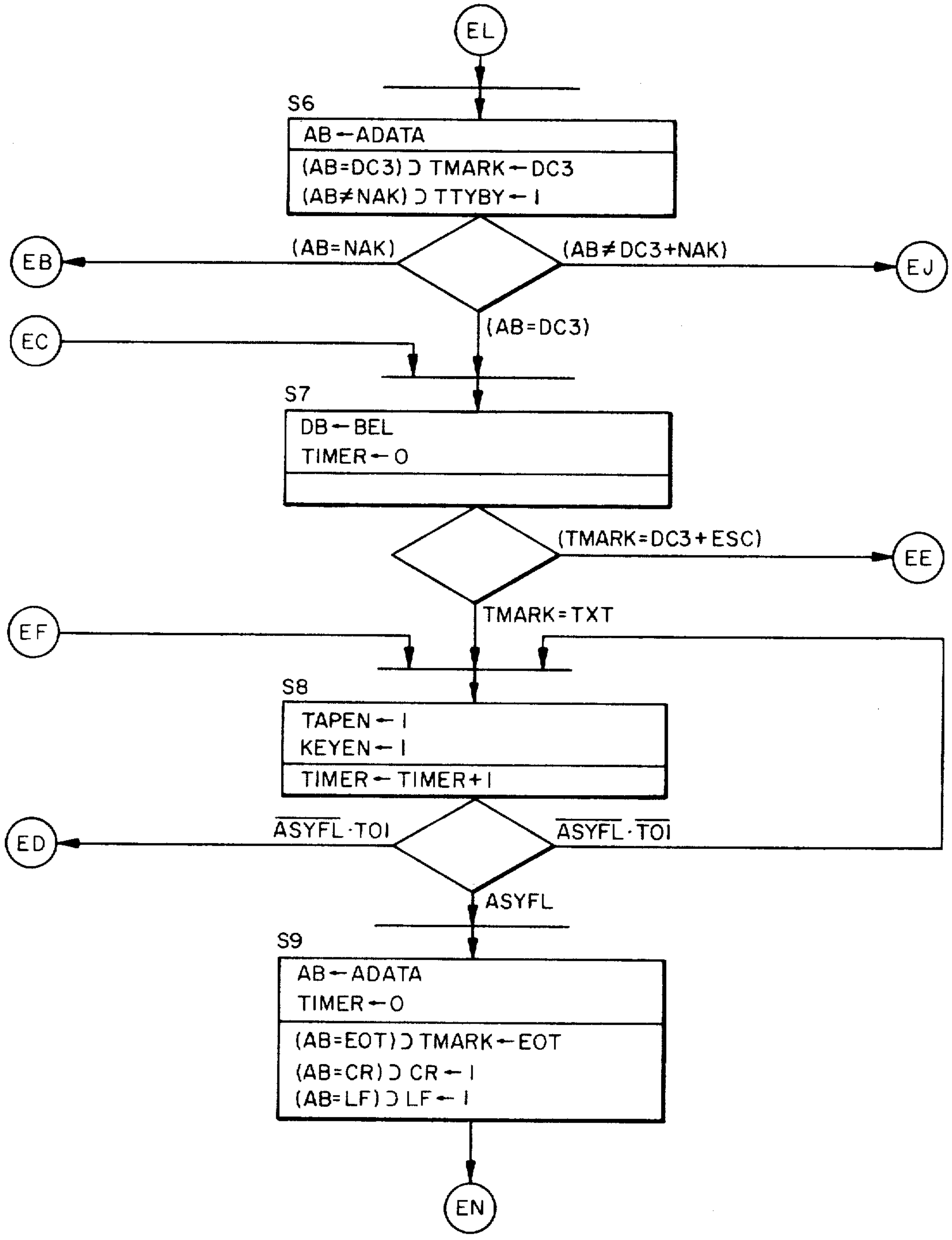
Figure 23D:
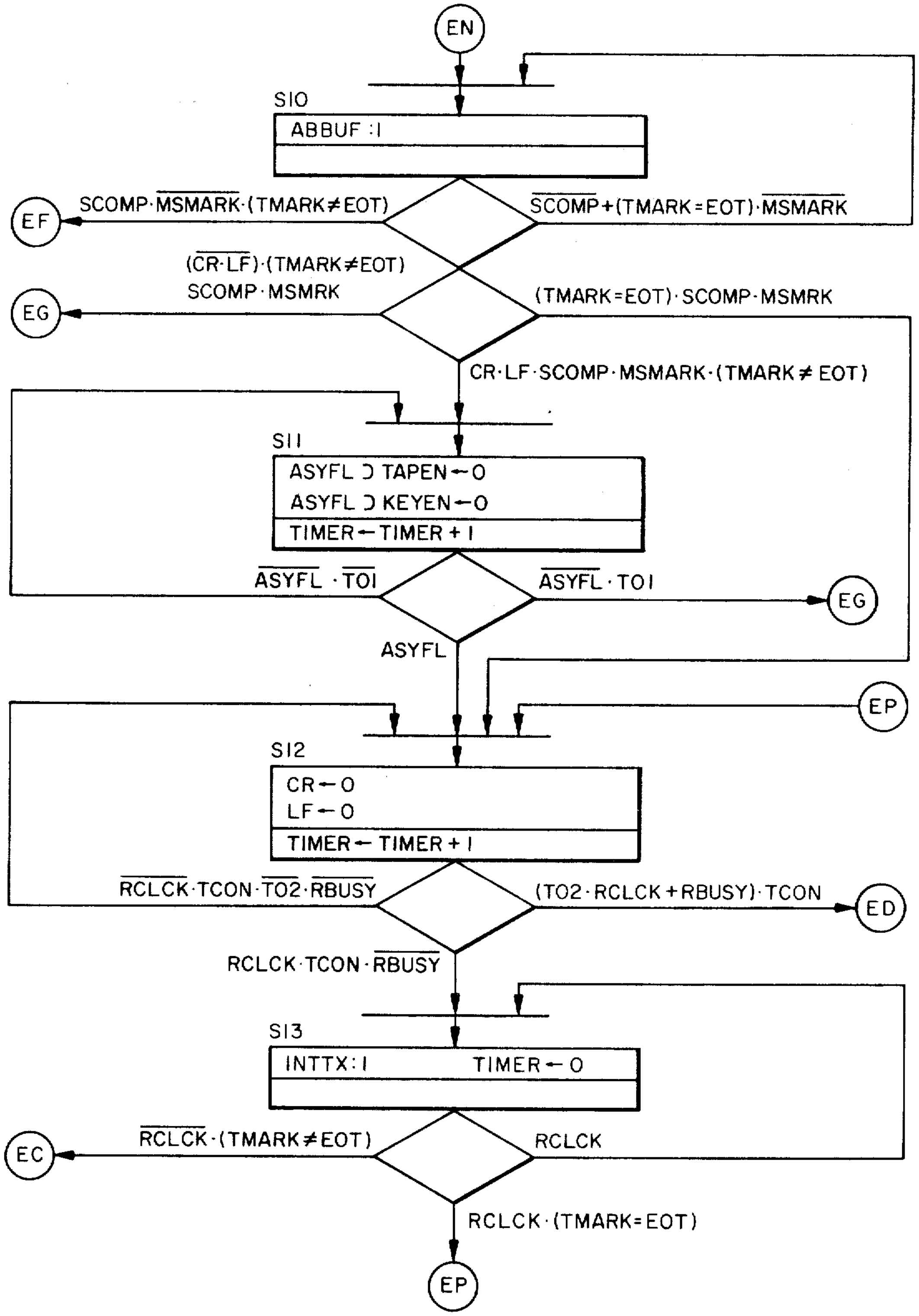
Figure 23E:
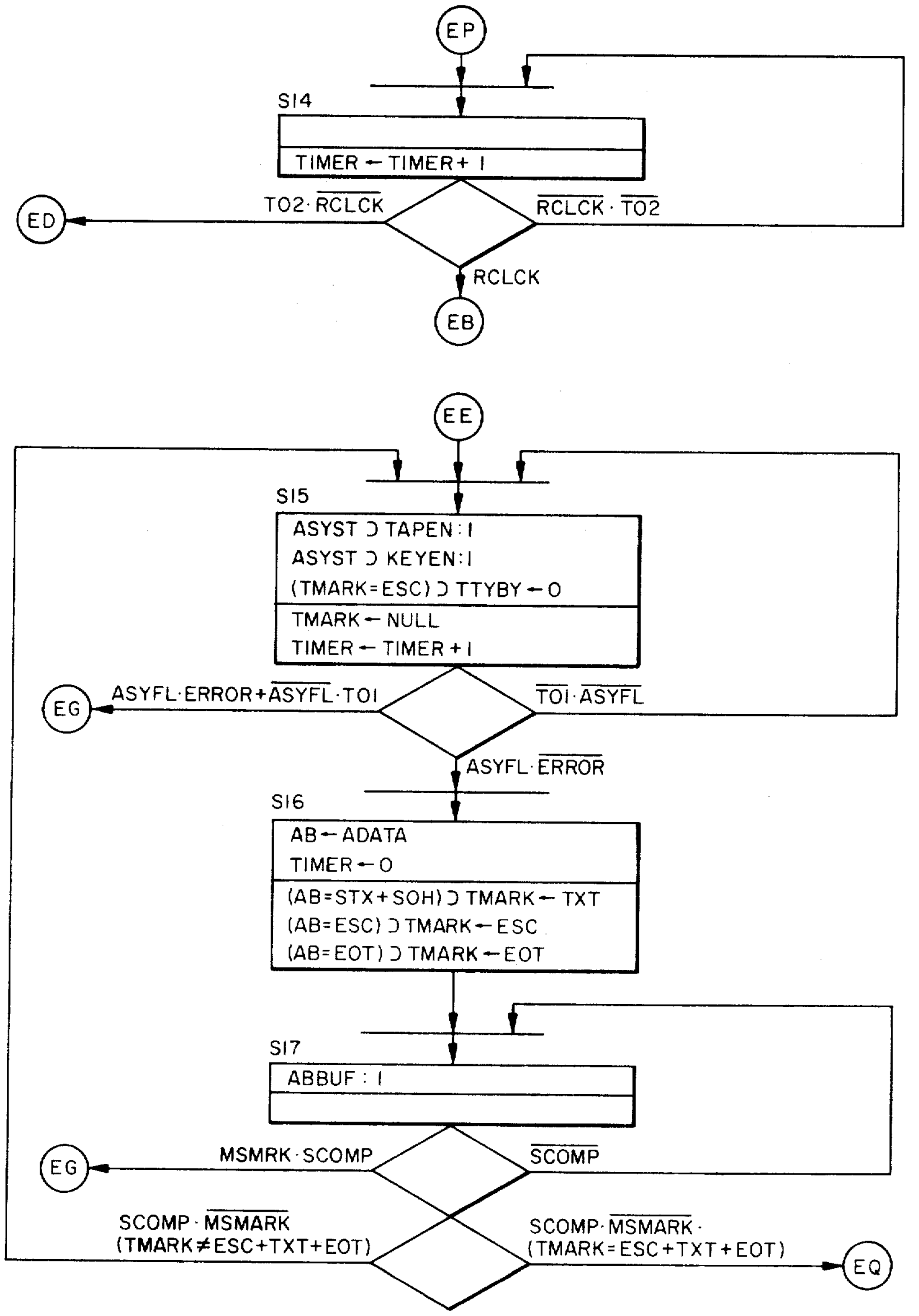
Figure 23F:
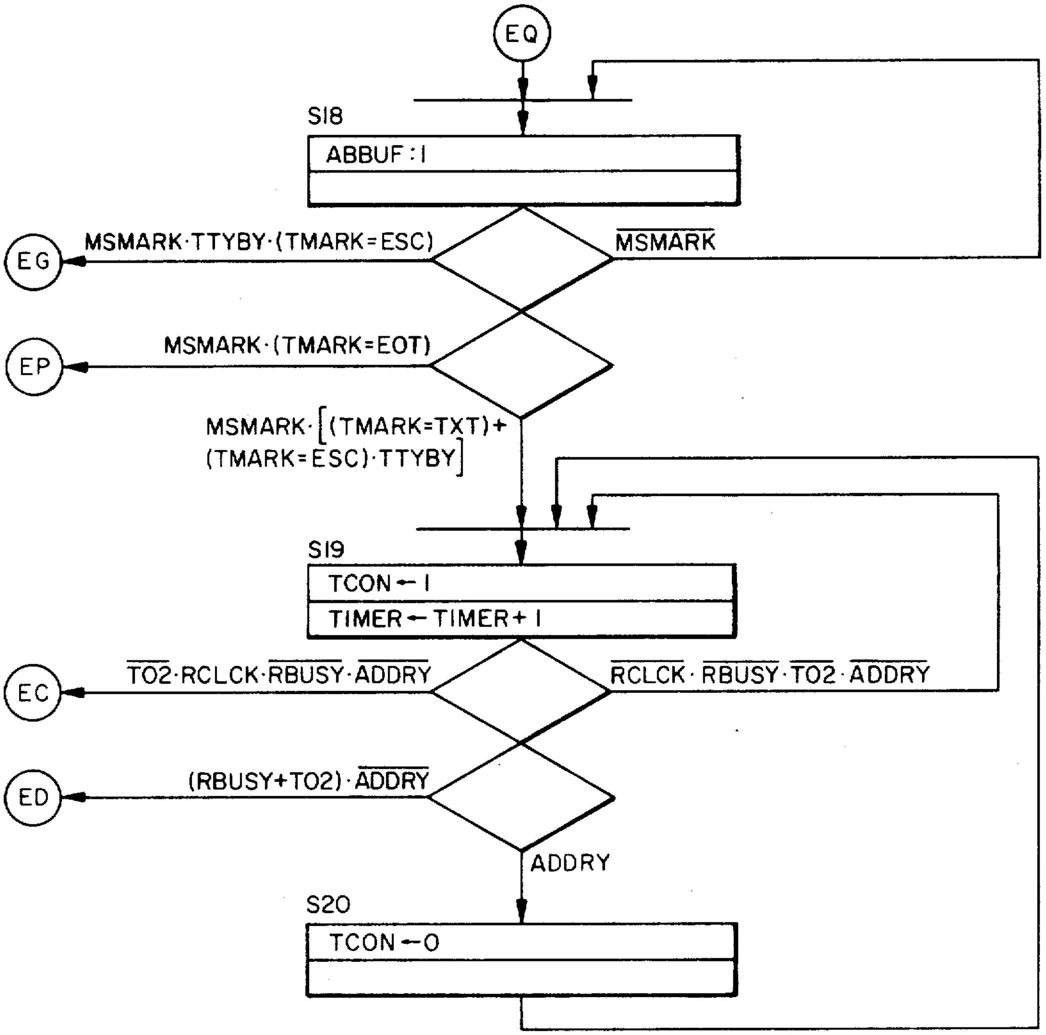
Figure 23G:
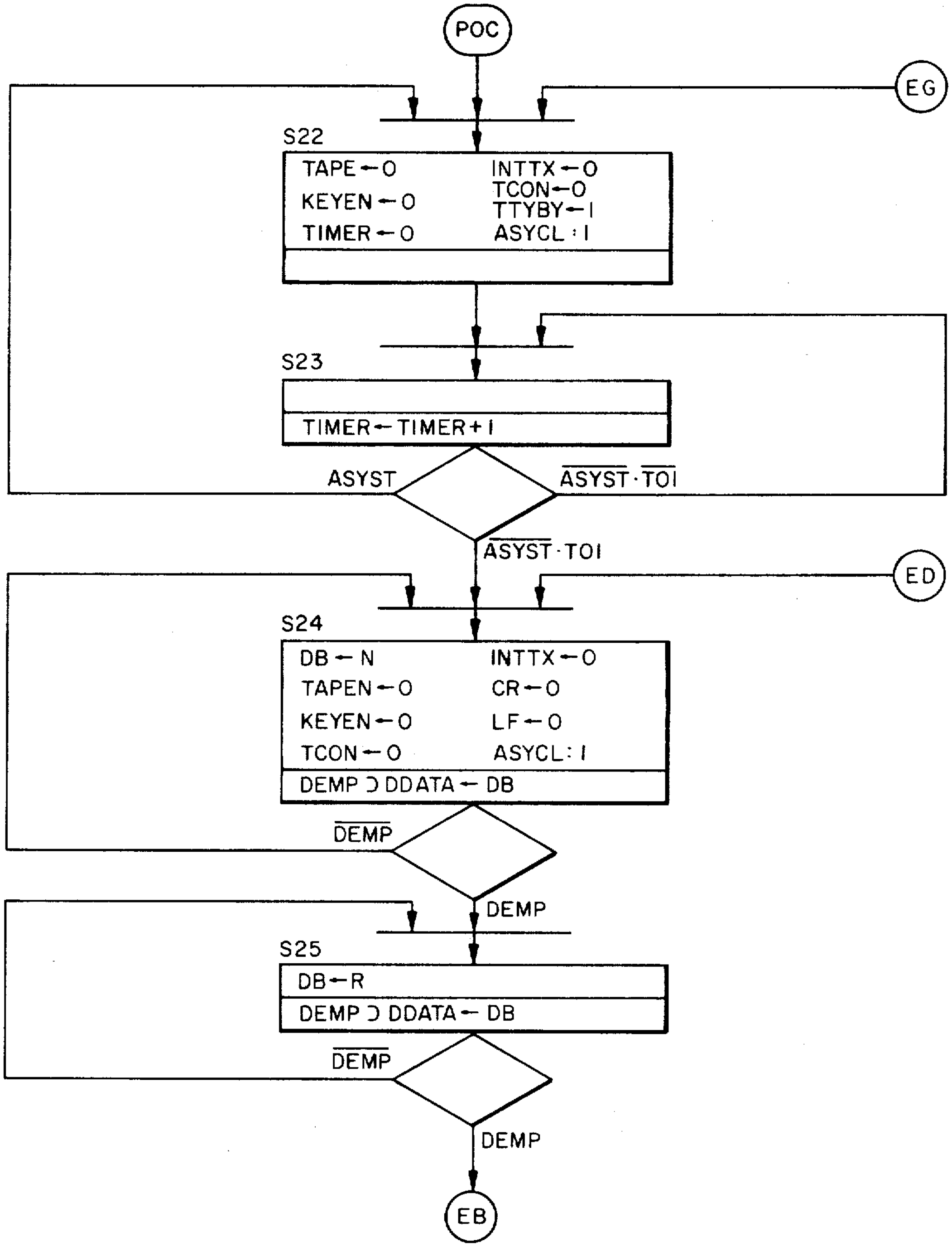

Since the apparatus in FIGS. 21-23 contain numerous mnemonics, these will be set out immediately before any description of these figures.

AB — Assembly Buffer - An eight-bit register in block 504 which is set by the TTY and read either by blocks 520 or 506 or by the SCU itself.

ABBUF — Assembly Buffer to SCU Buffer - A signal line used to request the transmission of the assembled character in the AB register to the buffer in the SCU which is set by the TTY interface and is read by the SCU interface.

ADATA — Assemble Data - An eight-bit register in the character assembler 504 of FIG. 21 and shown in FIG. 25 into which data is supplied to the TTY before being passed to the AB register.

ADENC — Address Encoder - An eight-bit register 506 having a four-bit parallel input which is set by the SCU INT and is read by the SCU.

ADDRY — Address Ready - A signal line from 500 to 508 indicating a pending call from the switching loop which is set by the SCU INT and read by the TTY INT.

ASYCL — Assembly Clear - A signal line used internally of the TIU for clearing the character assembler including the ADATA register and is set by the TTY interface.

ASYST — Assembly Start - A signal from the character assembler to the TTY interface logic 508 of FIG. 21 indicating that the TTY is supplying data bits to the ADATA register.

ASYFL — Assembly Full - A signal line from the character assembly 504 to control logic 508 indicating that the ADATA register contains eight data bits.

BEL — Bell - A signal supplied to the character distributor for transmission to the TTY which rings a bell on the TTY to acknowledge transmission of a message portion.

BUFDB — SCU Buffer to Distribution Buffer - A signal line used to request data from the SCU buffer which is set by the TTY interface and is read by the SCU interface.

CLKEN — Clock Enable - A signal line used to enable a gated data clock which is both set by and read by the SCU interface.

CONN — Connect - A flip-flop found in the control logic section 500 of the SCU interface used to indicate if a connection exists to the direct switch. This flip-flop is both set and read by this control logic.

CR — Carriage Return - A character which is transmitted from the TTY and used by the control logic for detection of errors.

CTLDT — Control/Data - A signal line used to define which type of message will be transferred (data or control). A logic "1" indicates control while a logic "0" indicates data. This signal, while having the same name, has a different mnemonic than a previous use of a similar signal. The signal is set by the SCU interface but is read by the SCU itself.

CTLRX — Control Received - A signal line used to indicate that a control message has been received by the SCU for transmission to the TIU. This signal line is set by the SCU and is read by the SCU interface logic 500.

COUNT — Count - A six-bit counter 524 to count 0, 4, 8, and 40 bit shifts and is both set and read by the control logic of the SCU interface.

DC3 — Device Control 3 - A mnemonic for an encoded ASCII character utilized to precede the address of a message. This is set by the TTY and read by the TTY interface.

DB — Distribute Buffer - An eight-bit register forming part of the character distributor 502 which is set by the SCU or the SCU interface and is read by the TTY via the DDATA register.

DDATA — Distributor Data Register - A register in character distributor 502 and shown in FIG. 24 which receives data in parallel from the DB register and transmits it in series to the TTY.

DEMP — Distributor Empty - A signal line from the character distributor signifying that the DDATA register does not contain any data bits.

DTRX — Data Received - A signal line used to indicate that a data message has been received by the SCU for the TIU which is set by the SCU and read by the SCU interface.

ESC — Escape - An ASCII character which precedes the beginning of a control message and is set by the TTY and read by the TTY interface.

EOT — End of Transmission - An ASCII character utilized at the end of a data or control message and also utilized by the TTY operator in the event of error when he wishes to start over.

GTCLK — Gated Data Clock - A clock line used to gate data between the SCU and the TIU which is set by the SCU interface and read by the SCU.

INTTX — Initiate Transmit - A signal line used by the TTY interface logic 508 to indicate to the SCU interface logic 500 to send a message through the SCU to the loop. This line is set by the TTY interface and is read by the SCU interface.

INLCK — Interlock - A signal line used by logic 500 to indicate that the TIU is operative and which is set by the SCU interface and read by the SCU.

KEYEN — Key Enable - A signal line from the TTY interface to the TTY for enabling the operation of the keys thereon for supplying characters in the form of data bits to the character assembler 504.

LF — Line Feed - An ASCII character used by the teletypewriter to tell the remote unit to turn the paper to a new line and which is used by the TIU to check for transmission errors.

MSMRK — Message Mark - A signal line used to indicate that the SCU buffer is aligned and therefore ready for use either by the SCU or by the TTY as a scratch pad. This signal line is set by the SCU and is read by either of the interface portions of the TIU.

NAK — Negative Acknowledgment - An ASCII response supplied by the TTY and read by the TTY interface for returning a negative acknowledgment to a remote connected party.

POC — Power On Clear - A signal line used to indicate that power is On and that a loop initialization sequence has been detected so that utilization of the direct switch may begin.

RCLCK — Receive Clock - A signal line used to indicate that the control clock has been received by the SCU interface. This line is set by the SCU interface and is read by the TTY interface.

RDDT — Read Data - A signal line used to send data from the SCU to the TIU which is set by the SCU and supplied data to the DB and S registers in 502 and read by the SCU interface decode logic 522.

RDWT — Read/Write - A signal line used to define the direction of data flow with a logic "1" indicating a read and logic "0" indicating a write. This signal line is set by the SCU interface logic 500 and is read by the SCU.

RMARK — Return Marker - A two-bit logic gate used to differentiate a particular one of three return paths from a common subroutine and which is found in the SCU interface control logic of FIG. 21. This two-bit gate is set and read by the SCU interface logic 500.

S In the presently described embodiment this is an eight bit serial in - serial or parallel out register 503 in FIG. 21 which is used to supply information received from the SCU to the decode logic 522 and the address encoder 506 in parallel or to the SCU in serial format via the WTDT line. The S and DB registers always receive and contain the same data bits from the SCU.

SCOMP — Shift Complete - A signal line used to indicate the completion of data transfers from the AB register character assembler 504 to the SCU and which is set by the SCU interface and read by the TTY interface.

SOH — Start of Header - An ASCII character utilized to indicate the start of a heading which follows a preliminary address such as a processor address and which may precede further addresses to be used by the processor. The SOH and ESC characters are not compatible in that both cannot be contained in the same message. However, a STX could be in the same message as a SOH.

STBSY — Station Busy - A signal line used to inhibit the SCU from loading its data buffer which is set by the SCU interface logic 500 and is read by the SCU.

STCON — Station Connect - A signal line used to establish or acknowledge a connection between the TIU and the SCU. This is set by the SCU interface logic 500 and is read by the SCU.

STX — Start of Text - An ASCII character preceding the data portion of a message and appearing after the address of data messages as they are transmitted from the SCU.

SWBSY — Switch Busy - A signal line used to indicate that the SCU is busy with a loop transaction and cannot receive messages from the TTY. This line is set by the SCU and is read by the SCU interface logic 500.

SWCON — Switch Connect - A signal line used by the SCU to initiate or acknowledge a connection to the SCU interface.

TAPEN — Tape Enable - A signal line from the TTY interface control logic 508 to the TTy for allowing use of the tape to supply character data bits to the assembler 504.

TCON — TTY Connect - A signal line used by the TTY interface logic 508 to establish or acknowledge a connection with the SCU. This signal line is read by the SCU interface.

TMARK — Transmit Marker - A multiple state logic gate contained in control logic 508 which may be set to various indications such as DC3, EOT, NULL, TXT, ESC, according to the contents of a character in the AB register.

T01 — TTY Time Out - A set, predetermined time after which the control logic is reinitiated if there is no response from the TTY.

T02 — Direct Switch Time Out - A second, predetermined time after which the device returns to an idle state if no response is received from the "connected" party. TXACT — Transmit Active - A signal line used to acknowledge the reception of a transmit initiate signal from the SCU interface to the SCU and the completion of the transmission from the SCU to the line.

TXINT — Transmit Initiate - A signal line used by the SCU interface to initiate a transmission from the SCU to the loop. This is set by the SCU interface and read by the SCU.

TXT — Message Text - A setting of the TMARK logic used to signify the start of a message in the correct flow path in the flow diagram.

WTDT — Write Data - A signal line used by the SCU interface to send data to the SCU and which is read by the SCU.

Referring now to FIG. 21 it will be noted that there are vertical lines on the left and right hand side of this figure. The leads which extend past the line on the right-hand side are all connected to the SCU and may either be coming from the SCU or going to it while the leads extending beyond the line on the left-hand side of the sheet are all connnected to a teletypewriter unit.

The remaining leads which are unconnected at one end and which are contained between the two vertical lines are connected to one or the other of the two control logic blocks 500 and 508 as may be determined from the flow diagrams of FIGS. 22 and 23 and/or from the above mnemonic list.

In view of the mnemonic description above and the flow diagrams of FIGS. 22 and 23 it is believed that further, lengthy comments on these leads are unnecessary. As will be noted, most of the leads from the SCU and to the ScU are connected to the SCU interface portion of the control logic 500. The RDDT line from the SCU is connected to a character distributor block 502 which also contains a DB register. It should be noted further that there are two output leads labeled WTDT. The first is from a S register 503 and the second is from a character assembler 504. An address encoder 506 also supplies signals to the second output WTDT. The logic gating in control logic 500 and the TTY interface control logic 508 prevent the application of output signals from more than one of the blocks 503, 504, and 506 at any given time. Distributor 502 has input and output leads such as LOAD, DEMP, CLOCK, and a word length strap which are connected to control logic 500. Character assembler 504 has various intpus and outputs such as CLOCK, ASYCL, STROBE, ASYFL, ASYST, pARITY and word length straps which are all connected to control logic block 508. An output of character distributor 502 is supplied through a V/Z block 501 to an output lead 512 for supplying data to the TTY. The block 510 and similar blocks on this drawing are merely voltage to impedance converters for matching the impedance characteristics of the TTY. Two outputs of key enable (KEYEN) and tape enable (TAPEN) are supplied from control logic block 508 through similar V/Z converters 514 and 516 to the TTY. A final V/Z block 518 is connected to receive data from the TTY and supply it to the character assembler 504. Block 504 supplies parallel outputs to a decode logic 520 and to the address encoder 506. Control logic 508 supplies a parallel output to the character distributor 502. The parallel input to distributor 502 from control logic 508 is received by the DB register. The DB register transfers incoming parallel or serial signals to a DDATA register in the character distributor section of block 502 for final transfer to the TTY. A clock counter and decode block 524 receives a clear count input from control logic 500 and supplies decoded outputs indicative of counts 0, 4, 8, and 40 back to the logic 500. A similar clock block 526 is connected in a similar fashion to control logic 508. The outputs are labeled T01 and T02 as these counts will vary depending upon the configuration of the local exchange loop and the desires of the TTY operator in the particular application. Thus, these decoded times are merely labeled T01 and T02. The input from character assembler 504 to decode logic 520 results in one specific output on one of ten lines from decode logic 520 to control logic 508. These lines are labeled EOT, STX, SOH, DC3, NAK, ACK, ESC, CR, and LF.

The decode logic 522 contains eight outputs which are connected to the control logic 500 and are labeled EOT, SOH, CALL, DATA, DISC, CLCK, ESC, and STX. The output EOT is also connected to logic 508. The control logic 500 has four outputs to control logic 508 which are labeled as shown and discussed above in the mnemonics and control logic 508 contains six outputs to the control logic 500 which are also discussed above.

The operation of FIG. 21 will be explained in more detail in the flow diagrams of FIGS. 22 and 23. However, basically, data is received by the TTY through the TIU from the SCU on the RDDT line. The incoming serial data is placed in the DB register of character distributor 502 and in the S register of 503. The incoming characters are decoded by decode logic 522 and their decoded indications are supplied to control logic 500. If the TTY has not been "connected" to a remote party previously, the device checks to see that a branch call is received. The TTY operator receives this call indication by a transfer of information from the DB register in parallel to a DDATA register which is then transferred to the TTY. This information occurs one character at a time. The TTY operator then replies with an acknowledge or negative acknowledge signal being supplied to the character assembler, one character at a time. This is placed in the ADATA register and transferred to the AB register for transmission to the SCU via the WTDT line. As previously indicated, the decode logic 522 monitors all incoming characters and supplies decoded signals to the control logic 500 indicative of end of transmission which signifies end of message and various other signals such as disconnect which will normally be supplied after an end of transmission.

When the TTY operator wishes to send a message, the address is supplied from the TTY to the ADATA register and then to the AB register one character at a time. When an address is involved, it is supplied in parallel to the address encoder, in the embodiment shown, for reformatting into hexidecimal characters from teletype ASCII. There is gating in the address encoder 506 and the character assembler 504 so that both registers do not supply information to the write data line simultaneously. The control logic also controls the output of the S register 503 so that it provides outputs at times independent of the last mentioned registers. As will be noted, decode logic 520 monitors all the data in the AB register and supplies signals to the control logic 508 indicative of various signals such as carriage return, line feed, end of transmission, etc.

Since the direct switch may be used in different environments, word length straps are utilized in the character assembler and the character distributor 504 and 502, respectively, to adjust the length of the words or characters to a prescribed number of data bits. This allows the TIU to operate with a variety of teletypewriters.

Basically, the TIU of FIG. 21 operates to retrieve characters from the SCU data buffer one character at a time and decode each of these characters before transmitting the characters to the TTY. It also serves to take characters from the TTy and place these in the SCU data buffer, one character at a time, simultaneously monitoring these characters and the SCU data buffer so that transmission may be stopped when the SCU data buffer is full and needs to be relieved of its contents by transmission of that portion of the message.

FLOW DIAGRAM OF TTY INTERFACE UNIT (SCU-LOGIC PORTION)

FIGS. 22

Reference will now be made to FIGS. 22A–H. These figures, as previously mentioned, describe the flow of logic in control logic 500 which is the SCU interface portion of the TIU.

After POWER ON CLEAR, the device stays in state 1 until an indication is received that the SCU has received a message and is forwarding it to the TTY on the SWCON and CTLRX line to state 2 or that the TTY has assembled a character in the character assembler 504 of FIG. 21 and is ready to send it to the SCU buffer as would occur starting in state 7 or finally that the TTY is attempting to establish a connection with the TIU by raising the TTY interface busy line the line used for establishing a connection between the TTY and the SCU interfaces thereof. This action would be commenced in state 9. While the device is waiting in state 1 it continually resets station connect, transmit initiate, control data, shift complete, address ready, count, receive clock, and connect to a zero, while setting read/write to a "1." The return marker is set to the same value as it would if the device returned to state 1 from state 25 after sending a disconnect back to a remote connected station. It may first be assumed that a switch connect and control received signal is received and the device exits to state 2 while setting interlock to a logic "1." The device counts to 8 while the TIU is accepting a control message from the SCU. As long as the count has not reached 8, the clock enable is set to a "1" and the station connect, control data and read/write lines are continually set to 1's. On each path through state 2 the count is incremented and as long as there is a clock enable the read data line bits are shifted into the S register. At the count of 8 the contents of the S register are decoded by decode logic 522 and if the decode is anything other than a branch call or data disconnect at the count of 8, the device proceeds to state 25 and sends a disconnect back to the originator. In state 25 the device sets station connect to a logic "0" and control data to a logic "0." As soon as switch connect is released to a logic "0," the device returns to state 1. As will be noted, if the connect flip-flop is in a logic "1" state when the switch connect line is dropped to a logic "0," the interlock line is set to a logic "0" so that the SCU will send a disconnect to the originator. When the device returns to state 1 the connect flip-flop is returned to a state of logic "0" and the interlock is returned to a logic "1."

If the decoded signal from the S register is a disconnect at the time the count equals 8, the device merely returns to state 1. If on the other hand the decoded output of logic block 522 is either a branch call or a branch data on the count of 8, the device proceeds to state 3. In state 3, the rest of the control word is shifted into the S register. During this time the clock enable is kept at 1 and the count is continuously incremented until a count of 40 is obtained. During this time the information from the RDDT line is shifted into the S register. The first 32 bits are lost and the S register contains only the party line address of the TTY called at the end of this shift. (This operation is only required where there is more than one TTY per SCU, but is included for completeness of disclosure. Upon a count of 40 the device proceeds to state 4 where the address ready line is set to a logic "1" and the count and control data lines are set to a logic "0" to indicate to the TTY interface that a word is ready for forwarding thereto. The TTY interface may be busy and if it raises the TTYBY line to a logic "1" and leaves the TCON line to a logic "0," the incoming call will be aborted and the device will proceed directly to state 6. However, if the TTY is not busy and a TTY connect signal is obtained the device will proceed to state 5 where count, address ready, and station busy lines are set to a logic "0." If for some reason at this time TTY connect is lowered to a logic "0" with the flip-flop indicating connection to the direct switch remaining in a logic "1" the device will proceed to state 25 where a disconnect word will be sent back to the connected party. However, the device will normally proceed to state 6 where the S register is loaded with the appropriate response to be sent back to the "connected" party. If the device enters state 6 directly from state 4, the initiate transmit signal will be at a logic "0" since the TTY has not initiated the signal. Thus, the S register would be loaded with a busy control message, the read/write signal would be set to a logic "0" for writing data into the S register, and the clock enable would be set to a logic "1" after the count exceeded "0" so that eight bits from the S register would be sent out on line WTDT. The remaining 32 bits would be logic "0's" so that the SCU could utilize the appropriate address from its address register in returning the busy response to the connected party.

At the count of 40 the device would proceed to state 16 where transmit initiate is set to logic "1" and count is returned to 0. Setting the transmit initiate to a logic "1" starts transmission of the response to the loop. The device will stay in state 16 until transmit active is set to a logic 1 by the SCU acknowledging reception of a transmit initiate. After the reception of TXACT, the device proceeds to state 17 where it awaits more messages from the "connected" party. In state 17 the control logic transmission initiate line is set to a logic "0" as well as the control data line. If the switch connect, control received, and initiate transmit lines are set to a logic "1," the device will return to state 2 to accept another control message from the SCU. However, if either initiate transmit or switch connect lines are dropped to a logic "0" by the TTY or SCU, respectively, the device proceeds to state 25.

In state 25 the device again sends a disconnect back to the "connected" party and returns to state 1 to await reception from a further party.

However, while idling in state 17 the device may receive an indication that a data message has been received by the data line being raised to a logic "1" rather than the control line. In this case the device will proceed to state 18 instead of the previously referenced state 2. In state 18 the station busy line is set to a logic "1" while the count is set to a "0." In this state it is awaiting the readiness of the TTY interface portion of the TIU to accept a character. When BUFDB is set to a logic "1" by the TTY interface, the device proceeds to state 19 where it waits for 8 counts to complete the sending of a character from the SCU buffer to the character distributor. During this time the read/write line is set to a logic "1" and the clock enable is set to logic "1" until the count of 8 is reached. When the count of 8 is reached, the SCOMP line is raised to a logic "1" indicating that the shift is complete for the data transfer for that particular character. During the time spent in state 19, the incoming data is shifted into both the S and DB registers of the character distributor 502.

If at the count of 8, a MSMRK or message mark signal is not received from the SCU, the device will proceed to state 18 so that it may accept a new character. This continues one character at a time until the message mark signal is raised to a logic "1" indicating that the buffer in the SCU is now empty. At this time the device returns to state 5 to set the count to 0 and set address ready, and station busy signals to a logic "0" and then proceeds to state 6 so that the S register may be loaded with the appropriate response to the connected party. In this case it would be a positive acknowledgement of CLCK being returned to the connected party.

The device continues returning to state 16 to send response messages and then back through states 17–19 to receive further messages until such time as a disconnect is received or the SCU or the TTY interface aborts the message. At this time the device will branch to state 25 and back to state 1. This ends the discussion of the reception of a message from the communication loops.

It may be assumed at this time that the switch connect and control receive lines are at a logic "0" but that the TTY busy and TTY connect lines are at a logic "1." This indicates that the TTY is busy and wants to connect. The device then proceeds to state 9 where station connect is set to a logic "1" and the device awaits a response. The device can get to state 9 only if the SCU has no message for the TTY but the reverse is not true. If upon receiving the switch connect line, the SCU suddenly receives an input, the switch busy line will also be raised and the device will proceed to state 2. The SCU interface will send a busy response to this call. However, normally the switch busy line will remain at a logic "0" upon the raising of a switch connect line to a logic "1" and the device will proceed to state 10. When arriving at state 10 via states 1 and 9 the RMARK logic gate is already set at DA so the operation in state 10 has no effect. This setting is used when the device enters this state from state 24. In state 10 the read/write line is set to a logic "1" and the control data and count lines are set to a logic "0." Thus, the address previously written into the SCU buffer by the TTY interface is now ready to be read by the SCU interface, encoded and returned to the SCU as a direct switch or system address. The device proceeds to state 11 where a count of 8 is awaited so that the entire address may be transferred to the S register in character distributor 502. During this time the clock enable is raised to a logic "1" and RDDT is connected to shift the input bits into the S register. The reason for the manipulation, in states 10–13 is that the connected party's address is in the SCU buffer and needs to be removed, reformatted and placed in the SCU address register for transmission to the local exchange loop as the preliminary part of a control or data message. At a count of 8 the device proceeds to state 12 where the output of the S register is parallel transferred from 503 to 506. At this time read/-write and count are set to logic "0" while control data is set to logic "1." The device then proceeds to state 13 where the output of address encoder 506 is connected to the write data lead and the device proceeds for four counts. During this time the four-bit character is serially shifted out of address encoder 506. In the embodiment shown the address encoder converts the ASCII format of the address in the SCU address register as transferred to the S register to a hexidecimal format. This reduces the number of bits from 8 to 4. Thus, only four bit times are required to shift out an address which required 8 bit times to shift into the S register. The use of hexidecimal addressing is, of course, peculiar only to the embodiment shown and could readily be altered to allow commonality of address and words throughout the entire system if so desired. After a count of 4 the device returns to state 10 and continues the state 10–13 trip as long as there is no end of transmission, start of header, start of message text or start of control message indicator. The receipt of any one of these indicators by control logic 500 from decode logic 522 provides an indication that it is now time to transmit the address and to start receiving the rest of the message from the TTY. Thus, the device proceeds to state 14.

State 14 is utilized for aligning the data buffer in the SCU. This is accomplished by clocking the data buffer until the MSMRK indication is received by control logic 500 thereby indicating that the buffer is in correct alignment. This alignment process empties the buffer of other extraneous material so that it will now be ready to receive future messages. During state 14 the device keeps the clock enable and read/write at a logic "1" while count and control data are set to logic "0." If the decode logic 522 decoded either an EOT or an ESC indicating a control message along with a MSMRK indicating that the buffer was aligned, the device would proceed to state 20. If, however, the decode was either STX or SOH indicating start of message text or start of header, respectively, along with the MSMRK the device would proceed to state 15. While it is not necessary to save an end of transmission or control message indicator for these two types of messages, it is necessary in the embodiment shown that the start of a header or start of a message text be provided. Thus, in state 15 the particular one of these two indications, which is in the S register at that time, is shifted out on 8 counts on the WTDT line to the buffer of the SCU. This is accomplished by enabling the clock for 8 counts during which time the shift register is connected to that output. During this time the read/write line is set to a logic "0." It should be noted that the SOH indicator is utilized for messages that are to go to a processor for further processing or forwarding to other stations. Thus, further addresses may appear after the SOH but at the present time are to be used as part of the message.

As now apparent, the device proceeds to state 20 from either state 14 or state 15 depending upon the type of message. In state 20 the TIU is asking the SCU to send a message by setting transmit initiate to a logic "1" and awaits acknowledgment from the SCU in the form of a TXACT. If the procedure has been as just described, the RMARK logic gate is in a DA state and thus the control data line is set to a logic "1" and a control message is sent. However, if state 20 had been entered from state 24, the control data line would have been left at a logic "0" and a data message is sent. After transmit active line is raised to a logic "1," the device enters state 21 where transmit initiate and control data are reset to a logic "0" and the device awaits completion of transmission by the SCU. If switch connect line is lowered to a logic "0" the device proceeds to state 24 since this indicates a failure of the SCU to transmit the message. However, if switch connect stays at a logic "1" and transmit active is changed to a logic "0," the transmission has been satisfactorily completed and the device proceeds to state 22. In state 22 RMARK is changed to the DE state so that the device can take care of a response when received. In state 22, shift complete and receive clock are also set to logic "0." If the response is too long in coming, the TTY connect line will be changed to a logic "0" and the device will proceed to state 25 wherein a disconnect signal is returned to the "connected" station. If the control received line is dropped to a logic "0," servicing of the TTY is indicated. Under these circumstances the device returns to state 7 where 8 clocks are utilized to load a TTY character into the SCU data buffer. This idling in state 22 continues as long as characters need to be loaded into the SCU data buffer or until the control receive line is raised to a logic "1" indicating that a response has been obtained from the local exchange loop. In other words, the detour through state 7 and 8 is a process whereby the TTY can load characters into the SCU data buffer during idle moments while waiting for a response.

When the control receive line is raised and the device proceeds through state 22 to state 23, 8 counts are used for clocking a full character. During this time control data and read/write are raised to a logic "1" while the incoming data is placed in the S register. The device then proceeds to state 24 where the RMARK logic gate is reset to DD and the S register is decoded. If the character in the S register is anything other than CLCK, the response is interpreted as being negative. However, a CLCK indicates a positive acknowledgment and receive clock is set to a logic "1" as long as switch connect is a logic "1." State 24 is used to inform the TTY interface that the message is satisfactorily or unsatisfactorily completed. The device stays in state 24 and awaits further words from TTY. If, however, ABBUF is changed to a logic "0" while initiate transmit, transmit connect, and TTY busy are logic "1's," the SCU data buffer is indicated as being full and ready to transmit a message. The device then returns to state 20 for such transmission. If the buffer is not full and there is no initiate transmit line the device returns instead to state 7 where more characters are loaded into the SCU data buffer. If TTYBY is changed to a logic "0," the device returns to state 10 because the TTY is now ready to send a control message. The final possibility of leaving state 24 is if transmit connect is changed to a logic "0" indicating that the message is aborted for taking too long. *n this instance a disconnect will be sent upon reaching state 25 and the device will proceed back to state 1.

The final way of leaving state 1 is to go directly to state 7 when ABBUF is logic 1 and switch connect and control receive are both at logic "0's." Again, the device merely loads TTY characters one at a time into the SCU and continually returns to state 1 after each character is loaded to check and see if the SCU has received a message.

In summary the SCU interface portion of the TIU acts to receive messages from the SCU which are bound for the TTY; and if upon decoding, they are not branch call or branch data to send a disconnect back to the transmitting party. However, if upon decoding a branch call or branch data is received, the message is transferred to the TTY and an appropriate response is returned to the remote party. The device then awaits more messages from the originating remote party until an end of transmission is received by the teletypewriter unit.

The transmission of a disconnect will return the device to state 1 where the device can await the reception of further messages or start assembling its own message for transmission to other remote parties. This is initiated by first loading the address into the SCU data buffer. When the address is fully loaded then the device proceeds to state 9 where the address is retrieved and reformatted and sent to the control register of the SCU. With the reformatted address in the control register of the SCU, the data buffer in the SCU is realigned and the rest of the message is supplied to the data buffer for transmission. After transmission and receipt of a satisfactory response, if further control messages are to be sent after transmission of a data message, a disconnect must be supplied and the remote station's address again inserted in the SCU data buffer for reformatting before further control messages may be sent to the same party.

TTY INTERFACE UNIT (TTY PORTION) FLOW DIAGRAM

FIGS. 23

In discussing FIGS. 23, states 22 to 25 will be discussed first. This portion of the flow diagram was placed on the last page since the only time that this portion is involved is during initialization or when there is an error. Normally, the TTY interface portion of the TIU idles in state 1. When POWER ON CLEAR is first received, the tape enable, key enable, timer, initiate transmit, and TTY connect are all set to 0 with TTY busy being set to a 1. Assembly clear is also at a logic "1" in state 22. This initializes some of the variables. It then proceeds from state 22 to state 23. If an assembly start is received from the TTY, the device returns to state 22 and recirculates through state 22 and 23 until the character assembler remains idle for a predetermined count of T01. If this time is attained, the device will become initialized and proceed to state 24. In state 24, more variables are set to logic "0" as well as setting the DB register equal to the character N. This DB register is found in character distributor 502. Assembly clear is also set to 1 to clear the input register of the character assembler 504. As soon as the distributor empty line becomes logic "1," thereby signifying a clearing of the distributor buffer, the letter N is transferred from the DB register to the DDATA register. The device then proceeds to state 25 where the DB register is loaded with a R. When the N from the previous state has been transmitted to the TTY the distributor empty line will again raise to a logic "1" and the device will proceed to state 1. Upon proceeding to state 1 the R in the DB register is transferred to the DDATA register in distributor 502 and is subsequently transmitted to the TTY. The process through states 24 and 25 supplies a NR to the TTY which provides an indication to the TTY of a negative response, which may occur for various reasons. When the device reaches state 1, the TMARK indicator is set to NULL. TMARK is a multiple state gate operating in much the same manner as the RMARK gate of the control logic 500. However, it is contained in control logic 508. The TMARK has two different states of NULL and DC3. The initiate transmit, TTY connect, TTY busy, and timer are set to logic "0" while tape enable and key enable are set to logic "1." The device then idles in state 1 until a message is ready for transmission or messages are received from the SCU. The setting of TTYBY to a 0 indicates that the TTY will accept a message. If a call is received, as indicated by an ADDRY or address ready and no assembly start ($\overline{\text{ASYST}}$) has occurred, the device will proceed to state 2. In state 2 it awaits the first character from the SCU data buffer after the data buffer is completely full. While it is idling, the timer is incremented and if it takes too long to receive the first character, the device proceeds to state 24 where a NR is loaded and sent back to the TTY before returning to state 1. The time at which this occurs is T02. As soon as the shift complete line becomes a logic "1" thereby indicating the shifting of a single character from the SCU data buffer into the DB register, the device will proceed to state 3. In state 3 the device awaits the emptying of the DDATA register in the character distributor 502 so that the contents of the DB register can be transferred thereto. When this is accomplished, the DEMP line rises to a logic "1," and the contents of the DB register are transferred to the DDATA register. The device then returns to state 2 so that it can receive another character from the SCU data buffer. This continues until an end of transmission character is received by the combination of the DB and S registers. The device then proceeds to state 4. As previously explained, the DB and S registers both receive the input RDDT; thus, at all times they contain the same words as received from the SCU data buffer. The decode logic 522 sends this EOT decode information both to control logic 500 and control logic 508. This is the only output from 522 which is sent to both control logic portions.

The device waits in state 4 until a disconnect is received by the SCU, thereby lowering station connect to a logic "0." If a disconnect is not received in the time period T02 after receiving the end of transmission signal the device will still leave state 4. In either case it will return to state 1.

As indicated previously, each transmission terminates in a disconnect signal after the EOT; and if the receiving party wishes to return a reply, it must reconnect to the previously "connected" party and thereafter send its own disconnect.

Upon returning to state 1, the device remains there until a further call is received or possibly an indication from the TTY that it wishes to send a message. This will be accomplished by the TTY sending a character to the character assembler thereby raising the assembly start to a logic "1." If this occurs, the device will proceed to state 5. The device awaits in state 5 until the buffer register in character assembler 504 is filled. At this time the assembly start line will be changed to a logic "0" and the tape enable and key enable will be set to a logic "1." If time T01 or an error indication occurs before the buffer in 504 is filled, the device will return to state 22 and reinitialize. However, assuming that the assembly full indication is obtained before time period T01 and without any errors, the device will proceed to state 6. While in state 6 the character in the ADATA register is transferred to the AB register and the character is decoded by the decode logic 520. If the character decoded is a NAK the device will return to state 1 and continue idling.

If the AB register has any character other than DC3 and NAK, the device will return to state 5. As will be noted, if the AB register does not contain a NAK, the TTY busy is raised to a logic "1." This possible path is utilized when the TTY operator does not proceed properly and inserts an address into the SCU data buffer. Assuming, however, that the AB register contains DC3, the device then proceeds to state 7. As indicated previously, DC3 indicates that the commencement of a message either data or control is to take place. In state 7, BEL is loaded into the DB register and the timer is set to 0. The BEL in the DB register is decoded by the decode logic 520. A bell is rung at the teletypewriter to indicate acknowledgment to the teletypewriter operator of receipt of the first character. If the TMARK logic contains either a DC3 or ESC indication, the device will proceed to state 15. The DC3 or ESC indication, of course, indicates that the end of the address has occurred while an indication of ESC indicates that the transmitting tape has become stuck on the character ESC and that is what is being used to continuously fill the ADATA register in character assembler 504. This ESC would have been set in state 16 before returning to state 7.

In any event, the appearance of either the DC3, indicating the end of the address or the ESC indicating a stuck tape, will allow the device to proceed to state 15. In state 15 the TTY is reenabled and a new character from the TTY is awaited. As long as the time T01 has not occurred and the assembly register is not full, the device will idle. However, if the time period T01 occurs before the assembly register is full the device will return to state 22 and reinitialize. Assuming, however, that the device fills the assembly register without an error, the device will proceed to state 16. As will be noted the TMARK logic is now set to null. Upon entering state 15 the fact that TMARK was ESC caused the teletypewriter busy signal to be set to a logic "0."

Since in state 16 the TMARK register is set to whatever is in the AB register after having been set to a null, the device will then detect upon going out of state 18 that there has been a plurality of ESC's. Since there should only be one ESC per message, this indicates a stuck tape and the device is reinitalized.

However, assuming that the device satisfactorily proceeds to state 16, the new character in the ADATA register is transferred to the AB register, and the timer is set to logic "0." This character in the AB register is decoded by decode logic 520. It may first be assumed that the character loaded is not a STX, SOH, ESC, or EOT. The device will then proceed directly to state 17 where the SCU interface is requested to load the contents of the AB register into the data buffer of the SCU. When this occurs the shift complete line will return to a logic "1"; and if there is no message mark from the SCU indicating that its buffer is full, the device will return to state 15 and await a new character from the TTY. If the message mark appears along with the shift complete, the device will realize there is an error because the address should never take the full contents of the data buffer. Eventually, an EOT, ESC, STX, or SOH will appear and the device will proceed to state 18. In state 18 the assembly buffer line is held to a logic "1" as it was in state 17 so that the SCU data buffer will be realigned. When message mark is received along with TMARK being an ESC and TTYBY being in a logic "0," the device will reinitialize as previously indicated. If a message mark is received and TMARK now equals EOT, the device will proceed to state 14 where it will await acknowledgment of last information transmission. If too much time is taken in state 14 before acknowledgment is received, the device will send NR for negative response to the TTY. If it is received the device will return to state 1 and await further developments.

When the SCU data buffer is realigned and the message mark is received, the TMARK may contain either a TXT or ESC with TTYBY being a logic "1." In this case the device will proceed to state 19 where it awaits the time when the SCU interface sends the control message with the recently supplied address and receives a response. If the response is RCLCK indicating a positive acknowledgement, the device proceeds to state 7 where the bell is rung to indicate acknowledgment to the operator. If there is a stuck tape and this is the second time through, then the TMARK can still be an ESC. However, at all other times the TMARK would be a TXT and the device would proceed to state 8.

Before proceeding to state 8 several other possibilities should be discussed. As will be noted, in state 19 TTY connect is set to a logic "1" to indicate to the TTY that it is connected to the TIU. This is continuously reset until the device proceeds out of state 19. If the device takes too long (longer than time T02) or a busy reply is received, the device proceeds to state 24 and submits a further NR to the TTY. If at this time the address ready line is raised to a logic "1" indicating that the SCU has received a call from the main loop, the TTY connect is set to a logic "0." The call from the line is rejected by setting TCON to a logic "0" and the device returns to state 19 to await the response or the excess time signal.

Returning now to state 8 after receipt of a proper reply and notification to the TTY of that positive acknowledgment, the device will wait in state 8 for further TTY characters. During this time tape enable and key enable are set to a logic "1" and the timer is incremented. If the TTY takes too long to fill the ADATA register in character assembler 504, the time T01 will occur and the letters NR will be returned to the teletypewriter and the device will return to the idle state.

However, assuming that a character is received, and the assembly full line is raised to a logic "1," the device will proceed to state 9 where the information from the ADATA register is loaded into the AB register and the timer is reset to a logic "0." The character is decoded and if it is an EOT, CR, or LF, the appropriate lines or logic gates are altered accordingly.

In state 10 the assembly buffer to buffer line is maintained at a logic "1" while the character in the AB register is sent to the SCU data buffer (see state 9). If the TMARK register is at an EOT, the device will remain in state 10 until the rest of the SCU data buffer is filled with EOT's. At this time message mark will be raised and the device will bypass the state 11 request for one more character and proceed to state 12. Returning to state 10, if a message mark is not received and the shift is complete and the TMARK is not an EOT, the device will return to state 8 to receive and decode further characters. If the message mark is received and shift complete and the TMARK does not equal an EOT and if there is no CR and LF in the message, the tape must be stuck since both of these characters must be transmitted in each message portion. Thus, the device will proceed to state 22 to reinitialize. However, if both the CR and LF as well as shift complete and message mark are received with the transmit mark not equaling EOT, the device will proceed to state 11. In state 11 the tape enable and key enable are set to a logic "0" after one more character is received in the ADATA register. The receipt of this character will change assembly full to a logic "1." This additional character is not transmitted as part of the present message portion but is rather the first character in the next message portion or section. If it takes too long to receive the next character the device will proceed to state 22 and reinitialize. However, assuming that the assembly full line is received before time TO1, the device will proceed to state 12.

State 12 is the state which the message went to if an EOT was received and bypassed state 11 in going directly from state 10 to state 12. In state 12 the response is awaited from the previously sent data section. If this takes longer than time TO2, the device will proceed to state 24 where a NR or negative response is returned to the teletypewriter. However, assuming that the teletypewriter is still connected and a positive response is received, the device will proceed to state 13. As will be noted in state 12 CR and LF are returned to "0" so that these two lines may be checked in the next data message. In state 13 the SCU interface is requested to send the contents of the SCU data buffer to the "connected" station. The receive clock line remains high until the message is transmitted at which time it is reduced to a logic "0." If the TMARK logic gate is an EOT condition, the device will proceed to state 14 where it awaits acknowledgment of the last information transmission. This information may be either control or data. When this is received, as indicated by receive clock, the device will return to state 1. However, if the acknowledgment is not received by time T02, the device will return to state 24 where a further NR is returned to the teletypewriter.

Returning to state 13, it may be assumed that the TMARK logic gate is not in an EOT condition and that the receive clock line is a logic "0" indicating that the message is transmitted. Under these conditions the device will return to state 7 so that the bell will ring and further teletypewriter characters will be supplied to the character assembler, character by character and transmitted to the SCU buffer until it is full and sent or until the end of the message.

To summarize the operation of the TTY interface portion of the TIU, the device will intialize by awaiting a predetermined amount of time during which no characters are sent by the TTY and will then send a NR to the teletypewriter indicating a negative response. In this case it merely means that everything is ready for operation. In other instances, the NR will indicate that there is some type of error or problem in transmission.

The device will then stay in this idle state until a message is received from the local loop or until the teletypewriter is ready to send a message. If the teletypewriter is ready to send a message as indicated by the DC3 character, the address is assembled and upon the end of the address as indicated by the TXT symbol, the SCU data buffer will be realigned and then the call message is transmitted and the device will await a response. If the response is negative a NR is returned to the teletypewriter. If, however, it is a positive response the device will ring a bell on the teletypewriter and proceed to receive the text portion of the message for future transmission. Since the address is stored in an appropriate register in the SCU, the address need not be re-sent to the SCU. Rather, the rest of the message is taken one character at a time and placed in the SCU data buffer while the TTY interface is checking each character to determine end of transmission. If the message is longer than one SCU data buffer, the device will accept the first character of the next portion of the message before checking for a response from the previously transmitted data section. Once this previous data section response is received, the new contents of the SCU data buffer are transmitted and further characters are received.

This continues until the EOT is received and at this time a disconnect is sent to the "connected" party and the device returns to state 1.

If the device receives a call from a remote party the device transmits characters from the SCU data buffer one character at a time until the SCU data buffer is completely empty. Once it is emptied the device awaits a further filling of the SCU data buffer and continues emptying this buffer until an EOT is received. At this time the device awaits a disconnect or an excessive time before returning to state 1 for idling.

CHARACTER DISTRIBUTOR AND DB REGISTER

FIGS. 24

Figure 24A:
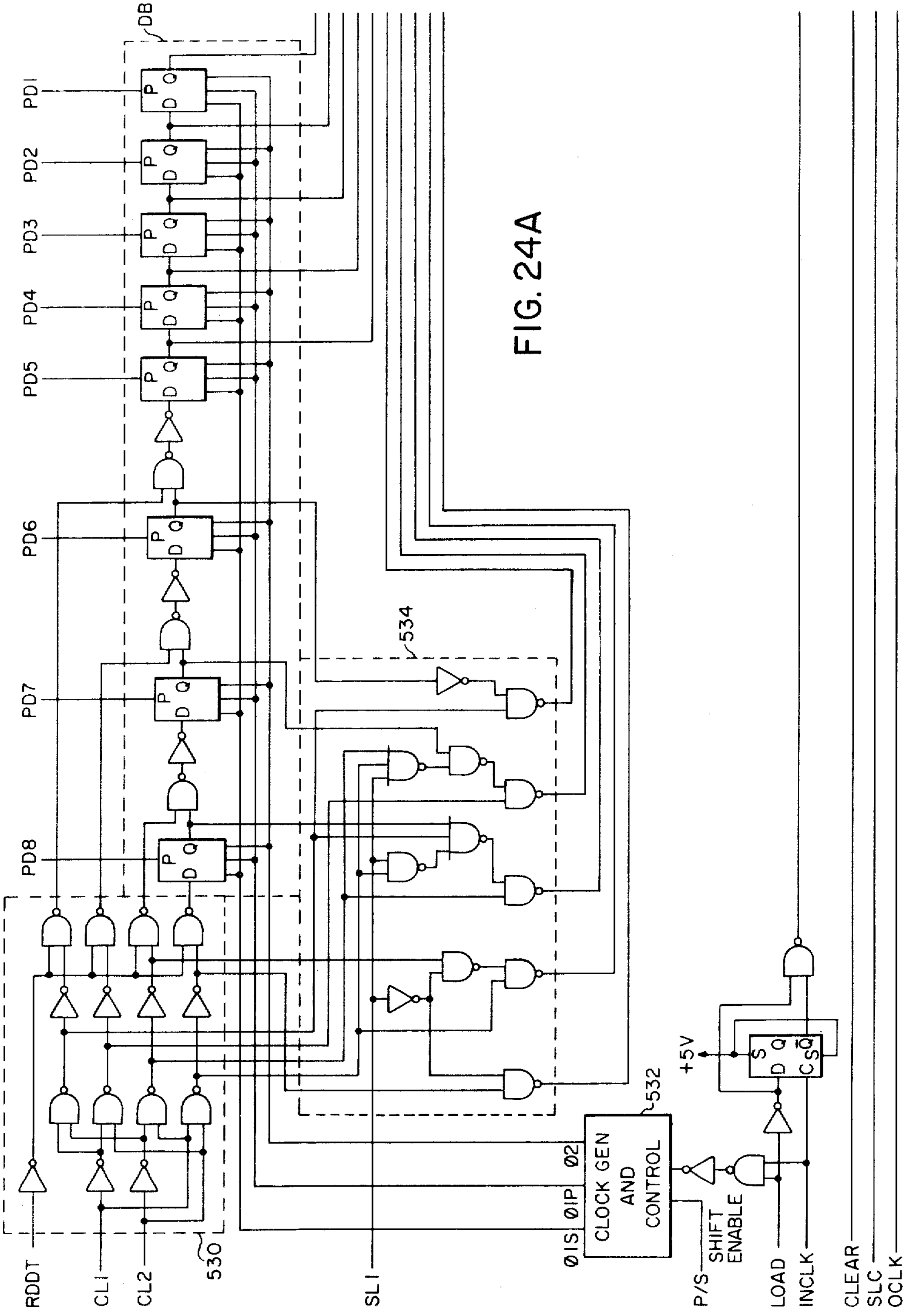
FIGS. 24A and B provide a detailed block diagram of the character distributor 502 of FIG. 21.
Figure 24B:
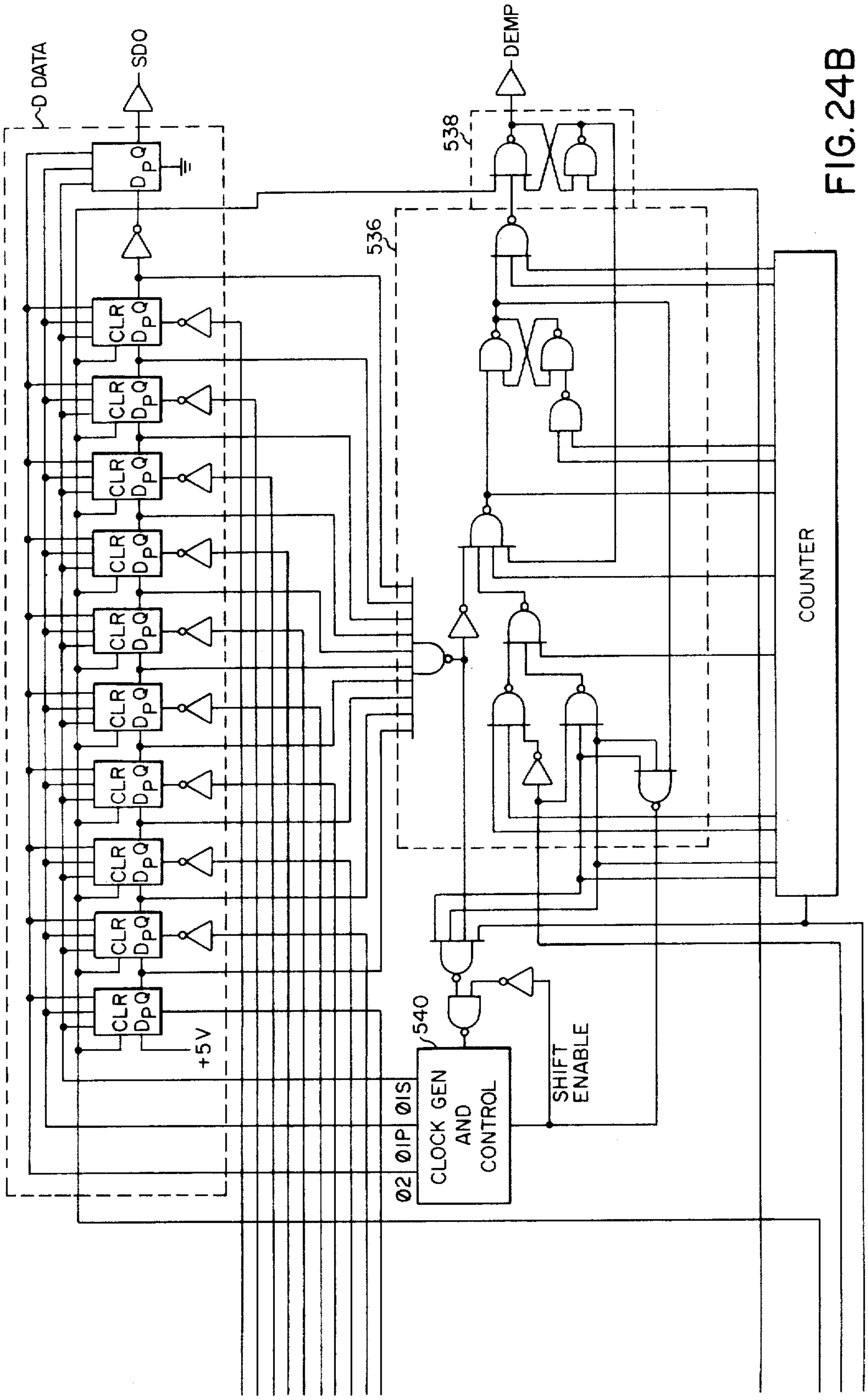

FIGS. 24A and B show a detailed schematic diagram of the character distributor 502 of FIG. 21. Since there are many ways in which the functions of the character distributor may be implemented and since the flow diagrams of FIGS. 22 and 23 are quite complete, only some of the details will be supplied for this figure. As will be noted, the two registers are labeled as DB and DDATA as indicated in FIG. 21. The information may be supplied on the serial input line RDDT or in parallel as from the control logic 508 on the parallel input lines PD1–PD8. Since there is a possibility that the word lengths may be desirably changed as referenced above, there are inputs labeled CL1 and CL2 to a block 530 for changing the word lengths. Two inputs of P/S and LOAD are utilized to change the output of a clock generator 532 to allow serial or parallel loading of registers DB and DDATA. The flip-flops in these registers are called static-to-phase flip-flops by some authorities and are utilized in various serial-in/parallel-in, serial-out or parallel-in, serial-out/parallel-out registers supplied by various manufacturers. Part of the output of DB register is supplied through other gating circuitry 534 which in cooperation with the logic of 530 controls the number of stop bits and the word length. The rest of the flip-flops of the DB register and the output of logic circuitry 534 is supplied as inputs in parallel to the DDATA register. A pair of logic gates 536 and 538 operate together to provide an indication when the DDATA register is empty at an output DEMP. The data is supplied to the teletypewriter unit in series at the output labeled SDO. As will be noted, the DDATA register also has a clock generator and control labeled 540. This provides the same general function as 532. However, in this case it determines whether the output will be serial or parallel. However, since only a serial output is required, the parallel output lines are utilized only in the determination of when the DDATA register is empty.

Returning to FIG. 24A, serial loading is accomplished by raising only the load input to a logic "1" while parallel loading is accomplished by raising both the P/S input and the LOAD input. The CL1 and CL2 inputs are used to produce the stop bits since the stop bits are of a different length than regular data bits in the described embodiment.

As will be realized, many other types of serial/parallel in, serial output registers could be utilized for the character distributor 502 and the embodiment shown is merely one of those possible embodiments.

CHARACTER ASSEMBLER AND AB REGISTER

FIGS. 25

Figure 25A:
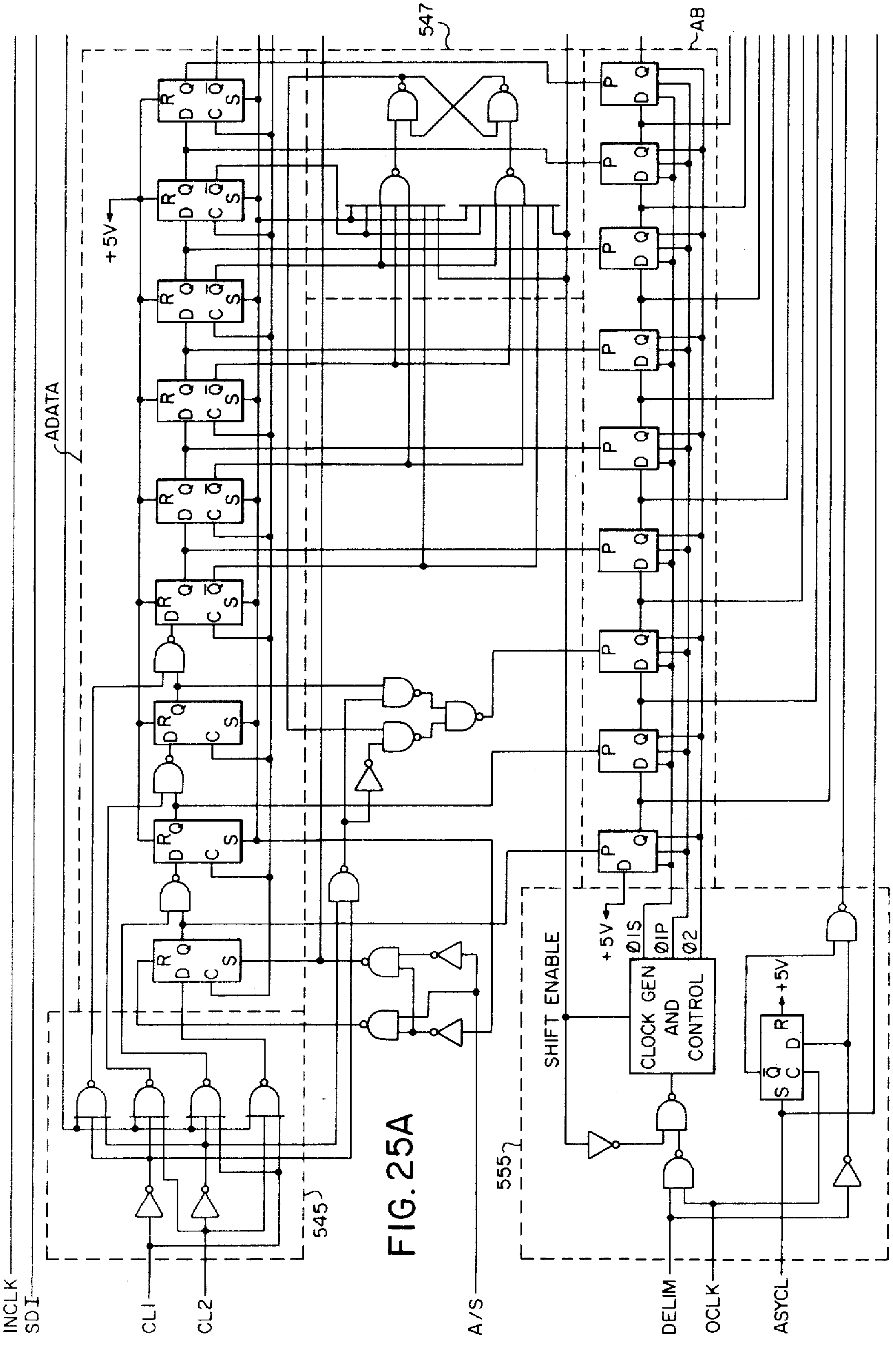
FIGS. 25A and B illustrate a detailed block diagram of the character assembler 504 of FIG. 21.
Figure 25B:
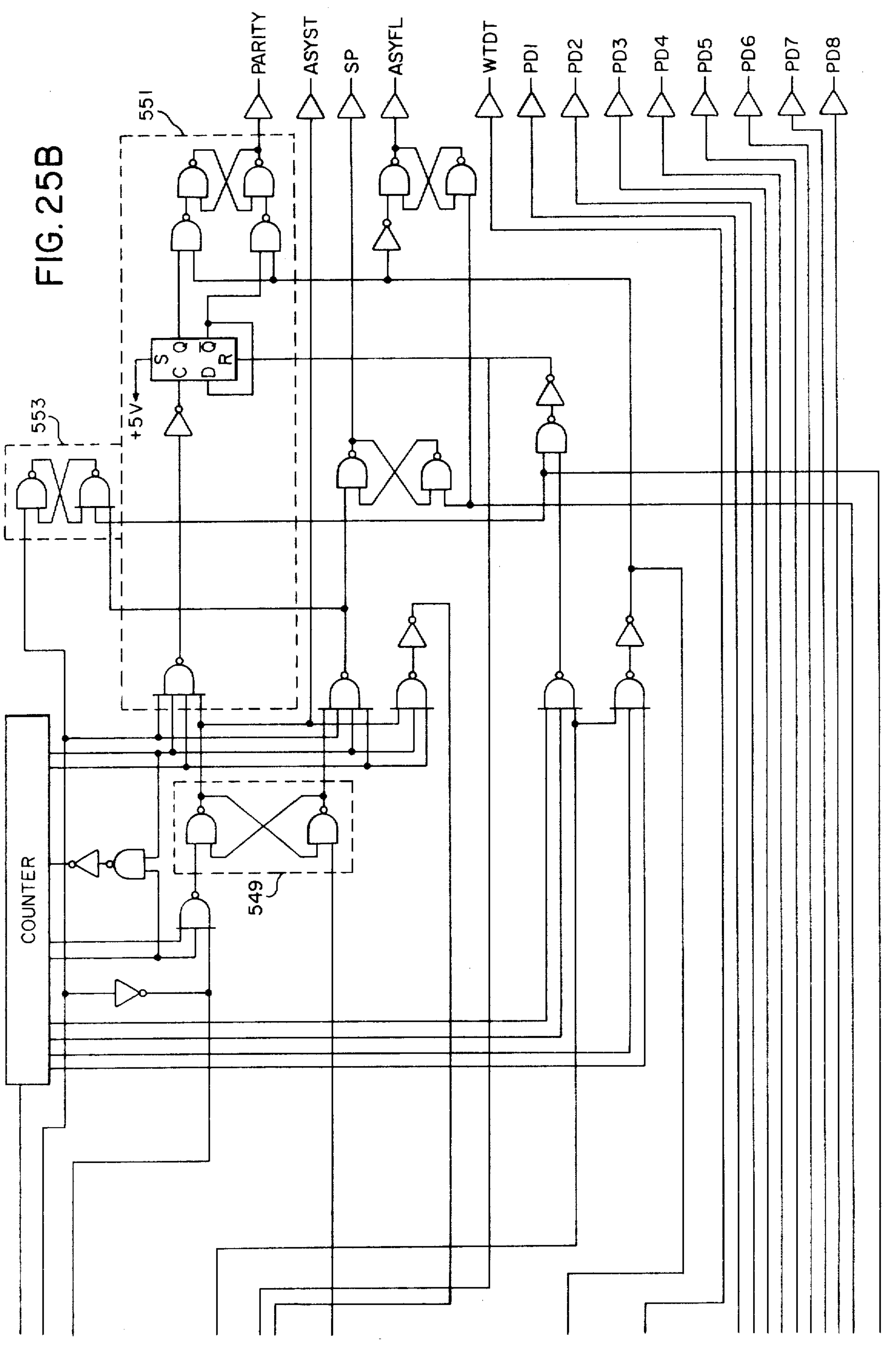

FIGS. 25A and 25B illustrate a specific embodiment of a character assembler. Again, the registers are labeled much as found in FIG. 21 for assembler 504. There is A/S input which stands for asynchronous/synchronous since the chip shown is designed for multiple applications. However, this is not needed for TTY utilization and would be strapped to a logic "0" for use as the character assembler 504. The SDI (serial data in) input would be that from the voltage to impedance matching network 518 and would supply serial data to the ADATA register which would have its word length monitored by the inputs CL1 and CL2 to a block 545. A block 547 is utilized in special applications when it is desired to send figures via the teletypewriter. In this instance a special character is generated by the teletypewriter indicating "figures" which activates a flip-flop within 547 to notify the receiving apparatus that until further notice all characters transmitted are figures or numerals rather than letters. The bits from the ADATA register are transferred in parallel to the AB register whose output is supplied to the WTDT line and to the parallel outputs PD1–PD8. The parallel outputs are, of course, supplied to address encoder 506 and decode logic 520 as explained in connection with FIG. 21. A block 549 is used to detect the amplitude of the incoming bit if the device is remotely connected and the incoming signals are not always of the necessary amplitude. However, since it may be assumed that the teletypewriter is closely connected, this block is not of interest at the present time. A further block 551 is utilized for checking the parity of the incoming words while a block 553 is utilized as a logic gate to prevent application of incoming signals if the amplitude detection gate 549 indicates that the amplitude of the incoming signals is too low. A further block 555 is used to control whether the output of the AB register will be serial or parallel and is used in conjunction with the output clock signal to time the serial output.

LOOP MESSAGE FORMAT

FIG. 26

The contents of FIG. 26 have been referred to from time to time and the following is merely a slight expansion on previous material.

The basic format of the words used in the intermediate and local exchange loops is shown in the first portion of FIG. 26. The first, S or START, bit of each message is a logic "1". The next 7 bits are operator bits arranged according to the Receive Module Mnemonic List of FIG. 13. The next section, which is of variable length depending upon the type of message, is the operand section. The fourth section is the parity check section of 24 bits whose content is determined by the arrangement and type of bits in the operator and operand section. The final section is a response portion of 8 bits which the called party fills so that each calling party or node has an indication of whether or not the next buffer node in the communication link has received the SELECT call and/or CONNECT mode message satisfactorily.

The next section of FIG. 26 illustrates the SELECT mode messages wherein the first message is a poll message comprising a single logic "1" start bit followed by a plurality of logic "0's." In other words, the operator and operand sections of the poll SELECT message comprises all zeros.

The SELECT call message has an operator field which defines whether the following CONNECT message will be a control message or a data message. The operand section contains the called party's address and the remainder of the message is standard.

In the CONNECT mode, the operator has a different format for data and control messages. This information is necessary to indicate to the receiving buffer or called party the necessary number of bits to be passed before receiving the end of the message and/or when to start looking for a new message. As may be observed, the CONNECT mode messages have both the address and either a 1,024 data bit portion or a 40-bit control portion.

In all events, the start bit of every message is a logic "1." In all cases the response section contains a plurality of logic "0's" as transmitted from a calling party or intermediate node and is changed by the called party or receiving intermediate node in the communication path to indicate positive acknowledgment of a message. This response field can be filled with a BUSY for a SELECT call message or with a NAK if the parity does not check in a CONNECT message.

The final portion of FIG. 26 illustrates various types of CONNECT messages as to data or control parameter portions.

A data message contains 1,016 bits of data and uses the last 8 bits to indicate that this is the end of a message portion.

The control CONNECT mode message contains suboperator and suboperand portions with the control field of the suboperator portion utilizing two bits and the branch field portion comprising 6 bits. The branch field portion is only used as a subportion of the branch control message. The calling party's address is supplied in the suboperand field for disconnect and branch call messages so that the called "connected" party will first know the party to whom it is connected, and then can receive a disconnect message and not interpret the disconnect message as a third party call. Although the description has not included the option of having more than one party connected to a SCU or TIU, the CONNECT mode message contains an 8-bit section in the branch control message which may be used for defining a particular extension number of a station connected to a SCU.

If a very small amount of data is to be transmitted, the calling party can use a control message for transmitting such data of a maximum of 32 bits. Other branch messages are a REPEAT request, a RESTART request, and a further request to HOLD further transmissions until requested to restart.

FLOW DIAGRAMS FOR TRUNK TERMINAL UNITS

FIGS. 27–30

In order to communicate between remote intermediate exchange loops, TTU's or trunk terminal units of FIG. 10 are utilized in the manner shown in FIG. 1. A message is transmitted to the TTU from the intermediate exchange loop and is stored in one of a plurality of buffers in the TTU. Such a TTU could be TTU 128 of FIG. 1. As soon as there is space available in a corresponding buffer in TTU 132, the message is transferred to TTU 132 for further transmission to the intermediate exchange loop 134.

One embodiment of this invention utilized TTU's which were substantially identical and which would transfer a status word after each message from one intermediate exchange loop to the other indicating the status of all of the buffer registers available for receiving messages from the remote TTU. Thus, continual updating is provided. When the TTU's are idle, they still periodically send TTU buffer status messages to help maintain synchronization.

Figure 30:
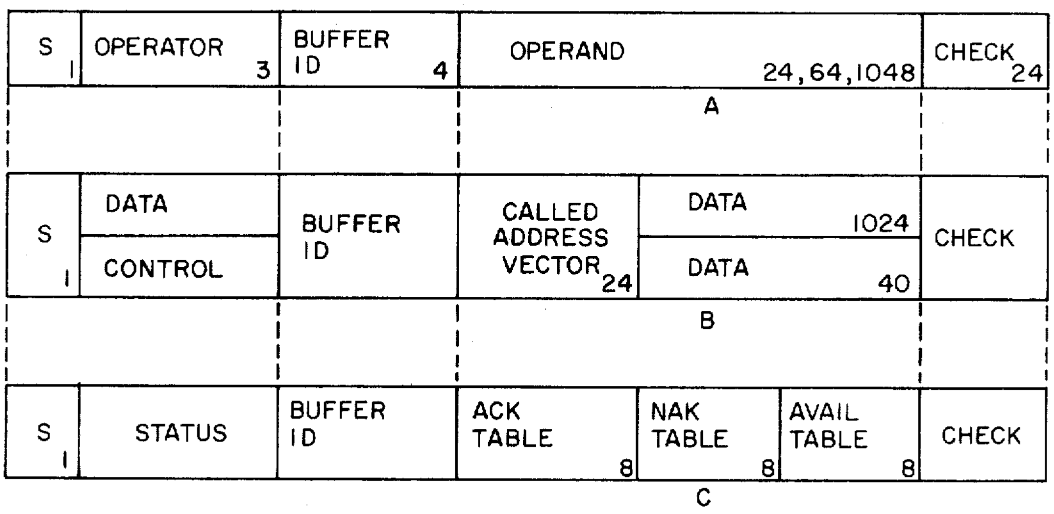
FIG. 30 illustrates the format of messages as transmitted in one embodiment of the invention between TTU's.

Reference may first be had to FIG. 30A which shows the layout of the messages which are transmitted over line 130 between TTU's. The basic format is shown first in portion A of FIG. 30 where the transmitted message includes a logic "1" start bit, a three-bit operator section for indicating the type of message such as data, control, or status, a fourbit section for indicating a specific one of the available buffers, an operand section which will vary depending upon the type of message and a twenty-four bit parity check section. One embodiment of the invention utilized eight buffer units and four bits can easily provide an indication of an individual one of eight buffer units. FIG. 30B indicates the number of bits in the operand portion for data and control messages. These messages are basically identical to those transmitted on the IXL loop except for the addition of the buffer ID.

FIG. 30C indicates the format of the status word which, when used with eight data buffers, enables the use of a unique bit position in the acknowledge and not acknowledge and availability tables to indicate the availability and the type of acknowledgement for each individual buffer. In other words, the status word can simultaneously provide information as to each of the buffers. An example of such use would be to have a logic "1" in the first position of the acknowledge table for the first buffer and correspondingly a logic "0" in the first position of the NAK table. For the second position and second buffer it may be that there is a logic zero in the acknowledge table and a logic "1" in the not acknowledge table. This could continue for each of the remaining six bits and their corresponding buffers. The available table would be used to indicate any of the buffers which have been emptied of their information onto the intermediate exchange loop and upon which a positive acknowledgment has been received from the appropriate processor terminal unit, TTU or MGU, on the intermediate exchange loop.

As previously indicated in conjunction with FIG. 13 and the Receive Module Mnemonic List and again in discussing FIG. 26, the second through eighth bits of the message are utilized in loop messages for defining the operator. The trunk terminal unit does not use the SELECT mode messages, as such, between TTU's. It does, however, utilize the information in the incoming message to encode new identification sections in the bits 2-8 of the message for providing the operator and buffer ID information. When the message has been received by the called TTU node, bits 2–8 will be reformatted for use on the remote exchange loops.

The format of the messages of the TTU in FIG. 30 differs from those of FIG. 26 in a second respect. This is the lack of a response section which is taken care of by the separate status message.

Referring to FIG. 10 it will be noted that the first portion of FIG. 10, labeled LRT, is substantially identical to the similarly labeled portions of FIG. 8. The flow diagram operation is also substantially identical. However, since this portion (as a unit) was not separately presented in connection with the flow diagrams relative to the MGU of FIG. 8 or the ELC of FIG. 9, this information will be presented in FIGS. 27 as applied to the TTU.

Figure 27A:
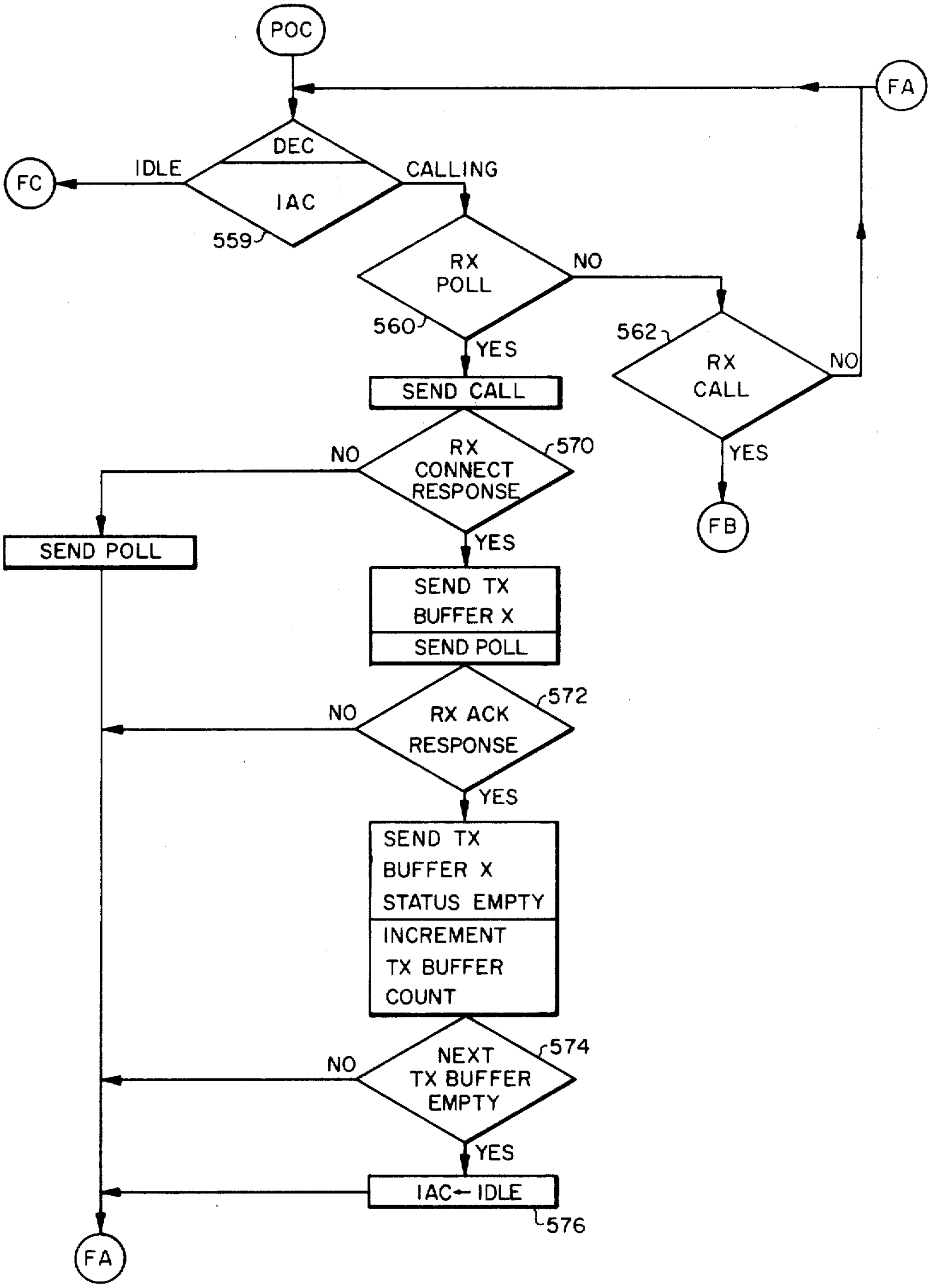
FIGS. 27A, 27B, 28, and 29 illustrate flow diagrams for various sections of control logic 312 in the TCL section of the TTU of FIG. 10.
Figure 27B:
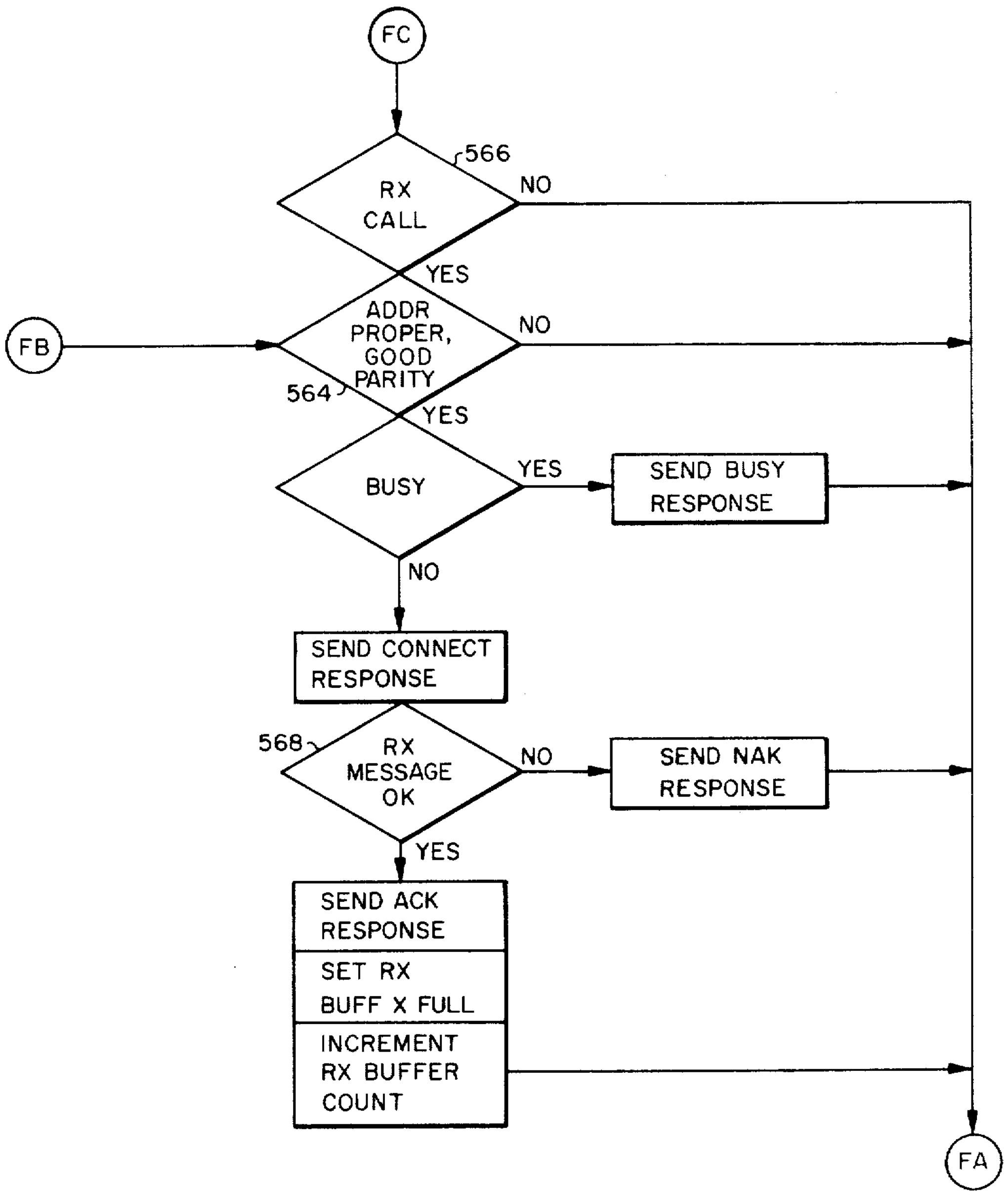
Figure 28:
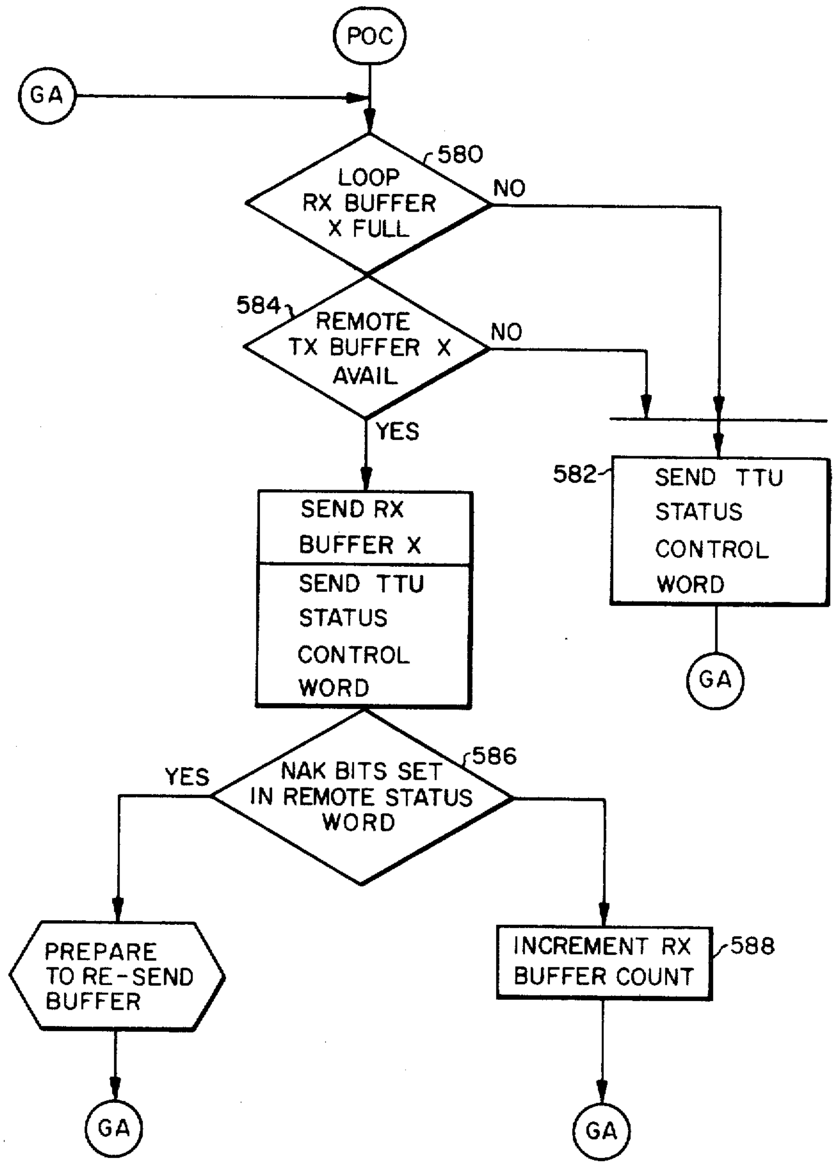
Figure 29:
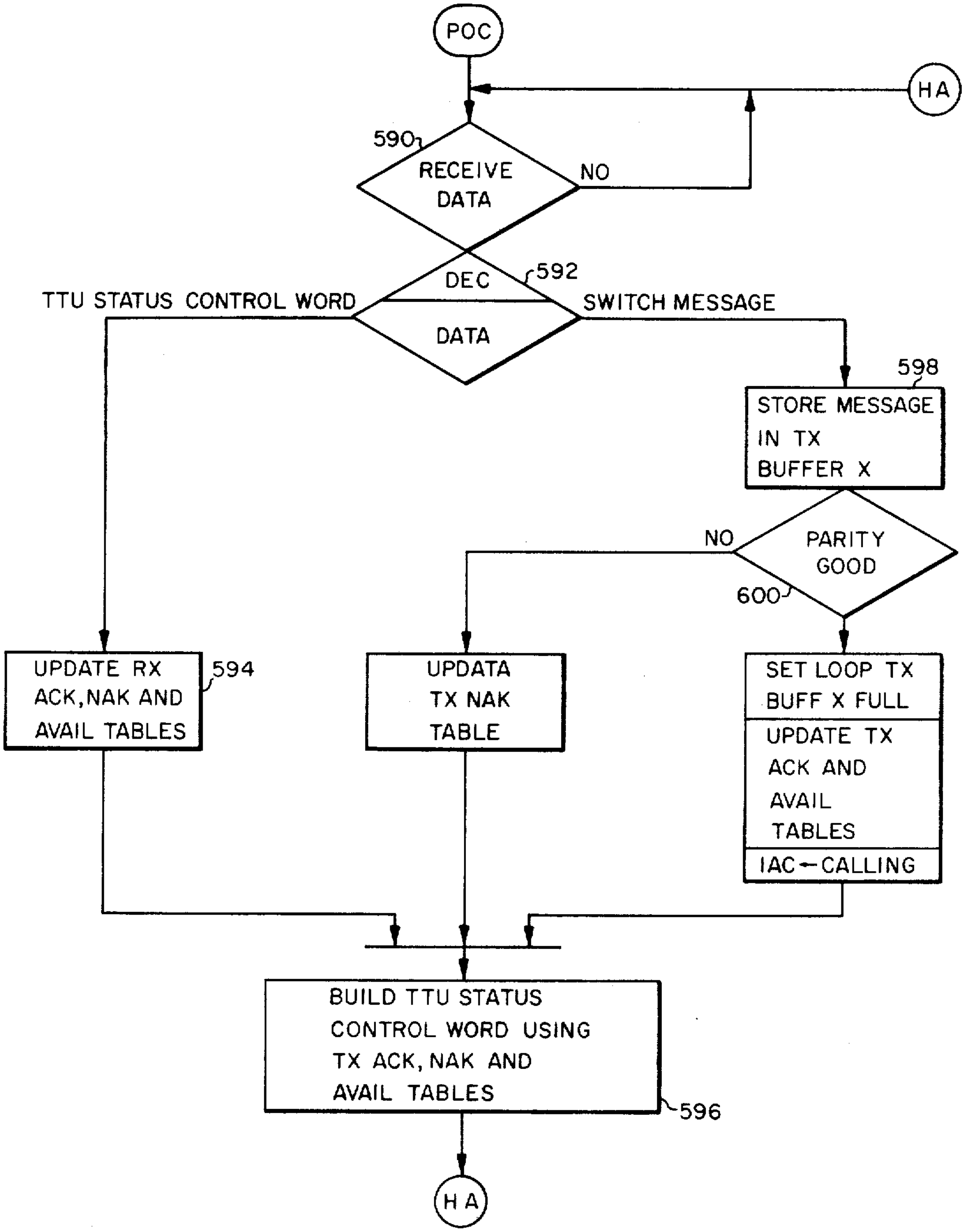

FIGS. 27 are the flow diagrams of the IXL interface portion of the TTU while FIG. 28 relates to the transmit portion of the control logic 312 of FIG. 10 and FIG. 29 relates to the receive portion of the control logic 312 of FIG. 10.

After receiving the POWER ON CLEAR, the device proceeds to a decision block labeled DEC-IAC. This decision block is actually a flip-flop which is set by control logic in the LRT and the control logic 312 of FIG. 10. The initials IAC in one embodiment refer to a label for the flip-flop which was instruction address counter. If one or more of the receive data buffers of FIG. 10 is full of information received from a remote TTU, the IAC flip-flop will be set to a calling condition and the IXL interface will proceed to the receive poll decision block 560. If a poll has not been received, the device proceeds to a receive call decision block 562 to see if a call has been received from the intermediate exchange loop. If no call is received, the device returns to the decision IAC, decision block 559. If a call has been received, the device proceeds to a decision block 564 which examines the call to see if the address is proper and it is of good parity. Decision block 564 is also reached when the decision block 559 indicates that the device is in an idle state. When the device is in an idle state and the apparatus reaches the 559 decision block in the flow path, the device proceeds to a receive call decision block 566. If there is no call, the device returns to decision block 559. However, if there is a call, it proceeds to decision block 564 to determine whether or not the address is proper and there is good parity. Again, if neither one of these are obtained, the device returns to decision block 559. Assuming, however, that the address is proper and there is good parity, the device checks to determine whether or not all the registers are full. If the registers appropriate for receiving information from the IXL loop are full, a busy response will be sent and the device will return to decision block 559. However, if one or more registers is available in the sequential order, the device will send a connect response and await the receipt of a message in decision block 568. If the message is not received okay, then a negative response will be supplied and the device will return to decision block 559. However, if the message is received satisfactorily, then an acknowledge response will be supplied, the receive buffer to which the message is sent will be provided with a full indication, and the receive buffer count will be incremented before returning to decision block 559.

Returning to the situation where the flip-flop constituting decision block 559 is set to a calling condition and a poll is received as determined by decision block 560, a call is sent out on the IXL loop. If a connect response is not received within a predetermined time as determined in a decision block 570, a poll will be sent to allow usage of the loop by the next device and the TTU - IXL interface portion will return to decision block 559. If a connect response is received, the information in the next appropriate buffer will be sent on the IXL loop and then a poll will be sent. The device then waits in decision block 572. If a positive or acknowledge response is not received within a predetermined time, the device returns to decision block 559. However, if a positive response is received, the status of the transmit buffer from which the message was just obtained is changed to empty and the transmit buffer count is incremented. The device then checks in decision block 574 to see if the next transmit buffer is empty. If it is not empty, the device returns to decision block 559 to await the next poll so that the next message can be sent to the IXL loop. If the next buffer is empty, the device resets the flip-flop 559 to an idle condition according to block 576 and then the device returns to decision block 559 to await the reception of further calls.

The above description relative to FIG. 27 merely discussed the procedure involved in the LRT portion of FIG. 10 for inserting messages into the receive data buffer portion of block 320 when messages are received from the IXL loop and for supplying messages to the IXL loop from the transmit portion of data buffer 320. The flow diagram of FIG. 28 illustrates the procedure for removing the messages just received from the IXL loop and supplying them to the remote TTU.

After POWER ON CLEAR, the device checks in decision block 580 to determine whether or not a specific receive buffer is full. This receive buffer may have any number from 1 to 8 in the embodiment shown. If the buffer is not full, the device proceeds to block 582 and sends a TTU status control work indicating the availability of all of the buffers available for receiving data from the remote TTU at that time. The device then returns to decision block 580. If at this time one of the receive buffers is full as a result of the receipt of a message from the IXL, the device will proceed to decision block 584. This decision block will check the receive availability tables as mentioned in conjunction with FIGS. 29 and 30 to determine if the corresponding buffer in the remote TTU is available to receive data from this TTU. If the remote buffer is not available, a status word will be sent indicating the status of the received buffers at that given time. If, however, the remote TTU buffer is available as indicated by the availability tables, the device will send the message contained in that specific buffer onto the outgoing line 316 of FIG. 10 and immediately thereafter send a new TTU status control word. The device will then enter decision block 586 where it will check the most recently received status word from the remote TTU to determine if any negative acknowledgment bits were set. If some negative acknowledgements have been set, the device will prepare to re-send the contents of the buffer which contained the information not satisfactorily received. The device will then return to decision block 580. It may be desirable in some embodiments of the invention to increment a negative acknowledgment counter for each one of the buffers so that after a predetermined number of transmission failures, the buffer will be declared empty and the originating party will have to re-send the message.

If, in decision block 586, it is determined that there are no negative acknowledgement bits set in the latest remote status word, the device will proceed to block 588 where the receive buffer count is incremented and the device can return to decision block 580 and inspect the following buffer from that previously inspected to determine whether or not it is full.

FIG. 29 indicates the flow diagram of the receive portion of control logic 312 where after determination of POWER ON CLEAR the device normally idles in decision block 590. As long as no message is received on line 318, the device stays in or circulates about the decision block 590. Once data is received, however, the device proceeds to decision block 592. A receive register is examined to determine whether or not the message received is a TTU status control word or a switch message. If it is a status control word, the receive acknowledge, not acknowledge, and availability tables are updated as indicated by block 594 before proceeding to block 596 where the device prepares a status control word utilizing a transmit acknowledge, negative acknowledgment, and availability tables for use by the transmit section of FIG. 28 in block 582 or the section immediately prior to decision block 586. The receive block then proceeds from block 596 back to the decision block 590. If the next message received is an exchange loop or switch message, the device proceeds from decision block 592 to a block 598 wherein the received message is stored in a transmit buffer X. The device proceeds to decision block 600 where the parity is checked and if the parity is not satisfactory, the transmit negative acknowledgment table is updated so that a new status word can be constructed for transmission by the transmit section. If the parity is satisfactory, the loop transmit buffer is set to a full indication. The transmit acknowledge and availability tables are then updated and the IAC flip-flop 559 of FIG. 27 is set to calling so that the LRT section of FIG. 10 may supply the message to the IXL loop. The device then proceeds to state 596 to prepare a new status control word for use by the transmit section before returning to receive data decision block 590.

In summary, the TTU's respond to a call from the IXL loop by transmitting a "connect" in response to a SELECT call and later receiving a data or control message which is stored in a data buffer in the TTU. The TTU has a plurality of such buffers which are checked in sequential order and transmitted to a remote TTU on a full duplex line so that messages may be continually and simultaneously transmitted and received. The message is transmitted as soon as a status word is received from the remote unit indicating that a buffer corresponding to the buffer in the present unit containing the last received message is available. Each of the messages supplied to the remote unit is followed by a status word which updates the transmitting TTU. After receipt of a positive acknowledgment by the remote TTU, the present TTU updates its status by indicating that the buffer is again available for more messages. When the present TTU receives messages from the remote TTU on the receive line, the received messages are placed in a transmit data buffer for later transmission on the IXL loop. The device then checks the IXL loop for a poll so that it can respond by sending a call, receive a "connect" from the called device and then transmit the message contained in the appropriate transmit buffer. After satisfactory acknowledgment, the status tables are updated to indicate that the appropriate transmit buffer is now available for more messages from the remote TTU.

The above description has been restricted to a single embodiment for the purpose of keeping the explanatory material as short and concise as possible. However, the invention is broader than the specifically described invention. As an example, the described invention utilized fill duplex lines between TTU's. The switch could certainly operate with half duplex lines, although it would take longer to transmit messages and obtain appropriate responses. As indicated in the description, the invention could also be modified to contain several switches in some type of party line for one or more SCU's.

PTU LOGIC SECTIONS

FIG. 31

Figure 31:
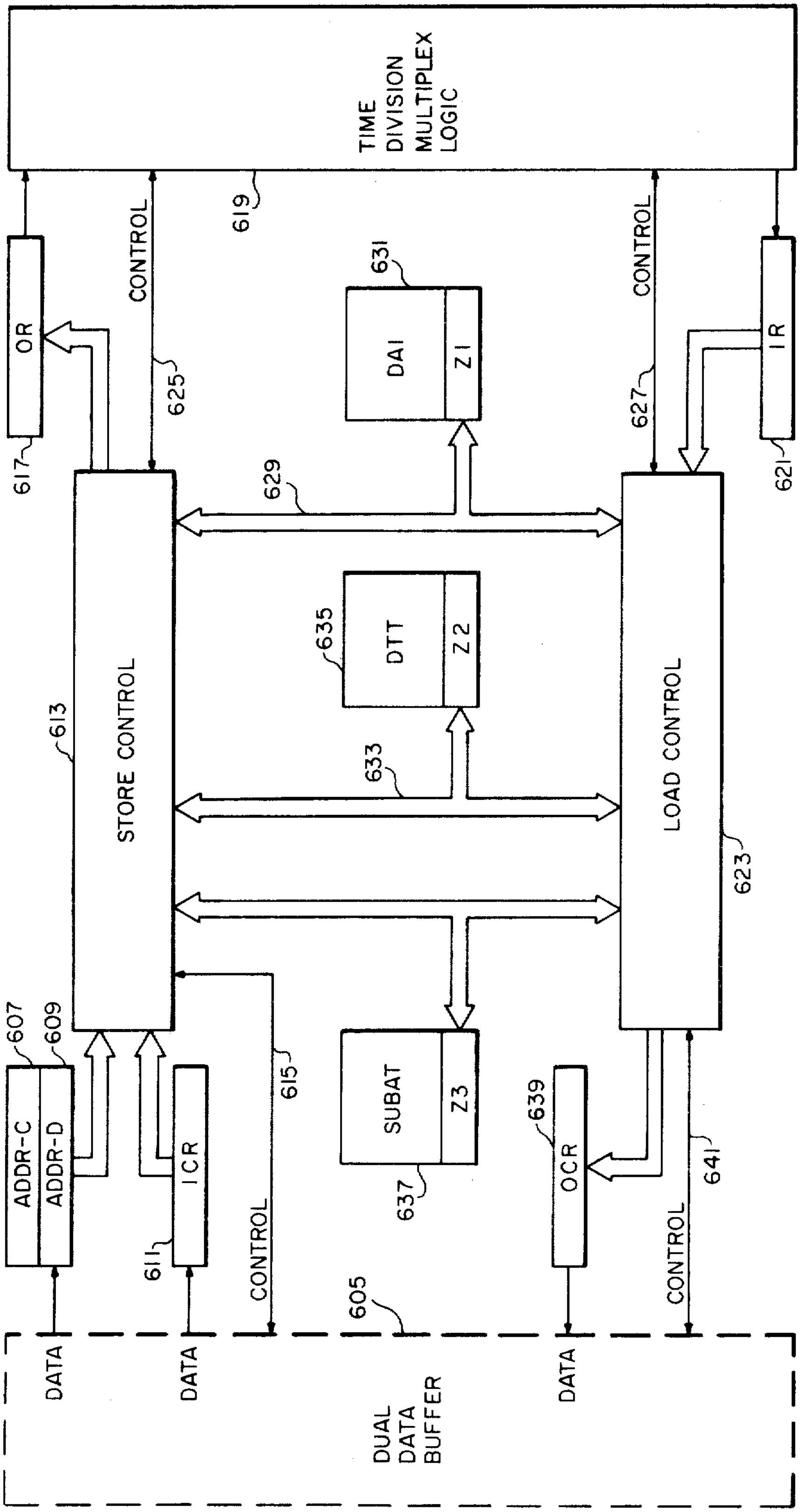
FIG. 31 is a detailed block diagram of the PCL and PIL portions of the PTU of FIG. 11.
Figure 32A:
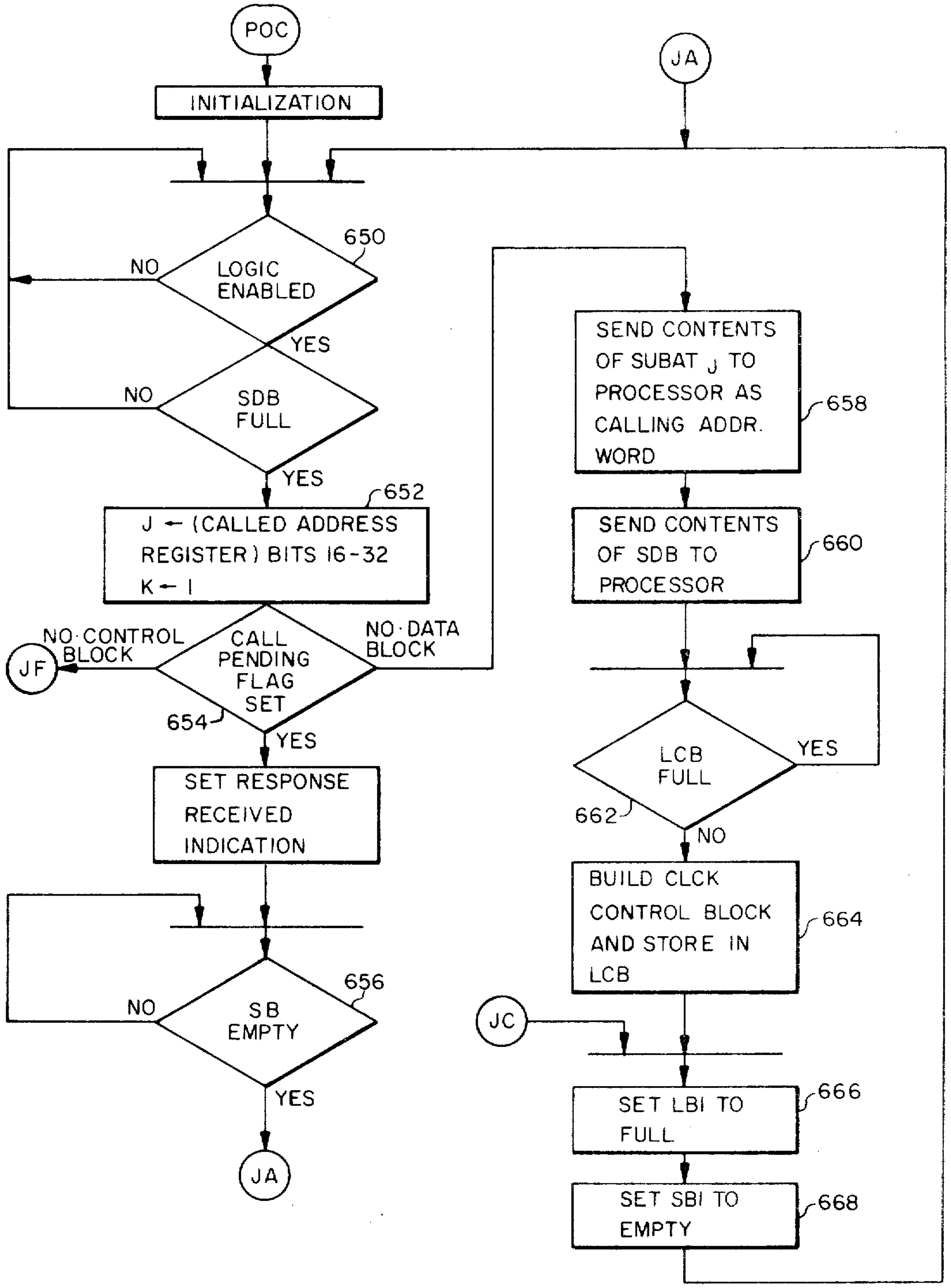
FIGS. 32A–32F illustrate the flow diagram operation of FIG. 31.
Figure 32B:
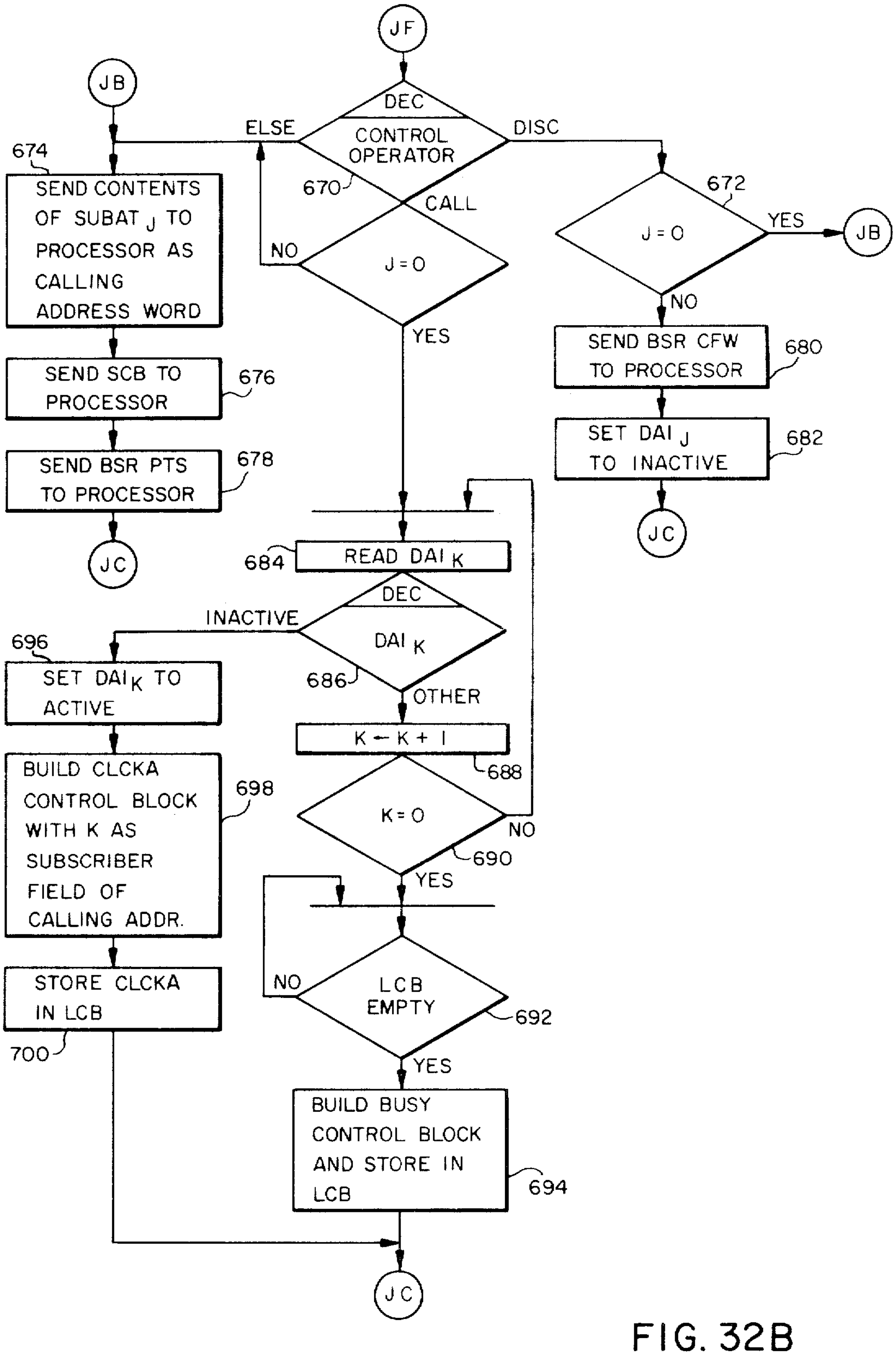
Figure 32C:
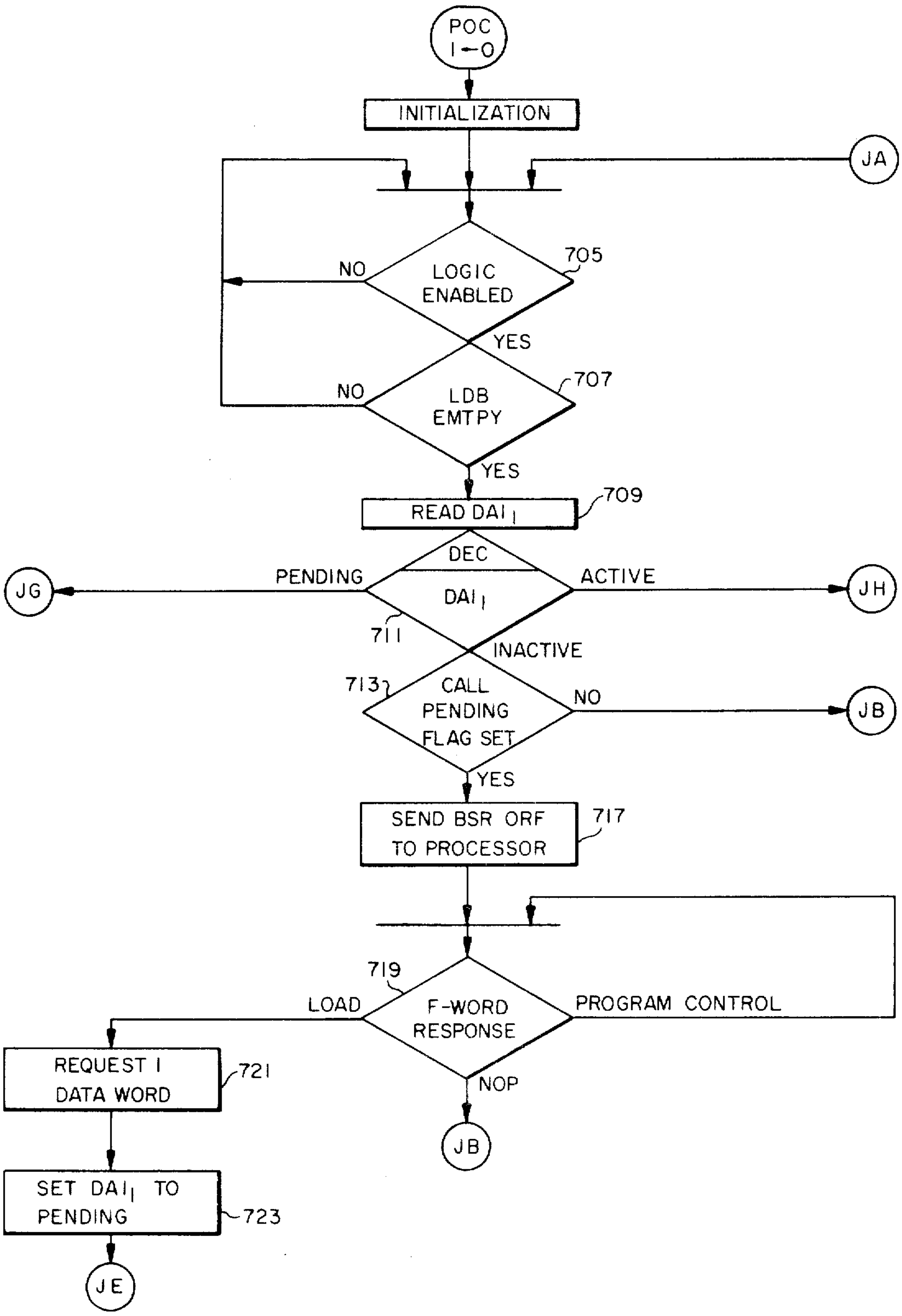
Figure 32D:
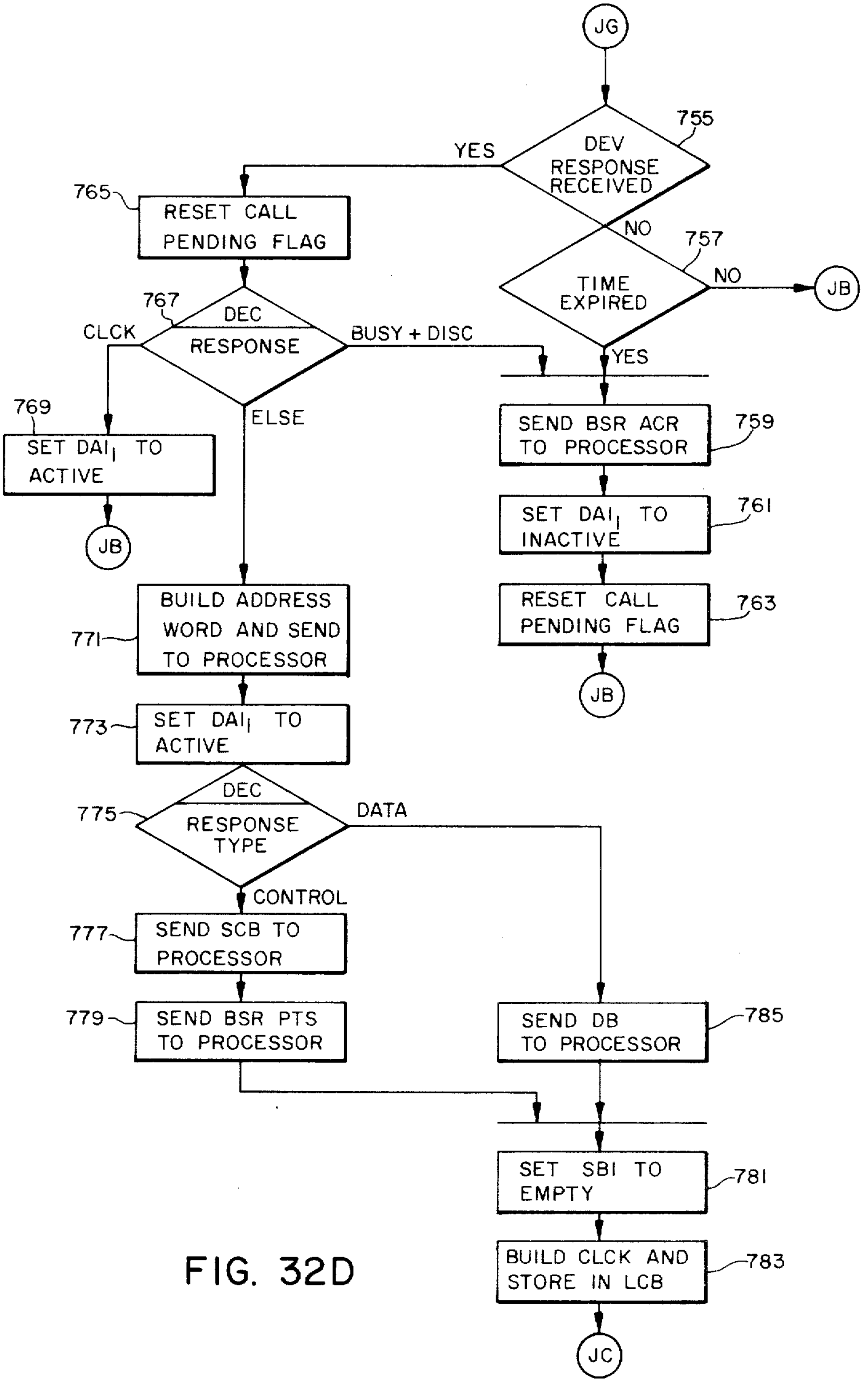
Figure 32E:
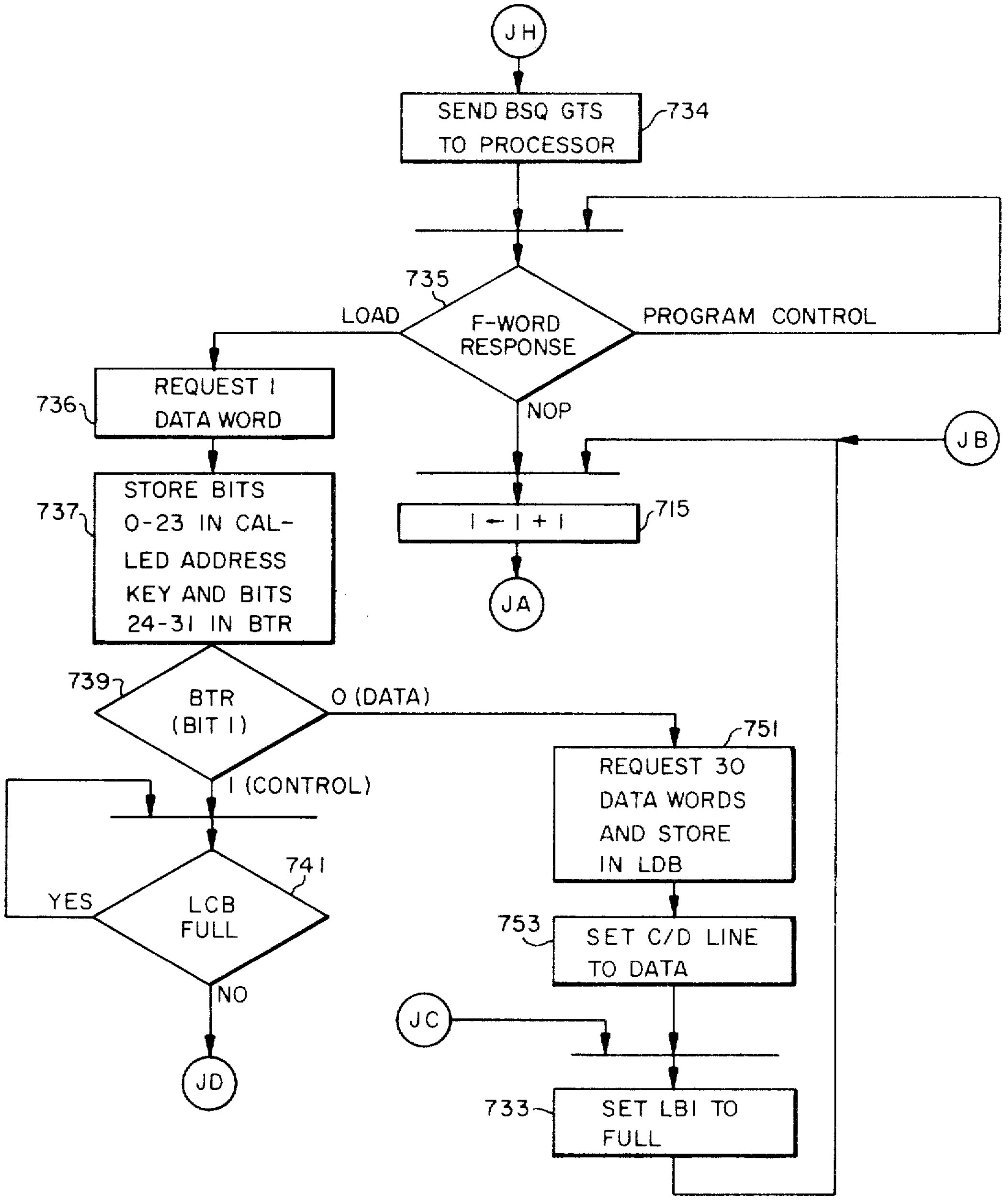
Figure 32F:
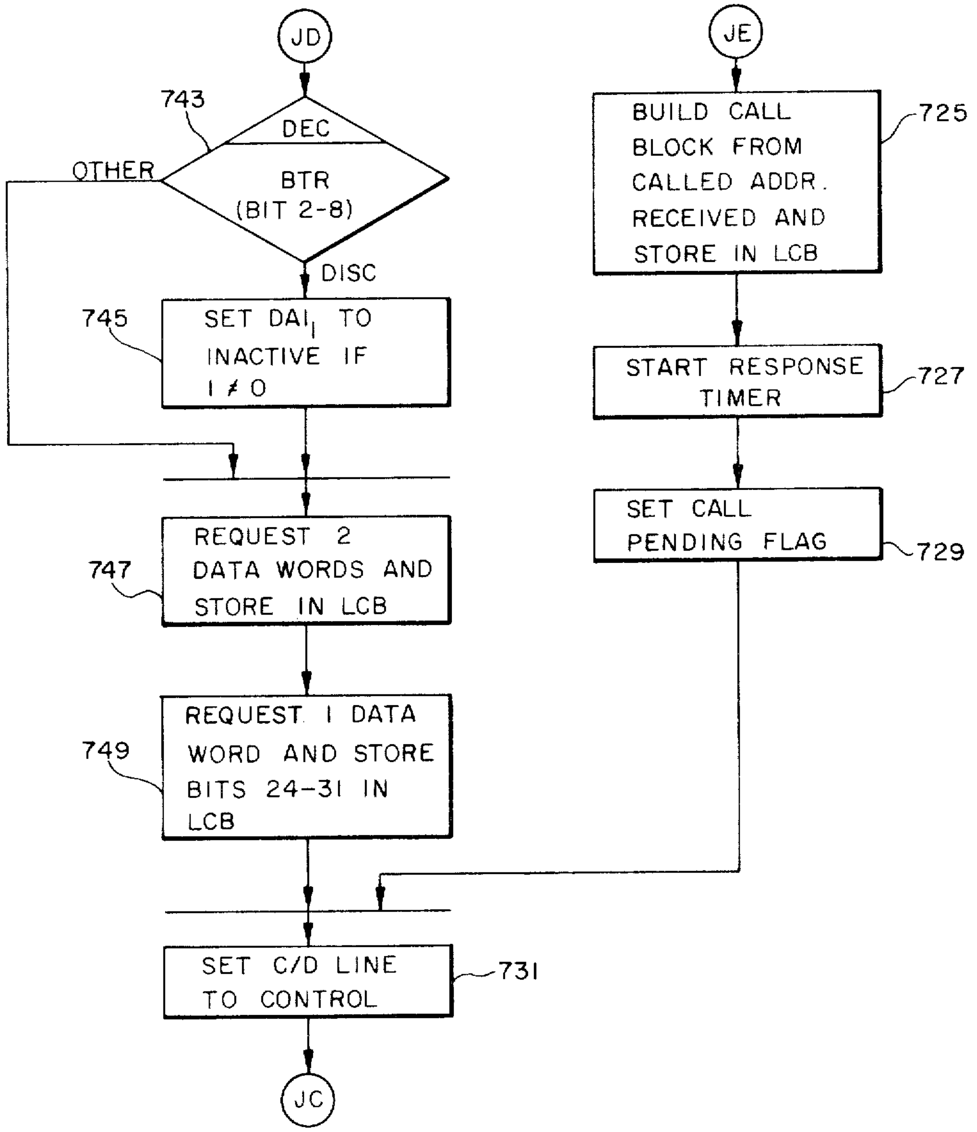

The PTU of FIG. 11 is shown as containing LRT, DDB, PCL, and PIL sections. The data buffer sections of the DDB are self-explanatory, and the LRT sections have been explained in the transmit control and receive control portions of this specification. The PCL and PIL sections of FIG. 11 are illustrated in FIG. 31 in block diagram form and are explained as to flow diagram logic of FIGS. 32.

The PTU logic to be described is for utilizing a PTU from the IXL loop as a direct connection to a TDM loop of a processor or computer system which operates in the manner shown in a patent in the name of Arthur A. Collins, 3,544,976, issued December 1, 1970, and assigned to the same assignee as the present invention. The referenced patent contains devices called loop coupler units (LCU's) which would be substantially idential with those used to connect a processor terminal unit or PTU to the TDM loop for the referenced computer patent system. The loop coupler unit basically contains a demodulator to convert from the data transmission format of the TDM loop to the data format of the present invention to supply information to the PTU. Further, the LCU would contain a modulator for reformatting data received from the PTU to the format of the TDM loop shown in the referenced patent and would further contain TDM synchronization detecting apparatus for providing clock signals, etc., to the PTU.

As referenced previously, each PTU would have to have its control and interface logic circuitry designed specifically for a particular processor and the logic illustrated and described herein is applicable only with reference to the computer system illustrated in the referenced patent. Other processors would require their own individualized logic systems to interface the present invention with that particular processor.

As briefly intimated previously, the need for connecting a processor or computer system to the direct switch network may be manyfold. The connection of a processor enables the various connected parties to send data to a processor for processing and to receive the results therefrom. Since the direct switch network has been described as a communication system, the processor may also be used as a subscriber address information system similar to that used by the telephone company. In other words, a party, not knowing the particular address of a given remote party, may be able to request from the precessor the specific address of said party. This type of request would, of course, require special programming of the processor and is outside the scope of the present invention. It is mentioned, however, for enlightenment as to one of the many reasons for connecting a processor to the switching network and to further emphasize the distinction of the present system from prior art systems which required a processor in order to operate the switching system. The use of a processor as an information system or directory assistance system, is not the only use to which that processor or other processors connected to the switching system may be put. The same processor or other processors may be connected to the switching system for monitoring the system whereby messages between given stations are counted and timed for the purposes of billing and/or load regulation. A connected processor may also be utilized for store and forward message switching. In other words, the processor may be connected to a separate communication system whereby it acts as a central processing unit as in prior art devices or it may be used to store undeliverable messages which are sent thereto by stations after attempting transmission to the desired party a given number of times. The distinction of the present system is that it merely uses one or more processors as auxiliary units for adding versatility to a system which is itself capable of operating independently of such processors. The use of such processors may also be extended to data concentration with multiple units adding to system reliability.

Referring to FIG. 31 it will be noted that on the left-hand side is a dual buffer 605 which has data outputs being supplied either to a combination of address registers C and D given designations 607 and 609, respectively, or to an input control register (ICR) 611. The registers 609 and 611 supply their outputs in parallel to a store control logic system block 613. A set of leads 615 supplies control information in both directions between the dual data buffer 605 and the store control unit 613. A store control supplies output information in parallel to an output register 617 which supplies information in series to a time division multiplex logic (TML) block 619. The TML is the interface logic block 332 of FIG. 11 and is primarily concerned with supplying the incoming data words to the above mentioned LCU of the TDM loop in the correct time slots for utilization by the processor. It also retrieves data from the proper time slots on the TDM loop of the referenced patent and supplies these back to a register 621 which is labeled IR for incoming or input data register. Register 621 supplies an output in parallel to a load control logic system block 623. A group of control lines 625 supplies control signals in both directions between blocks 613 and 619 while a second set of control lines 627 supplies control information in both directions between logic 619 and load control 623. A parallel connection 629 supplies information between control block 613 and 623 as well as between them and a DAI (device activity table) 631. The input is shown in a portion labeled Z1 as the device activity table may be selectively inputted at any one of a plurality of locations. A similar parallel connection 633 connects the control blocks 613 and 623 as well as being connected to a device transaction table (DDT) 635 at Z2. A final, similar connection between the two control blocks is connected to a subscriber address table (SUBAT) 637 at Z3. Both the blocks 635 and 637 are also designed so they can be selectively inputted to or outputted from. A parallel output of the load control block 623 is supplied to an output control register 639 which supplies a series output to the dual data buffer 605. This would be an output to buffer 334 of FIG. 11. A further group of lines 641 supply control information in both directions between the load control unit 623 and the dual data buffer 605.

All communications directed toward the processor or TDM loop are controlled and minitored by the store control logic 613 as shown in the flow charts of FIG. 32. The main function of this logic is to keep the data buffer 326 of the PTU empty. It also initiates return supervision of data to the PTU via the status table.

The store logic is initiated when an indication is received that the data buffer 326 of FIG. 11 is full. The store logic reads the called address of the stored message and notes the called address vector. On the first call to a processor, a calling party will not know which section of the subscriber address table he will be assigned. Therefore, the called address vector will contain zeros in the subscriber portion. The subscriber portion is not utilized in one embodiment of the invention since the called address vector has enough flexibility to have a special designation for a processor call and since the processor is located on the IXL loop and not on a specific LXL loop. Thus, the portion of the address vector which would normally be associated only with the LXL portion may be used to designate a specific address on the subscriber address table of 637 and a previous portion of the address may be used to designate that the message is to go to a processor only.

If the store control logic notes that there are zeros, it will realize that there is a new call and the logic looks for an unassigned location in the table 637.

When an unassigned location is located, the logic 613 stores the calling address in this location, marks the location active in a corresponding position in the device activity table 631, and sets the device transaction table such that it will request the load control logic 623 to return a clock acknowledge (CLCKA) message to the calling party. This clock acknowledge message is slightly different from the clock (CLCK) signal referenced in conjunction with previous descriptions of the invention since instead of keeping the suboperand of the CLCK message in FIG. 26 a blank as shown, this suboperand section is filled with the PTU's complete address including the subscriber address designation provided for a particular portion of the subscriber address table 637. Thus, future calls by the calling party to the PTU can contain the proper subscriber address position in the table 637 and the device will know that the processor is already working on data being received from the calling party. All subsequent transactions by the store control 613 are controlled using this supplied address vector in the clock acknowledge message to refer to the status in the blocks 631, 635, and 637, and to obtain the calling address for return supervision.

If, when the message is received, the block 637 does not have an unassigned location, the store logic 613 requests the load control logic 623 to return a BUSY control message to the calling station.

When the store control 613 receives an address vector with the subscriber portion filled in with a particular position designation in the subscriber address table, it refers to the blocks 631–637 to ascertain the station status and transfer the data to the processor via the TDM loop. The data is always preceded by the calling address vector obtained by the control 613 via reference to the subscriber address table 637. The store control 613 also checks the operator section of the incoming message to determine whether or not the message indicates that it is a BUSY or reply from another party or a disconnect (DISC).

When the control logic 613 receives a disconnect message, the processor is advised to close its file as the transaction is completed and the logic 613 resets the indicators in the tables 631–637.

The load control logic 623 controls the transfer of data from the processor to the party requesting information. The status of the load control or data buffer (LCB or LDB) in unit 605 and the status tables 631–637 are monitored by the logic in load control 623 to initiate the correct sequences to transfer this data. The flow diagram of this logic is also contained in FIGS. 32.

The control logic of 623 constantly monitors the LDB and LCB. When both buffers can accept data, the control logic scans the device activity table 631 to determine how many stations are active. If it finds an unused entry, it interrogates the processor for the next message destined for any station not currently active. Such data being available results in setting up a one word load transaction to receive the called party address from the processor and store it in the subscriber address table 637 and send it to the control logic 623. This address is loaded into the LCB or LDB for supplying return information to a particular party.

If no new transactions are initiated because the processor does not have any more data available, or because all the positions in the activity table are already indicated as being active or pending, the control logic scans the tables 631 and 635 to determine if there are any stations or parties which require more data or a control response. When a control response is required, the control logic 623 determines from the device transaction table what particular response is necessary (a clock or clock acknowledge), creates the command, loads the command into the LCB, and resets the device transaction table to indicate that no further present action is contemplated.

When the control logic 623 is sending data to a station and receives a clock reply, it sends a further request to the processor for more data and after each transmission resets the device transaction table to a no further operation condition. When a request to the processor indicates that there is no further data for a particular party or station, the control logic 623 notes this reply and sends a disconnect message to the station and resets the tables 631–637 to an inactive status for the position previously occupied by the station.

STORE AND LOAD LOGIC FLOW DIAGRAMS FOR PTU

FIGS. 32

When the PTU is connected to the TDM loop, POWER ON CLEAR and initialization must be completed before the device is operable. However, after these items have been taken care of, the device will proceed to a logic decision block 650 to determine whether or not the logic has been enabled by the initialization block or has been disabled by other factors in the PTU. If the logic has not been enabled, the device proceeds to idle in logic decision block 650 until the logic is enabled. When it is enabled, the storage data buffer is checked to determine whether it is full. Until it is full, the device does not proceed to block 652. In 652 part of the address (bits 16–23) are supplied to a device assignment register, contained within the store control logic 613, and a device assignment counter, which is contained in the load control logic 623, is set to "1." The device then proceeds to a decision block 654 which checks to see if the call pending flag is set. If it is set, the response receive indicator is set in the device transaction table 635 for the particular station corresponding to the address presently contained in the J register. (The last eight bits of register 607 and 609 comprise the J register depending on whether the message is a control or data block.) The device then proceeds to decision block 656 where the storage buffer is checked to determine whether or not it is empty and until it is empty it remains idling in this condition. Upon the storage buffer returning to an empty condition, the device proceeds back to decision block 650.

Returning now to decision block 654, the call pending flag set may have been a "no" and the message in the storage data buffer decoded as containing a data or a control block. If it contained data, the device would proceed to block 658 where the contents of a section of the subscriber address table 637 corresponding with the incoming message is sent to the processor as the calling address word. The device then proceeds to block 660 wherein the contents of the storage data buffer are also sent to the processor. The device then enters decision block 662 where the load control buffer is checked to determine whether or not it is full. It should be mentioned at this point that the store control buffer (SCB) and the store data buffer (SDB) are both separate portions of data buffer 326 of FIG. 11. The store control buffer is a buffer for containing control words while the store data buffer is a unit for containing data words. The same concept is applied to the load control buffer (LCB) and load data buffer (LDB) which, respectively, are portions of data buffer 334, FIG. 11, and applied to messages of control and data, respectively.

If the load control buffer is not full, the device proceeds to block 664 wherein a CLCK control block is assembled and stored in the load control buffer before proceeding to block 666 where the load buffer indicator is set to full and the device proceeds to block 668 where the store buffer indicator is set to empty whereupon the device proceeds to decision block 650. By setting the LBI indicator to full, the transmit control unit of FIG. 11 will transmit the return CLCK message to the calling party.

Returning again to decision block 654, a third alternative is that there is no call pending and that the incoming message is a control block. The device will then proceed to a decision block 670 which checks the control operator. If the control message is a disconnect, the device will proceed to a decision block 672 which checks to see if the contents of the J register is a "O," thereby indicating that the control call is from a new party. If this is "yes" the device proceeds to block 674 where the address is supplied to an unused portion of the subscriber address table and the address is also sent to the processor as a calling address word. The device then proceeds to block 676 whereby the contents of the store control buffer is sent to the processor. For the embodiment shown, a further part of the routine is shown in block 678 where an addition to the message is supplied to the processor as a BSR PTS and defines a subroutine that the processor utilizes in starting assembly of a request from a calling party. The device then proceeds to state 666 and proceeds as previously indicated for a data block.

Returning to decision block 672, if the J register does not equal "0" thereby indicating that the calling party had previously sent messages, the device proceeds to block 680 to close the file and write since the calling party has no more information to send. The device then proceeds to state 682 where the device activity table for the portion corresponding with the contents of the J register is set to inactive and the device again proceeds to block 666.

Returning now to decision block 670, the incoming control word could also have been a call and if the call was not a new call, as indicated by the J register not containing a "0," the device would proceed to state 674 and continues through 676, 678, 666, and 668 as previously indicated. However, if the J register contents were all "0's," thereby indicating a call from a new party, the device would proceed to state 684 wherein the device activity table corresponding to the device assignment counter register K is read. The device then proceeds to decision block 686 which determines the status of that particular portion of the table. If this portion is either pending or active (or something other than inactive), the device activity counter register is incremented in block 688, and checked in decision block 690. If the register is not equal to "0," the device returns to block 684 and checks the status of that portion of the device activity table. The purpose of this procedure is to find a position in the tables whereby a new call may be placed and a specific address given to the calling party for future data transactions. Thus, the J register is continuously incremented until an inactive status position appears or the K register equals "0."

If the K register first equals "0," the device will proceed to decision block 692.

In decision block 692, the load control buffer is checked to determine if it is empty. If it is not empty, the device stays in this situation until it is. When the buffer becomes empty the device proceeds to state 694 where a busy control block is formatted and stored in the load control buffer so that it can be sent by the transmit control 328 of FIG. 11. This is accomplished by setting the LBI indicator to full and the store buffer indicator to empty as provided in block 666 and 668.

Returning to the decision block 686, an inactive position in the table may be found whereby the device will proceed to state 696 and the device activity table for the position of register K is changed from an inactive to an active status. The device then proceeds to state 698 where a clock acknowledge (CLCKA) control block is assembled using the contents of the K register as a subscriber field of a calling address. The device then proceeds to state 700 where the CLCKA is stored in the load control buffer and the PTU is notified to supply this CLCKA back to the calling party.

In summary, the logic in the store control block checks to determine when the incoming data buffer is full thereby indicating complete reception of a message, it checks the indicators to determine whether or not a call is pending while taking the address and inserting it into a special or J register. If there is a call pending, the device waits until the pending call is completed. However, if there is no pending call, the device determines that there must be an incoming control or data block. If it is a data block, this information is correlated with the contents of the subscriber address table and the data is forwarded to the processor. If it is a control block, the message is decoded to determine whether or not it is a disconnect or a call or something else. If it is a new initial call, the call is assigned a special position in the tables 631–637 of FIG. 31 and a reply is supplied to the calling party. However, if the call is from a previously connected party or if the control word is anything other than a call, the information is forwarded to the processor with appropriate other disconnect actions being taken if the control word is a disconnect word or message.

The load control portion of the flow diagram shown in FIGS. 32C-F will now be explained. After POWER ON CLEAR and initialization, the load control 623 proceeds to logic enable decision block 705. It will stay in this decision block until the logic is enabled by the initialization sequence. After the logic is enabled, the device will proceed to a decision block 707 for determining whether or not the load data buffer is empty. On start-up conditions this would be true; however, when it returns from other parts of the flow diagram, the load data buffer may still have data contained therein which is being transmitted from the PTU to a calling party. The device proceeds to block 709 after the determination is made that the load data buffer is empty and checks the device activity indicator. During POWER ON CLEAR, the tables are set to the first position and thus the reading of the device activity table will be a decoding of the very first position therein. This decoding is done in decision block 711 and as may be observed the first position may either be pending, active, or inactive. If it may be assumed that this is one of the initial start-up conditions, the device activity indicator would show inactive. The device would then proceed to decision block 713 to check to see if a call pending flag is set. If no call pending flag is set, the device proceeds to block 715 in FIG. 32E where the position in the table is incremented by "1" and the device returns to the initial decision block 705. If the call pending flag is set, the device proceeds from decision block 713 to a block 717 which causes a message to be sent to the processor to open a read file. The device then proceeds to check the response from the processor in a decision block 719. The device idles in this state until the response is received. If it receives a NOP or take no action response, the device again proceeds to block 715 where the tables are incremented by "1" and returns to the start. However, it may receive a load response whereby it proceeds from decision block 719 to block 721 and requests the first data word. The device then proceeds to block 723 where the device activity indicator for that particular position is set to pending and the device proceeds to block 725 where a call block is assembled along with the address obtained from the subscriber address table of that particular position in the subscriber address table and the call is placed in the load control buffer in data buffer 334 of FIG. 11. Placing this data in the data buffer will cause the transmit control 328 to start transmitting the data as soon as possible. The logic then proceeds to block 727 where a response timer is started and continues to block 729 where the call pending flag is set. The device also continues through block 731 to set the control data line to control since this is a call block and proceeds to block 733 to set the load buffer indicator to full. The subscriber tables are then incremented by "1" and the device returns to the initial decision block 705. It will proceed to block 707 and stay there until the call has been transmitted. If the next device activity table position is indicated as being active, the device proceeds to block 734 where a message is sent to the processor to get the next segment of information. The unit then proceeds to decision block 735 and awaits the response from the processor. If the response is NOP or "take no action" the device proceeds to increment the table indicators and returns to the starting logic block 705. However, if the response is load, the device proceeds to block 736 where one data word is requested and continues to block 737 where the returned data word is segmented with the address portion being placed in one register and the information containing the type of block or word being placed in a block type register. The logic then proceeds to decision block 739 which examines the first bit of this data in the block-type register and determines whether it is a control word or a data word. If it is a control word the device proceeds to decision block 741 where it waits until the load control buffer is empty. When it is empty, it proceeds to decision block 743 and examines bits 2-8 in the block-type register. If the rest of the bits indicate that the word is a control disconnect, the device proceeds to block 745 and sets the device activity indicator table for that particular position to inactive as long as the indicator table is not at position "0." If the activity indicator table is at "0," or if the decoding determines that it is anything other than a disconnect, the device proceeds directly to block 747. In this block two further data words are requested from the processor and these are stored in the load control buffer. The device then proceeds to state 749 and requests one further data word of which bits 24–31 are stored in the load control buffer of unit 334 in FIG. 11 and the device then proceeds to state 731 to set the control data line to "control" and proceeds as previously indicated.

Returning to decision block 739, if the first bit in the block-type register indicates that the data word is data, the device proceeds to state 751 where 30 additional data words are requested from the processor and stored in the load data buffer. When these are stored the device proceeds to state 753 where the control data line is set to data and the device proceeds to and through state 733 as previously indicated.

It may now be assumed that, when the device again reaches decision block 711, for that particular position in the device activity table there is an indication that there is activity pending. In this case the unit would proceed from decision block 711 to decision block 755 wherein a check is made to see if a response from the indicated device has been received. If a response is not indicated as being received, the device proceeds to decision block 757 to determine whether or not the time set in decision block 727 has expired. If it has not, the device proceeds to state 715 where the device indicator state is incremented and proceeds to initial conditions in the decision block 705. However, if the time has expired, the device proceeds to decision block 759 where a message is sent to the processor to abandon the present call and try again later. The device then proceeds to state 761 where the device activity indicator for that particular position is set to inactive and the call pending flag is reset in block 763. The device then increments the device activity counter and proceeds as previously indicated.

If the decision block 755 determines that a response has been received, the device resets the call pending flag in block 765 and proceeds to decision block 767 wherein the response is decoded. If the response is a CLCK, the device proceeds to block 769 where the activity indicator for the position in the tables is set to active and the indicator is incremented and the device returns to block 705. If the response is a busy or a disconnect, the device proceeds to block 759 and tells the processor to abandon that call and try again later. However, if the decoded response is anything other than the above three referenced possibilities, the logic will proceed to block 771 where an address word is formulated from the information in the activity table and this address is sent to the processor. The logic then proceeds to block 773 where the device activity indicator for that position is set to active and in decision block 775 the response type is checked to determine whether it is a data or control message. If it is control, the contents of the store control buffer in data buffer 326 of FIG. 11 are sent to the processor according to block 777. A put segment request is also sent to the processor in block 779 and the device then proceeds to change the store buffer indicator to empty in block 781 and to form a CLCK reply and store this CLCK reply in the load control buffer of block 334 of FIG. 11 according to block 783. The device then proceeds to block 733 where the load buffer indicator is set to full.

Returning to decision block 775, if the response is indicated as being data, the contents of the data buffer are sent to the processor as indicated in block 785 and the device then proceeds to 781 and 783 where a reply is sent to the party supplying the data.

Figure 33:
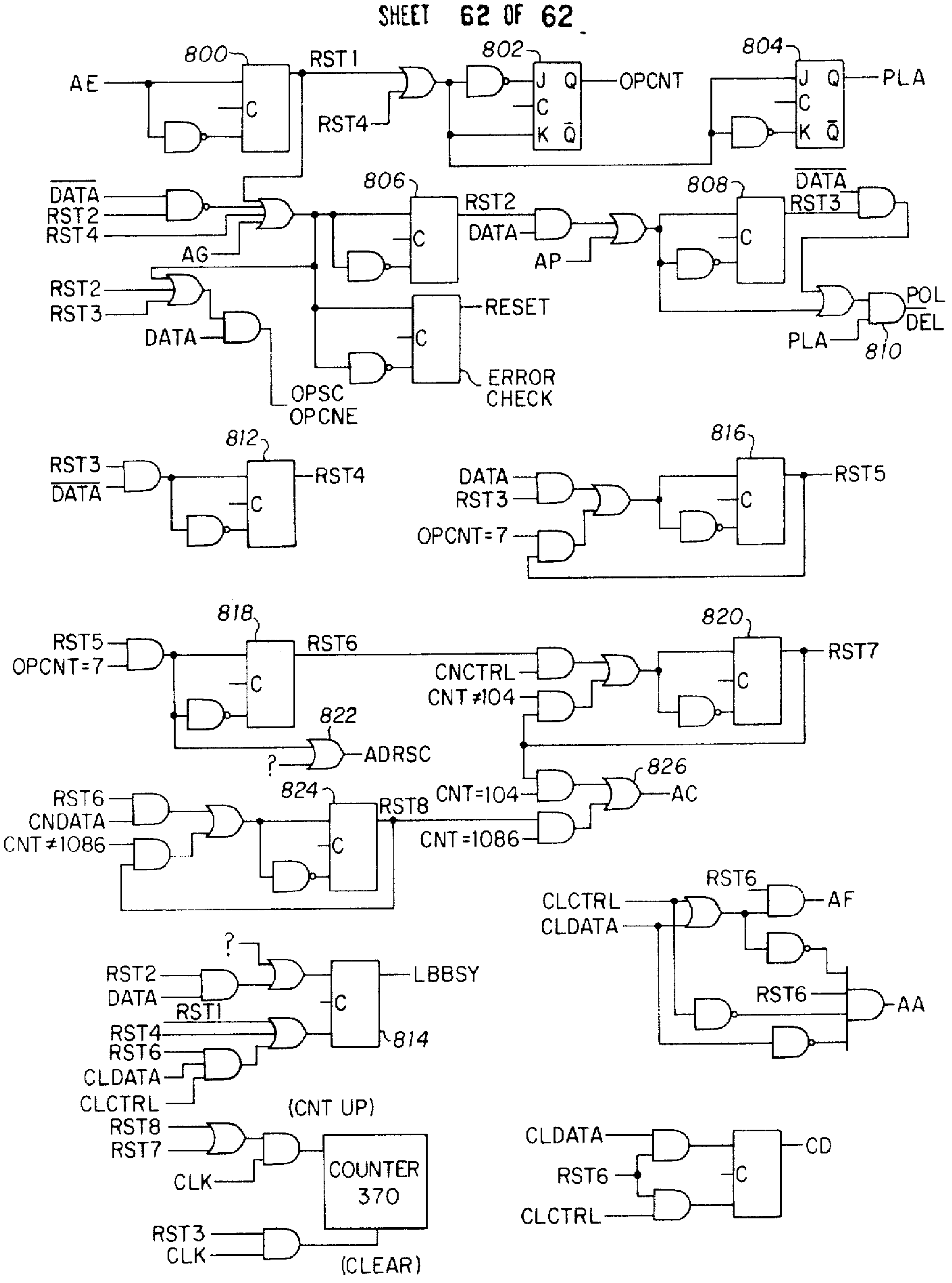
FIG. 33 illustrates a logic circuit diagram which may be used to implement the flow diagram of FIG. 14A.

In spite of the belief that the disclosure is adequate, there is appended to this application a FIG. 33 which illustrates one embodiment of specific circuitry utilizing J-K flip-flops, AND gates, NAND gates, and OR gates connected in accordance with the flow diagram of FIG. 14A, starting with state 1 and proceeding to state 8.

The various rectangular blocks which have a C in the center of one side are J-K flip-flops each one being operated on a periodic basis by a clock input. The connections of the clocks inputs are not shown. The output of each of the flip-flops is labeled in some manner such as a mnemonic or by a particular state. The signal appearing on these lines correspond with the information in the flow diagram.

Proceeding to state 1 of FIG. 14A and to the attached schematic diagram, it will be noted that when the signal corresponding to AE appears, the first J-K flip-flop 800 will be activated upon the occurrence of the next clock. The activation of this flip-flop will provide an output on lead RST 1. This output will pass through the attached OR gate and activate J-K flip-flop 802 to provide a logic 0 output on the lead labeled OPCNT. In addition, this signal passing through the OR gate will activate the flip-flop labeled 804 to produce a logic 1 output on the lead labeled PLA. As drawn, all J-K flip-flops have the true output in the upper position. Since the J input to J-K flip-flop 802 is inverted, the upper lead will be a logic 0. On the other hand, since the input to J input of J-K flip-flop 804 is not inverted, the output will be a logic 1 under the conditions given. The OR gate previously mentioned also has the input RST4 which will occur as the corresponding flip-flop produces the RST4 output. As may be seen from the flow diagram at this time the same conditions are to occur as occur in state 1. The output RST1 is also applied to an OR gate to activate a J-K flip-flop 806. As will be noted from the flow chart, state 2 may be entered by the input AG, the occurrence of no data while in state 2 or it may be entered from state 4. These conditions are also provided to the OR gate and will be allowed to activate the flip-flop 806. Simultaneously, an AND is activated for generating OPSC and OPCNE as well as resetting an error check flip-flop. The output of flip-flop 806 is supplied through an AND gate in combination with the DATA signal which is obtained as an input to block 352 in the circuitry of FIG. 13 and is used in conjunction with an OR gate to activate a flip-flop 808. This flip-flop 808 produces an output indicative of state 3 whenever the data signal occurs. Until this data signal occurs, the circuitry continues to activate the flip-flop 806 and thus stays in this condition. This is ascertained from the AND gate having the inputs RST2 and data with a slash thereabove indicating no data. Thus, each time the clock signal occurs, until data is obtained, the flip-flop 806 will be reset to have a logic 1 output on lead RST2. When the flip-flop 808 finally produces the output RST3, it is provided through two OR gates to an AND gate 810 to provide an output POLDEL if at the same time there is a signal indicative of PLA. As will be remembered, the signal PLA is obtained from flip-flop 804. As may be observed at the bottom of the attached logic diagram, the occurrence of RST3 signal in combination with a clock will clear the counter 370. The counter will commence counting upon the occurrence of either the signals RST7 or RST8 in connection with a clock signal.

Proceeding to the next state, it will be observed that the occurrence of no data and RST3 through the AND gate will activate the flip-flop 812 to provide an output RST4 upon the occurrence of a clock. The occurrence of the RST4 output will return the operation of the circuitry to flip-flop 806. Further, it will activate flip-flops 802 and 804 to provide the OPCNT and PLA outputs respectively, and further will set the flip-flop 814 to a logic 0 output for the loop busy (LBBSY) output signal. This also occurs upon each occasion of an input from the state 1 flip-flop 800 as well as for other indicated conditions. On the other hand, flip-flop 814 is set to provide a logic 1 output as illustrated in the state 2 condition of the flow diagram of FIG. 14A upon the simultaneous occurrence of data. As will be illustrated in other parts of the flow diagram of FIG. 14, there are also other conditions to set the flip-flop 814 to a logic 1 output.

Returning to the state 5 flip-flop 816, it will be observed that the occurrence of the state 3 signal from flip-flop 808 in combination with DATA will activate flip-flop 816 to provide the RST5 output. Once the flip-flop 816 is activated, it will stay in this condition unitl the count reaches 7. The output from operator counter 368 may be passed through an inverting circuit to provide the input to the appropriate AND gate indicating that the count is not yet 7.

Proceeding further in the logic diagram, it will be noted that a flip-flop 818 is activated upon the occurrence of the count equaling 7 and the signal from flip-flop 816. The appearance at the output of 818 of the signal RST6 will cause a flip-flop 820 to be activated if there is a signal CNCTRL. In any event, the activation of flip-flop 818 will, simultaneously, through the action of an OR gate 822, produce an output ADRSC. Other areas in the circuit may also produce the output ADRSC and thus an input with a question mark is illustrated. In a manner similar to that of flip-flop 816, the flip-flop 820 will stay in an activated condition until the count of the counter 370 equals 104. That is, of course, under the limitation that there is a CNCTRL signal. If there was no CNCTRL and instead there was a CNDATA signal indicating a connect data word, the circuit would instead proceed to activate a flip-flop 824. Thus, the state 8 signal would appear. Then, the circuit would stay with the activation of flip-flop 824 until the count equaled 1086 in counter 370. When the count either equals 104 from state 7 or 1086 from state 8, the circuit will proceed to produce the output AC from an OR gate 826.

As will be noted in FIG. 14A, there are two other possibilities upon leaving state 6 and one of these is to go to AF which is state 9 in FIG. 14B. However, this has merely been illustrated in this logic diagram as the simultaneous occurrence of the state 6 signal and either the CLCTRL signal or the CLDATA signal. If any other condition occurs in combination with state 6 signal the output will instead activate the lead AA which will return the circuit to state 45 as shown in FIG. 14A.

It is believed that the above completely demonstrates the ease of designing a circuit from a flow diagram and that it is completely obvious to one skilled in the art of logic circuit design from merely looking at the flow diagram with no other additional information.

In summary, the load control logic consecutively and periodically checks each position in the device activity tables; and if a particular position indicates that there is no activity, the processor is signaled to request more information to fill this position in the table. If the position is indicated as being active, new data is requested from the processor to be sent to the active party. If on the other hand the table indicates that a call is pending, the device checks to see if too much time has expired and if it has the call is abandoned. It is also abandoned if either a busy or disconnect has been received and the processor is told to try again later whether it takes too long or the busy or disconnect is received. However, if the response is either a clock or a control or data, the indicator is reset from pending to active and the received information, if it is control or data, is sent to the processor and a clock reply is returned to the data supplying party.

As will be realized, the PTU could easily be connected to two separate processors or TDM loops for reliability purposes with an automatic switch changing the PTU from one TDM to the other upon receipt of error indications.

Further, while the present PTU is shown connecting the direct switch to the processor at the intermediate exchange level, other embodiments of the invention have been connected to a processor at the local exchange level.

Although our invention is believed to encompass the broad concept of communicating from node to node in a communication system, one communication link at a time, for more efficient utilization of the communication system, the invention is not restricted thereto. It is believed that many of the individually described portions of the system are novel in concept and operation as well as many other aspects of providing the message transmission.

We claim:

1. Data communication switching apparatus comprising, in combination:

master station means including, local loop input means for receiving input signals from a local loop, local loop output means for supplying output signals to the local loop, means for transmitting SELECT and CONNECT mode message blocks comprising predetermined numbers of logic bits on said local loop output means, means for receiving SELECT and CONNECT mode message blocks comprising said predetermined numbers of logic bits on said local loop input means, and means, incorporated in said means for transmitting, for transmitting SELECT mode poll messages after said master station means detects the end of a connect mode message, said master station means passing some of said SELECT and CONNECT mode message blocks, received at said local loop input means, without change, to said local loop output means for forwarding therefrom;

a plurality of subordinate station means each including, local loop input means for receiving input signals from the local loop, local loop output means for supplying output signals to the local loop, means, in each of said plurality of subordinate station means, individually supplying SELECT mode call messages at said local loop output means thereof when the individual subordinate means contains CONNECT messages for transmission, and means for responding to SELECT call messages containing an address of said individual subordinate station means by alternating a response field section of received SELECT call messages; and means connecting the local loop input and output means of said master and subordinate station means in a closed loop such that each SELECT call and each CONNECT mode message traverses the complete closed loop.

2. Apparatus as claimed in claim 1 wherein:

each of said subordinate station means contains means for examining the response field section of a returned SELECT call message for a positive acknowledgement before said subordinate station means supplies a CONNECT mode message to said local loop output means thereof.

3. Apparatus as claimed in claim 2 wherein:

each of said subordinate station means includes means for initiating further SELECT call messages when positive acknowledgements are not received for the first SELECT call message for a particular CONNECT message.

4. Apparatus as claimed in claim 1 wherein:

said master station means includes means for inhibiting the transmission of SELECT mode poll messages upon reception of messages by said master station means from outside the local closed loop for subsequent transmission to one of said plurality of subordinate station means in the local loop.

5. Apparatus as claimed in claim 1 wherein:

said master station means includes means for formatting said SELECT mode poll messages to comprise a logic "1" bit followed by a number of logic "0's" at least equal to the length of a SELECT mode message block.

6. A data communication system comprising apparatus as claimed in claim 1 and comprising in addition:

at least one additional master station means and connected subordinate station means as defined in claim 1;

intermediate loop controller means for initially supplying a SELECT poll message and for supplying further SELECT poll messages upon detecting the occurrence of predetermined conditions;

means connecting said loop controller means and each of the plurality of said master station means in a closed intermediate loop; and each of said master station means further including means for transmitting a message from its local loop through the intermediate loop to a local loop of another master station means upon receiving a poll message on the intermediate loop and further including means for thereafter forwarding the transmitted poll to the next sequential master station means on the closed intermediate loop.

7. A data message transfer system including at least one subordinate node means and at least one master node means connected in a closed loop configuration wherein:

said master node means includes, local loop input means for receiving signals, local loop output means for supplying signals, means for originating SELECT and CONNECT mode message blocks to the loop, means for terminating SELECT AND CONNECT mode message blocks from the loop, means for monitoring the passage of SELECT and CONNECT mode message blocks therethrough from said local loop input means to said local loop output means, and means for monitoring said closed loop whereby a logic "1" poll bit is transmitted from said local loop output means after each observance by said master mode means of the end of a connect mode message block; and each of said at least one subordinate node means includes local loop input means for receiving signals from the local loop, local loop output means for transmitting messages, means for responding to said logic "1" poll bit by supplying a SELECT mode call message which when returned around the loop is examined in a response section thereof for a positive acknowledgement before supplying a CONNECT message for transmission.

8. Data message transfer apparatus as claimed in claim 7 wherein:

said at least one subordinate node means additionally comprises means for receiving SELECT mode call messages, means for examining the polynomial check code of said received SELECT mode call messages and means for altering the response section of said received SELECT mode call messages to indicate proper reception thereof as it is forwarded to continue its path around said closed loop to the calling node.

9. Data message transfer apparatus as claimed in claim 8 wherein:

said at least one subordinate node means additionally includes means for examining the address of received SELECT mode call messages for a predetermined address before altering the response section thereof and further contains means for differentiating between SELECT and CONNECT mode messages.

10. A data message transfer system including at least one subordinate station means and at least one master station means connected in a closed loop configuration wherein:

said master station means includes, local loop input means for receiving signals, local loop output means for supplying signals, means for originating SELECT and CONNECT mode message blocks to the loop, means for terminating SELECT and CONNECT mode message blocks from the loop, means for monitoring the passage of SELECT and CONNECT message blocks therethrough from said local loop input means to said local loop output means, and means for monitoring said closed loop whereby a logic "1" poll bit is transmitted from said local loop output means after each observance by the master station means of the end of a CONNECT mode loop block; and said at least one subordinate station means includes, local loop input means for receiving signals, local loop output means for supplying signals, means for altering the response section of SELECT mode call messages when said SELECT mode call messages are properly received, and means for subsequently receiving CONNECT mode messages whose response fields are also altered if properly received.

11. Data communication apparatus for transmitting messages between separate closed loop systems comprising, in combination;

first and second closed loop data communication systems each comprising a plurality of data receiving and data transmitting stations; and full duplex transmission system means connecting a first one of said stations of said first closed loop data system to a first one of said stations of said second closed loop data system for the transmission of messages between said closed loop data communication systems;

each of said first stations including a plurality of message storage means and further including means for transmitting a station status message intermediate each closed loop to closed loop data message.

12. Apparatus as claimed in claim 11 wherein;

the receiving one of said first stations additionally includes means for checking received message parity and means for transmitting a return positive acknowledgement message to the transmitting first station upon determination of proper message receipt; and said transmitting first station includes means for detecting a returned positive acknowledgement message and means for deleting stored messages for transmission corresponding to said returned positive acknowledgement.

13. Single channel closed loop data communication means wherein any data originating station in the closed loop can transmit messages as a complete and coherent message block directly to any data receiving station on said single channel closed loop comprising, in combination:

master station means for monitoring the passage of messages therethrough and said master station including means for transmitting polls at predetermined times;

transmitting first station means including means for sending a call message addressed to a station means other than said master station upon receipt of a poll, and means for transmitting a data message after receipt of a positive acknowledgement of said call message by the addressed station;

receiving second station means including means for detecting a preassigned address in a received call message, means for checking proper receipt of said call message, means for altering a response section of said received call message to indicate positive acknowledgement and means for forwarding the altered call message; and means connecting said master station means, said first station means and said second station means in a closed loop such that all stations see every transmitted message, either before or after alteration of the response section thereof.

14. Communication apparatus as claimed in claim 13 wherein:

said master station means includes means for transmitting a poll after it sees the passage therethrough of a data message from said first station means.

15. Communication apparatus as claimed in claim 13 wherein:

said second station means includes means for storing said data message as transmitted by said first station means after acknowledgement of said call message and further includes means for altering a response section of said received data message to indicate positive acknowledgement thereof as said data message is returned to the closed loop for forwarding to said first station means;

said first station means including means for detecting positive acknowledgement of said data message and thereupon returning said first station means to a condition for sending a new set of call and data messages after receipt of a further poll; and said master station means includes means for transmitting a poll after seeing the passage therethrough of a predetermined number of data messages.

16. The method of increasing efficiency of a communication switching system generally containing a plurality of connecting nodes and intermediate communication links in a communication path between message originating and message receiving parties comprising the steps of:

storing a multiple word message block in consecutive nodes in the communication path;

returning a positive acknowledgement of proper receipt to an immediately previous transmitting node; and awaiting an opening in link traffic for forwarding the stored message block to the next consecutive node in the communication path.

17. The method of claim 16 whereby multiplexing problems are eliminated comprising the additional step of transmitting the message blocks at the entire frequency bandwidth of the node to node connections.

18. Data message switching apparatus comprising, in combination:

a plurality of message storage and forwarding station means each of which is activated to store a CONNECT message by receipt of a selectively addressed call message at an input thereof and activated to transmit a call message followed by a CONNECT message at an output thereof by receipt of a poll message at an input thereof;

master group control means constructed for supplying polling messages after seeing the end of each CONNECT message; and means connecting said plurality of station means and said control means in a closed loop such that all CONNECT messages pass through said control means.

19. Apparatus as claimed in claim 18 wherein:

said control means includes means for inhibiting the supplying of polling messages after seeing the end of a loop CONNECT message until an internally stored message is transmitted by said control means to an addressed station means.

20. Apparatus as claimed in claim 19 comprising, in addition:

terminal means connected to each of said station means for originating messages to be transmitted via said closed loop to terminal means connected to other station means.

21. Apparatus as claimed in claim 19 comprising, in addition:

means in said station means for inhibiting activation by a poll message for a predetermined number of received poll messages after a previous activation.

22. The method of initializing a local closed data loop including a plurality of message storage transmitting and receiving station means and a master control station means whereby said storage station means are activated for message reception by a call from any station means and activated for transmission of a message by a single bit poll from said master station means comprising the steps of:

transmitting a series of logic "0's" around said loop in excess of the maximum message block length followed by a single bit poll;

detecting said series of logic "0's" for initialization of a given station means before said given station means allows itself to be activated;

monitoring loop transactions; and transmitting a new series of logic "0's" for re-initialization whenever the number of consecutive logic "0's" on the loop exceeds a predetermined magnitude.

23. Station apparatus for transferring CONNECT messages between portions of a closed data loop, including at least one other similar station apparatus, and terminal unit means comprising, in combination:

data buffer means for storing messages;

loop interface means;

terminal unit interface means;

control means connected to said loop and terminal interface means as well as said data buffer means, said control means operating part of the time to receive CONNECT message blocks from said loop interface means and distribute the CONNECT message blocks a portion at a time to said terminal interface means while inhibiting simulataneous reception of messages from said terminal unit interface means and operating part of the rest of the time to receive portions of a connect message from said terminal unit interface means for assembly of a CONNECT message in said data buffer means and to subsequently transfer the assembled CONNECT message to said loop interface means while inhibiting receipt of messages from said loop interface means; and said control means further containing means for detecting calls from said loop interface means and for replying with a busy signal when a message is being assembled in said data buffer means.

24. Apparatus as claimed in claim 23 wherein:

said control means includes means for detecting the occurrence of a single logic "1" poll bit from said loop interface means before transmitting assembled CONNECT messages in said data buffer means.

25. Apparatus as claimed in claim 24 wherein:

said control means includes means for assembling and transmitting a SELECT mode call message, including the address of the called party, to said loop interface means, and awaits a positive acknowledgement of said SELECT mode call message between receiving said logic "1" poll bit and transmitting the assembled CONNECT message from said data buffer means.

26. The method of interchanging messages between a closed loop interface means and a terminal unit interface wherein the message capacity of said terminal unit interface is much smaller than said closed loop interface means comprising the steps of:

receiving message segments from said terminal unit interface means;

assembling said received message segments to form a large capacity message block while inhibiting receipt of message blocks from the loop interface means;

detecting the completion of assembly of a message block;

detecting the occurrence of a poll from said loop interface means;

transmitting said assembled message block to said loop interface means;

checking received SELECT mode messages for the occurrence of a given address;

receiving a CONNECT data message when a message is not being assembled from said terminal unit interface means; and distributing said received data message in segments to said terminal unit interface means while inhibiting receipt of further data message segments therefrom until completion of the distribution.

27. The method of claim 26 comprising the additional step of:

altering the response portion of received select and connect mode messages containing a given assigned address as said messages are returned to said loop interface means.

28. The method as claimed in claim 26 comprising the additional steps of:

immediately returning all messages received from said loop interface means to said loop interface means;

checking an address portion of said received messages for said given address; and altering a response section of individual ones of said received messages as they are returned to said loop interface means if the address thereof coincides with said given address.

29. Closed loop communication system apparatus comprising, in combination:

a master station for periodically providing an initialization sequence comprising a plurality of logic bits of a first type followed by a poll logic bit of a second type, said plurality of logic bits being greater in number than the number of logic bits in a single message in the communication system;

a plurality of substations; and means connecting said master station and said substations together in a closed loop such that any substation can communicate with any other substation;

said substations including means for transmitting a call message in response to a single logic bit poll of the second type, means for transmitting a connect message in response to a positive acknowledgement of said call message and means for transmitting a plurality of logic bits of the first type and one of the second type after completion of the transmission of the connect message whereby other substations in said closed loop may detect the logic bit poll and attempt to send a message.

30. The method of commencing communicating between nodes in a communication system comprising, the steps of:

transmitting a SELECT call, including the called party's address to a next node in the communication system;

receiving a response of satisfactory receipt and acceptance of the SELECT call from said next node;

transmitting a CONNECT call, including the called and calling parties' addresses, to said next node in the communication system; and receiving a response of satisfactory receipt and acceptance of the CONNECT call from said next node.

31. The method of communicating between first and second parties in a buffered multinode communication system with different communication links between pairs of nodes, comprising the steps of:

transmitting a SELECT call containing the address of said second party from the node of said first party to the next node in the network;

awaiting a positive acknowledgement from said next node;

transmitting a CONNECT call including the addresses of both of said first and second parties;

awaiting a positive response from said next node;

transmitting SELECT and CONNECT calls between remaining pairs of nodes in said communication system between the node of said first party and said second party, one communication link at a time until the CONNECT call is received by said second party, each communication link passing SELECT and CONNECT calls with positive acknowledgements being supplied to said transmitting node before being forwarded over the next communication link to the next node in the communication system;

transmitting a CONNECT message from said second party to said first party, one data link at a time in substantially the same manner as the CONNECT call was transmitted, indicating said second party has received the CONNECT call message and is available to receive further messages, said second party using said first party's address in replying, as obtained from said CONNECT call message; and transmitting CONNECT data messages from said first party to said second party after said first party receives the positive acknowledgement CONNECT message from said second party, the messages being forwarded one data link at a time in the manner of the first referenced CONNECT call message.

32. The method of claim 31 comprising the additional step of:

arresting further transmissions from said first party to said second party by sending a CONNECT disconnect message from one of said first and second parties to the other of said first and second parties.

33. The method of claim 31 comprising the additional step of:

storing the CONNECT message at each node until a further communication link is available in a desirable communication path direction.

34. In a communication network including a plurality of nodes interconnected via communication links for connecting calling and called parties in a communication path, at least some of the nodes comprising, in combination:

storage means for storing a CONNECT message received from a source in the communication path between said calling and called parties;

means for transmitting a SELECT call to the next node in the communication path to the called party;

means for detecting a positive acknowledgement of said SELECT call from the next node;

means for nondestructively transmitting the CONNECT message contained in said storage means to the next node; and means for commencing nondestructive retransmission of said CONNECT message when a positive acknowledgement is not received from said next node.

35. Apparatus as claimed in claim 34 wherein said nodes comprise in addition:

means for permitting receipt of new messages and destruction of the CONNECT message contained in said storage means after receipt of a positive acknowledgement from the next node in the communication path subsequent to transmission by the means for transmitting of the CONNECT message.

36. In a communication system comprising, in combination:

data source means;

data sink means;

data monitoring means for administratively counting messages passing therethrough;

loop control means; and means connecting said data source means, said data sink means, said data monitoring means and said control means in a closed loop, any data source means supplying a data message directly to any data sink means on said closed loop with said data sink means altering a response portion of said data message as it circulates for indicating reception of said data message by said data sink means to said data source means when said data message means completes a closed loop circulation.

37. Communication apparatus as claimed in claim 36 wherein said data monitoring means includes means for calculating costs to be billed said data source means for data messages sent therefrom.

38. Communication apparatus as claimed in claim 36 wherein said data monitoring means includes means for providing directory service in response to specific requests from said data source means.

* * * * *

UNITED STATES PATENT OFFICE
CERTIFICATE OF CORRECTION

Patent No. 3,810,100 Dated May 7, 1974

Inventor(s) Laurence D. Hungerford and Clarence G. Marshall

It is certified that error appears in the above-identified patent and that said Letters Patent are hereby corrected as shown below:

Col. 3, line 19, after "31" insert --and--;

Col. 11, line 31, delete "Beync" and substitute therefor -- B SYNC--;

Col. 18, line 44, delete "CNZO" and substitute therefor --CNZØ--;

Col. 18, line 46, delete "OPZO" and substitute therefor --OPZØ--;

Col. 19, line 66, delete "OPZO" and substitute therefor --OPZØ--;

Col. 35, line 31, delete "()" and substitute therefor --(#)--;

Col. 35, line 58, delete "LISIP" and substitute therefor --LISTP--;

Col. 52, line 17, delete "supplied" and substitute therefor --supplies--;

Col. 53, line 51, delete "ScU" and substitute therefor --SCU--;

Col. 53, line 67, delete "pARITY" and substitute therefor --PARITY--;

Col. 54, line 3, delete "501" and substitute therefor --510--;

Col. 55, line 28, delete "TTy" and substitute therefor --TTY--;

Col. 60, line 17, delete "*n" and substitute therefor --In--;

Col. 71, line 6, delete "work" and substitute therefor --word--; and

Col. 72, line 45, delete "fill" and substitute therefor --full--.

Signed and sealed this 8th day of October 1974.

(SEAL)
Attest:

McCOY M. GIBSON JR.
Attesting Officer

C. MARSHALL DANN
Commissioner of Patents